United States Patent
Schmidt et al.

(10) Patent No.: US 11,790,722 B2
(45) Date of Patent: Oct. 17, 2023

(54) SINGLE-SIDED STORAGE LOCKER SYSTEMS ACCESSED AND CONTROLLED USING MACHINE-READABLE CODES SCANNED BY MOBILE PHONES AND COMPUTING DEVICES

(71) Applicant: Best Lockers, LLC, Orlando, FL (US)

(72) Inventors: Mark Christopher Schmidt, Windermere, FL (US); Wesley Edward Swogger, Fairfax Station, VA (US); Kevin George Miranda, Ocoee, FL (US)

(73) Assignee: BEST LOCKERS, LLC, Orlando, FL (US)

( * ) Notice: Subject to any disclaimer, the term of this patent is extended or adjusted under 35 U.S.C. 154(b) by 222 days.

(21) Appl. No.: 17/399,077

(22) Filed: Aug. 11, 2021

(65) Prior Publication Data

US 2022/0051514 A1    Feb. 17, 2022

Related U.S. Application Data

(63) Continuation-in-part of application No. 16/990,381, filed on Aug. 11, 2020, now Pat. No. 11,631,295.

(51) Int. Cl.
*G07F 17/12* (2006.01)
*G06Q 20/32* (2012.01)
(Continued)

(52) U.S. Cl.
CPC ............ *G07F 17/12* (2013.01); *G06K 7/1417* (2013.01); *G06Q 10/02* (2013.01);
(Continued)

(58) Field of Classification Search
CPC ............ G07C 9/00309; G07C 9/00896; G07C 9/00817; G06V 20/00; G06Q 10/02;
(Continued)

(56) References Cited

U.S. PATENT DOCUMENTS 689,243 A    12/1901  Sutton
1,409,312 A   3/1922  Pippin
(Continued)

FOREIGN PATENT DOCUMENTS

BE    1024241 B1    1/2018
CN    2558420 Y     7/2003
(Continued)

OTHER PUBLICATIONS

International Search Report dated Feb. 7, 2022 issued in PCT International Application No. PCT/US2021/045463 (pp. 15).

(Continued)

*Primary Examiner* — Yong Hang Jiang
(74) *Attorney, Agent, or Firm* — Thomas J. Perkowski, ESQ., PC

(57) ABSTRACT

A single-sided ride storage locker system deployed at any site within a facility, and providing guest visitors with access control enabled by scanning multi-level machine-readable codes using mobile scanning computing systems, such as web-enabled smartphones with digital cameras and mobile application support. The storage locker system supports automated modes of discovering and finding where a guest's rented locker is located within the facility and its sites at any moment in time, simply by using the guest' smart phone to scan a device-level code, a site-level code, a facility-level code or a discovery-level code, posted anywhere within the facility or any site, without need for using a physical locker lookup kiosk or other conventional systems and methods.

9 Claims, 120 Drawing Sheets

(51) Int. Cl.

| | | |
|---|---|---|
| *G07C 9/00* | (2020.01) | |
| *G06Q 10/02* | (2012.01) | |
| *G06Q 30/06* | (2023.01) | |
| *G06K 7/14* | (2006.01) | |
| *G06K 9/00* | (2022.01) | |
| *G06Q 30/0645* | (2023.01) | |
| *G06V 20/00* | (2022.01) | |

(52) U.S. Cl.
CPC ..... *G06Q 20/3276* (2013.01); *G06Q 30/0645* (2013.01); *G06V 20/00* (2022.01); *G07C 9/00309* (2013.01); *G07C 9/00817* (2013.01); *G07C 9/00896* (2013.01); *G07C 2009/00476* (2013.01); *G07C 2009/00825* (2013.01); *G07C 2009/00841* (2013.01)

(58) Field of Classification Search
CPC ............ G06Q 20/3276; G06Q 30/0645; G07F 7/1025; G07F 9/002; G07F 17/12; G07F 9/001; G06K 7/1417
See application file for complete search history.

(56) References Cited

U.S. PATENT DOCUMENTS

| | | |
|---|---|---|
| 1,411,496 A | 4/1922 | Herrmann |
| 1,681,093 A | 8/1928 | Capek |
| 1,732,030 A | 10/1929 | Runyan |
| 3,447,735 A | 6/1969 | Whitney |
| 3,978,959 A | 9/1976 | Muellner |
| 4,177,589 A | 12/1979 | Villa |
| 4,494,805 A | 1/1985 | Washburn |
| 4,496,896 A | 1/1985 | Melocik |
| 4,654,482 A | 3/1987 | Deangelis |
| 4,698,630 A | 10/1987 | Ellsberg |
| 4,841,132 A | 6/1989 | Kajitani |
| D304,110 S | 10/1989 | Yang |
| 5,157,687 A | 10/1992 | Tymes |
| 5,169,222 A | 12/1992 | Bollore |
| 5,231,272 A | 7/1993 | Mardon |
| 5,280,498 A | 1/1994 | Tymes |
| 5,288,976 A | 2/1994 | Citron |
| D349,796 S | 8/1994 | Wimberley |
| 5,345,379 A | 9/1994 | Brous |
| 5,429,290 A | 7/1995 | Greene, Jr. |
| 5,448,046 A | 9/1995 | Swartz |
| 5,483,052 A | 1/1996 | Smith, III |
| 5,490,217 A | 2/1996 | Wang |
| 5,506,697 A | 4/1996 | Li |
| 5,523,666 A | 6/1996 | Hoelzl |
| 5,547,684 A | 8/1996 | Vainberg |
| 5,635,694 A | 6/1997 | Tuhro |
| 5,804,803 A | 9/1998 | Cragun |
| 5,815,657 A | 9/1998 | Williams |
| 5,825,002 A | 10/1998 | Roslak |
| 5,842,713 A | 12/1998 | Barnes |
| 5,869,819 A | 2/1999 | Knowles |
| 5,894,277 A | 4/1999 | Keskin |
| 5,902,353 A | 5/1999 | Reber |
| 5,903,729 A | 5/1999 | Reber |
| 5,905,251 A | 5/1999 | Knowles |
| 5,918,213 A | 6/1999 | Bernard |
| 5,923,884 A | 7/1999 | Peyret |
| 5,929,276 A | 7/1999 | Kirkovits |
| 5,930,767 A | 7/1999 | Reber |
| 5,933,829 A | 8/1999 | Durst |
| 5,938,726 A | 8/1999 | Reber |
| 5,940,000 A | 8/1999 | Dykema |
| 5,940,595 A | 8/1999 | Reber |
| 5,946,660 A | 8/1999 | McCarty |
| D415,073 S | 10/1999 | Meehan |
| 5,971,277 A | 10/1999 | Cragun |
| 5,978,773 A | 11/1999 | Hudetz |
| 5,979,757 A | 11/1999 | Tracy |
| 5,992,752 A | 11/1999 | Wilz, Sr. |
| 6,012,102 A | 1/2000 | Shachar |
| 6,027,024 A | 2/2000 | Knowles |
| 6,064,979 A | 5/2000 | Perkowski |
| 6,070,793 A | 6/2000 | Reichl |
| 6,073,958 A | 6/2000 | Gagnon |
| 6,108,656 A | 8/2000 | Durst |
| 6,139,061 A | 10/2000 | Lewis |
| 6,165,773 A | 12/2000 | New |
| 6,185,773 B1 | 2/2001 | Goedde |
| 6,199,048 B1 | 3/2001 | Hudetz |
| D446,478 S | 8/2001 | Wu |
| 6,311,214 B1 | 10/2001 | Rhoads |
| 6,321,991 B1 | 11/2001 | Knowles |
| 6,321,992 B1 | 11/2001 | Knowles |
| 6,345,764 B1 | 2/2002 | Knowles |
| 6,375,078 B1 | 4/2002 | Russell |
| 6,384,717 B1 | 5/2002 | Devolpi |
| 6,386,453 B1 | 5/2002 | Russell |
| 6,400,272 B1 | 6/2002 | Holtzman |
| 6,412,699 B1 | 7/2002 | Russell |
| 6,464,139 B1 | 10/2002 | Wilz, Sr. |
| 6,491,122 B2 | 12/2002 | Leitner |
| 6,505,776 B1 | 1/2003 | Wilz, Sr. |
| 6,510,997 B1 | 1/2003 | Wilz, Sr. |
| 6,525,510 B1 | 2/2003 | Ayano |
| 6,542,927 B2 | 4/2003 | Rhoads |
| 6,568,595 B1 | 5/2003 | Russell |
| 6,622,917 B1 | 9/2003 | Knowles |
| 6,622,919 B1 | 9/2003 | Wilz |
| 6,625,581 B1 | 9/2003 | Perkowski |
| 6,655,180 B2 | 12/2003 | Gokcebay |
| 6,694,043 B2 | 2/2004 | Seder |
| 6,694,217 B2 | 2/2004 | Bloom |
| 6,791,450 B2 | 9/2004 | Gokcebay |
| 6,802,000 B1 | 10/2004 | Greene |
| 6,806,807 B2 | 10/2004 | Cayne |
| 6,827,273 B2 | 12/2004 | Wilz, Sr. |
| 6,850,153 B1 | 2/2005 | Murakami |
| 6,868,433 B1 | 3/2005 | Philyaw |
| 6,879,243 B1 | 4/2005 | Booth |
| 6,882,269 B2 | 4/2005 | Moreno |
| 6,942,150 B2 | 9/2005 | Knowles |
| 6,961,712 B1 | 11/2005 | Perkowski |
| 6,961,713 B2 | 11/2005 | Perkowski |
| 6,980,797 B1 | 12/2005 | Tuulos |
| 6,988,662 B2 | 1/2006 | Russell |
| 6,999,825 B2 | 2/2006 | Inomata |
| 7,012,053 B1 | 3/2006 | Barnabas |
| 7,012,503 B2 | 3/2006 | Nielsen |
| 7,023,177 B1 | 4/2006 | Bussinger |
| 7,068,149 B2 | 6/2006 | Lee |
| 7,089,199 B2 | 8/2006 | Perkowski |
| 7,108,171 B1 | 9/2006 | Ergo |
| 7,143,055 B1 | 11/2006 | Perkowski |
| 7,176,782 B2 | 2/2007 | Shitan |
| 7,183,925 B2 | 2/2007 | Marshall |
| 7,221,273 B1 * | 5/2007 | Seyfarth ................. G07F 17/12 70/99 |
| 7,323,967 B2 | 1/2008 | Booth |
| 7,337,968 B2 | 3/2008 | Wilz, Sr. |
| 7,341,191 B2 | 3/2008 | Russell |
| 7,430,528 B2 | 9/2008 | Perkowski |
| 7,434,674 B1 | 10/2008 | Bain |
| 7,438,148 B1 | 10/2008 | Crea |
| 7,441,710 B2 | 10/2008 | Perkowski |
| 7,445,300 B2 | 11/2008 | Collins |
| 7,458,514 B1 | 12/2008 | Kitada |
| 7,477,132 B2 | 1/2009 | Mayer |
| 7,493,908 B2 | 2/2009 | Carter |
| 7,516,094 B2 | 4/2009 | Perkowski |
| 7,526,122 B2 | 4/2009 | Usuda |
| 7,533,040 B2 | 5/2009 | Perkowski |
| 7,548,988 B2 | 6/2009 | Philyaw |
| 7,591,335 B2 | 9/2009 | Howell |
| 7,659,891 B2 | 2/2010 | Mackenzie |
| 7,705,731 B2 | 4/2010 | Trammell, III |
| 7,711,598 B2 | 5/2010 | Perkowski |
| 7,739,353 B2 | 6/2010 | Philyaw |

(56) References Cited

U.S. PATENT DOCUMENTS

| | | |
|---|---|---|
| 7,748,511 B1 | 7/2010 | Maher |
| 7,764,176 B2 | 7/2010 | Zhang |
| 7,785,167 B2 | 8/2010 | Friend-Douglass |
| 7,819,316 B2 | 10/2010 | Philyaw |
| 7,819,719 B2 | 10/2010 | Tye |
| 7,822,829 B2 | 10/2010 | Philyaw |
| 7,828,399 B1 | 11/2010 | Bass |
| 7,844,492 B2 | 11/2010 | Perkowski |
| 7,848,948 B2 | 12/2010 | Perkowski |
| 7,865,275 B2 | 1/2011 | Palmer |
| 7,866,422 B2 | 1/2011 | Peters |
| 7,880,585 B1 | 2/2011 | Aronson |
| 7,900,952 B2 | 3/2011 | Cone, II |
| 7,904,333 B1 | 3/2011 | Perkowski |
| 8,172,033 B2 | 5/2012 | Corbett |
| 8,239,251 B2 | 8/2012 | Wellman |
| 8,253,533 B2 | 8/2012 | Jones |
| RE43,680 E | 9/2012 | Kitada |
| 8,366,135 B2 | 2/2013 | Asbach |
| 8,368,700 B1 | 2/2013 | Difrancesco |
| 8,390,629 B2 | 3/2013 | Anderson |
| 8,410,901 B2 | 4/2013 | Mullin |
| 8,463,765 B2 | 6/2013 | Lesavich |
| 8,500,012 B2 | 8/2013 | Amdahl |
| 8,639,578 B2 | 1/2014 | Barber |
| 8,714,452 B2 | 5/2014 | Amdahl |
| 8,854,184 B2 | 10/2014 | Mullin |
| 8,854,185 B2 | 10/2014 | Mullin |
| 8,892,463 B2 | 11/2014 | Mullin |
| 8,990,110 B2 | 3/2015 | Mullin |
| 9,010,769 B1 | 4/2015 | Munive |
| 9,050,879 B2 | 6/2015 | Guzzetta |
| 9,138,638 B2 | 9/2015 | Bastawros |
| 9,145,067 B1 | 9/2015 | Dahlen |
| 9,158,946 B2 | 10/2015 | Amdahl |
| 9,284,054 B2 | 3/2016 | Saint-Jalmes |
| 9,339,671 B1 | 5/2016 | Raj |
| 9,418,345 B1 | 8/2016 | Meehan |
| 9,430,892 B2 | 8/2016 | Amdahl |
| 9,558,608 B2 | 1/2017 | Amdahl |
| 9,610,510 B2 | 4/2017 | Comploi |
| 9,656,682 B2 | 5/2017 | Ahlemeier |
| 9,706,835 B2 | 7/2017 | Zaniker |
| 9,795,214 B2 | 10/2017 | Zaniker |
| 9,818,217 B2 | 11/2017 | Tena |
| 9,826,049 B2 | 11/2017 | Lim |
| 9,889,979 B2 | 2/2018 | Nelson |
| 9,936,804 B2 | 4/2018 | Zaniker |
| 9,937,932 B2 | 4/2018 | Nemeth |
| 9,943,769 B2 | 4/2018 | Comploi |
| 9,948,603 B1 | 4/2018 | Lee |
| 9,975,031 B2 | 5/2018 | Bastawros |
| 9,984,356 B2 | 5/2018 | Janis |
| 10,040,611 B2 | 8/2018 | Nelson |
| 10,052,246 B2 | 8/2018 | Lozano |
| 10,064,123 B2 | 8/2018 | Bari |
| 10,068,403 B1 * | 9/2018 | McGehee ............ G02B 27/017 |
| 10,096,183 B2 | 10/2018 | Nitu |
| 10,140,191 B2 | 11/2018 | Kaulgud |
| 10,182,952 B1 | 1/2019 | Nelson-Herron |
| 10,210,474 B2 | 2/2019 | Robinson |
| 10,234,087 B2 | 3/2019 | Spriggins |
| 10,249,128 B1 | 4/2019 | Yang |
| 10,322,675 B2 | 6/2019 | Naboulsi |
| 10,346,614 B1 | 7/2019 | Ko |
| 10,435,093 B2 | 10/2019 | White |
| 10,460,539 B2 | 10/2019 | Zielkowski |
| 10,474,797 B2 | 11/2019 | Lowenthal |
| 10,504,313 B2 | 12/2019 | Dautz |
| 10,536,211 B2 | 1/2020 | Leroux |
| 10,594,929 B2 | 3/2020 | Tyson |
| 10,596,930 B2 | 3/2020 | Chiesa |
| 10,621,811 B2 | 4/2020 | Tovey |
| 10,660,806 B1 | 5/2020 | Nelson-Herron |
| 10,672,211 B2 | 6/2020 | Flynn |
| 10,679,239 B2 | 6/2020 | Khoyilar |
| 10,693,714 B2 | 6/2020 | Teo |
| 10,701,074 B2 | 6/2020 | Tsao |
| 10,755,508 B2 | 8/2020 | Ghorpade |
| 10,779,642 B2 | 9/2020 | Zaniker |
| 10,814,926 B2 | 10/2020 | White |
| 10,817,484 B2 | 10/2020 | Rana |
| 10,820,265 B2 | 10/2020 | Schneider |
| 10,827,358 B2 | 11/2020 | Cui |
| 10,839,629 B2 | 11/2020 | Jones |
| 10,846,970 B2 | 11/2020 | Ruggiero |
| 10,861,267 B2 | 12/2020 | Aman |
| 10,915,856 B2 | 2/2021 | Fee |
| 10,965,684 B2 | 3/2021 | Achtermann |
| 10,992,711 B2 | 4/2021 | Hu |
| 11,038,838 B2 | 6/2021 | Lau |
| 11,082,839 B2 | 8/2021 | Jacobson |
| 2002/0035515 A1 | 3/2002 | Moreno |
| 2002/0180582 A1 | 12/2002 | Nielsen |
| 2003/0022138 A1 | 1/2003 | Korala |
| 2003/0141840 A1 | 7/2003 | Sanders |
| 2003/0227550 A1 | 12/2003 | Manico |
| 2003/0236601 A1 | 12/2003 | McLeod |
| 2004/0046014 A1 | 3/2004 | Russell |
| 2005/0040093 A1 | 2/2005 | Yanagisawa |
| 2005/0040931 A1 | 2/2005 | Shitan |
| 2005/0044906 A1 | 3/2005 | Spielman |
| 2005/0068178 A1 | 3/2005 | Lee |
| 2005/0090981 A1 | 4/2005 | Gaegauf |
| 2005/0171663 A1 | 8/2005 | Mittelsteadt |
| 2005/0179349 A1 | 8/2005 | Booth |
| 2005/0190037 A1 | 9/2005 | Shitan |
| 2005/0283043 A1 | 12/2005 | Sisk |
| 2007/0001804 A1 | 1/2007 | Lanier |
| 2007/0021032 A1 | 1/2007 | Tye |
| 2007/0208483 A1 | 9/2007 | Rabin |
| 2008/0010105 A1 | 1/2008 | Rose |
| 2008/0054704 A1 | 3/2008 | Friend-Douglass |
| 2008/0103696 A1 | 5/2008 | Cheok |
| 2008/0170355 A1 | 7/2008 | Kyriakides |
| 2009/0033445 A1 | 2/2009 | Menard |
| 2009/0033456 A1 | 2/2009 | Castillo |
| 2009/0153566 A1 | 6/2009 | Anderson |
| 2009/0174363 A1 | 7/2009 | Maher |
| 2009/0200838 A1 | 8/2009 | Cone, II |
| 2009/0257564 A1 | 10/2009 | Kito |
| 2009/0267564 A1 | 10/2009 | Gerber |
| 2010/0030590 A1 | 2/2010 | Sodaro |
| 2010/0089846 A1 | 4/2010 | Navarro Ruiz |
| 2010/0102780 A1 | 4/2010 | Koh |
| 2010/0228405 A1 | 9/2010 | Morgal |
| 2010/0287057 A1 | 11/2010 | Aihara |
| 2011/0074350 A1 | 3/2011 | Kocher |
| 2011/0074541 A1 | 3/2011 | Jones |
| 2011/0140656 A1 | 6/2011 | Starr |
| 2011/0163520 A1 | 7/2011 | Fair |
| 2011/0208710 A1 | 8/2011 | Lesavich |
| 2011/0301748 A1 | 12/2011 | Lecarpentier |
| 2011/0303371 A1 | 12/2011 | Harrison |
| 2012/0007848 A1 | 1/2012 | Han |
| 2012/0078413 A1 | 3/2012 | Baker, Jr. |
| 2012/0098493 A1 | 4/2012 | Budike |
| 2012/0138548 A1 | 6/2012 | Young |
| 2012/0203672 A1 | 8/2012 | Morgan |
| 2012/0203673 A1 | 8/2012 | Morgan |
| 2012/0203695 A1 | 8/2012 | Morgan |
| 2012/0312562 A1 | 12/2012 | Woehrle |
| 2012/0324966 A1 | 12/2012 | Dallaire |
| 2013/0036456 A1 | 2/2013 | Boysen |
| 2013/0073377 A1 | 3/2013 | Heath |
| 2013/0117078 A1 | 5/2013 | Weik, III |
| 2013/0173242 A1 | 7/2013 | Anderson |
| 2013/0197992 A1 | 8/2013 | Bao |
| 2013/0254122 A1 | 9/2013 | Mullin |
| 2013/0292468 A1 | 11/2013 | Amdahl |
| 2014/0035721 A1 | 2/2014 | Heppe |
| 2014/0058870 A1 | 2/2014 | Zhao |
| 2014/0203076 A1 | 7/2014 | Amdahl |
| 2014/0309842 A1 | 10/2014 | Jefferies |

(56) References Cited

U.S. PATENT DOCUMENTS

| | | |
|---|---|---|
| 2014/0316918 A1 | 10/2014 | Zaniker |
| 2014/0330407 A1 | 11/2014 | Corder |
| 2014/0354403 A1 | 12/2014 | Zaniker |
| 2015/0004873 A1 | 1/2015 | Schecter |
| 2015/0102630 A1 | 4/2015 | Guzzetta |
| 2015/0102711 A1 | 4/2015 | Zaniker |
| 2015/0112887 A1 | 4/2015 | Camp |
| 2015/0120602 A1 | 4/2015 | Huffman |
| 2015/0170164 A1 | 6/2015 | Marsico |
| 2015/0179006 A1 | 6/2015 | Von Zurmuehlen |
| 2015/0199610 A1 | 7/2015 | Hershberg |
| 2015/0254760 A1* | 9/2015 | Pepper ............... G07F 17/12 705/5 |
| 2015/0255226 A1 | 9/2015 | Rouvala |
| 2015/0356801 A1* | 12/2015 | Nitu ................. G07F 9/002 340/5.61 |
| 2016/0035166 A1 | 2/2016 | Amdahl |
| 2016/0066733 A1 | 3/2016 | Gozar |
| 2016/0098678 A1 | 4/2016 | Levy |
| 2016/0133074 A1* | 5/2016 | Amdahl ............ G07C 9/00571 340/5.54 |
| 2016/0133075 A1 | 5/2016 | Amdahl |
| 2016/0180623 A1 | 6/2016 | Rashkovan |
| 2016/0189147 A1 | 6/2016 | Vanczak |
| 2016/0200261 A1 | 7/2016 | White |
| 2017/0016249 A1 | 1/2017 | Johnson |
| 2017/0032597 A1 | 2/2017 | Johnson |
| 2017/0059534 A1 | 3/2017 | Mcadams |
| 2017/0098273 A1 | 4/2017 | Meehan |
| 2017/0116449 A1 | 4/2017 | Kotlarsky |
| 2017/0157521 A1 | 6/2017 | Comploi |
| 2017/0244262 A1 | 8/2017 | Schadow |
| 2017/0250834 A1 | 8/2017 | Hsiao |
| 2017/0266069 A1 | 9/2017 | Lozano |
| 2017/0311715 A1 | 11/2017 | Zaniker |
| 2017/0347885 A1 | 12/2017 | Tan |
| 2017/0367909 A1 | 12/2017 | Barnes |
| 2018/0040181 A1 | 2/2018 | Groeger |
| 2018/0041493 A1 | 2/2018 | Wilkinson |
| 2018/0061157 A1 | 3/2018 | Zielkowski |
| 2018/0091503 A1 | 3/2018 | Tang |
| 2018/0101833 A1 | 4/2018 | Parekh |
| 2018/0109308 A1 | 4/2018 | Leroux |
| 2018/0135987 A1 | 5/2018 | Evans |
| 2018/0139290 A1 | 5/2018 | Lim |
| 2018/0162613 A1 | 6/2018 | Nelson |
| 2018/0165638 A1 | 6/2018 | Wilkinson |
| 2018/0165640 A1 | 6/2018 | Wilkinson |
| 2018/0182194 A1 | 6/2018 | Schmidt-Lackner |
| 2018/0191719 A1 | 7/2018 | Tsao |
| 2018/0315012 A1 | 11/2018 | Janis |
| 2018/0331386 A1 | 11/2018 | Koh |
| 2018/0337820 A1 | 11/2018 | Chen |
| 2018/0350144 A1 | 12/2018 | Rathod |
| 2018/0350177 A1 | 12/2018 | Dautz |
| 2018/0365641 A1 | 12/2018 | Zhu |
| 2019/0021921 A1 | 1/2019 | Nelson-Herron |
| 2019/0035186 A1 | 1/2019 | Nitu |
| 2019/0042175 A1 | 2/2019 | Shah |
| 2019/0054972 A1 | 2/2019 | Meehan |
| 2019/0056745 A1 | 2/2019 | Meehan |
| 2019/0080574 A1 | 3/2019 | Cai |
| 2019/0108430 A1 | 4/2019 | Coppedge |
| 2019/0132329 A1 | 5/2019 | Verberkt |
| 2019/0172011 A1 | 6/2019 | Robinson |
| 2019/0195443 A1 | 6/2019 | Spriggins |
| 2019/0236873 A1 | 8/2019 | Estill |
| 2019/0246262 A1 | 8/2019 | Salkintzis |
| 2019/0248439 A1 | 8/2019 | Wang |
| 2019/0259232 A1 | 8/2019 | Gopal |
| 2019/0281030 A1 | 9/2019 | Isaacson |
| 2019/0304216 A1 | 10/2019 | Mendelson |
| 2019/0325691 A1 | 10/2019 | Tovey |
| 2019/0329125 A1 | 10/2019 | Peretz |
| 2019/0333304 A1 | 10/2019 | Flynn |
| 2019/0347532 A1 | 11/2019 | Amisar |
| 2019/0379739 A1 | 12/2019 | Schulz |
| 2019/0386954 A1 | 12/2019 | Lau |
| 2020/0045546 A1 | 2/2020 | Zhou |
| 2020/0059363 A1 | 2/2020 | Lobo |
| 2020/0068029 A1 | 2/2020 | Lim |
| 2020/0112614 A1 | 4/2020 | Lim |
| 2020/0184758 A1 | 6/2020 | Groeger |
| 2020/0193375 A1 | 6/2020 | Santangeli |
| 2020/0220788 A1 | 7/2020 | Ramanathan |
| 2020/0226706 A1 | 7/2020 | Ramarao |
| 2020/0229596 A1 | 7/2020 | Finney |
| 2020/0268577 A1 | 8/2020 | Lau |
| 2020/0286354 A1 | 9/2020 | Bloom |
| 2020/0301748 A1 | 9/2020 | Gupta |
| 2020/0357211 A1 | 11/2020 | Mendelson |
| 2020/0385046 A1 | 12/2020 | Vollmar |
| 2020/0394436 A1 | 12/2020 | Rakshit |
| 2021/0049846 A1 | 2/2021 | Kashi |
| 2021/0126810 A1 | 4/2021 | Dinh |
| 2021/0142277 A1 | 5/2021 | Fee |
| 2022/0051509 A1 | 2/2022 | Schmidt |
| 2022/0051510 A1 | 2/2022 | Schmidt |
| 2022/0051511 A1 | 2/2022 | Schmidt |
| 2022/0051512 A1 | 2/2022 | Schmidt |
| 2022/0051513 A1 | 2/2022 | Schmidt |
| 2022/0051514 A1 | 2/2022 | Schmidt |
| 2022/0051515 A1 | 2/2022 | Schmidt |

FOREIGN PATENT DOCUMENTS

| | | |
|---|---|---|
| CN | 1565673 A | 1/2005 |
| CN | 201940046 U | 8/2011 |
| CN | 202208341 U | 5/2012 |
| CN | 207473750 U | 6/2018 |
| CN | 207565656 U | 7/2018 |
| CN | 109102359 A | 12/2018 |
| CN | 208233253 | 12/2018 |
| EP | 0645728 A2 | 3/1995 |
| EP | 2887240 | 6/2015 |
| EP | 2887240 A1 | 6/2015 |
| EP | 3668467 A1 | 2/2019 |
| KR | 101272562 B1 | 6/2013 |
| WO | 2005076233 | 8/2005 |
| WO | 2006036913 A2 | 4/2006 |
| WO | 2007098571 A1 | 9/2007 |
| WO | 2009079514 A1 | 6/2009 |
| WO | 2010036952 A2 | 4/2010 |
| WO | 2010067006 | 6/2010 |
| WO | 2012050891 | 4/2012 |
| WO | 2013049259 A2 | 4/2013 |
| WO | 2013115815 | 8/2013 |
| WO | 2013115815 A1 | 8/2013 |
| WO | 2014014362 A1 | 1/2014 |
| WO | 2017059534 A1 | 4/2017 |
| WO | 2019035888 | 2/2019 |
| WO | 2019035888 A1 | 2/2019 |

OTHER PUBLICATIONS

Written Opinion dated Feb. 7, 2022 issued in PCT International Application No. PCT/US2021/045463 (pp. 22).
International Search Report dated Feb. 1, 2022 issued in PCT International Application No. PCT/US2021/045456 (pp. 13).
Written Opinion dated Feb. 1, 2022 issued in PCT International Application No. PCT/US2021/045456 (pp. 42).
International Search Report dated Jan. 26, 2022 issued in PCT International Application No. PCT/US2021/045459 (pp. 8).
Written Opinion dated Jan. 26, 2022 issued in PCT International Application No. PCT/US2021/045459 (pp. 36).
International Search Report dated Dec. 15, 2021 issued in PCT International Application No. PCT/US2021/045461 (pp. 9).
Written Opinion dated Dec. 15, 2021 issued in PCT International Application No. PCT/US2021/045461 (pp. 11).
Rydables Inc. "Rydables" May 2021 (pp. 25).
Office Action (Non-Final Rejection) dated Apr. 25, 2022 for U.S. Appl. No. 16/990,381 (pp. 1-12).

(56) References Cited

OTHER PUBLICATIONS

US Trademark Registration No. 5547684 for the mark "Rydables" granted to Ridabl, LLC on Aug. 21, 2018 (pp. 1-29).
Office Action dated Jun. 9, 2020 for U.S. Appl. No. 16/152,144 (pp. 1-195).
Office Action (Non-Final Rejection) dated May 12, 2022 for U.S. Appl. No. 17/242,922 (pp. 1-12).

* cited by examiner

Locker Status Light Guide
from GoPod® Operations Manual

| | |
|---|---|
|  | Solid Green, Indicates the locker is communicating & Available for Rent |
|  | Solid Red, Indicates the locker is communicating & is Rented |
|  | Slow Flashing Red, Indicates the locker is Out of Service |
|  | Blinking Red & Green, Indicates the Rental is Expired |
|  | Rapidly Blinking Green, Indicates the locker was rented but not accessed |
|  | Slow Flashing Green, Indicates the door is open on Available Locker |
|  | Steady Yellow, Indicates Keypad lost Communication with Server |
|  | Solid Read & Flashing Green, Indicates the door is open on Rented Locker |
|  | Blinking Yellow, Indicates there is a communication failure with Keypad |
|  | Rapid Flashing Yellow, Indicates the Keypad is ready to be addressed |
|  | Flashing Read & Green, Indicates the entered PIN is incorrect or incomplete |
|  | Solid Red-Flashing Yellow, Indicates a key is pressed on Keypad -Rented Locker |
|  | Solid Green-Flashing Yellow, Indicates a key is pressed on Keypad on Available Locker |

(PRIOR ART)

FIG. 2

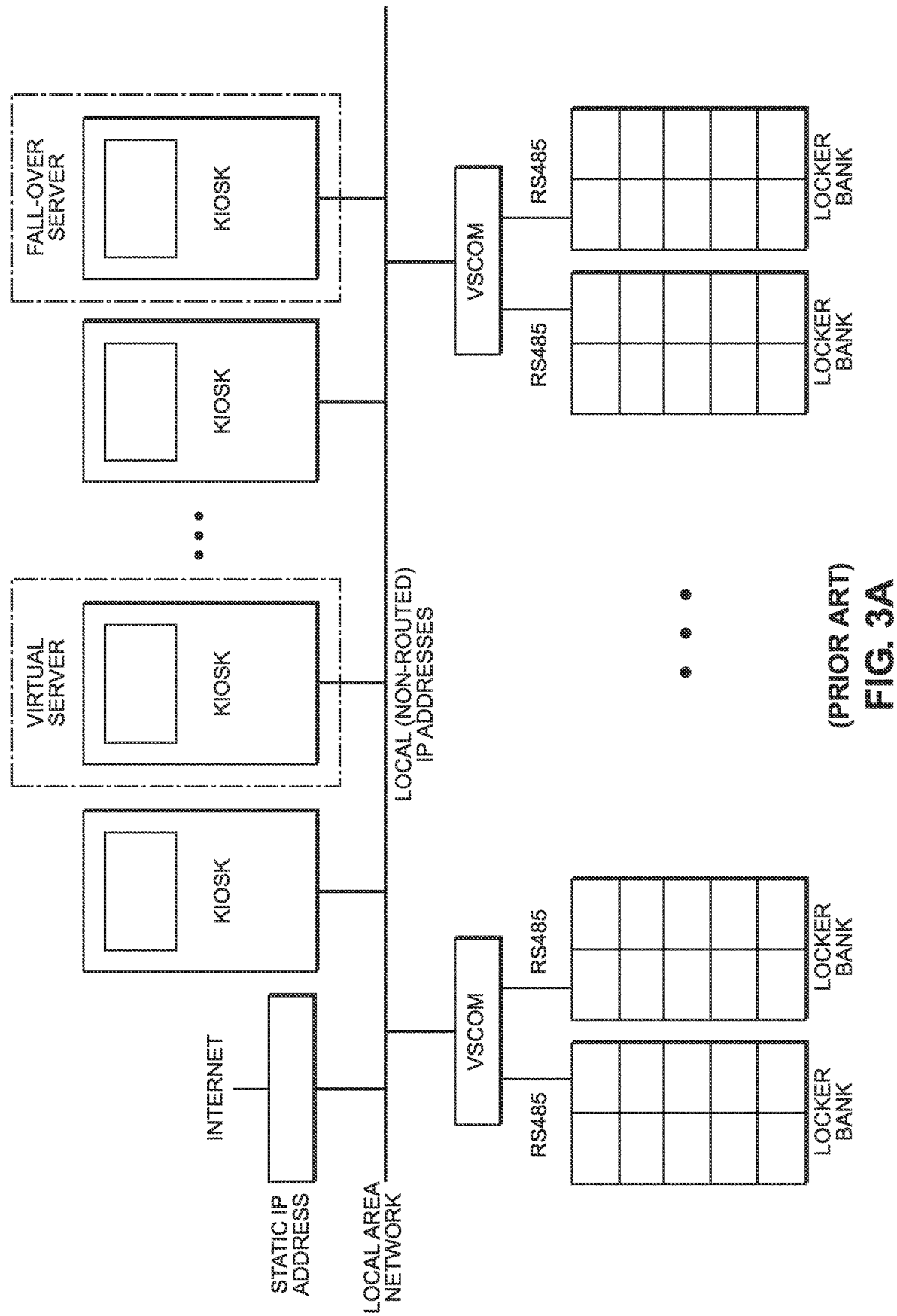

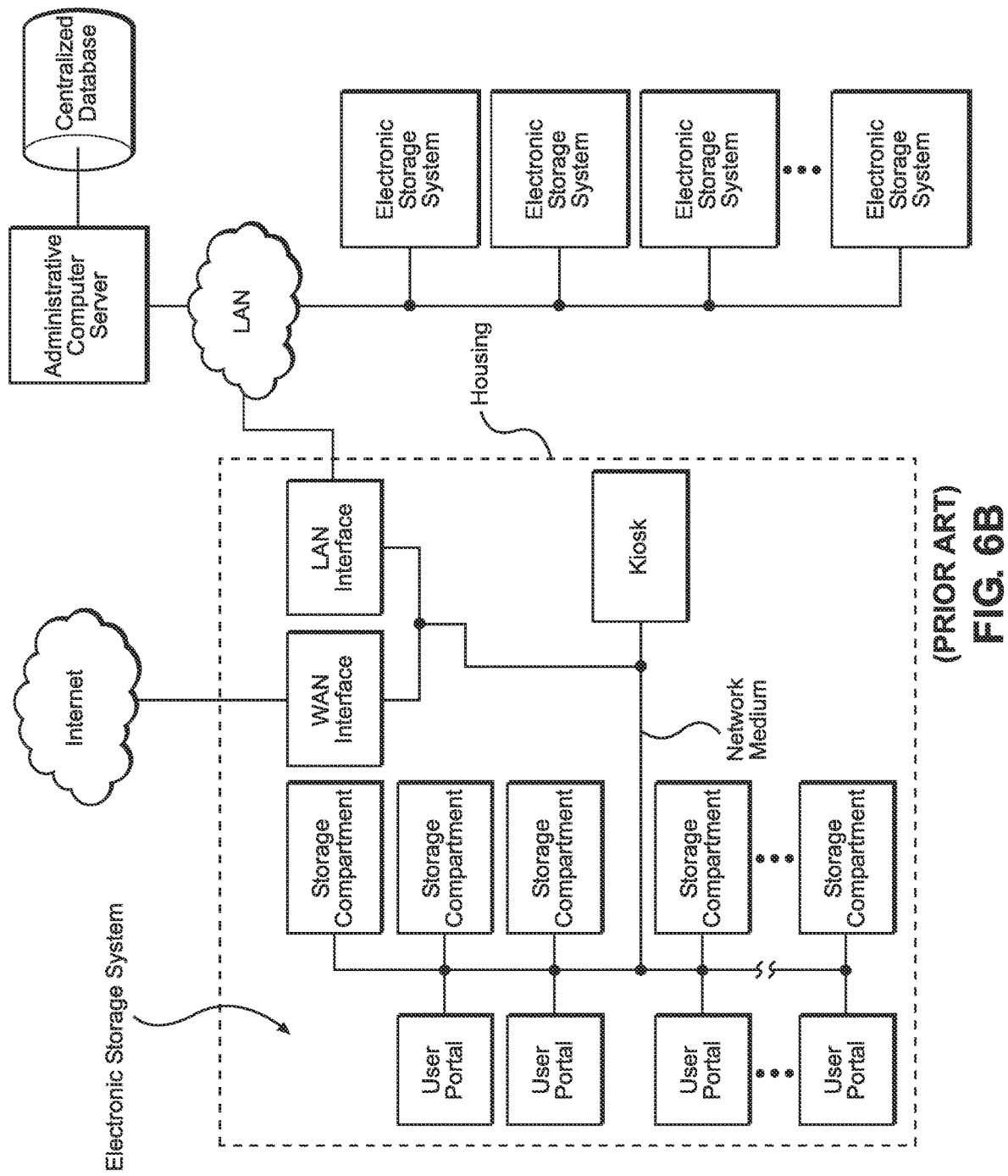

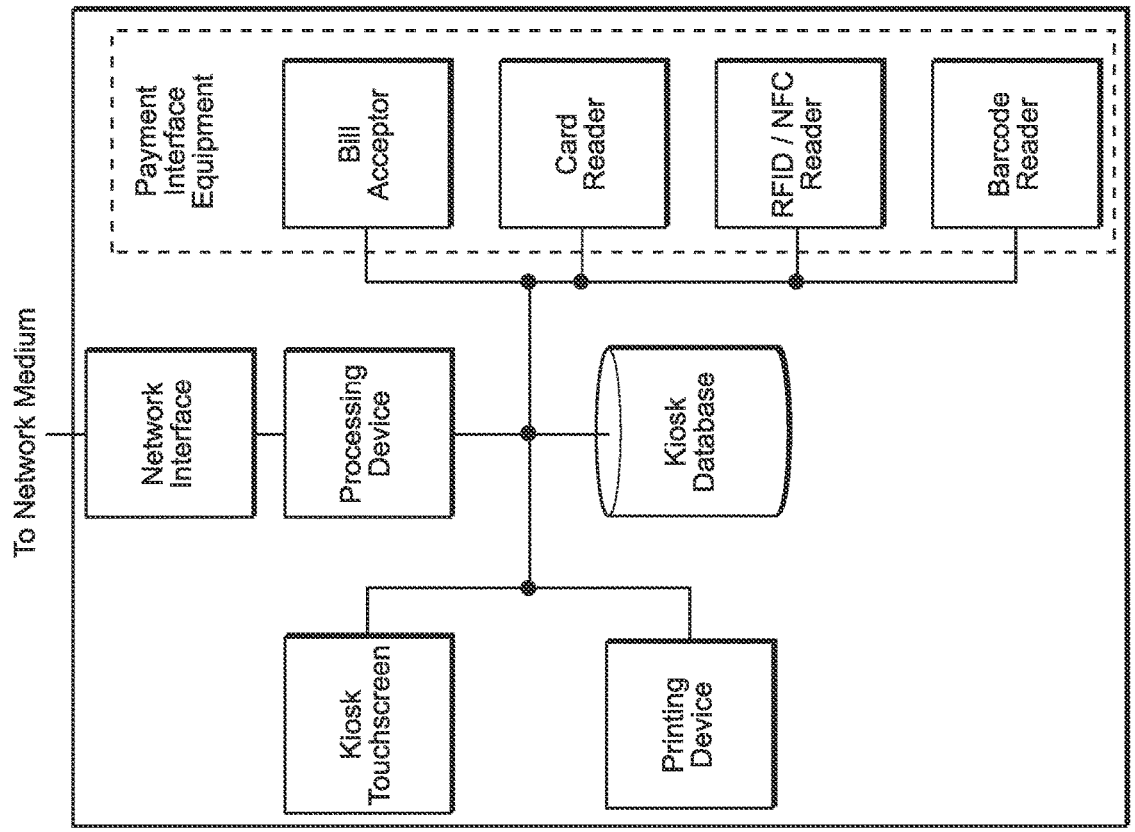
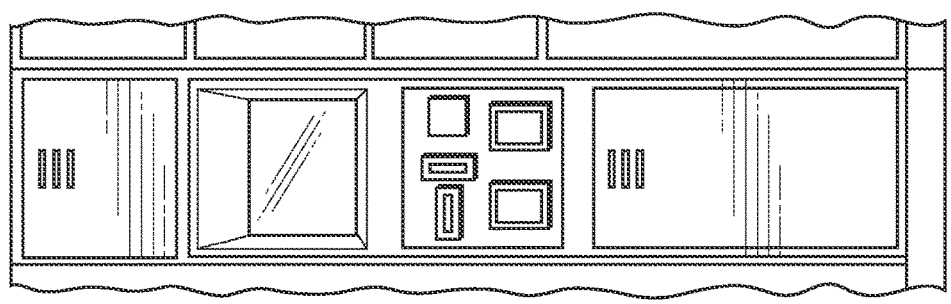
FIG. 6C (PRIOR ART)

RULE-BASED TRIGGERS FOR AUTOMATED RE-DIRECTION OF TRANSACTIONAL WORKFLOW UPON AUTOMATED DETECTION THEREOF DURING QR DRIVEN ACCESS CONTROL PROCESSES EXECUTING ON SYSTEM SERVERS

TRIGGER RULE #1 :

If all or specific size Lockers are sold out at specific Site-Level,
Then Re-Direct to Facility-Level In the Transactional Workflow

TRIGGER RULE #2

If a different (new) mobile phone scans a Door-Level QR code on a locker that is currently rented, then the system will displays a message in the web browser of the mobile phone: "this locker is already rented by a different user, if you would like to rent a locker, look for a GREEN LED".

TRIGGER RULE #3

If a guest re-scans a Door-Level code upon returning to her locker, and the mobile phone performing the scanning is recognized by its stored Transaction Identifier, then the system will pre-populate the PIN of the guest into the PIN field of the web browser application.

TRIGGER RULE #4

If a guest's mobile smartphone scans a Door-Level QR code and Internet operation is detected as unavailable, then mobile phone should load its local Bluetooth (BT) communication GUI to establish a wireless BT communication connection between the Locker Unit and mobile smartphone and invite the user to enter his or her PIN code into the locker unit so it can be opened and belongings retrieved

TRIGGER RULE #5

If a guest's mobile smartphone scans a Facility-Level or Site-Level QR Code, and the mobile phone does not receive an Internet Server Connection Status from System Network Servers, then load and display a GUI on mobile smartphone with message requesting the guest user to attempt to scan a Door-Level QR code on a Locker Unit at Local Kiosk Server System 170 (using WIFI) to rent a new locker unit or open a currently rented locker unit, as the case may be.

FIG. 11C

EXEMPLARY MULTI-LEVEL MACHINE-READABLE CODE HIERARCHY EMPLOYED IN THE WIRELESS ACCESS CONTROL SYSTEM NETWORK

| QR code type | URL (for example only) | Additional info associated to the Unique ID pulled from the Database |
|---|---|---|
| Discovery level | //GoPod.mobi/discovery | Facility, site, door |
| Door level | //GoPod.mobi/door | Facility, site, door, type (timed/daily), Size, pricing |
| Site level | //GoPod.mobi/site | Facility, site, door, type (timed/daily), Size OPTIONS pricing for each size and option- Inventory status of each type |
| Facility level | //GoPod.mobi/facility | Facility, site(s)- to be rendered as choices types, size options, pricing for each size and type option |

FIG. 12

LOCAL DATABASE RECORD TABLE MAINTAINED IN EACH SINGLE-SIDED LOCKER UNIT IN THE SINGLE-SIDED LOCKER SYSTEM OF THE PRESENT INVENTION

| Locker Records for Locker # | | |
|---|---|---|
| Locker # | Locker Cabinet # | Locker Size |
| Locker Status | Track ID | Interior Camera (Y/N) |
| Door Status | Content Status | IP Address - Locker |
| Rental Transaction Identifier | | |
| Device (Phone) ID (e.g. a Cookie or Digital Token Generated and Stored in Cache Memory of the Mobile Phone Scanning The QR Code For Locker Rental) | | |
| Guest Access PIN (4 Digits) | | |

FIG. 15A

GLOBAL DATABASE TABLE MAINTAINED FOR EACH SINGLE-SIDED LOCKER SYSTEM OF THE PRESENT INVENTION

| Site #1 | Site #2 | Site #3 | Site #4 |
|---|---|---|---|
| Locker Records for Locker # | Locker Records for Locker # | Locker Records for Locker # | Locker Records for Locker # |
| Locker Records for Locker # | Locker Records for Locker # | Locker Records for Locker # | Locker Records for Locker # |
| | | | |
| Locker Records for Locker # | Locker Records for Locker # | Locker Records for Locker # | Locker Records for Locker # |

FIG. 15B

LED LOCKER DOOR STATUS INDICATIONS

ON Steady (Color #1) = AVAILABLE

ON Steady (Color #2) = RESERVED

OFF = RENTED

FIG. 18

CLOSED AND LOCKED CONFIGURATION

METHOD OF STORING BELONGINGS WITHIN A SINGLE-SIDED RIDE/EVENT STORAGE LOCKER SYSTEM INSTALLED AT AN AMUSEMENT PARK

STEP A: A Guest Visits a Facility such as an Amusement Park, and Uses a Web-enabled Mobile Camera Phone to scan (i) a Facility-Level QR Code to rent and reserve an available Storage Locker that will be available in a Single-Sided Locker System at a selected Site in the Park, (ii) a Site-Level QR Code at a specific Site to reserve and rent a Single-Sided Storage Locker, or (iii) a Door-Level QR Code to rent an available Storage Locker in A Single-Sided Locker System at a Site in the Park, wherein the Guest Supplies the System with an Access Code for Accessing the Rented Locker, as may be Required, and the System Generates and Stores a Digital Token/Cookie in the Memory of the Mobile Camera Phone To Remember the Mobile Camera Phone That Scanned the QR Code Initiating the Locker Rental Transaction.

STEP B: If the Storage Locker is Rented by Scanning A Facility-Level QR Code or Site-Level QR Code, then the Guest can use a Web-enabled Mobile Camera Phone to Scan the Door-Level QR Code on the Storage/Ingress Side of Rented Storage Locker, Open the Door, Store Belongings and Enjoys in the Facility; and if A Storage Locker is Rented by scanning the A Door-Level QR Code, then the Guest may Open the Locker Door After Rental, Store Personal Belongings in the Opened Storage Locker, Close the Locker Door, and Return to Activities in the Facility STEP C: After Completing the Park Ride/Event, the Guest Scans the Door-Level QR Code or Enters Access PIN using Physical Keypad on the Rented Storage Locker, Opens the Locker Door, Removes Personal Belongings, and then Closes the Locker Door.

STEP D: After the Door is Locked on the Rented Storage Locker, The System Automatically Checks To Determine If Any Personal Belongings Are Visually-Detected in the Rented Locker Using Internal Locker Cameras, and if Not, then Terminates the Locker Rental Transaction; but if Personal Belongings are Visually Detected, then System Automatically Sends Message to Guest Phone To Remove Belongings from the specified Rented Locker unit.

FIG. 35

METHOD OF MANAGING ACCESS CONTROL TO A NETWORKED LOCKER SYSTEM BY SCANNING FACILITY-LEVEL QR CODES POSTED AT THE ENTRANCE GATE OR OUTSIDE OF AN AMUSEMENT PARK FACILITY, USING A MOBILE SMARTPHONE WIRELESS CONNECTED TO THE WIRELESS ACCESS CONTROL SYSTEM NETWORK OF THE PRESENT INVENTION

STEP A: Using a mobile smartphone deployed on the wireless access control system network to practice a facility-level access control method by (i) the scanning of a Facility-Level QR Code, and (ii) automatically directing the smartphone web-browser application (e.g. Apple Safari) to parse and analyze the scanned QR code and serve, load and display the webpage specified by the URL encoded in the Facility-Level QR Code, and whereupon, the application server stores a "Rental Transaction Identifier – Facility Entry" (RTI-FE) (e.g. digital token) within the cache on the mobile smartphone STEP B: Using the mobile smartphone deployed on the wireless access control system network to practice a facility-level access control method by selecting which Ride (Site) within the Facility (e.g. Main Gate, South Entrance, or Picnic Area) where the guest user would like to rent and access a dual-sided storage locker to store personal belongings, with what size locker, And on what track at Ride (Site)

STEP C: Using the mobile smartphone deployed on the wireless access control system network to practice a facility-level access control method by selecting the time/date of the locker rental at the Site within the Facility when would the guest user would like to rent and access to store personal belongings

FIG. 36A

Scanning Door-Level QR Code
After Facility Level QR Scanning

STEP J: Using the mobile smartphone deployed on the wireless access control system network to practice rescan a Door-Level QR Code after completing the facility-level access control method, by (i) the scanning of the Door-Level QR code on the rented locker using the user's web-enabled mobile smartphone, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier - Facility Entry" (e.g. digital token) stored on the phone by the system application servers, so as to determine the state of the transaction for the Door-Level Access Control Method STEP K: Using the mobile smartphone deployed on the wireless access control system network to practice a facility-level access control method, by displaying a message that the "Locker Is in Use/Rented" (e.g. Locker Number 154), and requesting the user to enter his or her unique 4 digital passcode, and the select the button "OPEN MY LOCKER"

STEP L: Using the mobile smartphone deployed on the wireless access control system network to practice a facility-level access control method, by displaying, after scanning the door-level QR code and/or entering the unique passcode into the locker's keypad on locker, a message that the locker is OPEN, and to remove stored personal belongings from the accessed locker, and that the locker rental will be terminated upon selecting END RENTAL Button or closing the locker door.

FIG. 36D

METHOD OF RENTING, ACCESSING AND CONTROLLING A SINGLE-SIDED STORAGE LOCKER BY SCANNING FACILITY-LEVEL QR CODE AT PARK, AND THEN SCANNING A DOOR-LEVEL QR CODE ON RENTED SINGLE-SIDED STORAGE LOCKER

FACILITY-LEVEL

1. Guest Uses A Web-Enabled Mobile Phone To Scan a Facility-Level QR Code posted at Facility having one or more Sites supporting a plurality of Single-Sided Storage Lockers 2. System Automatically Generates and Stores a Rental Transaction Record and Identifier in the System Database In response to the scanning of the Facility-Level QR Code and Rental Of a Single-Sided Storage Locker 3. System Automatically Generates and Stores A Device Identifier (i.e. Cookie/Digital Token) On the Mobile Phone Scanning The Facility-Level QR Code; Requests Guest to Enter Access PIN; Then Assigns Locker Identified by Locker # and Issues Locker Rental Agreement

DOOR-LEVEL

4. Guest Uses The Mobile Phone To Scan A Door-Level QR Code on the Rented Single-Sided Storage Locker 5. System Automatically Reads and Updates the Rental Transaction Record and Identifier Stored in the System Database 6. System Automatically Reads The Device Identifier (i.e. Cookie/Digital Token) ) Stored On The Mobile Phone Used to Scan The Facility-Level QR Code and Rent A Single-Sided Storage Locker; Request Guest to Enter Access PIN, Open Door and Store Belongings

DOOR-LEVEL

7. After Ride Experience, Guest Uses The Mobile Phone To Scan Door-Level QR Code on The Rented Single-Sided Storage Locker 8. System Automatically Reads and Updates the Rental Transaction Record and Identifier Stored in the System Database 9. System Automatically Reads The Device Identifier (i.e. Cookie/Digital Token) On Mobile Phone Used To Scan The Facility-Level QR Code, Request Guest to Enter Access PIN, and Determines and Displays on Mobile Phone Display if Extra Rental Fee Is Due To Locker Rental Time Overage 10. Guest Uses The Mobile Scanning Phone To Pay for Extra Rental Time If and As Required, and Terminate the Rental Transaction; Guest Removes Belongings from Storage Locker, and Terminates Locker Rental 11. System Automatically Reads and Updates the Rental Transaction Record and Identifier Stored in the System Database, to Reflect That The Single-Sided Storage Locker is AVAILABLE for Rental 12. System Automatically Drives and Activates the Locker (Rental) Status Indication Light (LEDs) on the Available Dual-Sided Storage Locker to Indicate Rental AVAILABILITY Status

FIG. 43

PATH A (CONT.)

DOOR-LEVEL

9A. System Automatically Reads The Device Identifier (i.e. Cookie/Digital Token) On Mobile Phone Used To Scan The Door-Level QR Code or Discovery-Level QR Code; If the Device (Phone) Identifier does not match The Scanned Locker # in any active Rental Transaction Records in the System Database, then the System automatically displays a message on the Phone Display:*"Oops, You Scanned the Wrong Locker, Try Scanning Locker # 245";* If the Device (Phone) Identifier does match The Scanned Locker # in an active Rental Transaction Record in the System Database, then the System Requests the Guest to Enter its Access PIN, and Automatically Determines and Displays on Mobile Phone Display if Extra Rental Fee Is Due To Any Locker Rental Time Overage 10A. Guest Uses The Mobile Scanning Phone To Pay for Extra Rental Time If and As Required, and Terminate the Rental Transaction; Guest Removes Belongings from Locker, and Terminates Locker Rental 11A. System Automatically Reads and Updates the Rental Transaction Record and Identifier Stored in the System Database, to Reflect That The Single-Sided Storage Locker is AVAILABLE for Rental 12A. System Automatically Drives Locker Status Indication Light (LED) on the Available Single-Sided Storage Locker to Indicate AVAILABILITY Status

PATH B

DOOR-LEVEL

7B. After Ride Experience, Guest Uses The Mobile Phone To Scan Door-Level QR Code on The Rented Single-Sided Storage Locker 8B. System Automatically Reads and Updates the Rental Transaction Record and Identifier Stored in the System Database 9B. System Automatically Reads The Device Identifier (i.e. Cookie/Digital Token) On Mobile Phone Used To Scan The Door-Level QR Code or Discovery-Level QR Code; If the Device (Phone) Identifier does not match The Scanned Locker # in any active Rental Transaction Records in the System Database, then the System automatically displays a message on the Phone Display: *"Oops, You Scanned the Wrong Locker, Try Scanning Locker # 245";* If the Device (Phone) Identifier does match The Scanned Locker # in an active Rental Transaction Record in the System Database, then the System Requests the Guest to Enter its Access PIN, and Determines and Displays on Mobile Phone Display if Extra Rental Fee Is Due To Any Locker Rental Time Overage 10B. Guest Uses The Mobile Scanning Phone To Pay for Extra Rental Time If and As Required, and Terminate the Rental Transaction; Guest Removes Belongings from Locker, and Terminates Locker Rental 11B. System Automatically Reads and Updates the Rental Transaction Record and Identifier Stored in the System Database, to Reflect That The Single-Sided Storage Locker is AVAILABLE for Rental 12B. System Automatically Drives Locker Status Indication Light (LED) on the Available Single-Sided Storage Locker to Indicate AVAILABILITY Status

FIG. 44B

METHOD OF MANAGING ACCESS CONTROL TO A SINGLESIDED RIDE STORAGE LOCKER SYSTEM BY SCANNING SITE-LEVEL QR CODES POSTED AT A PARTICULAR SITE IN AN AMUSEMENT PARK FACILITY, USING A MOBILE SMARTPHONE WIRELESS CONNECTED TO THE WIRELESS ACCESS CONTROL SYSTEM NETWORK OF THE PRESENT INVENTION

STEP A: Using a mobile smartphone deployed on the wireless access control system network to practice a site-level access control method by (i) the scanning of a Site-Level QR Code, and (ii) automatically directing the smartphone web-browser application to parse and analyze the scanned QR code and serve, load and display the webpage specified by the URL encoded in the Site-Level QR Code, and whereupon, the application server stores a "Rental Transaction Identifier - Site-Entry" (RTI-SE) (e.g. digital token) within the cache on the mobile smartphone STEP B: Using the mobile smartphone deployed on the wireless access control system network to practice a site-level access control method by selecting the time/date of the dual-sided locker rental at the ride/event Site within the Facility when would the guest user would like to rent and access to store personal belongings STEP C: Using the mobile smartphone deployed on the wireless access control system network to practice a site-level access control method by selecting the locker size (e.g. small, large, jumbo) and track at the selected ride/event Site within the Facility which the guest user would like to rent and access to store personal belongings STEP D: Using the mobile smartphone deployed on the wireless access control system network to practice a site-level access control method by the guest user requesting to "Rent This Locker" previously specified by the ride/event Site, time/date, location, locker size and track selected by the guest at the Site, while displaying the price of the locker rental and availability at the time of the rental offer (prior to acceptance and order placement)

FIG. 45A

Scanning A Door-Level QR Code
After Scanning A Site-Level QR Code

STEP I: Using the mobile smartphone deployed on the wireless access control system network to scan a Door-Level QR Code after scanning a Site-Level QR Code by (i) the scanning of the Door-Level QR code on the rented locker using the user's web-enabled mobile smartphone, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier – Site Entry" (e.g. digital token) stored on the phone by the application servers, so as to determine the state of the transaction for the Door-Level Access Control Method STEP J: Using the mobile smartphone deployed on the wireless access control system network to practice a door-level access control method, after completing the site-level access control method, by displaying a message that the "Locker Is in Use" (e.g. Locker Number 154), and requesting the user to enter his or her unique 4 digital passcode, and the select the button "OPEN MY LOCKER"

STEP K: Using the mobile smartphone deployed on the wireless access control system network to practice a door-level access control method, after completing the site-level access control method, by scanning the door-level QR code or entering the unique passcode into the locker's keypad, on the retrieval side of locker, and displaying a message that the locker is OPEN and for the guest to retrieve all personal belongings from the storage locker and end the locker rental transaction

FIG. 45C

METHOD OF AUTOMATICALLY FINDING A SINGLE-SIDED STORAGE LOCKER RENTED A RIDE SITE BY SCANNING A SITE-LEVEL QR CODE AT THE FACILITY, OR A DOOR-LEVEL QR CODE ON A SINGLE-SIDED STORAGE LOCKER AT A SITE IN THE FACILITY

SITE LEVEL

1. Guest Uses A Web-Enabled Mobile Phone To Scan a Site-Level QR Code posted at the Site supporting a Plurality of Single-Sided Storage Lockers 2. System Automatically Generates and Stores a Rental Transaction Record and Identifier in the System Database In response to the scanning of the Site-Level QR Code and Rental of a Single-Sided Storage Locker 3. System Automatically Generates and Stores A Device Identifier (i.e. Cookie/Digital Token) On the Mobile Phone Scanning The Site-Level QR Code ; Requests Guest to Enter Access PIN; Then Assigns Locker Identified by Locker # and Issues Locker Rental Agreement

DOOR-LEVEL

4. Guest Uses The Mobile Phone To Scan A Door-Level QR Code on the the Rented Single-Sided Storage Locker 5. System Automatically Reads and Updates the Rental Transaction Record and Identifier Stored in the System Database 6. System Automatically Reads The Device Identifier (i.e. Cookie/Digital Token) On Mobile Phone Used To Scan The Door-Level QR Code; If the Device (Phone) Identifier does not match The Scanned Locker # in any active Rental Transaction Records in the System Database, then the System automatically displays a message on the Phone Display: *"Oops, You Scanned the Wrong Locker, Try Scanning Locker # 245";* If the Device (Phone) Identifier does match The Scanned Locker # in an active Rental Transaction Record in the System Database, then the System Requests the Guest to Enter its Access PIN, and Determines and Displays on Mobile Phone Display if Extra Rental Fee Is Due To Locker Rental Time Overage

DOOR-LEVEL

7A. After Ride Experience, Guest Uses The Mobile Phone To Scan Door-Level QR Code on The Rented Single-Sided Storage Locker 8A. System Automatically Reads and Updates the Rental Transaction Record and Identifier Stored in the System Database

FIG. 53A

PATH A (CONT.)

DOOR-LEVEL
- 9A. System Automatically Reads The Device Identifier (i.e. Cookie/Digital Token) On Mobile Phone Used To Scan The Door-Level QR Code; If the Device (Phone) Identifier does not match The Scanned Locker # in any active Rental Transaction Records in the System Database, then the System automatically displays a message on the Phone Display:*"Oops, You Scanned the Wrong Locker, Try Scanning Locker # XXXX";* If the Device (Phone) Identifier does match The Scanned Locker # in an active Rental Transaction Record in the System Database , then the System Requests the Guest to Enter its Access PIN, and Determines and Displays on Mobile Phone Display if Extra Rental Fee Is Due To Locker Rental Time Overage

- 10A. Guest Uses The Mobile Scanning Phone To Pay for Extra Rental Time If and As Required, and Terminate the Rental Transaction; Guest Removes Belongings from Locker, and Terminates Locker Rental

- 11A. System Automatically Reads and Updates the Rental Transaction Record and Identifier Stored in the System Database, to Reflect That The Single-Sided Storage Locker is AVAILABLE for Rental

- 12A. System Automatically Drives LED Status Indication Light on the Available Single-Sided Storage Locker to Indicate AVAILABILITY Status

PATH B

DOOR-LEVEL
- 7B. After Ride Experience, Guest Uses The Mobile Phone To Scan Door-Level QR Code on The Retrieval/Egress Side of The Rented Single-Sided Storage Locker

- 8B. System Automatically Reads and Updates the Rental Transaction Record and Identifier Stored in the System Database

- 9B. System Automatically Reads The Device Identifier (i.e. Cookie/Digital Token) On Mobile Phone Used To Scan The Door-Level QR Code; If the Device (Phone) Identifier does not match The Scanned Locker # in any active Rental Transaction Records in the System Database, then the System automatically displays a message on the Phone Display: *"Oops, You Scanned the Wrong Locker, Try Scanning Locker # 245";* If the Device (Phone) Identifier does match The Scanned Locker # in an active Rental Transaction Record in the System Database , then the System Requests the Guest to Enter its Access PIN, and Determines and Displays on Mobile Phone Display if Extra Rental Fee Is Due To Locker Rental Time Overage

- 10B. Guest Uses The Mobile Scanning Phone To Pay for Extra Rental Time If and As Required, and Terminate the Rental Transaction; Guest Removes Belongings from Locker, and Terminates Locker Rental

- 11B. System Automatically Reads and Updates the Rental Transaction Record and Identifier Stored in the System Database, to Reflect That The Single-Sided Storage Locker is AVAILABLE for Rental

- 12B. System Automatically Drives LED Status Indication Light on the Available Single-Sided Storage Locker to Indicate AVAILABILITY Status

FIG. 53B

METHOD OF MANAGING ACCESS CONTROL TO A NETWORKED LOCKER SYSTEM BY SCANNING DOOR-LEVEL QR CODES POSTED OR DISPLAYED ON THE FRONT DOOR OF EACH STORAGE LOCKER DEPLOYED WITHIN THE AMUSEMENT PARK FACILITY, USING A MOBILE SMARTPHONE WIRELESS CONNECTED TO THE WIRELESS ACCESS CONTROL SYSTEM NETWORK OF THE PRESENT INVENTION

STEP A: Using a mobile smartphone deployed on the wireless access control system network to practice a door-level access control method by (i) the scanning of a Door-Level QR Code, and (ii) automatically directing the smartphone web-browser application to parse and analyze the scanned QR code and serve, load and display the webpage specified by the URL encoded in the Site-Level QR Code, and whereupon, the application server stores a "Rental Transaction Identifier - Door-Entry" (RTI-DE) within the cache on the mobile smartphone

STEP B: Using the mobile smartphone deployed on the wireless access control system network to practice a door-level access control method by the user selecting the "Rent This Locker" Button to rent the scanned and selected locker for a specific time/date (e.g. Locker Rental from 1-3PM), locker size and track, given its specified size and rental price at the Site within the Facility

STEP C: Using the mobile smartphone deployed on the wireless access control system network to practice a door-level access control method by the user's selection of four-digit passcode for use in opening the rental locker, and selecting SAVE and CONTINUE to save the request in the RDBMS of the wireless access control system network

FIG. 54A

STEP D: Using the mobile smartphone deployed on the wireless access control system network to practice a door-level access control method by displaying the selected locker size and user passcode, and entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center STEP E: Using the mobile smartphone deployed on the wireless access control system network to practice a door-level access control method by displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested)

STEP F: Using the mobile smartphone deployed on the wireless access control system network to practice a door-level access control method by displaying, after the prior payment transaction has been successfully completed, a message that the locker is ready, along with the selected locker # and user's passcode, and a Button enabled to "Open My Locker" at its location by the user simply either scanning the door-level QR code on the locker door, or entering the unique passcode into the locker's keypad, where and as provided

FIG. 54B

RESCANNING DOOR LEVEL QR CODE
AFTER SCANNING DOOR-LEVEL QR CODE

STEP G: Using the mobile smartphone deployed on the wireless access control system network to rescan a Door-Level QR Code after scanning a Door-Level QR Code by (i) the scanning of the Door-Level QR code on the rented locker using the user's web-enabled mobile smartphone, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier – Door Entry" stored on the phone by the application servers, so as to determine the state of the transaction for the Door-Level Access Control Method STEP H: Using the mobile smartphone deployed on the wireless access control system network to practice a door-level access control method, after completing the door-level access control method, by displaying a message that (i) the "Locker Is in Use" (e.g. Locker Number 154), and requesting the user to enter his or her unique 4 digital passcode, and the select the button "OPEN MY LOCKER", and (ii) if the scanned locker is not the guest's rented locker, then the user should look for a locker with a GREEN light indicating it is available for rental

FIG. 54C

STEP I: Using the mobile smartphone deployed on the wireless access control system network to practice a door-level access control method, after scanning the door-level QR code or entering the unique passcode into the locker's keypad, by displaying a message indicating (i) that the "Locker is Open" (and "upon return, unlock the locker by entering the passcode on the keypad or rescanning the Door-Level QR Code") allowing the user to either retrieval personal belongings from the storage locker, and (ii) press the displayed END RENTAL Button to the end the locker rental transaction at the Site of the Facility

FIG. 54D

METHOD OF AUTOMATICALLY FINDING A SINGLE-SIDED STORAGE LOCKER RENTED A SITE BY SCANNING A DOOR-LEVEL QR CODE ON ANY DUAL-SIDED STORAGE LOCKER AT A SITE

DOOR-LEVEL

1. Guest Uses A Web-Enabled Mobile Phone To Scan a Door-Level QR Code posted on a Single-Sided Storage Locker in a Single-Sided Locker System installed at a Site 2. System Automatically Generates and Stores a Rental Transaction Record and Identifier in the System Database In response to the scanning of the Door-Level QR Code on the Single-Sided Locker in the Single-Sided Storage Locker System 3. System Automatically Generates and Stores A Device Identifier (i.e. Cookie/Digital Token) On the Mobile Phone Scanning The Door-Level QR Code; Requests Guest to Enter Access PIN; Then Assigns Locker Identified by Locker # and Accepts Locker Rental Agreement; Opens Door and Stores Belongings, and Closes Door 4. After Ride Experience, Guest Uses The Mobile Phone To Scan a Door-Level QR Code on The Retrieval/Egress Side of The Rented Double-Sided Locker, or a Discovery-Level Code Posted On a Surface Accessible on the Ingress or Egress Side of Double-Sided Locker System 5. System Automatically Reads and Updates the Rental Transaction Record and Identifier Stored in the System Database 6. System Automatically Reads The Device Identifier (i.e. Cookie/Digital Token) On Mobile Phone Used To Scan The Door-Level QR Code or Discovery-Level QR Code; If the Device (Phone) Identifier does not match The Scanned Locker # in any active Rental Transaction Records in the System Database, then the System automatically displays the message on the Phone Display: *"Oops, You Scanned the Wrong Locker, Try Scanning Locker # 245";* If the Device (Phone) Identifier does match The Scanned Locker # in an active Rental Transaction Record in the System Database, then the System Requests Guest to Enter Access PIN, and Determines and Displays on Mobile Phone Display if Extra Rental Fee Is Due To Locker Rental Time Overage

DOOR-LEVEL

PATH A

7A. Guest Uses The Mobile Scanning Phone To Pay for Extra Time if and As Required, and Terminate the Rental Transaction; Guest Removes Belongings from Storage Locker, and Terminates Locker Rental 8A. System Automatically Reads and Updates the Rental Transaction Record and Identifier Stored in the System Database, to Reflect That The Single-Sided Storage Locker is AVAILABLE for Rental 9A. System Automatically Drives Locker Status Indication Light )LED) on the Available Single-Sided Storage Locker to Indicate AVAILABILITY Status

FIG. 60A

PATH B

DOOR-LEVEL

7B. Guest Uses The Mobile Scanning Phone To Scan the Door-Level QR Code on the Locker # XXXX 8B. System Automatically Reads and Updates the Rental Transaction Record and Identifier Stored in the System Database 9B. System Automatically Reads The Device Identifier (i.e. Cookie/Digital Token) On Mobile Phone Used To Scan The Door-Level QR Code or Discover—Level QR Code; If the Device (Phone) Identifier does not match The Scanned Locker # in any active Rental Transaction Records in the System Database, then the System automatically displays the message on the Phone Display: *"Oops, You Scanned the Wrong Locker, Try Scanning Locker # 245";* If the Device (Phone) Identifier does match The Scanned Locker # in an active Rental Transaction Record in the System Database, then the System Requests Guest to Enter Access PIN, and Determines and Displays on Mobile Phone Display if Extra Rental Fee Is Due To Locker Rental Time Overage 10B. Guest Uses The Mobile Scanning Phone To Pay for Extra Time if and As Required, and Terminate the Rental Transaction; Guest Removes Belongings from Locker, and Terminates Locker Rental 11B. System Automatically Reads and Updates the Rental Transaction Record and Identifier Stored in the System Database, to Reflect That The Single-Sided Storage Locker is AVAILABLE for Rental 12B. System Automatically Drives Locker Status Indication Light (LED) on the Available Single-Sided Storage Locker to Indicate AVAILABILITY Status

FIG. 60B

006# SINGLE-SIDED STORAGE LOCKER SYSTEMS ACCESSED AND CONTROLLED USING MACHINE-READABLE CODES SCANNED BY MOBILE PHONES AND COMPUTING DEVICES

RELATED CASES

The present Patent Applications is a Continuation-in-Part (CIP) of co-pending: U.S. patent application Ser. No. 16/990,381 filed Aug. 11, 2020, which is commonly owned by Safemark Systems, L.P. and incorporated herein by reference as if fully set forth herein.

BACKGROUND OF THE INVENTION

Field of Invention

The present invention relates to the field of amusement park, theme park and recreational environments, and more particularly, to new and improved methods of and apparatus for guest visitors to rent, access, and control storage lockers and mobility devices such as electric convenience vehicles (ECVs), wheelchairs and strollers, and related services, without compromising the park or venue experience.

Brief Description of the State of the Art of Knowledge

Since 2008, Safemark Systems L.P. has offered its GoPod® electronic locker system to amusement and theme parks around the world. As illustrated in FIGS. 1 and 2, the GoPod® electronic locker system has its own locally-controlled inventory system, and supported by its own POS/payment transaction system. The GoPod® locker system is networked with flexibly placed guest kiosks so that payment queue lines do not interfere with guests accessing their lockers. Each GoPod® electronic locker unit is provided with a dedicated keypad on its locker door to bypass the kiosk during future access. To rent a locker rental using the prior art GOPOD® electronic locker system, a guest simply visits any networked GoPod® kiosk. Using cash or credit card, a guest user enters their desired PIN at the GoPod® Kiosk, and then goes directly to their locker to use it. FIG. 2 shows the green, red and yellow indicator lights supported on each prior art GoPod® electronic locker, visibly signaling to the user the status of the assigned locker. The locker keypad eliminates operational nightmares associated with costly wristbands or RFID keys, unreliable biometric sensors and misplaced keys. It also provides direct access to their stored personal belongings even when there is a local power and/or Internet disruption at the locker system.

FIGS. 3A and 3B show a prior art system from U.S. Pat. No. 8,990,110 (assigned to Best Lockers LLC) which is used to assign controlled access to a securable device (e.g. locker) using a kiosk configured to receive a PIN number from the user, which is then stored in rented locker for local access to the locker even when the locker is disconnected from the network. This invention, disclosed in U.S. Pat. No. 8,990,110, is currently used in Safemark's Best Locker GOPOD® electronic locker system described above.

Recently, prior art efforts have been made to use mobile smartphones to control access to networked locker systems around the world.

For example, as shown in FIG. 4, US Patent Application No. US2019/0035186 (assigned to Best Lockers, LLC) discloses the use of a guest's mobile phone to send kiosk/locker data to the management server via a cell tower network, while directly controlling access to the locker, via a local locker computer device controlling the electronic lock installed in the accessed locker.

Also, FIGS. 5A through 5C show a prior art locker system disclosed in U.S. Pat. No. 9,558,608 (assigned to Smarte Carte, Inc.) that includes electronic lockers that are centrally managed by a locker manager that handles admissions and sales for a venue. As disclosed, guests scan their ID codes at the locker terminal (kiosk terminal) and provide the scanned codes to ID code to the locker manager, and when approved, generates a rental plan and provided the guest access to the assigned locker.

FIGS. 6A through 6D show a prior art storage locker system in U.S. Pat. No. 10,474,797 (assigned to Tiburon Lockers Inc.) that includes (i) a kiosk to assign locker units to users and provide users with access credentials (e.g. via text or SMS messages or applications on a computer) to access assigned lockers, and (ii) a user portal for each locker unit to access the locker using assigned access credentials.

Also, it is well known to use mobile code symbol scanning terminals to initiate e-commerce and other kinds of web-based transactions by reading code symbols, as recognized by U.S. Pat. No. 7,341,191 to Russell et al (assigned to Metrologic Instruments, Inc.) titled "Internet-Based System for Enabling Information-Related Transactions over the Internet" granted on Mar. 11, 2008. In U.S. Pat. No. 7,341,191, a transaction-enabling method and system is disclosed, wherein a transaction-enabling Java-Applet was embedded within an HTML-encoded document stored in an HTTP server at predetermined URL. When a code symbol (e.g., magstripe or bar code) encoded with the URL is read using a code symbol reader interfaced with a Java-enabled Internet terminal, the corresponding HTTP document is automatically accessed and displayed at the terminal, and the transaction-enabling Java-Applet initiated for execution, so that the customer, consumer or client desiring the transaction can simply and conveniently conduct the information-related transaction over the Internet. While the promise of such general techniques has been great, success at using mobile scanning techniques has been generally limited to a few industries focused on document production and delivery, and not access and control of physical, electronic and photonic systems.

Since 2008, Best Lockers, LLC has offered its GoPod® electronic locker system to amusement and theme parks around the world. As illustrated in FIGS. 7A and 7B, the GoPod® electronic locker system has its own locally-controlled inventory system, and supported by its own POS/payment transaction system. The GoPod® locker system is networked with flexibly placed guest kiosks so that payment queue lines do not interfere with guests accessing their lockers. Each GoPod® electronic locker unit is provided with a dedicated keypad on its locker door to bypass the kiosk during future access. To rent a locker rental using the prior art GOPOD® electronic locker system, a guest simply visits any networked GoPod® kiosk. Using cash or credit card, a guest user enters their desired PIN at the GoPod® kiosk, and then goes directly to their assigned locker to use it. The locker keypad eliminates the need for RFID-enabled wristbands or RFID keys, unreliable biometric sensors, and misplaced keys. It also provides direct access to their stored personal belongings even when there is a local power and/or Internet disruption at the locker system.

FIGS. 7A and 7B show Figures from US Patent Application No. 2014/0316918 by Zaniker et al (assigned to Best Lockers LLC) which describes the GoPod® electronic locker system and its kiosk-based methods of assigning guest users with controlled access to a securable locker, and enabling access to the assigned locker using a PIN code created by the user. Over the past decade, the GoPod® locker system has been deployed around the world serving users in diverse environments including, but not limited to, multi-ride amusement parks. Many of these amusement parks offer rides that require storage of personal belonging before passengers can board such rides engineered to exploit the forces of gravity and inertia, and provide a sense of thrill, adventure and ecstasy.

As early as August 2016, US Patent Application Publication No. 2018/0061157 by (assigned to Universal City Studios), Zielkowski et al. recognized the need for better solutions allowing park guests to (i) store personal belongings (e.g. cellphones, keys) in a safe place and manner before boarding amusement park rides, and (ii) manage loose items for guests during amusement park experiences. As explained in detail in US Patent Application Publication No. 2018/0061157, "traditionally, loose items are kept in lockers to avoid issues associated with taking them on rides at an amusement park. However, the cost of building lockers is typically high, and the lockers permanently occupy valuable space within the amusement park. Additionally, riders are often reluctant to put their loose items (e.g., cell phones, wallets, keys, and cameras) in lockers. Moreover, riders may use their cell phones to display ride passes (e.g., passes with priority rights) that are scanned at an entrance of the ride. Therefore, the rider's cell phone may need to be readily accessible prior to loading the ride. Riders often prefer to keep their loose items on their person so that they can use them while waiting in line and other reasons. Accordingly, it is now recognized that there is a need for an improved loose item storage system that allows guests to have control of their loose items during operation of the amusement park ride."

US Patent Application Publication No. 2018/0061157 by Zielkowski et al. (issued as U.S. Pat. No. 10,460,539 on Oct. 29, 2019) discloses many different solutions to the problem of providing short term locker space while guests ride the latest high intensity inverted coasters and thrill rides. Among Zielkowski et al.'s disclosed solutions were a double-sided (i.e. two-sided) pass-through locker system for installation at the entry and exit points of an amusement park ride, as disclosed in FIG. 8. This double-sided ride locker system is depicted in FIG. 8 and described in detail in Paragraph [0056] as follows:

"[T]he storage system 34 may permanently fixed to a location or may move from one location to another location (e.g., from a loading station to an unloading station) within the amusement park ride 10. For example, the storage system 34 may be located at a central location near the loading and unloading stations of the amusement park ride 10. The rider 14 may approach the storage system 34 prior to boarding the ride vehicle to store and secure the portable locker 16. Similarly, the rider 14 may approach the storage station 34 after unloading from the ride vehicle to retrieve the stored items. In one embodiment, the plurality of compartments 152 associated with the storage station 34 may include a storage side facing the loading station and a pick-up side facing the unloading station. For example, each compartment of the plurality of compartments 152 may include a first door on the storage side and a second door on the pick-up side, each door having a lock. In this way, the rider 14 may access the storage side prior to boarding the ride vehicle (e.g., from a load queue upstream of the loading point) via the first door and may access the pick-up side from the unloading station (e.g., from an exit queue) via the second door to mitigate congestion at the storage system 34. This double-sided locker may be mechanically actuated such that doors open for guests to place items in the loading side during ride loading and then closes during operation of the ride 10. Similarly, when riders are exiting, the doors may be actuated to open from the unloading side during unloading."

In November 2018, VLocker PTY LTD filed its U.S. patent application Ser. No. 16/191,420 by Danson titled "Dual Access Ride Lockers," and was allowed to issue on Mar. 31, 2020 without disclosing or citing U.S. Pat. No. 10,607,433 (or US Patent Application Publication No. 2018/0061157) by Zielkowski et al as relevant prior art.

FIG. 9 illustrates the double-sided locker system disclosed in VLocker's U.S. Pat. No. 10,607,433. As disclosed, VLocker's double-sided locker system supports automated allocation and assignment of lockers in response to the supply of user identification input (e.g. fingerprint reading), wherein the locker number of the automatically assigned locker is displayed on the kiosk display screen, and then the locker is electronically opened by the system controller. Unfortunately, while seeking to advance locker system automation, VLocker's automated locker assignment and management method prevents guest users/riders from selecting and choosing available lockers they desire might to rent and use to store their belongings before and while riding on an amusement park ride.

In most popular amusement parks around the world, it is generally known that guests have unlimited access to "All-Day Locker Rentals" during the course of the day. These lockers are typically available on a first-come, first-served basis. At some theme parks, the large lockers measuring 12'×13'×16.9' are available to rent near the park entrances of the theme parks starting at $10/day. Family-sized lockers measuring 12"×16.25"×16.9" are available at the park starting at $15/day. At other park venues, different size lockers are available: mini, regular and family ($9, $13, $16 respectively).

Many amusement parks and/or theme parks also offer "Single-Time Use Lockers" at park rides and attractions. Often, single-time use lockers are available at rides and attractions in standard-size lockers (e.g. 14"×5.5"×16.9") for storing small loose articles while guests on riding on the rides. These standard-size lockers are free while guests ride on rides or enjoy experiencing attractions. Larger lockers (12"×13"×16.9") for oversized items can be rented for $2 during the posted time period, and additional $3 per 30 minutes, with a $20 day maximum.

While it is preferred to use and rent double-sided pass-through lockers using "single-time use" principles described above, it is also possible and perhaps desirable in some situations to rent out double-sided passthrough lockers under "all-day locker rental" principles.

Also, it is important to consider and accommodate two different types of "loose article" policies developed and used with rides at modern amusement parks:
  (i) ZERO LOOSE ARTICLES—requiring that the phones of each guest must be stored in double-sided ride storage locker, necessitating the need for access methods on the egress side not requiring the phone stored in the locker;
  (ii) PHONES ALLOWED ON RIDE—where rides are provided with a storage mechanism that allow guest phones to brought aboard on the ride, and allowing more flexible access methods to be used on the egress side to retrieve personal belongings stored in a ride locker.

Thus, despite advances made in the amusement ride locker access and control field over the past decade, there is a still a great need in the art for new and improved double-sided (i.e. two-sided) personal locker systems for installation at or near the entrance and exit gates of an amusement park ride and/or event, without compromising the guest's amusement park ride or event experience.

OBJECTS AND SUMMARY OF PRESENT INVENTION

Accordingly, a primary object of the present invention is to provide a new and improved cloud-based (i.e. Internet-based) wireless access control wireless system network employing mobile smartphones in diverse application environments, including amusement and theme parks, entertainment centers, recreational facilities and the like, supporting the rental, access and control of single-sided storage lockers for use at rides, attractions and events at amusement and theme parks, to overcome the shortcomings and drawbacks of prior art systems and methodologies.

Another object of the present invention is to provide a new and improved wireless access control wireless system network, wherein multi-level machine-readable codes (e.g. multi-level Facility-Level QR Codes, Site-Level QR Codes and device-level QR codes) are deployed across the entire enterprise of the facility to support the contact-less procurement and provision of diverse kinds of single-sided storage locker systems, and related services, to guests and visitors, anywhere within the environment, on a prepayment basis, when simply using their mobile smartphones.

Another object of the present invention is to provide such a new and improved wireless system network, mobile systems and methods for controlling access to storage lockers operating within the Internet infrastructure.

Another object of the present invention is to provide such a new and improved wireless system network, wherein multi-level QR codes are embedded at the facility, site, and device level of the park environment to enable park guests, visitors and other system users to procure, access and receive storage and related services while visiting an amusement park environment.

Another object of the present invention is to provide a new and improved method of mapping multi-level QR codes to particular entry points in transaction workflows supported on the wireless system network, and designed to support procurement and delivery of services to an amusement park, tourist, or adventure seeking environment, wherein (i) Facility-Level QR codes are mapped to facility-level entry points in the transactional workflow and posted/displayed at physical and virtual locations outside of amusement park facility, (ii) Site-Level QR codes are mapped to site-level entry points in the transactional workflow and posted/displayed at physical point of rental or point-of-sale (POS) Site locations within the amusement park facility or within a facility but not located near the item to be rented, and (iii) Device-Level QR codes are mapped to device-level (e.g. locker door level) entry points in the transactional workflow and posted/displayed on actual physical surfaces and/or touchpoints located at diverse Sites within the amusement park facility;

Another object of the present invention is to provide a new and improved System of Multi-Level QR Codes having a hierarchy comprising (i) Door-Level QR Codes intelligently encoded with data attributes including facility (park), site, door, type (e.g. timed/daily), size, and pricing and URL directed to a first server component supported on the wireless system network of the present invention, (ii) Site-Level QR Codes intelligently encoded with data attributes including facility (park), site, type (e.g. timed/daily), size options, track options, the pricing for each size and type options, and inventory status of each type and option, and URL directed to a second server component supported on the wireless system network of the present invention, and (iii) Facility-Level QR Codes intelligently encoded with data attributes including facility (park), sites rendered as choices, types (e.g. timed/daily), size options, tracks, and the pricing for each size and type options, and URL directed to a third server component supported on the wireless system network of the present invention.

Another object of the present invention is to provide a cloud-based GPS-tracking code driven wireless system network configured for procurement and access control of storage lockers, mobility solutions and other services offered within an enterprise-level amusement park facility, shown comprising: a system of GNSS satellites orbiting around the Earth, GPS-tracked wireless networked lockers, GPS-tracked wireless networked vehicles, GPS-tracked service providers, GPS-tracked vendors, and other diverse types of GPS-tracked wireless networked securable devices, each being interfaced with a TCP/IP infrastructure directly, and/or via a facility-based Internet Gateway; a network of cellular towers for supporting wireless data communication services between wireless mobile computing devices and network communication adapters; a plurality of wireless mobile computing systems (e.g. smartphones, tablet computers, etc.); one or more industrial strength data centers, each supporting a cluster of communication servers (e.g. web servers), a cluster of application servers, and a cluster of database servers, and SMS/text and email servers supported by at least one wide area network (WAN), and local weather servers, and network service platforms including electronic payment systems and services, credit card processing, and the universe of webservers supported on the WWW;

Another object of the present invention is to provide a new and improved GPS-tracking wireless system network supporting remote access control to (i) GPS-tracked wireless networked locker systems displaying Device-Level QR Codes for procurement and access control by guests scanning these QR codes using mobile smartphones, (ii) GPS-tracked wireless networked strollers displaying Device-Level QR Codes for procurement and access control by guests scanning these QR codes using mobile smartphones, (iii) GPS-tracked wireless networked electric convenience vehicles (ECVs) displaying Device-Level QR Codes for procurement and access control guests by scanning these QR codes using mobile smartphones, (iv) GPS-tracked wireless networked amusement park rides (e.g. Sites) posting/displaying Site-Level QR Codes for access to the park's storage and mobility service transactional workflow by guests scanning these QR codes using mobile smartphones, (v) GPS-tracked wireless networked Service Providers and Vendors (e.g. Sites) posting/displaying Site-Level QR Codes for access to the park's service transactional workflow by guests scanning these QR codes using mobile smartphones, and (vi) GPS-tracked wireless networked Amusement Park Facility (e.g. Facility) posting/displaying Facility-Level QR Codes for access to the park's storage and mobility service transactional workflow by guests scanning these QR codes using mobile smartphones.

Another object of the present invention is to provide a new and improved GPS-tracking wireless locker access control system network comprising a plurality of GPS-tracked wireless networked single-sided locker systems, and system network components interfaced with an TCP/IP Internet infrastructure, namely, electronic payment systems, locker inventory systems, and web, application and database servers associated with the data centers deployed to support the services required by the system network.

Another object of the present invention is to provide a new and improved wireless networked mobile/stationary locker system having a plurality of wireless networked locker units, each locker unit being accessible by scanning the multi-level QR code posted or displayed on the locker unit, using a web-enabled mobile smartphone deployed in the system network, and carrying out the transaction supported on the display screen of the mobile smartphone.

Another object of the present invention is to provide a new and improved wireless networked transportable locker system with QR code driven access control, comprising a group of electronically-controlled locker units that are internetworked together in a transportable GPS-tracked cabinet, that can be locally managed by a networked kiosk server system, and/or remotely managed by network servers maintained in a cloud-based data center, under any of a large variety of case providing unprecedented flexibility, convenience and migration options for system users.

Another object of the present invention is to provide a new and improved wireless networked transportable locker, comprising a group or bank of networked locker units are networked together and managed/manageable by the kiosk server system using Ethernet or other communication networking protocols, while the manual keypads and PIN storage memory on each locker unit are in communication with kiosk server system using a serial-to-UDP/IP communication network.

Another object of the present invention is to provide a new and improved GPS-tracked wireless networked locker system with code-driven access-controlled locker units, each having an electronic-ink (E-ink) display panel for displaying machine-readable codes and user instructions.

Another object of the present invention is to provide a new and improved method of managing access control to a networked locker system by scanning Facility-Level QR Codes posted at the entrance gate or outside of an amusement park facility, using a mobile smartphone wireless connected to the wireless access control system network.

Another object of the present invention is to provide a new and improved amusement park facility, with a sign posted at the entrance date of the park, displaying a Facility-Level QR code which upon scanning with a web-enabled mobile smartphone is engineered to direct the guest user to a web-based e-commerce-enabled locker rental and access control transaction having the largest scope of services, encapsulating the entire facility, and allowing guest users to select a Site location of choice within the amusement park for their locker rental within the amusement park, and then allow the wireless system network to automatically assign an available locker to the guest at the selected Site.

Another object of the present invention is to provide a new and improved method of managing access control to a networked double-sided locker system involving the user's web-enabled mobile phone for scanning Facility-Level QR Codes posted at the entrance gate or outside of an amusement park facility, using a mobile smartphone wireless connected to the wireless access control system network.

Another object of the present invention is to provide a new and improved wireless access control system network for a double-sided locker system supporting a facility-level access control method involving the user's web-enabled mobile phone for (i) scanning a Facility-Level QR Code, and (ii) automatically directing the smartphone web-browser application (e.g. Apple Safari) to parse and analyze the scanned QR code and serve, load and display the webpage specified by the URL encoded in the Facility-Level QR Code, and whereupon, the application server stores a "Rental Transaction Identifier-Facility Entry" (RTI-FE) within the cache on the mobile smartphone.

Another object of the present invention is to provide a new and improved wireless access control system network for a double-sided pass-through locker system supporting a facility-level access control method involving the selection of which Site within the Facility (e.g. amusement park) (e.g. Main Gate, South Entrance, or Picnic Area) where the guest user would like to rent and access a storage locker to store personal belongings.

Another object of the present invention is to provide a new and improved wireless access control system network for a single-sided locker system supporting a facility-level access control method involving the selection of time/date of the locker rental at the Site within the Facility when would the guest user would like to rent and access to store personal belongings.

Another object of the present invention is to provide a new and improved wireless access control system network for a single-sided locker system supporting a facility-level access control method involving the selection of locker size (e.g. small, large, jumbo) at the selected Site within the Facility which the guest user would like to rent and access to store personal belongings.

Another object of the present invention is to provide a new and improved wireless access control system network for a single-sided locker system supporting a facility-level access control method involving the guest user requesting to rent the locker previously specified by the site, time/date, and locker size selected by the guest within the Facility, while displaying the price of the locker rental and availability at the time of the rental offer (prior to acceptance and order placement).

Another object of the present invention is to provide a new and improved wireless access control system network for a single-sided locker system supporting a facility-level access control method involving the user's selection of four-digit passcode for use in opening the rental locker, and selecting SAVE and CONTINUE to save the request in the RDBMS of the wireless access control system network.

Another object of the present invention is to provide a new and improved wireless access control system network for a single-sided locker system supporting a facility-level access control method involving the user's web-enabled mobile phone to display the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers maintained at the data center.

Another object of the present invention is to provide a new and improved wireless access control system network for a single-sided locker system supporting a door-level access control method after scanning a Facility-Level QR code involving (i) the scanning of the Door-Level QR code on the storage/ingress side of a rented locker using the user's web-enabled mobile smartphone, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier—Facility Entry" stored on the phone by the application servers, so as to determine the state of the transaction for the Door-Level Access Control Method.

Another object of the present invention is to provide a new and improved wireless access control system network for a double-sided pass-through locker system supporting a door-level access control method involving the user's web-enabled mobile phone to display a message that the "Locker Is in Use", and requesting the user to enter his or her unique 4 digital passcode, and the select the button "OPEN MY LOCKER".

Another object of the present invention is to provide a new and improved wireless access control system network for a double-sided pass-through locker system supporting a door-level access control method involving the user's web-enabled mobile phone displaying, after scanning the Door-Level QR Code or entering the unique passcode into the locker's keypad, a message that the locker is OPEN allowing the user to either store personal belongings in the storage locker or access stored personal belongings from the accessed locker, as the case may be.

Another object of the present invention is to provide a new and improved method of managing access control to a networked locker system involving the user's web-enabled mobile phone to scan Site-Level QR Codes posted at a particular Site in an amusement park facility, using a mobile smartphone wireless connected to the wireless access control system network.

Another object of the present invention is to provide a new and improved wireless access control system network for a single-sided storage locker system supporting a site-level access control method involving (i) the scanning of a Site-Level QR Code, and (ii) automatically directing the smartphone web-browser application to parse and analyze the scanned QR code and serve, load and display the webpage specified by the URL encoded in the Site-Level QR Code, and whereupon, the application server stores a "Rental Transaction Identifier—Site-Entry" (RTI-SE) within the cache on the mobile smartphone.

Another object of the present invention is to provide a new and improved wireless access control system network for a single-sided storage locker system supporting a site-level access control method involving the user's web-enabled mobile phone and the selection of time/date of the locker rental at the Site within the Facility when would the guest user would like to rent and access to store personal belongings in accordance with loose article policies maintained at the Site.

Another object of the present invention is to provide a new and improved wireless access control system network for a single-sided storage locker system supporting a site-level access control method involving the user's web-enabled mobile phone and the selection of locker size (e.g. small, large, jumbo) at the selected Site within the Facility which the guest user would like to rent and access to store personal belongings.

Another object of the present invention is to provide a new and improved wireless access control system network for a single-sided storage locker system supporting a site-level access control method involving the user's web-enabled mobile phone and the user's selection of four-digit passcode for use in opening the rental locker, and selecting SAVE and CONTINUE to save the request in a database of the wireless access control system network.

Another object of the present invention is to provide a new and improved wireless access control system network for a single-sided storage locker system supporting a site-level access control method involving the user's web-enabled mobile phone displaying the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center.

Another object of the present invention is to provide a new and improved wireless access control system network for a single-sided storage locker system supporting a site-level access control method involving the user's web-enabled mobile phone displaying the selected locker size, entered passcode, text receipt phone number, and total price of the locker rental (tax included), and providing several options for the user to make payment.

Another object of the present invention is to provide a new and improved wireless access control system network for a single-sided storage locker system supporting a site-level access control method involving the user's web-enabled mobile phone displaying, after the prior payment transaction has been successfully completed, a message indicating that the locker is ready for use, along with the selected locker # and user's passcode, and a button enabled to open the locker at its location, by the user simply either scanning the Door-Level QR Code on the locker door, or entering the unique passcode into the locker's keypad (where and as provided).

Another object of the present invention is to provide a new and improved wireless access control system network for a single-sided storage locker system supporting a door-level access control method after scanning a Site-Level QR Code, by scanning the Door-Level QR Code or entering the unique passcode into the locker's keypad, and displaying a message that the locker is OPEN (and "upon return, unlock the locker by entering the passcode on the keypad or rescanning the Door-Level QR Code"), and an END RENTAL Button for selection by the user to the end the locker rental.

Another object of the present invention is to provide a new and improved wireless access control system network for a single-sided storage locker system supporting a door-level access control method, after scanning a Site-Level QR code, involving (i) the scanning of the Door-Level QR code on the storage/egress side of a rented locker using the user's web-enabled mobile smartphone, (ii) automatically directing the smartphone web-browser application to parse and analyze the scanned Door-Level QR code and serve, load and display the webpage specified by the URL encoded in the Door-Level QR Code, and (iii) executing the access control transaction script for the locker rental transaction identified by the "Rental Transaction Identifier—Site Entry" stored on the phone by the application servers, so as to determine the state of the transaction for the Door-Level Access Control Method.

Another object of the present invention is to provide a new and improved wireless access control system network for a single-sided storage locker system supporting a door-level access control method involving the user's web-enabled mobile phone displaying, after scanning the Door-Level QR Code or entering the unique passcode into the locker's keypad, a message stating that the locker is OPEN, and upon return, unlock the locker by entering the passcode on the keypad or rescanning the Door-Level QR Code", allowing the user to either store personal belongings in the storage locker or access stored personal belongings from the accessed locker, and the message further providing an END RENTAL Button for selection by the user to the end the locker rental.

Another object of the present invention is to provide a new and improved amusement park or recreational facility, with a single-sided storage locker system cabinet located at a sign posted at a Site in the park, and each locker unit in the cabinet displaying a Door-Level QR code which, upon scanning with a web-enabled mobile smartphone, is engineered to direct the guest user to a web-based e-commerce-enabled locker rental, access and control transaction having a narrowed scope of services within the facility, and allowing guest users to rent the storage locker at the Site within the park, and then allow the wireless system network to automatically control access to the locker at the Site.

Another object of the present invention is to provide a new and improved wireless access control system network for a single-sided storage locker system supporting a door-level access control method involving the user's web-enabled mobile phone, and (i) the scanning of a Door-Level QR Code posted on the double-sided storage locker system, and (ii) automatically directing the smartphone web-browser application to parse and analyze the scanned QR code and serve, load and display the webpage specified by the URL encoded in the Door-Level QR Code, and whereupon, the application server stores a "Rental Transaction Identifier-Door-Entry" (RTI-DE) within the cache on the mobile smartphone.

Another object of the present invention is to provide a new and improved wireless access control system network for a double-sided pass-through locker system supporting a door-level access control method involving the user's web-enabled mobile phone, and selection of the "Rent This Locker" Button to rent the scanned and selected locker for a specific time/date (e.g. Ride Locker Rental), given its specified size and rental price at the Site within the Facility.

Another object of the present invention is to provide a new and improved wireless access control system network for a single-sided storage locker system supporting a door-level access control method involving the user's web-enabled mobile phone, and selection of four-digit passcode for use in opening the rental locker, and selecting SAVE and CONTINUE to save the request in the RDBMS of the wireless access control system network.

Another object of the present invention is to provide a new and improved wireless access control system network for a single-sided storage locker system supporting a door-level access control method initiated by scanning a Door-Level QR Code posted on the storage/ingress side of a locker door, automating serving to the user's web-enabled mobile phone a GUI screen displaying the selected locker size and user passcode, and requesting the entry of the guest's phone number to which the system network will transmit locker information and rental receipt via SMS/text once the user enters the phone number information and selects SAVE and CONTINUE, thereby initiating a web-based transaction between the web-enabled mobile phone and the system's web-enabled e-commerce-supported locker access control servers maintained at a data center connected to the infrastructure of the Internet.

Another object of the present invention is to provide a new and improved wireless access control system network for single-sided storage locker system supporting a door-level access control method displaying a message on the user's web-enabled mobile phone, the selected locker size, entered passcode, text receipt phone number, and total price of the locker rental (tax included), and providing several options for the user to make payment.

Another object of the present invention is to provide a new and improved wireless access control system network for a single-sided storage locker system supporting a door-level access control method displaying, after the prior payment transaction has been successfully completed, a message on the user's web-enabled mobile phone that the locker is ready, along with the selected locker # and user's passcode, and a Button enabled to "Open My Locker" at its location by the user simply either scanning the Door-Level QR Code on the locker door, or entering the unique passcode into the locker's keypad.

Another object of the present invention is to provide a new and improved wireless access control system network supporting a door-level access control method displaying, after scanning the Door-Level QR Code and entering the unique passcode into the locker's keypad from the retrieval/egress side of the rented locker, a message that the locker is OPEN, that the guest user should retrieve personal belongings, and select the END RENTAL Button to the end the locker rental.

Another object of the present invention is to provide a new and improved wireless access control system network for single-sided storage locker system supporting a door-level access control method involving the user's web-enabled mobile phone, after scanning a Door-Level QR Code on the storage/ingress side of a rented locker, (i) the scanning of the Door-Level QR code on the retrieval/egress side of the rented locker, (ii) automatically directing the smartphone web-browser application to parse and analyze the scanned Door-Level QR code and serve, load and display the webpage specified by the URL encoded in the Door-Level QR Code, and (iii) executing the access control transaction script for the locker rental transaction identified by the "Rental Transaction Identifier-Door Entry" stored on the phone by the application servers, so as to determine the state of the transaction for the Door-Level Access Control Method.

Another object of the present invention is to provide a new and improved wireless access control system network supporting a door-level access control method involving the user's web-enabled mobile phone displaying a message indicating and confirming the user ended the locker rental, and the user should remove all belongings from the locker before closing the locker.

Another object of the present invention is to provide a machine-readable code-driven access control method and system, wherein, during emergencies, when electrical power and/or Internet connectivity are disrupted, the system and method of the present invention allows the guest user to directly enter his or her digital password (e.g. PIN) into the keypad provided on the rented locker unit, and locally operate its lock controller (provided with local battery power backup) and where the digital password is stored in local memory of the locker unit, by the system network servers within the data center during the web-based rental, access and control method, thereby allowing the guest to unlock the electronically-controlled lock unit in locker unit, and open the locker door and access one's personal belongings while the locker system is disconnected from the Internet infrastructure and/or during local power disruptions.

Another object of the present invention is to provide a machine-readable code-driven access control method and system, wherein, during emergencies, when electrical power and/or Internet connectivity are disrupted, the system and method of the present invention also allows the guest user to locally communicate with the locker controller, through its network adapter and antennas (e.g. using Bluetooth and/or WIFI protocols), to establish a communication session between the mobile smartphone and the rented locker unit, and then enter the guest's digital locker password (i.e. PIN) via the virtual keypad (GUI screen) on the mobile smartphone, to locally operate its lock controller (provided with local battery power backup), and where the digital password is stored in local memory of the locker unit, by the system network servers within the data center during the web-based rental, access and control method, thereby allowing the guest to unlock the electronically-controlled lock unit of a rented locker unit, and open the locker door and access one's personal belongings while the locker system is disconnected from the Internet infrastructure and/or during local power disruptions.

Another object of the present invention is to provide a new and improved GPS-tracked double-sided locker system deployed at a wireless networked amusement park attraction, ride and/or event, wherein each GPS-tracked wireless networked locker unit is access controlled and managed using Door-Level QR code.

Another object of the present invention is to provide a new and improved GPS-tracked wireless network access controlled locker system comprising a system of wireless networked double-sided locker units internetworked together at the cabinet/bank-level by a low-rate wireless personal area network (WPAN), and each wireless networked double-sided locker system comprises the following components integrated about a system bus, namely, a programmed microprocessor interfaced to the system bus and supported by a memory architecture (e.g. RAM, ROM, and SSD persistent storage), a network controller for interfacing with the TCP/IP infrastructure, a solenoid driver circuit connected to a lock solenoid and bolt assembly and locker door, a keypad and E-ink display panel and Bluetooth/WIFI interfaced with the system bus via an I/O module interface, a digital video camera with a field of view (FOV) and interfaced with the system bus, a GPS module interfaced with the system bus, a first Door-Level QR Code physically posted or electronically displayed on the storage-side door surface using its E-ink panel, and a second Door-Level QR Code physically posted or electronically displayed on the storage-side door surface using its E-ink panel.

Another object of the present invention is to provide a new and improved single-sided storage locker system enabling customers to retrieve purchased items from the lockers in a contactless manner using mobile phones and the wireless access control system network.

Another object of the present invention is to provide a new and improved single-sided storage locker system for contactless item retrieval, integrated within the cloud-based GPS-tracking wireless access control system network.

Another object of the present invention is to provide a Discovery-Level QR Code enabling guests to automatically find and locate their rented storage lockers in a facility, and at particular sites, by using a web-enabled mobile phone to scan this specially-programmed QR code symbol wherever it may be posted within the facility, at sites and even on storage locker cabinets at the convenience of guests trying to remember where they rented a storage locker in the facility.

7. A method of renting, accessing and controlling a single-sided storage locker comprising: scanning a Facility-Level machine-readable code at a site to rent a single-sided storage locker at the site; and then scanning a Door-Level machine-readable code on the rented single-sided storage locker at said site so as to access, control and use the single-sided storage locker at the site.

Another object of the present invention is to provide a method of renting, accessing and controlling a single-sided storage locker comprising: scanning a Site-Level machine-readable code at a site to rent a single-sided storage locker at the site; and then scanning a Door-Level machine-readable code on the rented single-sided storage locker at said site, so as to access, control and use the single-sided storage locker at the site.

Another object of the present invention is to provide a method of renting, accessing and controlling a single-sided storage locker comprising: scanning a Door-Level machine-readable code on a single-sided storage locker at a site within a facility so as to rent the single-sided storage locker at said site; and then scanning said Door-Level machine-readable code on the rented single-sided storage locker at said site so as to access, control and use the single-sided storage locker at said site.

Another object of the present invention is to provide a method of finding a single-sided storage locker rented by a guest within a facility having one or more sites, said method comprising: scanning a Site-Level machine-readable code at a site within a facility, a Door-Level machine-readable code on any single-sided storage locker at the site or within the facility, or a Discovery-Level QR Code on any scannable surface posted within the facility at a site therein.

Another object of the present invention is to provide a method of finding a single-sided storage locker rented by a guest within a facility having one or more sites, comprising: scanning any Door-Level machine-readable code on a single-sided storage locker within a single-sided storage locker system deployed within said facility at the site.

Another object of the present invention is to provide a method of finding a single-sided storage locker rented by a guest within a facility comprising: said guest using a web-enabled mobile phone to scan a Facility-Level machine-readable code at the facility, a Door-Level machine-readable code on a single-sided storage locker at a site, a Door-Level machine-readable code on any single-sided storage locker, or a Discovery-Level machine-readable code posted on a scannable surface within the facility or at any the site therein.

Another object of the present invention is to provide a method of renting, accessing and controlling a single-sided storage locker comprising: scanning a Facility-Level QR Code at a site to rent a single-sided storage locker at the site; and then scanning a Door-Level QR Code on the rented single-sided storage locker at said site so as to access, control and use the single-sided storage locker at the site.

Another object of the present invention is to provide a method of renting, accessing and controlling a single-sided storage locker comprising: scanning a Site-Level QR Code at a site to rent a single-sided storage locker at the site; and then scanning a Door-Level QR Code on the rented single-sided storage locker at said site, so as to access, control and use the single-sided storage locker at the site.

Another object of the present invention is to provide a method of renting, accessing and controlling a single-sided storage locker comprising: scanning a Door-Level QR Code on a single-sided storage locker at a site within a facility so as to rent the single-sided storage locker at said site; and then scanning said Door-Level QR Code on the rented single-sided storage locker at said site so as to access, control and use the single-sided storage locker at said site.

A method of finding a single-sided storage locker rented by a guest within a facility having one or more sites, said method comprising: scanning a Site-Level QR Code at a site within a facility, a Door-Level QR Code on any single-sided storage locker at the site or within the facility, or a Discovery-Level QR Code on any scannable surface posted within the facility at a site therein.

A method of finding a single-sided storage locker rented by a guest within a facility having one or more sites, comprising: scanning any Door-Level QR Code on a single-sided storage locker within a single-sided storage locker system deployed within said facility at said site.

A method of finding a single-sided storage locker rented by a guest within a facility comprising: said guest using a web-enabled mobile phone to scan a Facility-Level QR Code at the facility, a Door-Level QR Code on a single-sided storage locker at a site, a Door-Level QR Code on any single-sided storage locker, or a Discovery-Level QR Code posted on an scannable surface within the facility or at any said site therein.

A system installed within a facility having sites with single-sided storage lockers, and infrastructure enabling guests to automatically find and locate their rented storage lockers in a facility, and at particular sites, by using a web-enabled mobile phone to scan this specially-programmed QR code symbol wherever it may be posted within the facility, at sites and even on storage locker cabinets at the convenience of guests trying to remember where they rented a storage locker in the facility.

A method of storing personal belongings within a single-sided storage locker system installed at a site, employing automated digital image capture and processing within the interior of each locker unit so as to automatically determine if personal belongings are being stored in the storage locker, and to support rental and control access operations using such machine intelligence to advance the property and security interests of guests using the single-sided ride storage locker system.

Another object of the present invention is to provide a single-sided ride storage locker system deployed at any site within a facility, and providing guest visitors with access control enabled by scanning multi-level machine-readable codes using mobile scanning computing systems, such as web-enabled smartphones with digital cameras and mobile application support.

Another object of the present invention is to provide a storage locker system that supports automated modes of discovering and finding where a guest's rented locker is located within the facility and its sites at any moment in time, simply by using the guest' smart phone to scan a device-level code, a site-level code, a facility-level code or a discovery-level code, posted anywhere within the facility or any site, without need for using a physical locker lookup kiosk or other conventional systems and methods.

These and other objects will become more apparent hereinafter in view of the Detailed Description and pending Claims to Invention.

BRIEF DESCRIPTION OF THE DRAWINGS

In order to more fully understand the Objects, the following Detailed Description of the illustrative embodiments should be read in conjunction with the accompanying Drawings, wherein:

FIG. 2 is a table showing the green, red and yellow indicator lights supported on each prior art GOPOD® electronic locker, visibly signaling to the user the status of the assigned locker, what operations to conduct and when;

FIGS. 3A and 3B show a prior art system in U.S. Pat. No. 8,990,110 (assigned to Best Lockers LLC) for assigning controlled access to a securable device (e.g. locker) using a kiosk configured to receive a PIN number from the user which is then stored in rented locker for local access to the locker even when the locker is disconnected from the network;

FIGS. 6A, 6B, 6C and 6D show a prior art storage locker system disclosed in U.S. Pat. No. 10,474,797 (assigned to Tiburon Lockers Inc.) that includes (i) a kiosk to assign locker units to users and provide users with access credentials (e.g. via text or SMS messages or applications on a computer) to access assigned lockers, and (ii) a user portal for each locker unit to access the locker using assigned access credentials;

FIG. 11C is a table setting forth asset of exemplary rule-based triggers that are employed for automated re-direction of transactional workflow upon automated detection thereof during the QR driven access control processes executing on system servers of the present invention.

FIG. 12 is a table showing the Multi-Level QR Code Hierarchy comprising (i) Door/Device-Level QR Codes intelligently encoded with data attributes including facility (park), site, type (e.g. timed/daily), size, and pricing and URL directed to a first server component supported on the wireless system network of the present invention, (ii) Site-Level QR Codes intelligently encoded with data attributes including facility (park), site, type (e.g. timed/daily), size options, the pricing for each size and type options, and inventory status of each type and option, and URL directed to a second server component supported on the wireless system network of the present invention, (iii) Facility-Level QR Codes intelligently encoded with data attributes including facility (park), sites rendered as choices, types (e.g. timed/daily), size options, and the pricing for each size and type options, and URL directed to a third server component supported on the wireless system network of the present invention, and (iv) Discovery-Level QR Code for automatically finding a guest's rented storage locker in the facility and at a site by scanning this specially-programmed QR code symbol wherever it may be posted within the facility, at sites and even on storage locker cabinets at the convenience of guests trying to remember where they rented a storage locker in the facility;

FIG. 15A is a schematic representation in the form of a locally maintained table showing the various locker records maintained and updated for each locker #, in the networked single-sided storage locker system of the present invention, during each rental transaction supported at the site within the facility in which the storage locker system is installed;

FIG. 15B is a schematic representation in the form of a globally maintained table showing the various locker records maintained and updated for each locker #, in each networked single-sided storage locker system, during each rental transaction supported at the site within the facility in which the storage locker system is installed;

FIG. 18 is a table setting forth the LED color codes used for the LED-based locker door rental status indications on each single-sided storage locker deployed in the single-sided locker system of the present invention;

FIG. 35 is a flow chart describing the primary steps involved in practicing the method of storing personal belongings within a single-sided storage locker system installed at an amusement park, in accordance with the principles of the present invention, employing automated digital image capture and processing within the interior of each locker unit so as to automatically determine if personal belongings are being stored in the storage locker, and to support rental and control access operations using such machine intelligence to advance the property and security interests of guests using the single-sided ride storage locker system;

FIGS. 36A, 36B, 36C and 36D set forth a flow chart describing the primary steps involved when carrying out the method of managing access control to a networked locker system by scanning Facility-Level QR codes posted at the entrance gate or outside of an amusement park facility, using a mobile smartphone wireless connected to the wireless access control system network of the present invention;

FIG. 43 is a flow chart describing the primary steps involved in carrying out method of renting, accessing and controlling a single-sided storage locker by scanning Facility-Level QR Code at a facility level, and then scanning a Door-Level QR Code on the single-sided storage locker at the door level;

FIGS. 44A and 44B, taken together, show a flow chart describing the primary steps involved in carrying out method of method of finding a single-sided storage locker rented within a facility by scanning a Facility-Level QR Code at the facility, a Site-Level QR Code posted at a Site, or a Door-Level QR Code on a single-sided storage locker system at the Site;

FIGS. 45A, 45B, and 45C, taken together, set forth a flow chart describing the primary steps involved when carrying out the method of managing access control to a networked double-sided storage locker system by scanning Site-Level QR Codes posted at a particular Site in an amusement park facility, using a mobile smartphone wireless connected to the wireless access control system network of the present invention;

FIGS. 53A and 53B, taken together, show a flow chart describing the primary steps involved in carrying out method of method of finding (i.e. discovering) a single-sided storage locker rented within a facility by scanning a Site-Level QR Code at a site within a facility, or a Door-Level QR Code on a single-sided storage locker located at a site in the facility;

FIGS. 54A, 54B, 54C and 54D, taken together, provide a flow chart describing the primary steps involved when carrying out the method of managing access control to a networked locker system by scanning Door-Level QR Codes posted or displayed on the front door of each storage locker deployed within the amusement park facility, using a mobile smartphone wireless connected to the wireless access control system network of the present invention;

FIGS. 60A and 60B, taken together, show a flow chart describing the primary steps involved in carrying out method of finding a single-sided storage locker rented within a facility by scanning a Door-Level QR Code posted on a single-sided storage locker system at a site.

DETAILED DESCRIPTION OF THE ILLUSTRATIVE EMBODIMENTS OF THE PRESENT INVENTION

Figure 1:
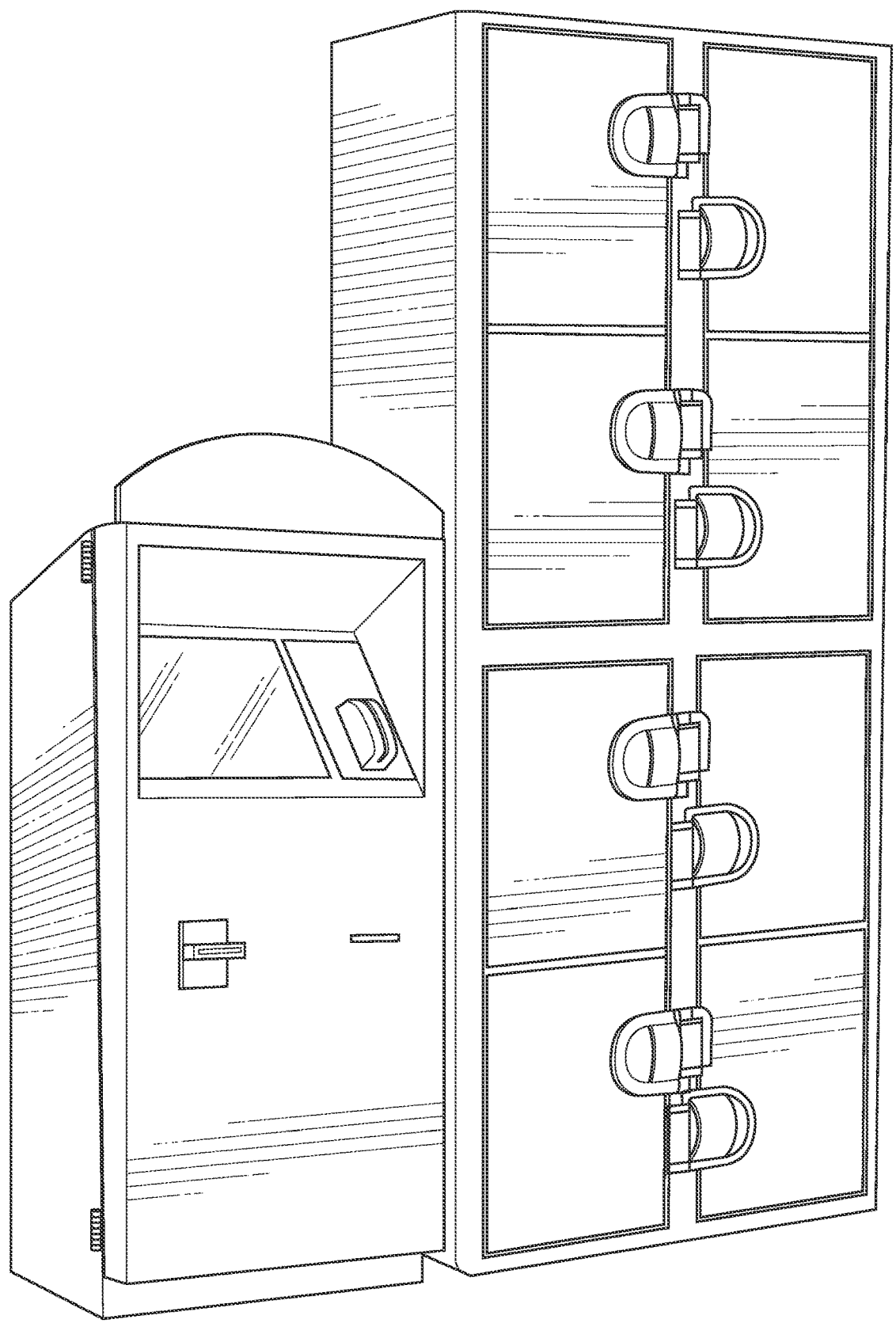
FIG. 1 shows a prior art GOPOD® electronic locker system, wherein for locker rental, guests simply visit any networked GOPOD® kiosk using cash or credit card, enter their desired PIN, and go directly to their locker, and wherein a dedicated keypad is installed on each locker allowing guests to bypass the kiosk for future access, thereby (i) eliminating operational nightmares associated with costly wristbands or RFID keys, unreliable biometric sensors and misplaced keys, (ii) reducing employee cash handling, and (iii) streamlining operations.
Figure 3B:
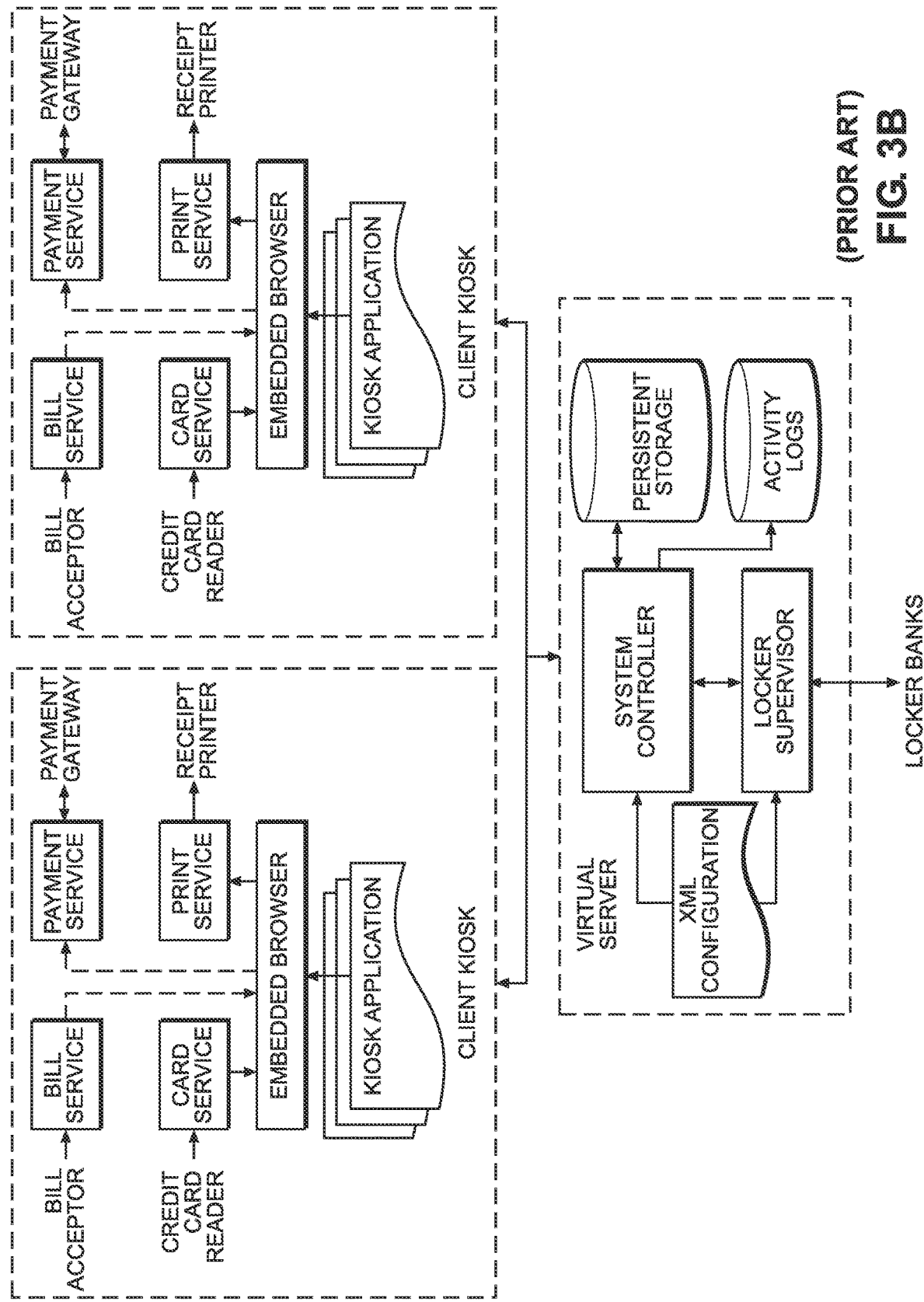
Figure 4:
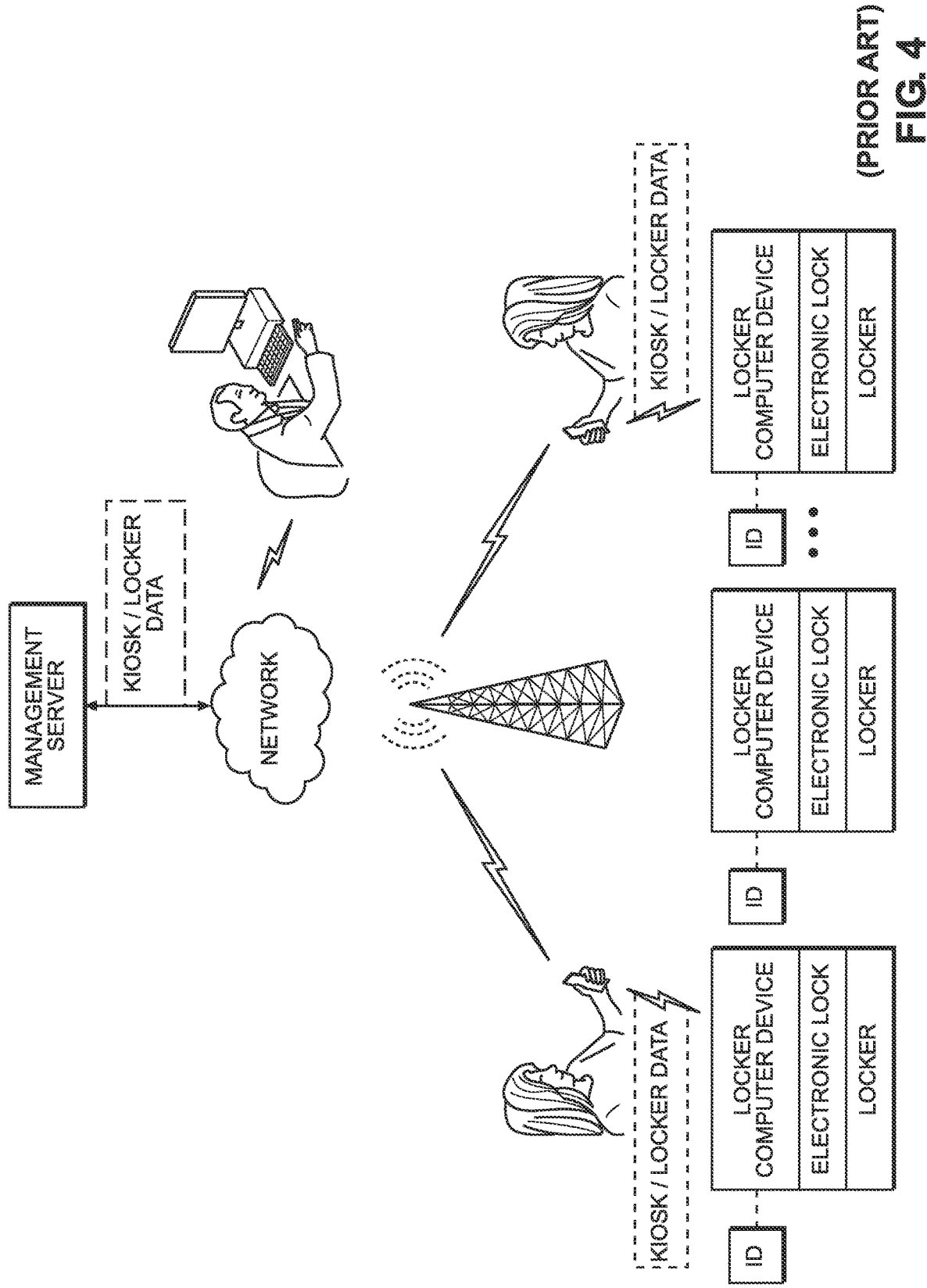
FIG. 4 is a system network diagram of the prior art system in FIGS. 3A through 3C, disclosed in US Patent Application No. US2019/0035186, showing the mobile phone of a guest sending kiosk/locker data to the management server via a cell tower network, while directly controlling access to the locker via a local locker computer device controlling the electronic lock installed in the accessed locker, as generally employed in Safemark's GoPod® electronic locker system.
Figure 5A:
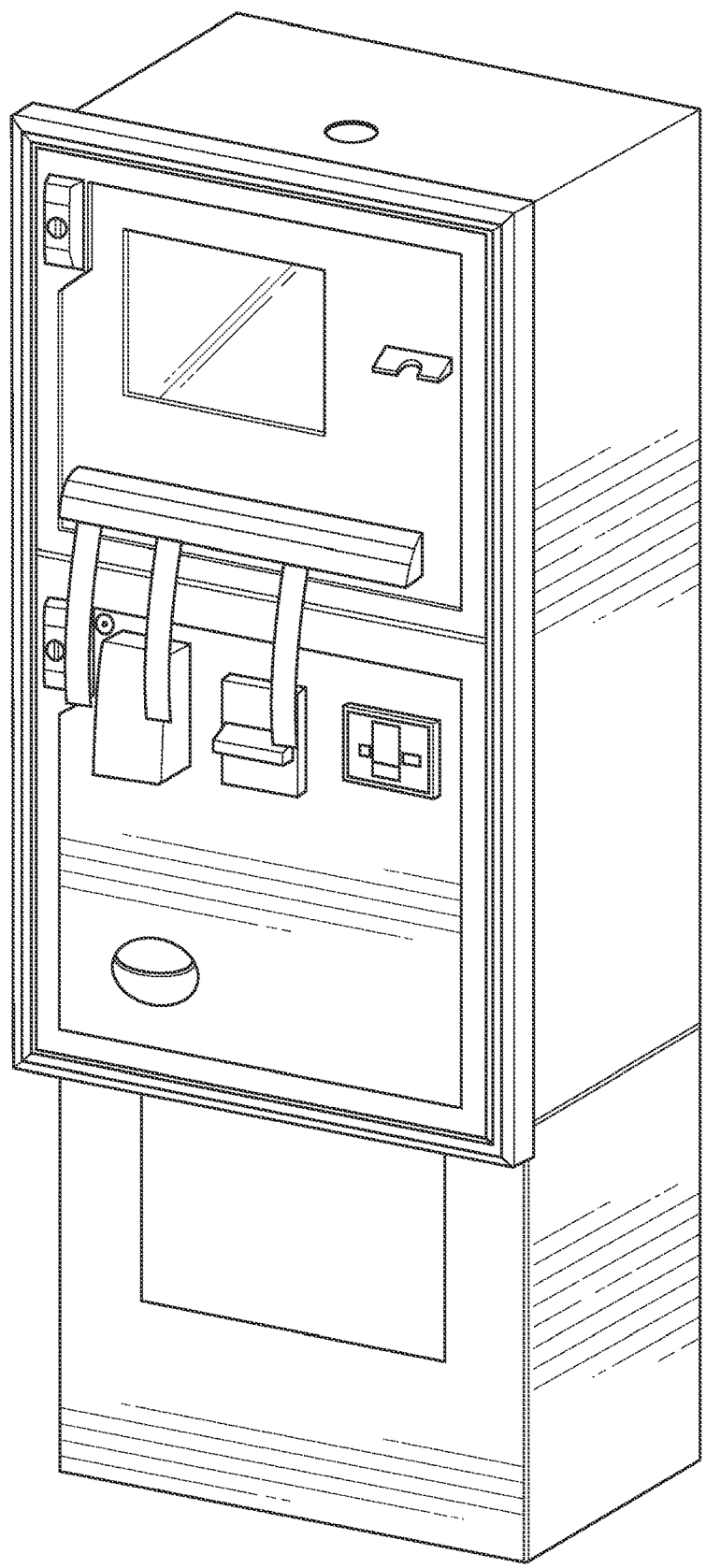
FIGS. 5A, 5B and 5C show a prior art locker system disclosed in U.S. Pat. No. 9,558,608 (assigned to Smarte Carte, Inc.) that includes electronic lockers that are centrally managed by a locker managed that handles admissions and sales for a venue, and wherein guests scan their ID codes at the locker terminal (kiosk terminal) and provide the scanned codes to ID code to the locker manager, and when approved, generates a rental plan and provided the guest access to the assigned locker.
Figure 5B:
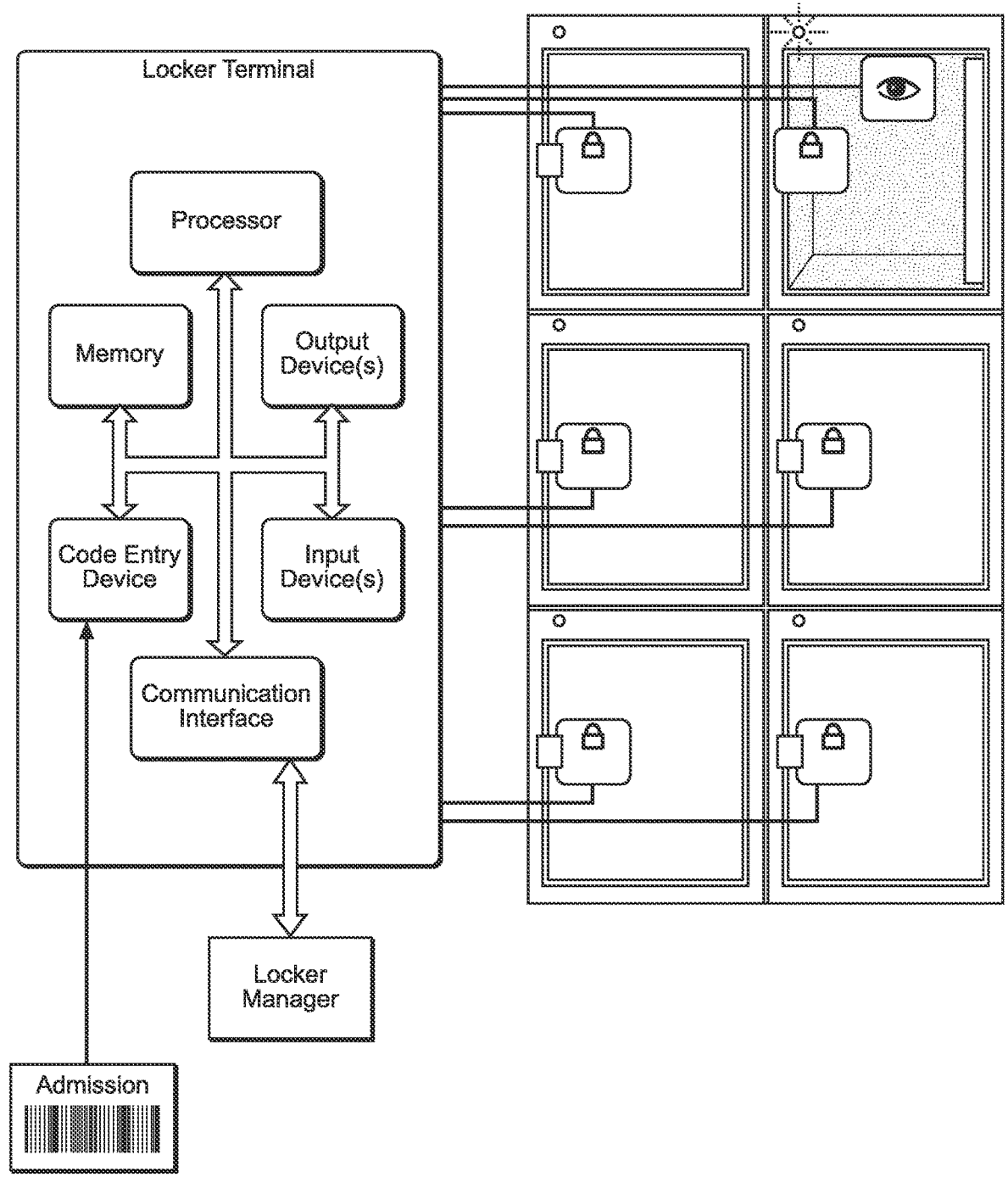
Figure 5C:
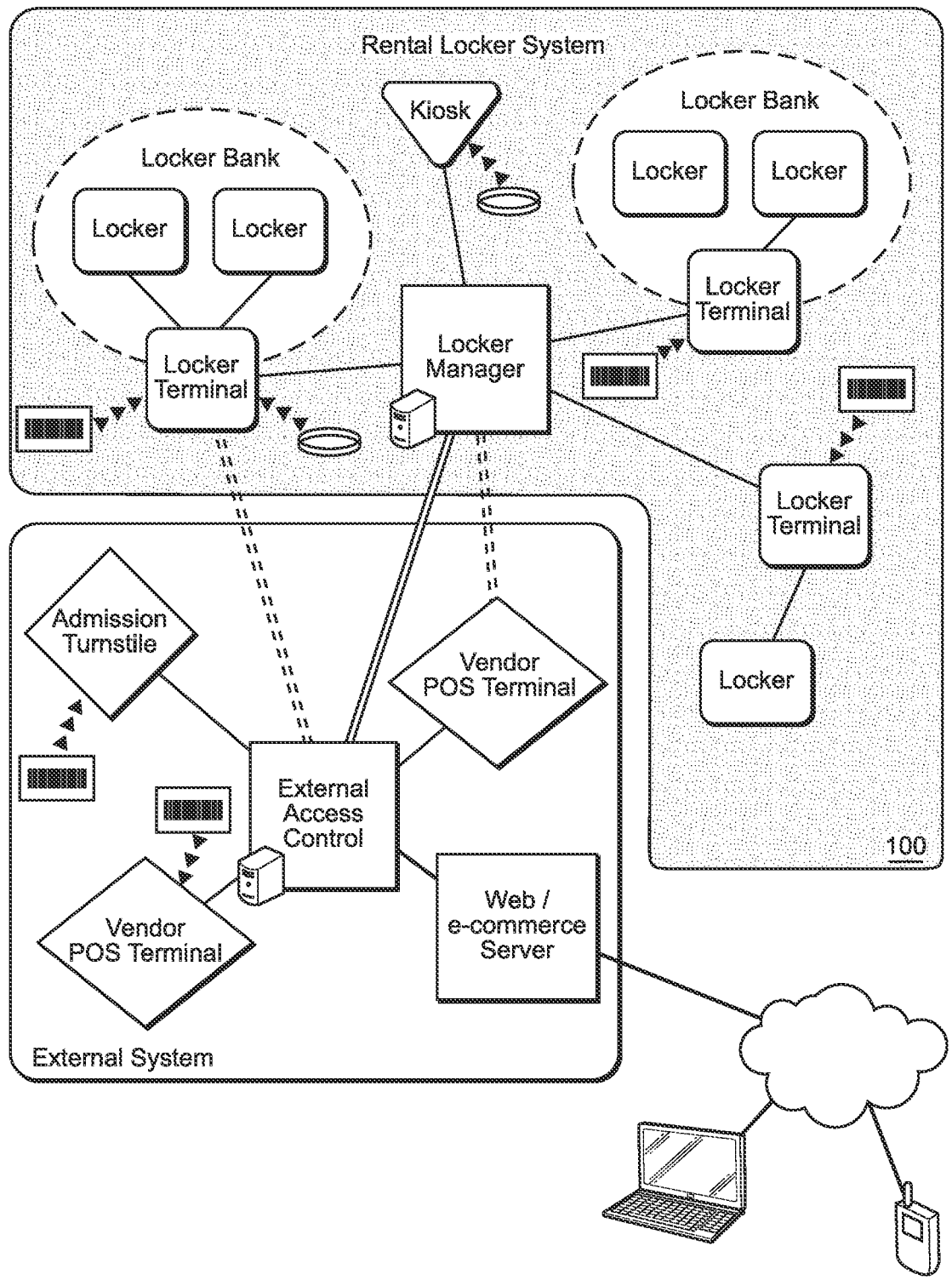
Figure 6A:
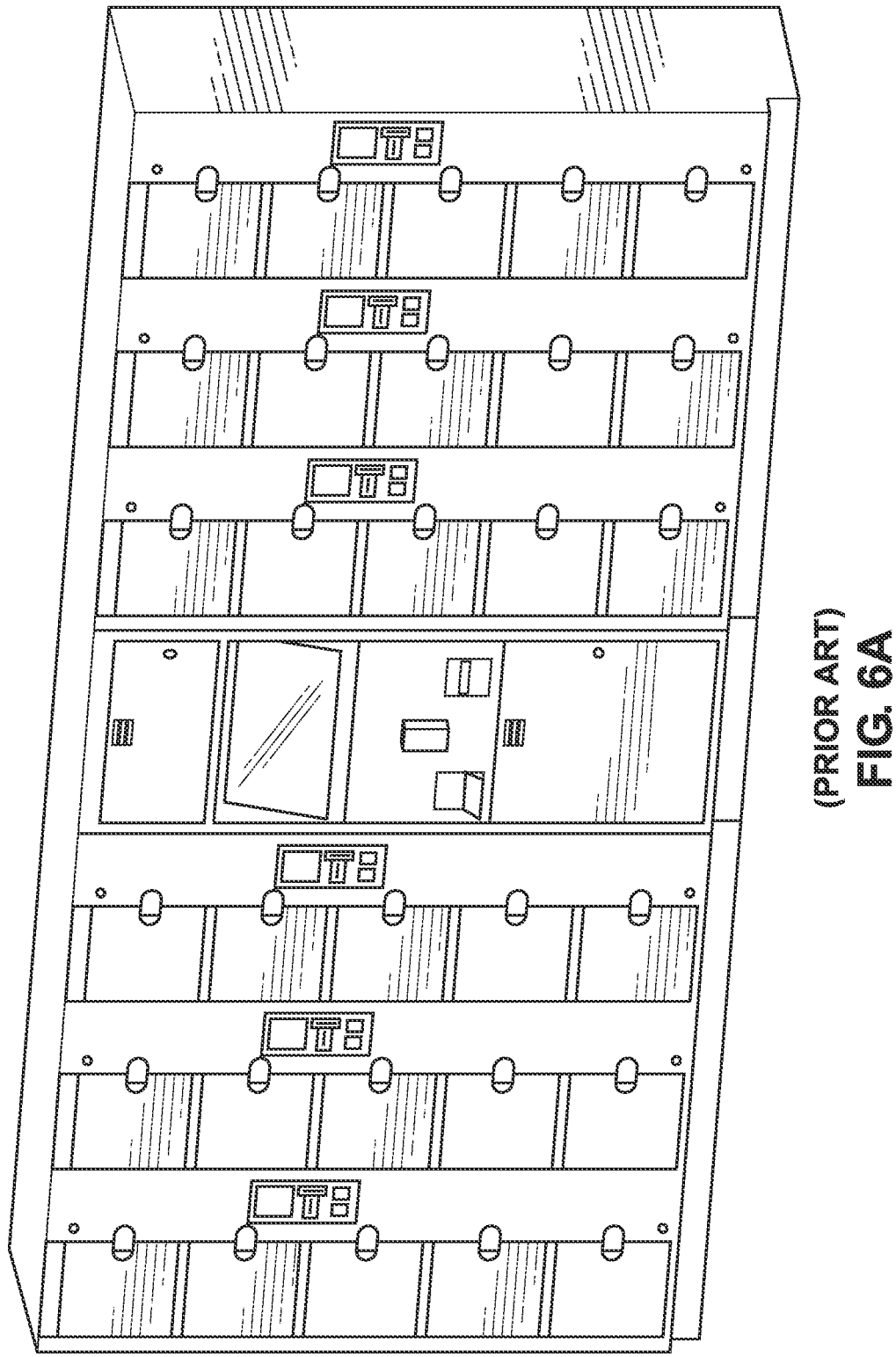
Figure 6D:
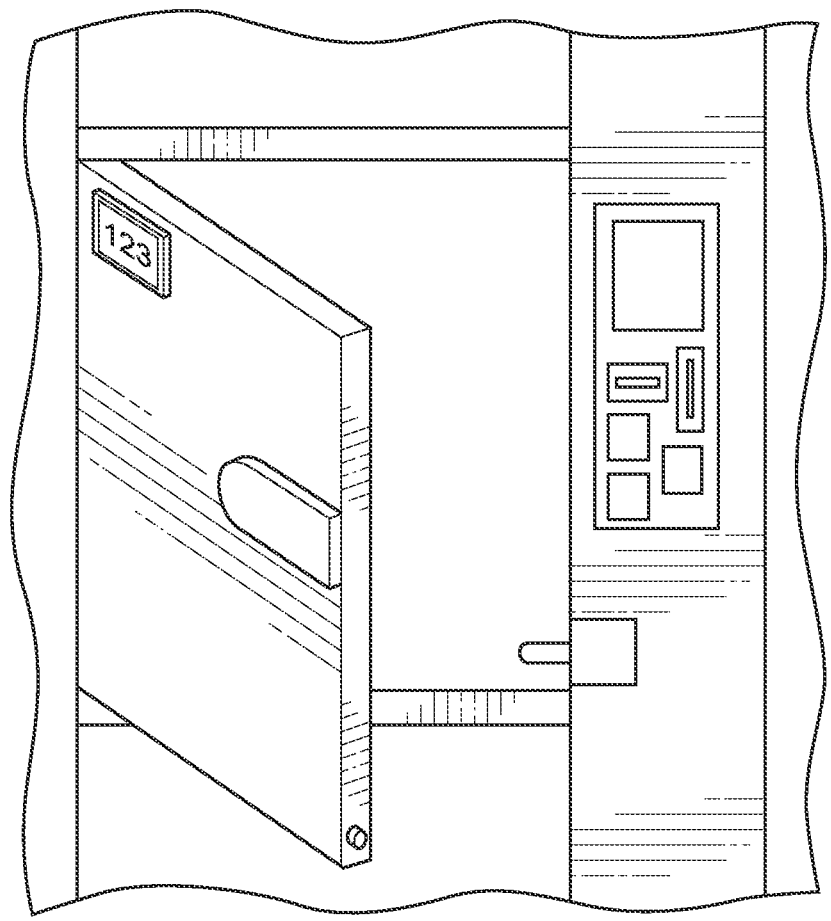
Figure 7A:
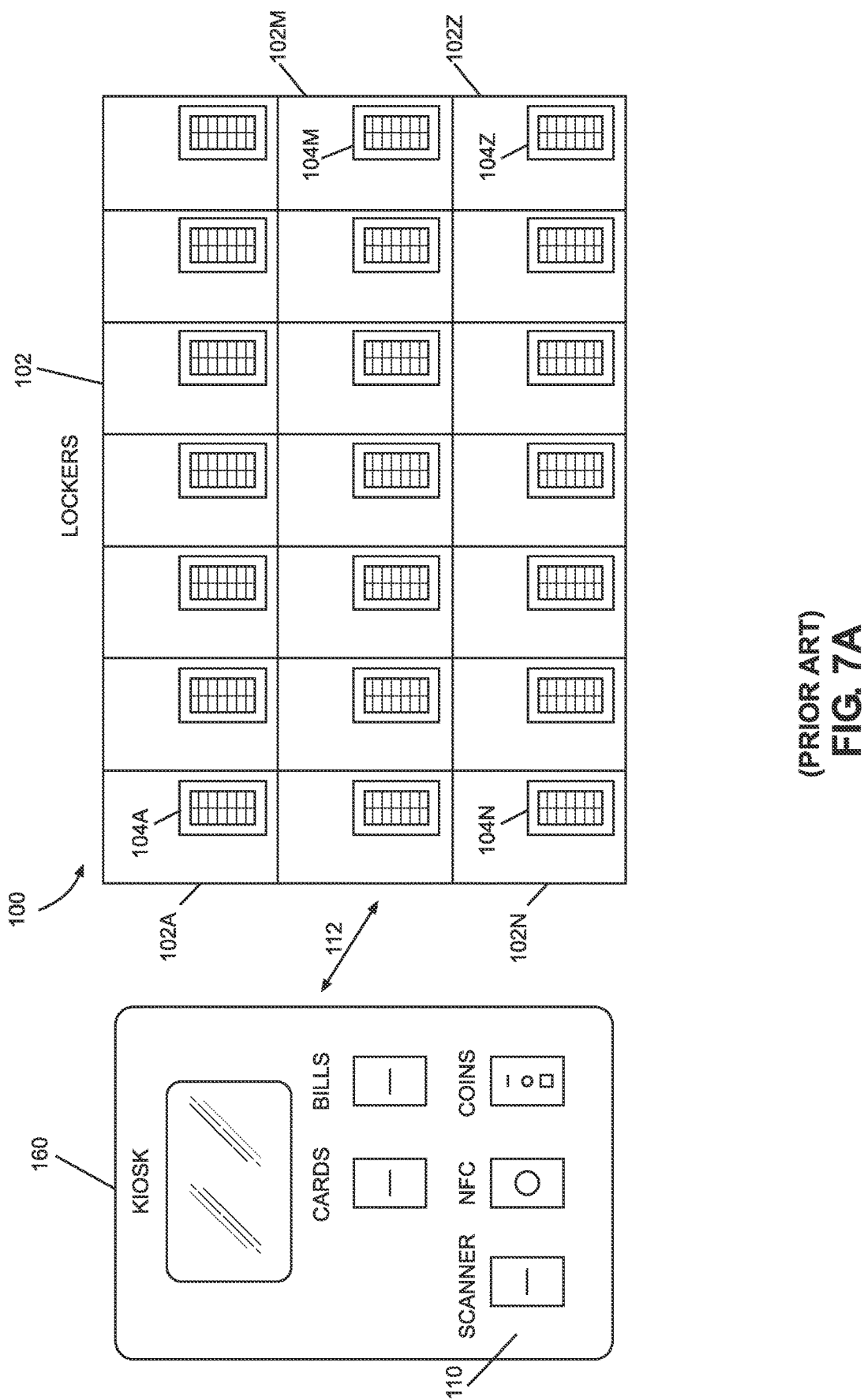
FIGS. 7A and 7B show a prior art electronic locker system in US Patent Application No. US2014/0316918 to Zaniker et al (assigned to Best Lockers LLC), wherein the locker system is networked with flexibly placed guest kiosks so that payment queue lines do not interfere with guests accessing their lockers, wherein each electronic locker unit is provided with a dedicated keypad on its locker door to bypass the kiosk during future access, wherein to rent a locker rental using the prior art electronic locker system, a guest simply visits any networked kiosk, and using cash or credit card, a guest user enters their desired PIN at the kiosk, and then goes directly to their assigned locker to use it, also providing direct access to their stored personal belongings even when there is a local power and/or Internet disruption at the locker system.
Figure 7B:
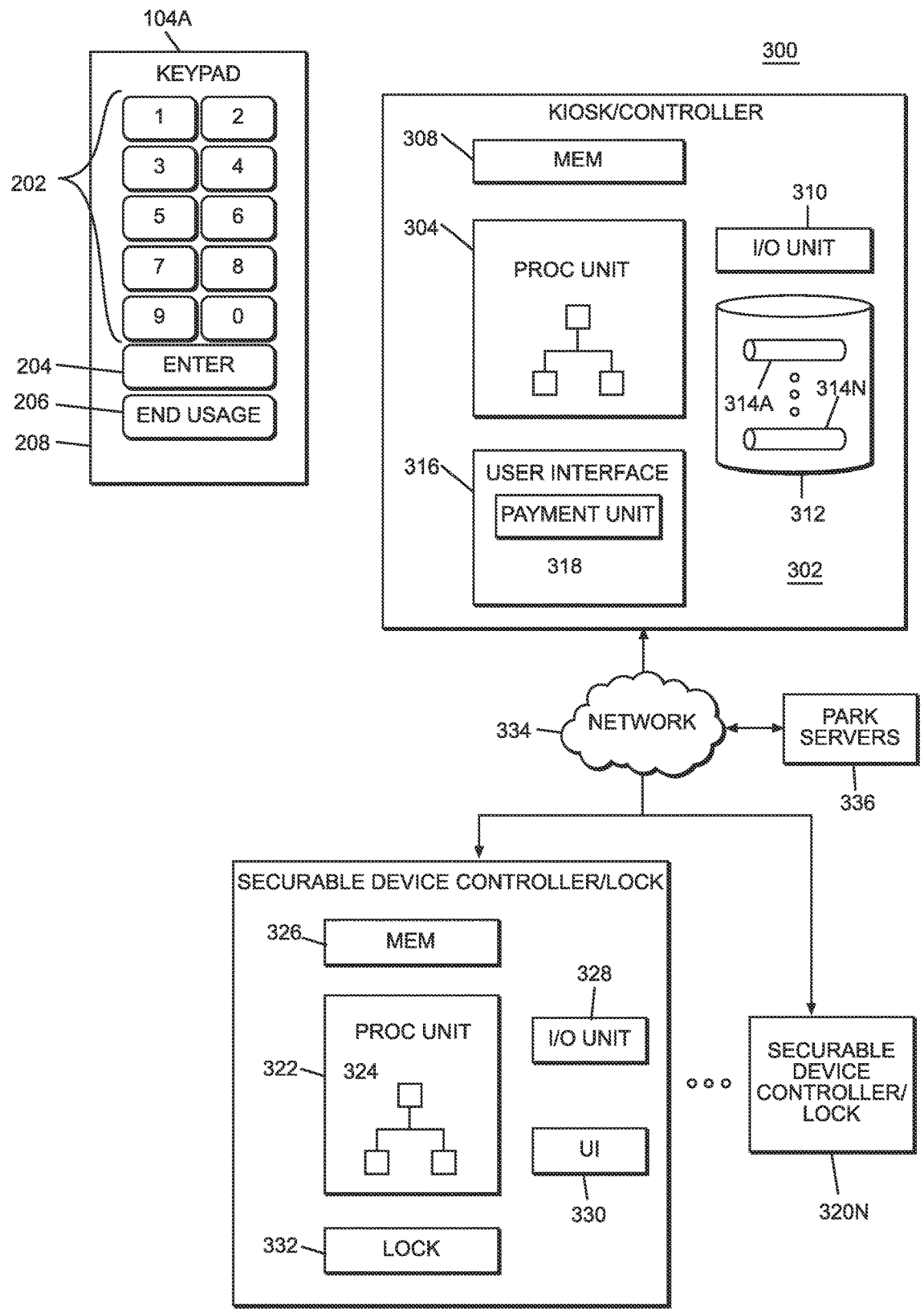
Figure 8:
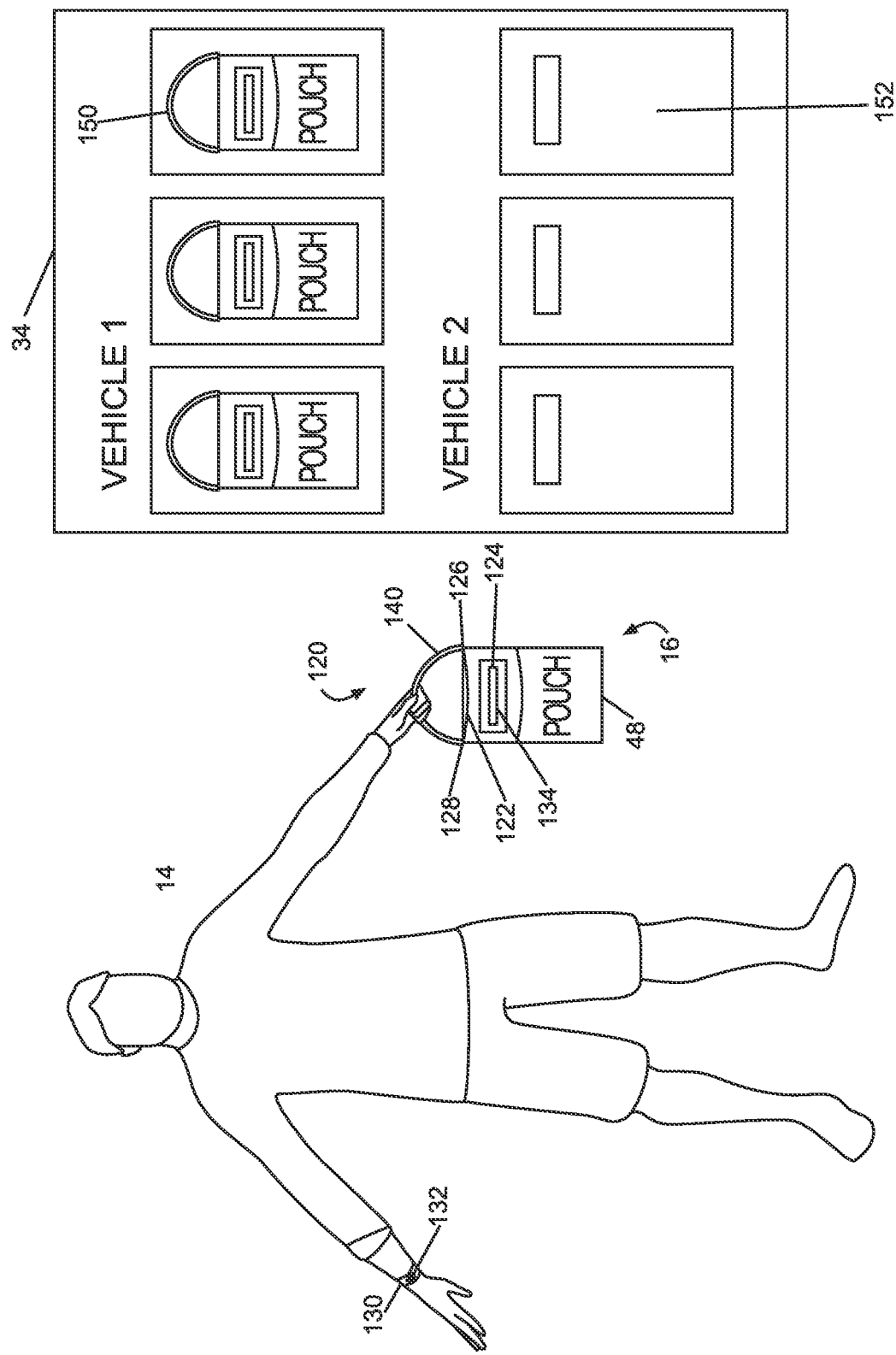
FIG. 8 is a schematic illustration of a double-sided locker system for installation at the entry and exit points of an amusement park ride, illustrated in FIG. 7 and disclosed in Paragraph in US Patent Application Publication No. 2018/0061157 by Zielkowski et al. issued as U.S. Pat. No. 10,460,539, wherein the storage system may be located at a central location near the loading and unloading stations of the amusement park ride, where the rider may approach the storage system 34 prior to boarding the ride vehicle to store and secure the portable locker, and after unloading from the ride vehicle, the rider may approach the storage station to retrieve the stored items as described in detail hereinabove.
Figure 9:
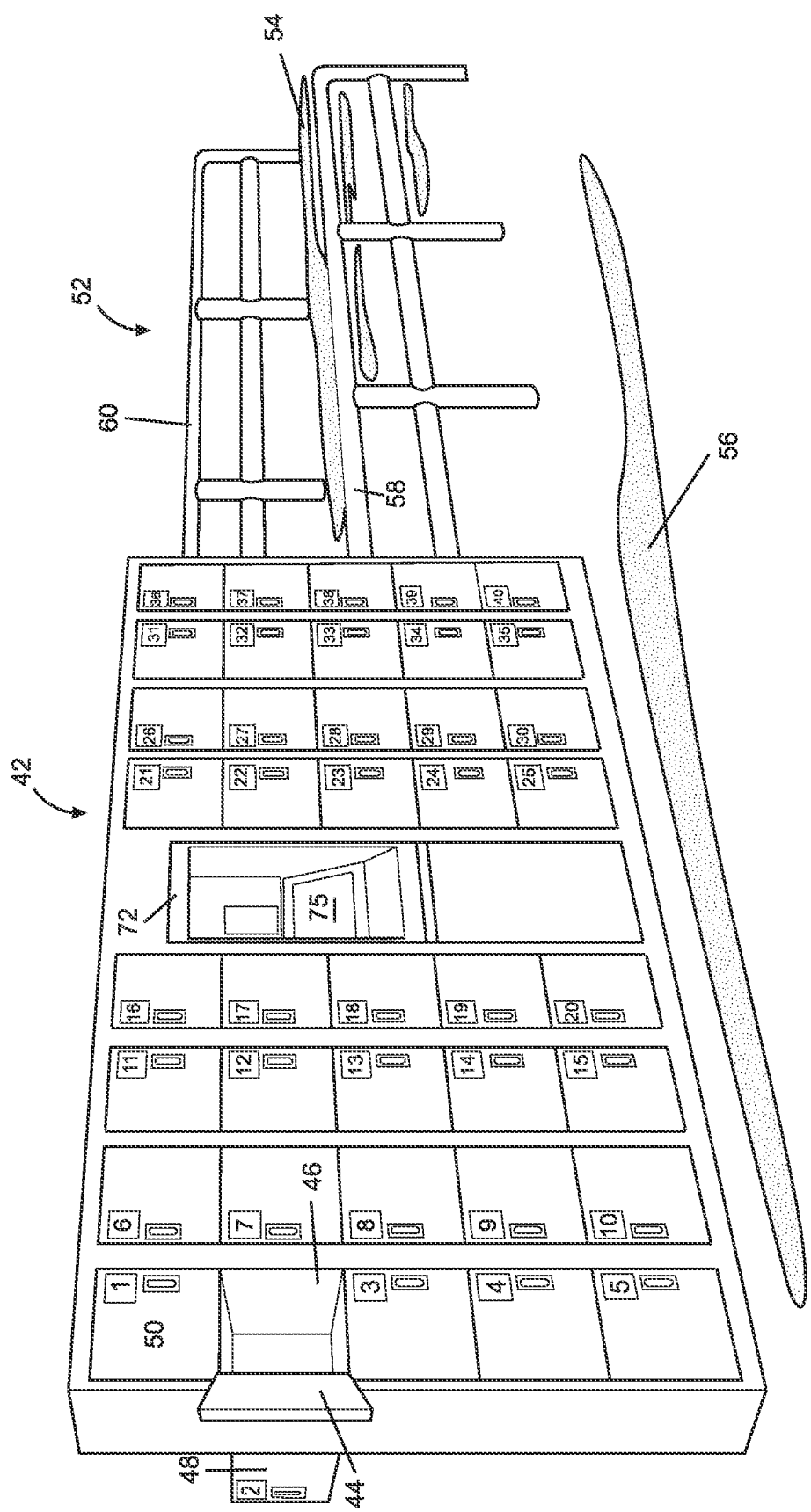
FIG. 9 shows a prior art double-sided locker system disclosed in U.S. Pat. No. 10,607,433 to Danson assigned to VLocker PTY, LTD.

Referring to the figures in the accompanying Drawings, the illustrative embodiments of the system and will be described in great detail, wherein like elements will be indicated using like reference numerals.

Also, U.S. Pat. No. 8,990,110, US Patent Application No. US2019/0035186, U.S. Pat. Nos. 9,558,608, 10,474,797, 7,341,191, and pending U.S. patent application Ser. No. 14/728,887 filed Jun. 2, 2015, and Ser. No. 16/663,057 filed Oct. 24, 2019, are each hereby incorporated herein by reference in their entirety, as if set forth fully herein.

Figure 10:
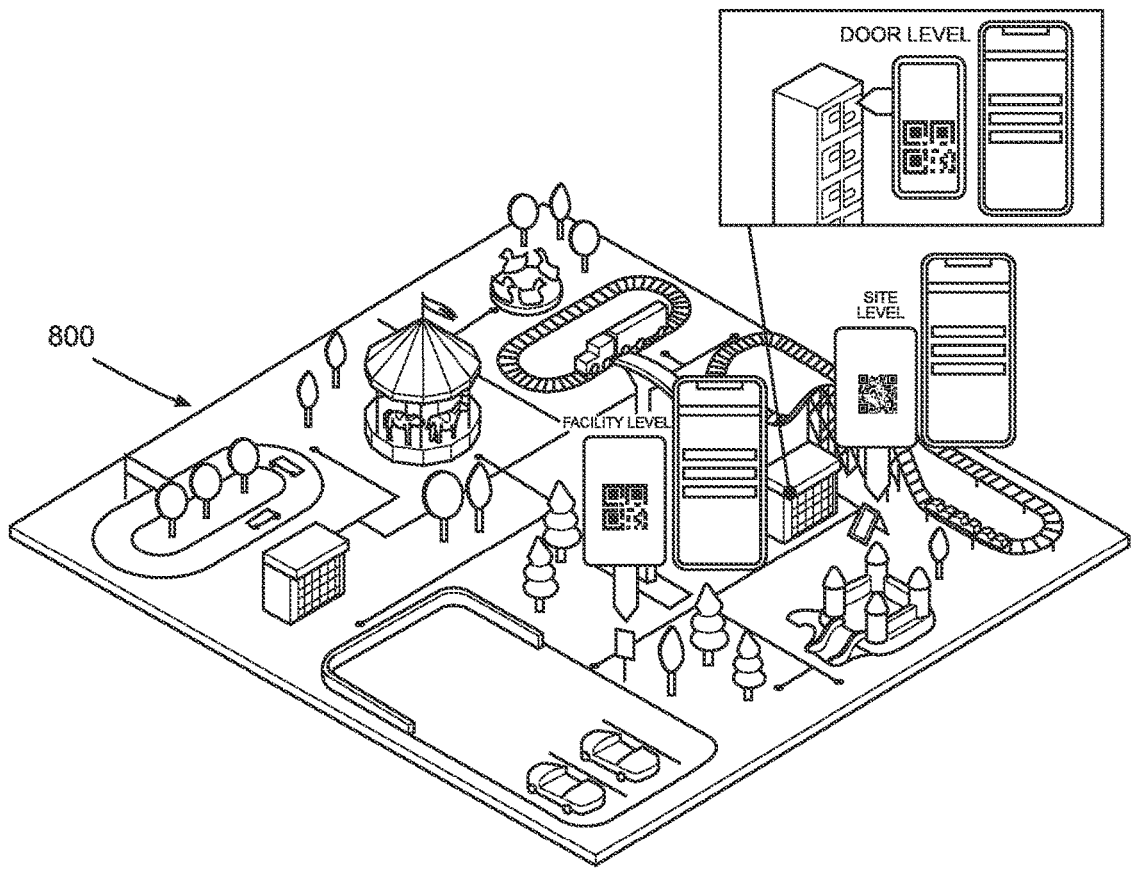
FIG. 10 shows a schematic illustrating providing a global view of an amusement park facility supported by the cloud-based Quick Response (QR) code driven wireless system network supporting storage lockers, mobility solutions and other guest services in accordance with the principles of the present invention, wherein multi-level QR codes (e.g. Facility-Level QR Codes, Site-Level QR Codes and device-level QR codes) are deployed across the entire amusement park facility (i.e. enterprise) to support the contact-less procurement and provision of diverse kinds of valuable services to park guests and visitors, anywhere within the park environment, when simply using their mobile (smart) phones.

Brief Overview of the Wireless Control Access System Network of the Present Invention FIG. 10 illustrates a global view of an amusement park facility supported by a cloud-based Quick Response (QR) code driven wireless control access system network 1 supporting the rental, access and control of storage lockers, mobility solutions and other guest services in accordance with the principles of the present invention.

In the illustrative embodiments disclosed herein, multi-level QR codes (e.g. Facility-Level QR Codes 40A, Site-Level QR Codes 40B and device-level QR codes 40C) are deployed across the entire amusement park facility (i.e. enterprise) 800 to support the contact-less procurement and provision of double-sided ride/attraction storage lockers 150, and other valuable products and services, to park guests and visitors anywhere within the park environment, when simply using their mobile smartphones 130 deployed on the wireless system network.

Figure 11A:
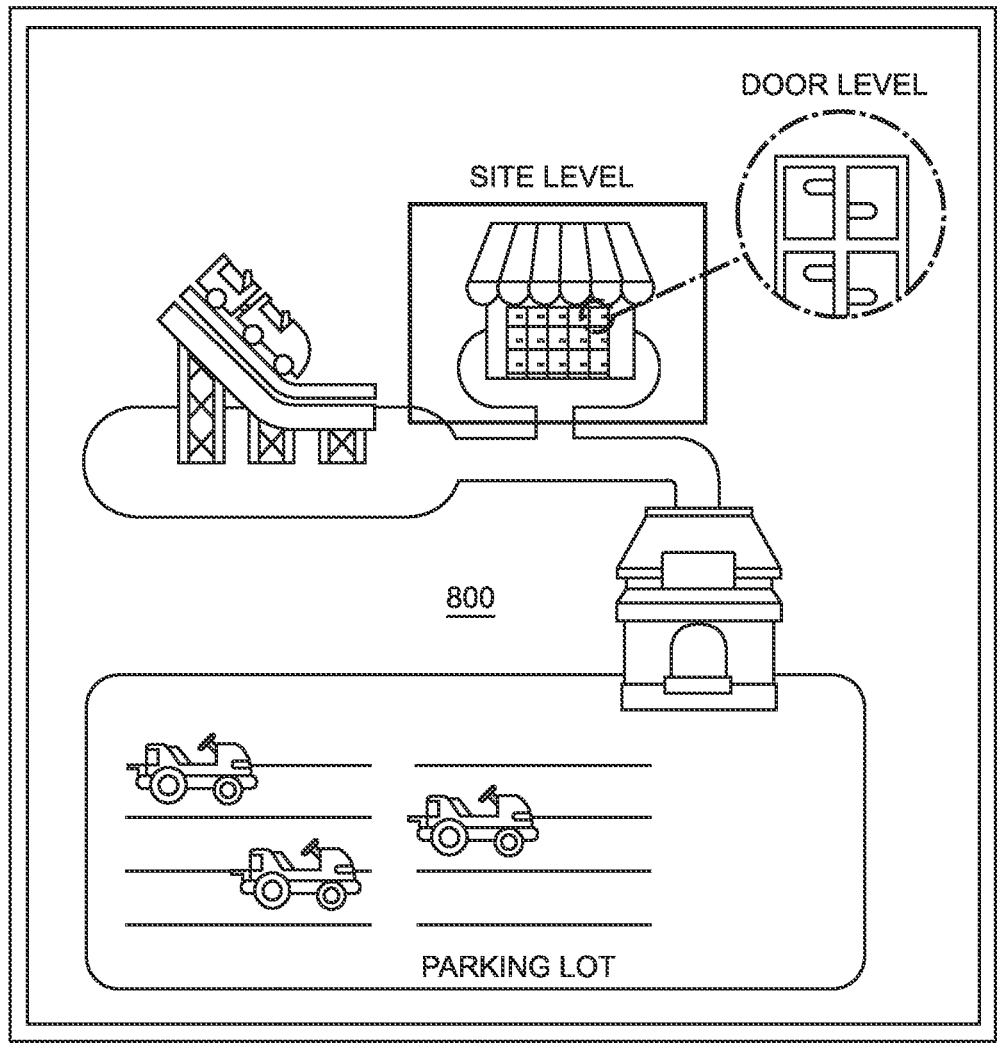
FIG. 11A shows a schematic representation of an amusement park facility, which the system of multi-level QR codes of the present invention are embedded at the facility, site, and device (i.e. thing) level of the park environment to enable park guests, visitors and other system users to procure, access and receive storage, mobility and other valuable products and services while visiting an amusement park environment.

While the use of the term "amusement park" and "amusement park facility" has been used herein in connection with many illustrative embodiments of the present invention, it is understood that this term shall be understood to include, but not be limited to, any "adventure seeking" or "human social" activity on Earth, including, for example:

Casinos
Museums
National Parks
Amusement Parks
Theme Parks
Sporting Arenas and Centers
Virtual Reality and Augmented Reality Adventure Parks
Colosseums and Amphitheatre
Music and Arts Festivals
Water and River Rafting and Outdoor Activities
Western Activities
Horseback Riding
Hiking and Mountain Climbing Activities
Sporting and Recreational Centers
Gymnastic Centers
National Beaches
Rodeos
Animal Shows
Sporting Games and Contests
Film and Performing Arts Theaters
Public Parks
Ice Skating Rinks
Public Swimming Pools
ATR vehicles and trailblazing
Ski Lodges
Snowboarding
Alpine Sports
Hunting and Fishing Lodges While amusement park venue will provide many opportunities to serve people using the wireless system network of the present invention 1, it is understood that any social environment involving human and/or animal life will be suitable venues for the wireless system network 1, where mobile phones can be used to provide machine-code driven access control double-sided ride storage locker systems 150, single-sided storage locker systems, and other products and services of value. For examples, social environments for use of the wireless system network of the present invention 1 will include, but are not limited to:

National Disaster and Relief Centers (FEMA)
International Red Cross Relief Centers
Homeless Shelters and Centers
Personal Relief Shelters
Shared Business Office Space
Community Living Environments
Senior Citizen Centers
Transportation Centers FIG. 11A shows an amusement park facility 800, in which a system of exemplary multi-level QR codes of the present invention are embedded at the facility, site, and device (i.e. thing) level of the park environment to enable park guests, visitors and other system users to procure, access and control storage, mobility and other valuable products and services while visiting an amusement park environment.

Figure 11B:
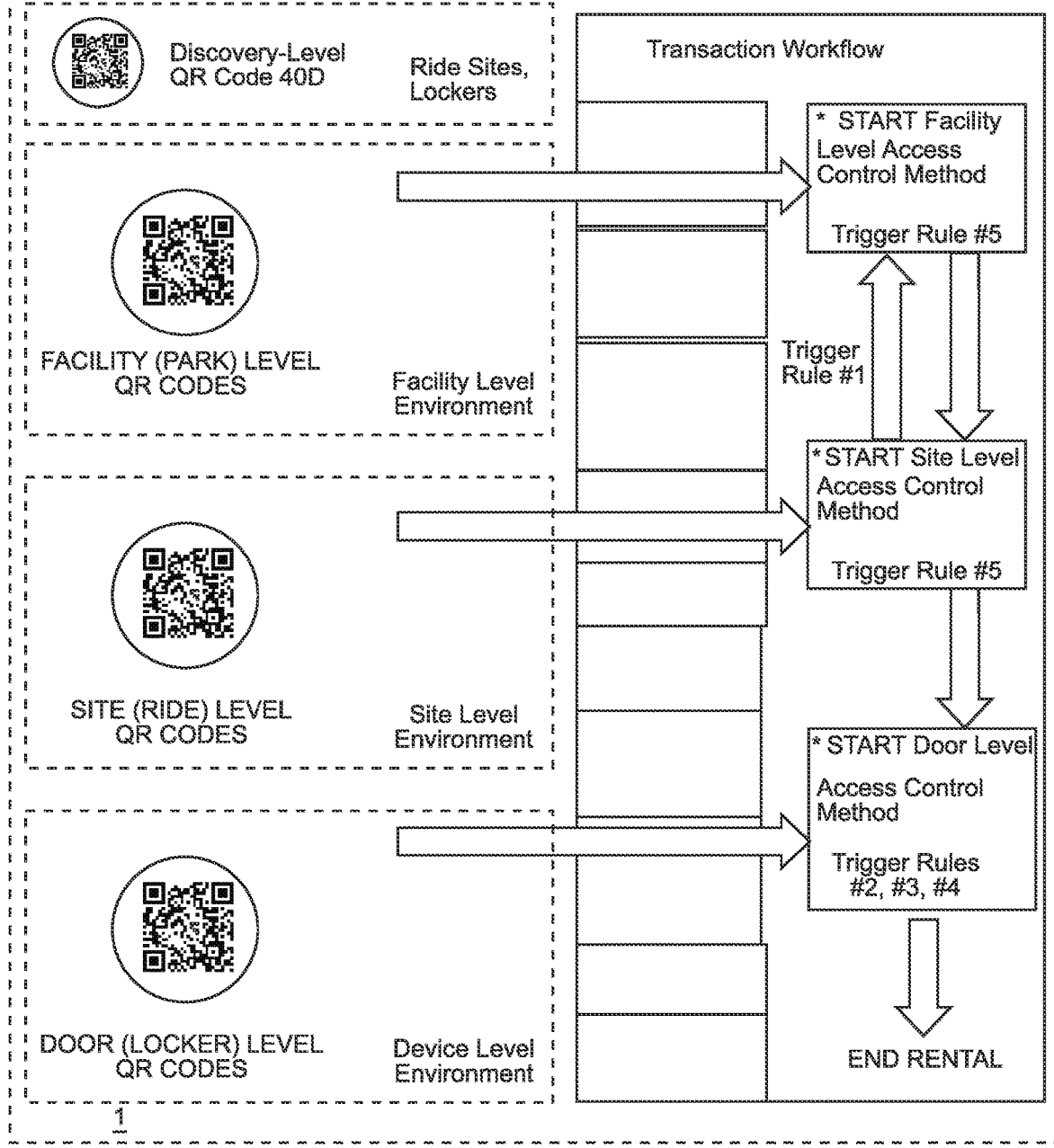
FIG. 11B shows a schematic representation illustrating the mapping of multi-level QR codes to particular entry points in transaction workflows designed to support procurement and delivery of services to an amusement park, tourist, or adventure seeking environment, wherein (i) Facility-Level QR codes are mapped to facility-level entry points in the transactional workflow and posted/displayed at physical and virtual locations outside of amusement park facility, (ii) Site-Level QR codes are mapped to site-level entry points in the transactional workflow and posted/displayed at physical Site locations within the amusement park facility, and (iii) Device-Level QR codes are mapped to device-level (e.g. locker door level) entry points in the transactional workflow and posted/displayed on actual physical locker doors located at Sites within the amusement park facility.

FIG. 11B illustrates the mapping of multi-level QR codes to particular entry points in transaction workflows designed to support procurement and delivery of services to an amusement park, tourist, or adventure seeking environment. As shown, the (i) Facility-Level QR codes 40A are mapped to facility-level entry points in the transactional workflow and posted/displayed at physical and virtual locations outside of amusement park facility, (ii) Site-Level QR codes 40B are mapped to site-level entry points in the transactional workflow and posted/displayed at physical Site locations within the amusement park facility, and (iii) Device-Level QR codes 40C are mapped to Device-Level (e.g. locker door level) entry points in the transactional workflow and posted/displayed on both the storage/retrieval side of actual physical locker doors located at ride, attraction and/or event Sites within the amusement park facility.

FIG. 11C list a set of exemplary rule-based triggers that can be employed for automated re-direction of transactional workflow upon automated detection thereof during the QR driven access control processes executing on system servers of the present invention. This list is merely exemplary and will vary from embodiment to embodiment, and application to application.

FIG. 12 shows the Multi-Level QR Code Hierarchy used to practice the illustrative embodiments of the present invention, namely: (i) (Locker) Door-Level QR Codes intelligently encoded with data attributes including facility (park), site, door (e.g. storage/ingress-side door, and retrieval-egress-side door), type (e.g. timed/daily), size, and pricing and URL directed to a first server component supported on the wireless system network of the present invention, (ii) Site-Level QR Codes intelligently encoded with data attributes including facility (park), site, type (e.g. timed/daily), size options, the pricing for each size and type options, and inventory status of each type and option, and URL directed to a second server component supported on the wireless system network of the present invention, and (iii) Facility-Level QR Codes intelligently encoded with data attributes including facility (park), sites rendered as choices, types (e.g. timed/daily), size options, and the pricing for each size and type options, and URL directed to a third server component supported on the wireless system network of the present invention; and Discovery-Level QR Codes 40D intelligently encoded with a URL that points to a server process enabling automated discovery of any lockers that the guest may have rented within the facility, or a particular site within the facility, along with data attributes that typically specify the location where the particular Discovery-Level QR Code has been posted in the facility to deliver such "Find My Locker" discovery services. This is code hierarchy is merely exemplary, and will vary from embodiment to embodiment of the present invention disclosed herein.

In general, when practicing the principles of the present invention, each Multi-Level QR (Quick Response) Code Structure (e.g. Facility-Level, Site-Level and Device/Door-Level QR Code Structure) can be realized using (i) any machine-readable optically-readable bar code symbol of any symbology type, and/or (ii) any RFID tag component, realized using an RFID technology including active and passive RFID technologies known, and as may be developed and advanced in the future.

These machine-readable codes, including optically-readable codes and other forms of graphical indicia containing decodable information, can be printed in a physical medium and posted on the signs, doors, and devices described herein requiring wireless remote and local access control, as described herein, by scanning and decoding (i.e. reading) the code with aa user's web-enabled mobile phone deployed on the wireless access control system network of the present invention.

Alternatively, these machine-readable codes can be electronically displayed on electronic-ink (e.g. E-Ink display media) and LCD display screens alike mounted on signs, doors, and devices described herein also requiring wireless remote and local access control by scanning the code with a user's web-enabled mobile phone deployed on the wireless access control system network of the present invention.

Figure 13:
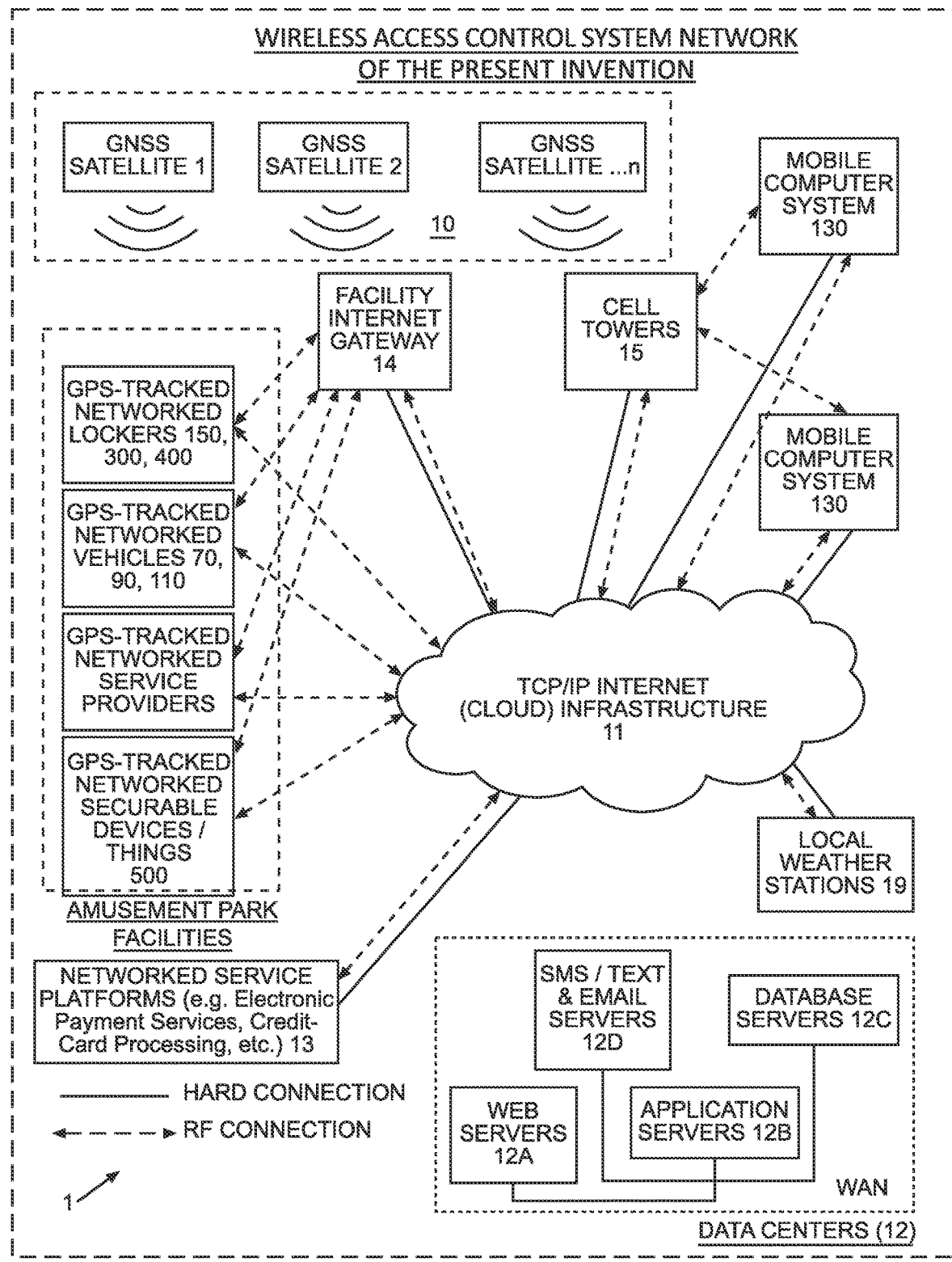
FIG. 13 is a schematic system block diagram of the cloud-based (i.e. Internet-based) GPS-tracking wireless access control system network of the present invention configured for procurement and access control of storage lockers, mobility solutions and other services offered within an enterprise-level amusement park facility, shown comprising: a system of GNSS satellites orbiting around the Earth, GPS-tracked wireless networked single-sided storage lockers, GPS-tracked wireless networked vehicles (e.g. ECVs, wheelchairs, and strollers alike), GPS-tracked service providers, GPS-tracked vendors, and other diverse types of GPS-tracked wireless networked securable devices, each being interfaced with a TCP/IP infrastructure directly, and/or via a facility-based Internet Gateway; a network of cellular towers for supporting wireless data communication services between wireless mobile computing devices and network communication adapters; a plurality of wireless mobile computing systems (e.g. smartphones, tablet computers, etc.); one or more industrial strength data centers, each supporting a cluster of communication servers (e.g. web servers), a cluster of application servers, and a cluster of database servers, and SMS/text and email servers supported by at least one wide area network (WAN), and local weather servers, and network service platforms including electronic payment systems and services, credit card processing, and the universe of web servers supported on the WWW.

FIG. 13 shows the cloud-based (i.e. Internet-based) GPS-tracking wireless access control system network of the present invention 1 configured for procurement and access control of storage lockers, mobility solutions and other services offered within an enterprise-level amusement park facility, shown comprising: a system of GNSS satellites 10 orbiting around the Earth, GPS-tracked wireless networked lockers 150, 300, GPS-tracked wireless networked vehicles (e.g. ECVs 70, wheelchairs 110, and strollers 90 alike), GPS-tracked service providers, GPS-tracked vendors, and other diverse types of GPS-tracked wireless networked securable devices, each being interfaced with a TCP/IP infrastructure 11 directly, and/or via a facility-based Internet Gateway 14; a network of cellular towers 15 for supporting wireless data communication services between wireless mobile computing devices and network communication adapters; a plurality of wireless mobile computing systems (e.g. smartphones, tablet computers, etc.) 130; one or more industrial strength data centers 12, each supporting a cluster of communication servers (e.g. web servers) 12A, a cluster of application servers 12B, and a cluster of database servers 12C, and SMS/text and email servers 12D supported by at least one wide area network (WAN), and local weather servers 19, and network service platforms 13 including electronic payment systems and services, credit card processing, and the universe of web servers supported on the WWW.

Figure 14:
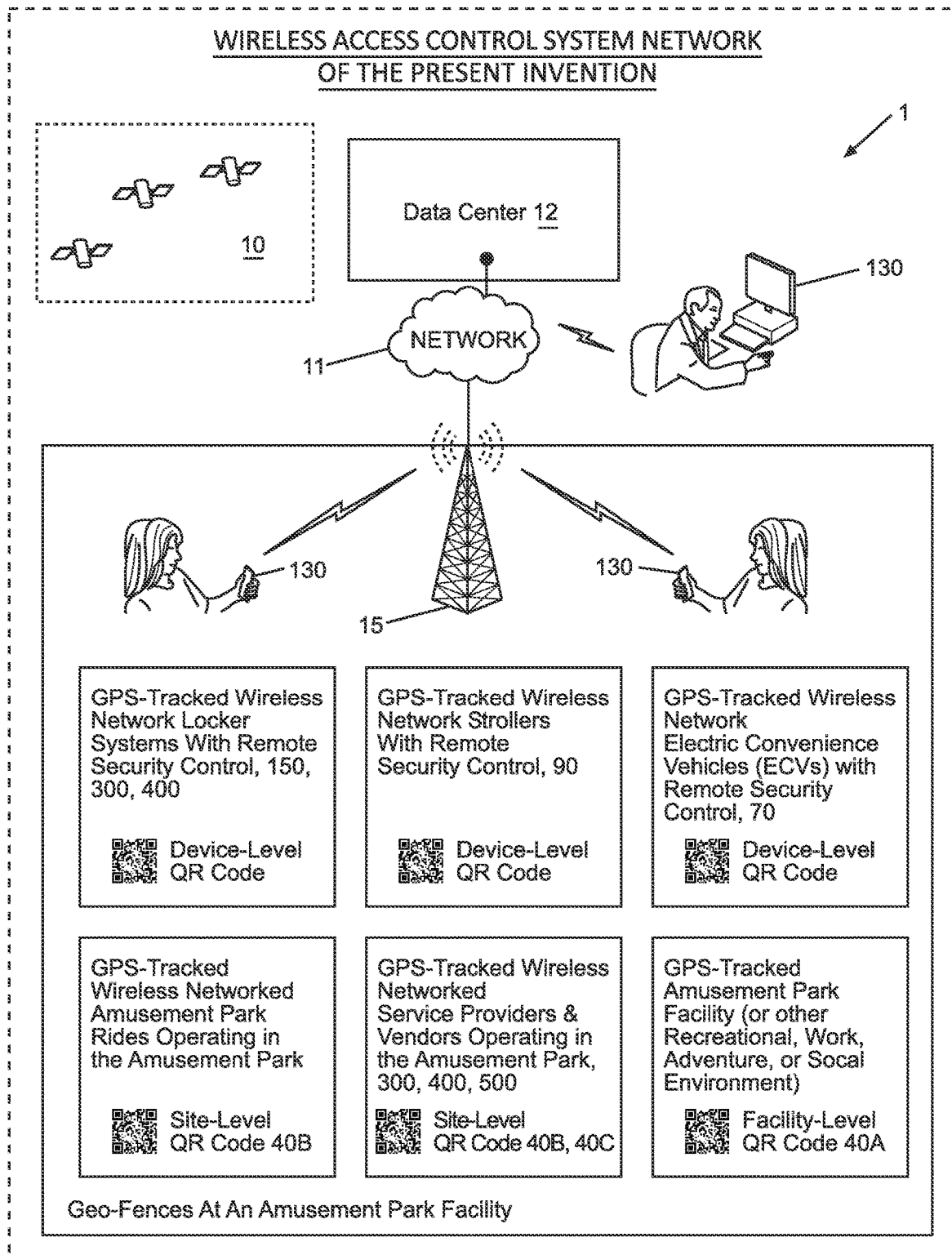
FIG. 14 is a schematic system diagram of the cloud-based GPS-tracking wireless access control system network of the present invention depicted in FIG. 10, showing, in greater detail, (i) GPS-tracked wireless networked locker systems with remote access control and bearing Device-Level QR Codes for procurement and access control by guests scanning these QR codes using mobile smartphones, (ii) GPS-tracked wireless networked strollers with remote security control and bearing Device-Level QR Codes for procurement and access control by guests scanning these QR codes using mobile smartphones, (iii) GPS-tracked wireless networked electric convenience vehicles (ECVs) with remote security control and bearing Device-Level QR Codes for procurement and access control guests by scanning these QR codes using mobile smartphones, (iv) GPS-tracked wireless networked amusement park rides (e.g. Sites) with remote security control and posting/displaying Site-Level QR Codes for access to the park's storage and mobility service transactional workflow by guests scanning these QR codes using mobile smartphones, (v) GPS-tracked wireless networked Service Providers and Vendors (e.g. Sites) with remote security control and posting/displaying Site-Level QR Codes for access to the park's service transactional workflow by guests scanning these QR codes using mobile smartphones, and (vi) GPS-tracked wireless networked Amusement Park Facility (e.g. Facility) with remote security control and posting/displaying Facility-Level QR Codes for access to the park's storage and mobility service transactional workflow by guests scanning these QR codes using mobile smartphones.

FIG. 14 shows the cloud-based GPS-tracking wireless access control system network 1 depicted in FIG. 10, showing, in greater detail: (i) GPS-tracked wireless networked locker systems 150, 300 with remote access control and bearing Device-Level QR Codes 40A for procurement and access control by guests scanning these QR codes using mobile smartphones 130; (ii) GPS-tracked wireless networked strollers with remote security control and bearing Device-Level QR Codes 40C for procurement and access control by guests scanning these QR codes using mobile smartphones 130; (iii) GPS-tracked wireless networked electric convenience vehicles (ECVs) 70 with remote security control and bearing Device-Level QR Codes 40C for procurement and access control guests by scanning these QR codes using mobile smartphones 130; (iv) GPS-tracked wireless networked amusement park rides (e.g. Sites) with remote security control and posting/displaying Site-Level QR Codes 40B for access to the park's storage and mobility service transactional workflow by guests scanning these QR codes using mobile smartphones 130; (v) GPS-tracked wireless networked Service Providers and Vendors (e.g. Sites) with remote security control and posting/displaying Site-Level QR Codes 40B for access to the park's service transactional workflow by guests scanning these QR codes using mobile smartphones 130; and (vi) GPS-tracked wireless networked Amusement Park Facility (e.g. Facility) 800 with remote security control and posting/displaying Facility-Level QR Codes 40A for access to the park's storage and mobility service transactional workflow by guests scanning these QR codes using mobile smartphones 130.

Figure 15:
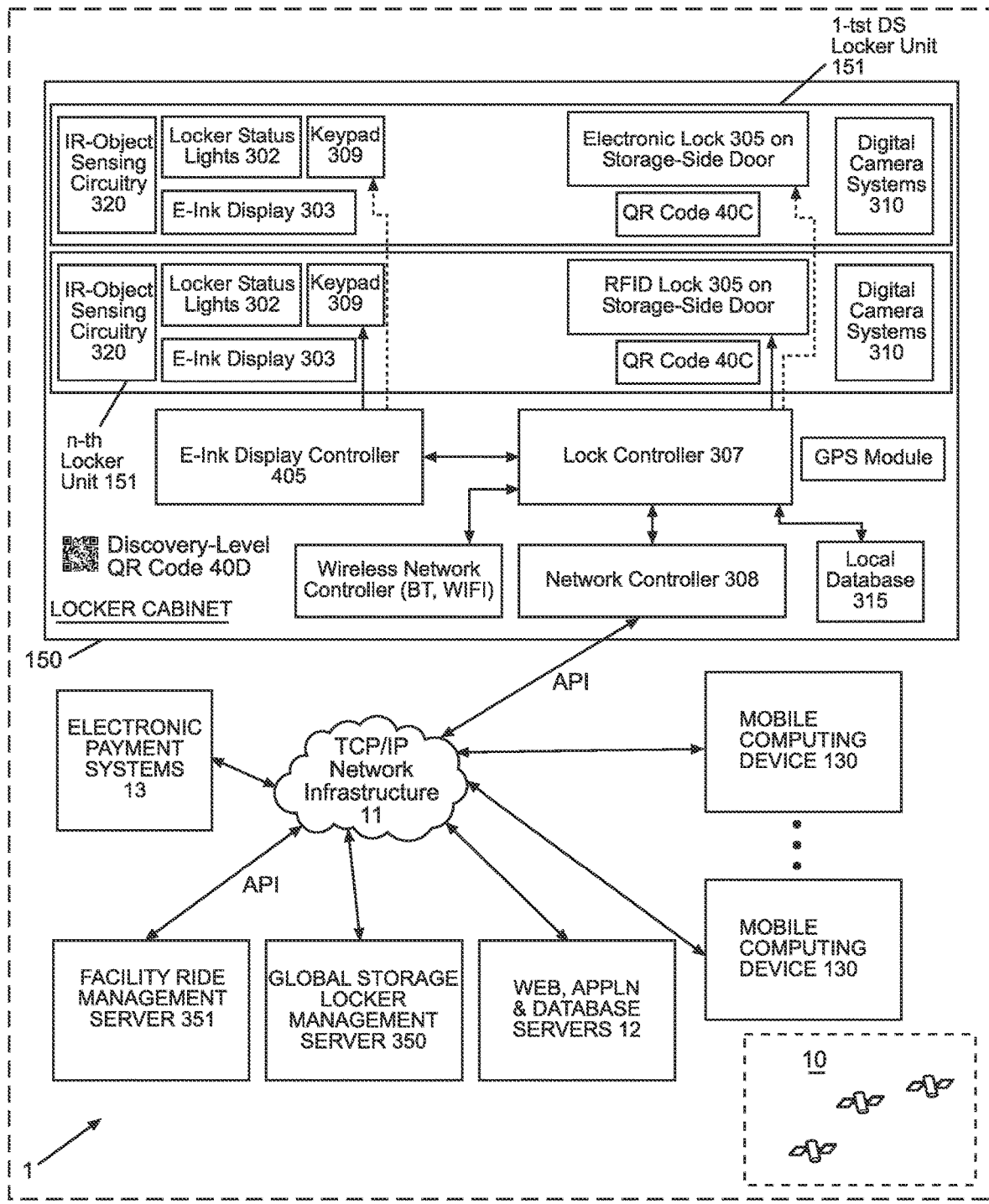
FIG. 15 is a schematic system block diagram of the cloud-based GPS-tracking wireless access control system network of the present invention, shown comprising a system of wireless networked single-sided storage locker units internetworked together at the cabinet/bank-level and each wireless networked single-sided locker system comprises the following components integrated about a system bus, namely, a programmed microprocessor interfaced to the system bus and supported by a memory architecture (e.g. RAM, ROM, and SSD persistent storage), a network controller for interfacing with the TCP/IP infrastructure, a solenoid driver circuit connected to a lock solenoid and bolt assembly and locker door, a keypad and E-ink display panel and Bluetooth/WIFI interfaced with the system bus via an I/O module interface, a digital video camera with a field of view (FOV) and interfaced with the system bus, a GPS module interfaced with the system bus, a Door-Level QR Code physically posted or electronically displayed on the locker door surface using its E-ink panel.

FIG. 15 shows the cloud-based GPS-tracking wireless access control system network 1, with other aspects thereof depicted in FIGS. 13 and 14, and showing the system subcomponents comprising: an installed base of single-sided ride storage locker systems 150 according to the present invention, each having a group of networked two-sided locker units 151 internetworked together at the cabinet/bank-level and each wireless-networked single-sided locker system 150.

As shown in FIG. 15, each single-sided ride storage locker system 150 comprises: a plurality of single-sided locker units 151, each having a hinged electronically-locked locker door on each single-sided locker unit 151, and a hinged door on the retrieval/egress side of the single-sided locker unit 151; a first Door-Level QR Code 40C physically posted or electronically displayed on the storage-side door surface 305 using its E-ink panel 303; a second Door-Level QR Code 40C physically posted or electronically displayed on the storage-side door surface using its E-ink panel 303; RGY locker status LED lights 302; an e-ink display controller 306 for the locker unit; an electronic lock module for each door 305, controlled by a local lock controller 307; a keypad 309 for each lock controller mounted on the locker door, for entry of digital lock code selected by the user; a network controller 308 for interfacing with the TCP/IP infrastructure 11 and communicating each locker unit with the wireless system network servers, as described herein; a first and second digital video camera systems 310 with field of views (FOV1 and FOV2) projected within the interior space of each double-sided locker, and interfaced with the system bus; an IR object sensing circuit 320 employing IR transmitters and IR receiver (i.e. IR transceivers) and associated light transmission and collection optics, for directing IR object sensing beams through the interior space of each double-sided locker unit and automatically detecting received IR beams so as to automatically determine whether or not objects (e.g. personal; belongings) are physically present in the interior of each locker at any moment in time, and interfaced with the system bus in a conventional manner; a GPS module 321 interfaced with the lock controller 307 having a system bus and programmed processor and a memory architecture; a local database 315 for storing data records reflected in the data schemas of FIGS. 15A, 15B and 15C, and replicated in a mirrored manner in global locker storage management system 350, and database servers within the data center 12. As shown, the single-sided locker cabinet 151 is connected to the data center 12 via the cloud infrastructure, along with mobile phone systems 130, global storage locker management server 350, facility ride management system server 351, electronic payment systems 13, and the like, operably connected to the TCP/IP network infrastructure of the Internet 11.

In the preferred embodiment, each double-sided locker units 151 comprises components integrated about a system bus, namely: a programmed microprocessor interfaced to the system bus and supported by a memory architecture (e.g. RAM, ROM, and SSD persistent storage), a network controller for interfacing with the TCP/IP infrastructure, a solenoid driver circuit connected to a lock solenoid and bolt assembly and locker door, a keypad and E-ink display panel and Bluetooth/WIFI interfaced with the system bus via an I/O module interface, a digital video camera with a field of view (FOV) and interfaced with the system bus, a GPS module interfaced with the system bus, a first Door-Level QR Code physically posted or electronically displayed on the storage-side door surface using its E-ink panel, and a second Door-Level QR Code physically posted or electronically displayed on the storage-side door surface using its E-ink panel.

As shown FIG. 15, the facility ride management system server 351 is configured ad programming for automatically managing the rides and attractions maintained and operating at the ride sites within the facility and supporting an API for access to the database system 12, including (i) receiving and processing guest passenger boarding passes issued for specific rides, train and cart assignments, and (iii) seat assignments optionally, and (ii) maintaining logs, records and reports regarding the date and timing of guests boarding and un-boarding ride trains and carts, which and when trains are running on the ride tracks, as well as which and when specific trains are stopped and allowing the boarding and/or un-boarding of guest passengers and the like.

In the system network of present invention 1, each single-sided storage locker 151 in system 150, as well as networked stroller, ECV, wheelchair, and thing (i.e. "network device") deployed and managed on the system network 1 is, or should wherever possible, be assigned a static IP address so as to enable data communication between network devices and information servers deployed on the system network 1 using data communication protocols suitable for the application at hand, as described herein. It is also understood that preferably, the IP address will be set in the network controller of the networked device, as well as in the computer memory architecture of the programmed processor the networked device. However, in some embodiments, a network controller may be assigned to one or more or a group of networked devices, and IP address management and network protocol translation methods maybe be used as required or desired to achieve digital communication in a manner well known to those skilled in the computer architecture and networking communication arts.

FIG. 15A shows a table (i.e. schema) used to create data records stored in a local database 315 maintained within the locker system 150 maintaining the various locker records for the storage locker identified by its locker #, and containing data records such as, for example: locker #; locker cabinet #; locker size; locker status (e.g. available; rented; out of order); Track ID (e.g. regular, medium, or fast); interior digital camera system(s) (FOV1=Y/N; FOV2=Y/N); content status of locker interior space (i.e. empty/full); door status (i.e. opened or closed); IP Address for locker; rental transaction identifier (i.e. unique code assigned to rental transaction by rental server); guest PIN (i.e. 4 digits) stored by specific guest; Device (phone) ID assigned to phone scanning the locker #; Device (Phone) ID (e.g. electronic cookie or digital token generated and stored in cache memory of the phone (e.g. randomly generated number for the rental transaction, or code generated based on MAC address and/or other phone identifier). These data records are used throughout the practice of the methods of access and control of the present invention described and specified herein.

FIG. 15B shows a schema for the database records that are stored in the global database system (i.e. global storage locker management server) 350 for each single-sided locker unit in the single-sided ride storage locker system of the present invention 150.

Figure 15C:
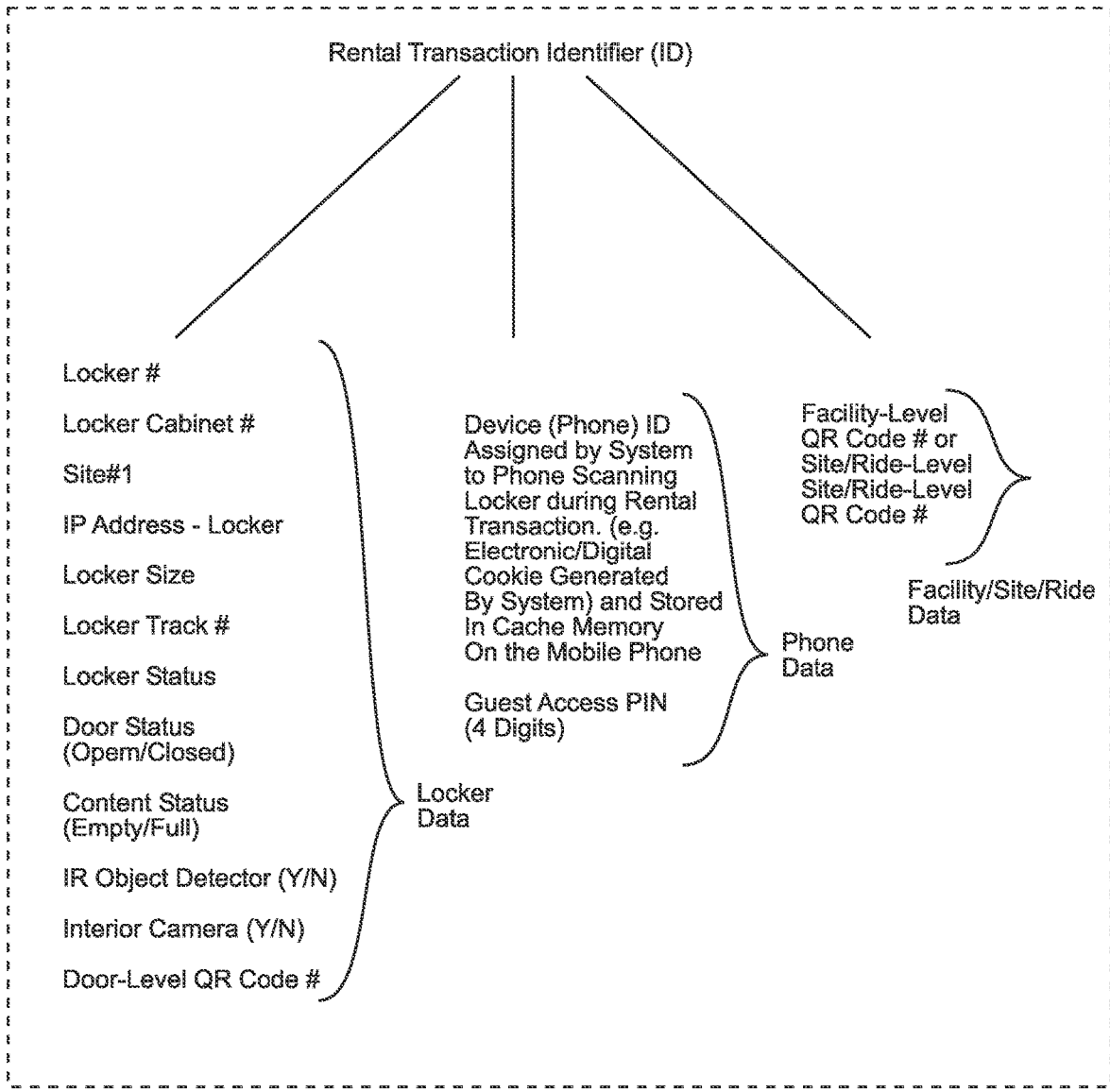
FIG. 15C is a schematic representation of a relational data structure formed and maintained within the RDBMS on the network database server of the system network of the present invention depicted in FIG. 15, wherein for each rental transaction carried out within a particular facility supported by the system network, a relational-type rental transaction data structure is created and maintained, representable by a tree-type data structure identified by (i) its rental transaction identifier assigned by the system, linked/related to (ii) device (phone) ID (e.g. electronic/digital cookie/token generated transaction ID) assigned to and stored on the phone scanning a Facility-Level QR Code, Site/Ride-Level QR Code or Device/Locker-Level QR Code to initiated the rental of a single-sided storage locker, (iii) and a locker # whose Door-Level QR Code has been scanned.

FIG. 15C illustrates a relational data structure formed and maintained within the RDBMS on the network database server of the system network of the present invention depicted in FIG. 15, wherein for each rental transaction carried out within a particular facility supported by the system network, a relational-type rental transaction data structure is created and maintained. As shown in FIG. 15C, this data structure is representable by a tree-type data structure identified by (i) its rental transaction identifier assigned by the system, linked/related to (ii) Device (phone) ID (e.g. electronic cookie/digital-token generated transaction ID) assigned to and stored in cache memory on the mobile phone 130 scanning (iii) a Facility-Level QR Code, Site/Ride-Level QR Code or Device/Locker-Level QR Code to initiate the rental of a single-sided storage locker 151, and (iv) the Locker # assigned to the locker being rented by the guest by scanning either a Facility-Level QR Code, a Site-Level QR Code or a Door-Level QR Code using the mobile phone identified and tagged by the system using the device ID (e.g. digital token) stored in memory on the scanning mobile phone 130.

Figure 15D:
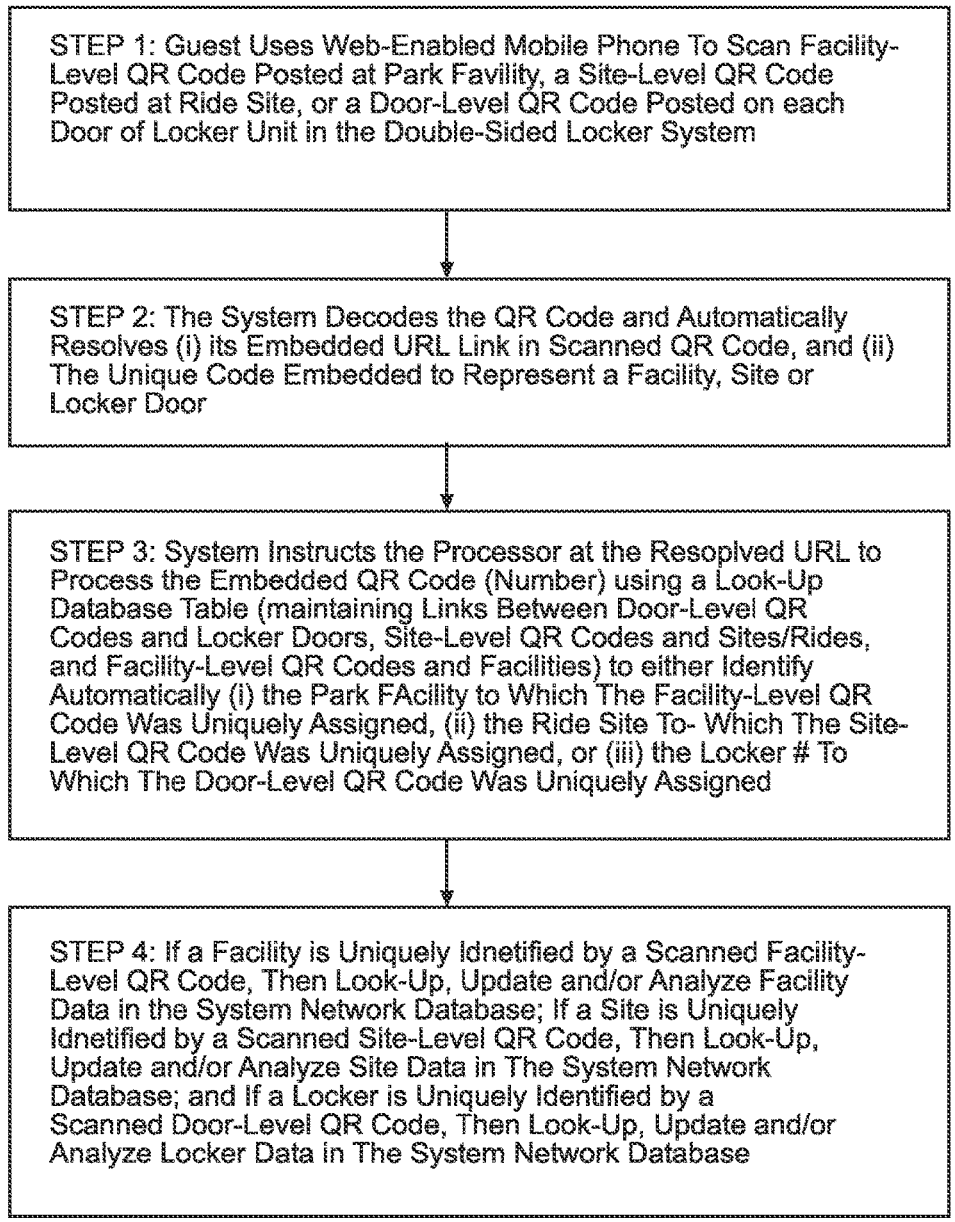
FIG. 15D is a schematic representation of the automated facility, site and locker lookup process involving the scanning of unique Facility-Level QR Codes posted at a facility (e.g. park), Site-Level QR Codes posted at ride or attraction sites, and Door-Level QR Codes posted on each door of each single-sided storage locker supported on the networked storage locker system of the present invention.

FIG. 15D illustrates an automated process of looking up the facility, site and/or locker rented by a guest using a particular mobile scanning phone 130 to scan (i.e. read) unique Facility-Level QR Codes posted at the entrance and about a facility (e.g. theme park), a Site-Level QR Code posted at ride or attraction sites, and a Door-Level QR Code posted on each door of each single-sided storage locker 151 supported on the single-sided locker system of the present invention 150.

As shown in Step 1 of FIG. 15D, the first step of the process involves the STEP 1: Guest uses Web-Enabled Mobile Phone 130 to scan Facility-Level QR Code posted at Park Facility, a Site-Level QR Code posted at a Ride Site, or a Door-Level QR Code posted on each Door of Single-Sided Locker Unit in the Single-Sided Locker System 150.

As shown in Step 2 of FIG. 15D, the second step of the process involves the System decodes the QR Code and automatically resolves (i) its embedded URL Link in scanned QR Code, and (ii) the Unique Code embedded therein to represent a Facility, Site or Locker Door.

As shown in Step 3 of FIG. 15D, the third step of the process involves System instructs the processor located at the Resolved URL to process the embedded QR Code (Number) using a Look-Up Database Table (maintaining Links between Door-Level QR Codes and Locker Doors, Site-Level QR Codes and Sites/Rides, and Facility-Level QR Codes and Facilities) so as to either identify automatically (i) the Park Facility to which the Facility-Level QR Code was uniquely assigned, (ii) the Ride Site to which the Site-Level QR Code was uniquely assigned, or (iii) the Locker # to which the Door-Level QR Code was uniquely assigned.

As shown in Step 4 of FIG. 15D, the fourth step of the process involves if a Facility is uniquely identified by a scanned Facility-Level QR Code, then look-up, update and/or analyze facility fata in the System Network Database; if a Site is uniquely by a Scanned Site-Level QR Code, then look-up, update and/or analyze Site Data in the System Network Database; and if a locker is uniquely identified by a Scanned Door-Level QR Code, then look-up, update and/or analyze Locker Data in the System Network Database.

Figure 52:
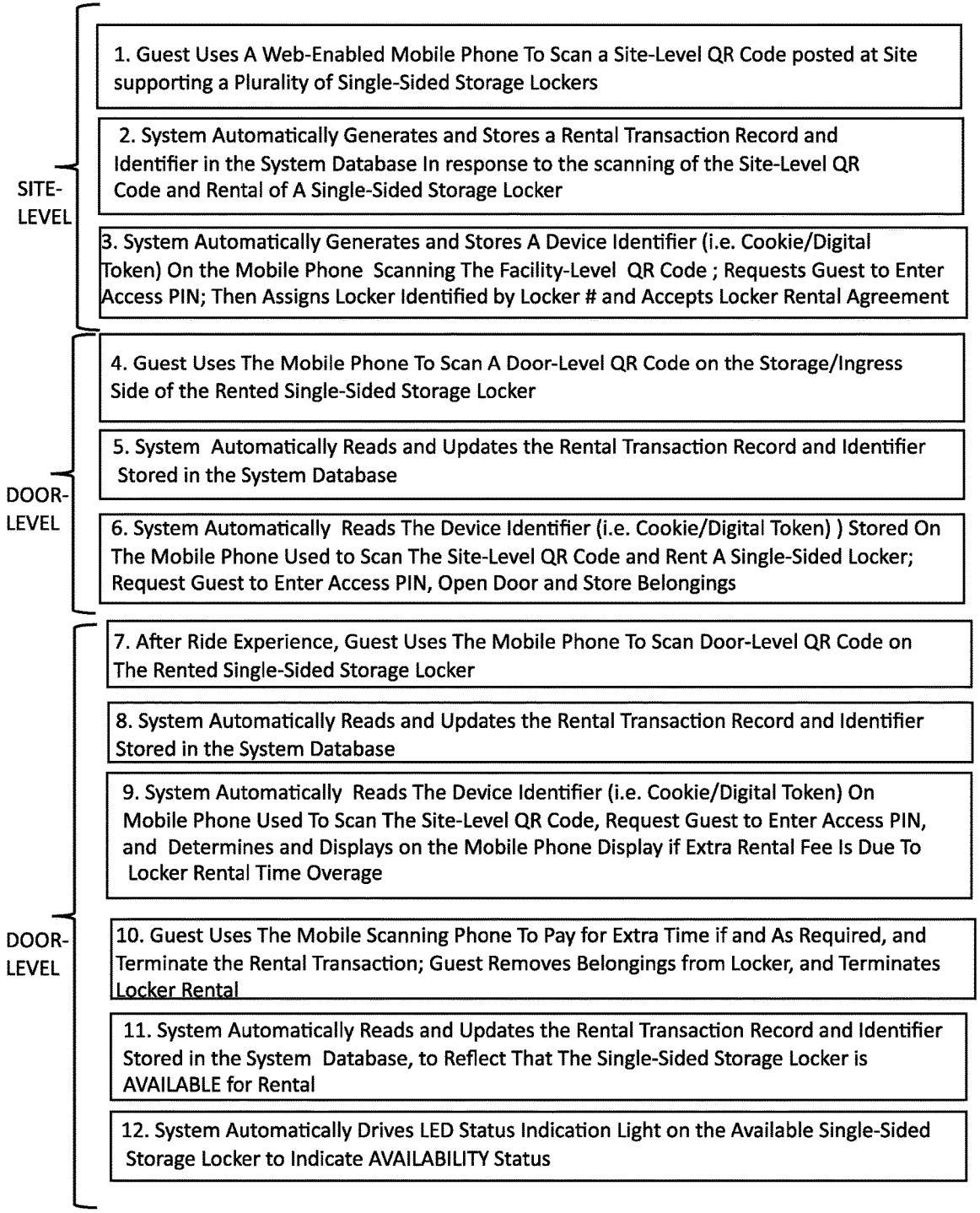
FIG. 52 is a flow chart describing the primary steps involved in carrying out method of renting, accessing and controlling a double-sided storage locker by scanning Site-Level QR Code at park, then scanning a Door-Level QR Code on the storage/ingress side of a double-sided storage locker at a ride/attraction site, then scanning a Door-Level QR code on the retrieval/egress side of the double-sided storage locker.
Figure 59:
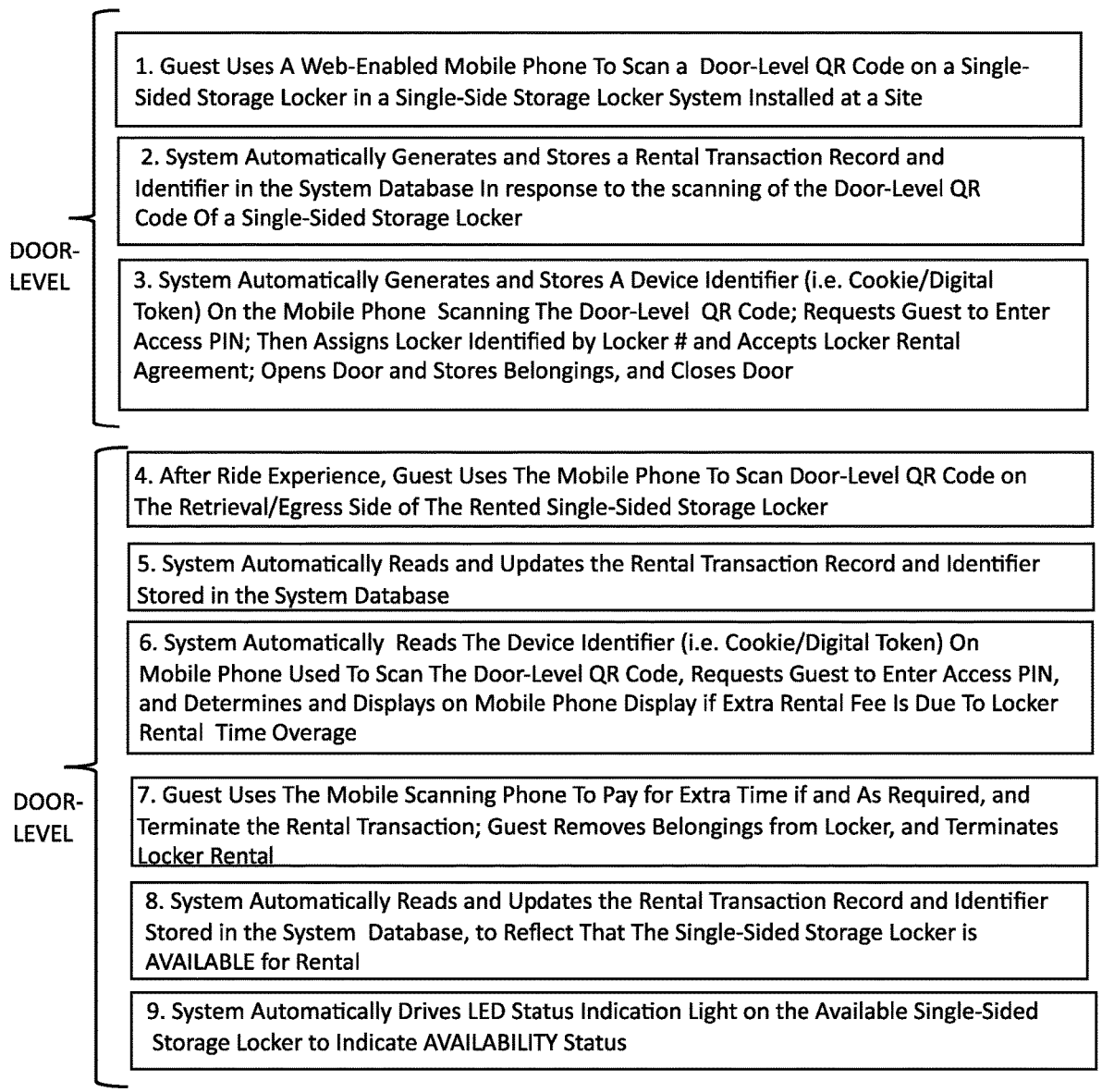
FIG. 59 is a flow chart describing the primary steps involved in carrying out method of renting, accessing and controlling a single-sided storage locker system by scanning a Door-Level QR Code on the storage/ingress side of a single-sided storage locker system at a site, and then scanning a Door-Level QR code on the single-sided storage locker system.

This automated facility, site and locker look-up process of the present invention is employed throughout the methods specified in FIGS. 43, 52 and 59, as described throughout the present Patent Specification. While the illustrative embodiments of the present invention employ QR Codes with embedded URLs pointing to particular process and unique codes uniquely assigned to enterprise-level objects within a Facility, having one or more Ride Sites, and many different double-sided ride storage lockers, it is understood that this look-up process can be modified in various ways without departing from the scope and spirit of the present invention.

Specification of the Network Architecture of the Wireless System Network of the Present Invention In general, FIGS. 13, 14, and 15 illustrate the network architecture of the wireless system network 1 for the case where the system network is implemented as a stand-alone platform designed to work independent from, but alongside of one or more networks deployed on the Internet. As shown, the wireless system network 1 comprises various system components, including a cellular phone and SMS messaging systems 12D, and one or more industrial-strength data centers 12, preferably mirrored with each other and running Border Gateway Protocol (BGP) between its router gateways, in a manner well known in the data center art. As shown in FIG. 13, each data center 12 comprising: a cluster of communication servers 12A for supporting http and other TCP/IP based communication protocols on the Internet; cluster of application servers 12B; a cluster of email processing servers 12D; cluster of SMS servers 12D; and a cluster of RDBMS servers 12C configured within a distributed file storage and retrieval ecosystem/system, and interfaced around the TCP/IP infrastructure 11 of the Internet well known in the art.

As shown in FIGS. 13, 14 and 15, the system network architecture also comprises: a plurality of Web-enabled mobile client machines 130 (e.g. mobile smartphones, mobile computers such as iPad, laptop computers, ad workstations, and other Internet-enabled computing devices with graphics display capabilities, etc.) running native mobile applications and mobile web browser applications supported modules supporting client-side and server-side processes on the system network of the present invention; and numerous media servers (e.g. Google, Facebook, NOAA, etc.) operably connected to the infrastructure of the Internet. The network of mobile computing systems 130 will run enterprise-level mobile application software, operably connected to the TCP/IP infrastructure of the Internet. Each mobile computing system 130 is provided with GPS-tracking and having wireless internet connectivity with the TCP/IP infrastructure of the Internet, using various communication technologies (e.g. GSM, Bluetooth, WIFI, and other wireless networking protocols well known in the wireless communications arts).

As shown in FIG. 15, the networked single-sided ride/ attraction storage locker system 150 is operably connected to the Internet's TCP/IP infrastructure 11, to which is connected various computing resources including: electronic payment systems 13 to support e-commerce payment transactions (e.g. ApplePay®, credit and debit card transactions, PayPal®, etc.); the data centers 12 to support the wireless system network 1 shown in FIGS. 13 and 14; facility ride management system servers 351; global storage locker management system servers 350; mobile computing devices 130 such as millions of mobile smartphones deployed on the wireless system network; and web, application and database servers associated with thousands of third-party service providers and vendors desiring to serve the guests and visitors of the facilities served by the system network of the present invention.

In general, regardless of the method of implementation employed, the wireless system networks of the illustrative embodiments of the present invention will be in almost all instances, realized as an industrial-strength, carrier-class Internet-based (i.e. cloud-based) network of object-oriented system design. Also, the system network will be deployed over a global data packet-switched communication network comprising numerous computing systems and networking components, as shown. As such, the information network of the present invention is often referred to herein as the "system" or "system network".

Preferably, although not necessary, the system network 1 would be designed according to object-oriented systems engineering (DOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. The Internet-based system network can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application described above. Such practices are well known in the computer programming, networking and digital communication arts.

Figure 16:
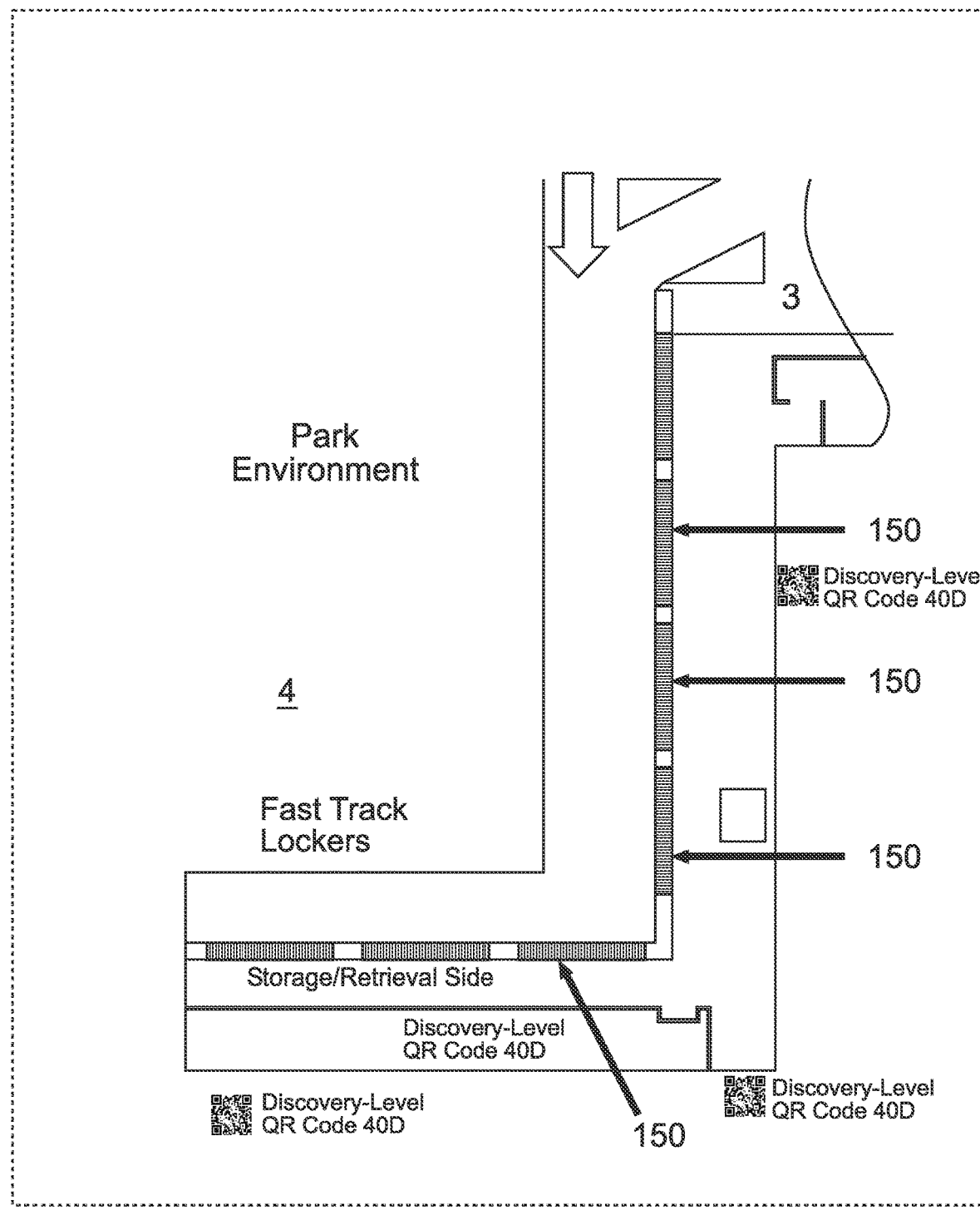
FIG. 16 is a plan view of a site map of an amusement park ride/attraction, at which the wireless-networked single-sided storage locker system of the present invention is installed, supporting, for differentiated service, x-large, large and small/regular sized single-sided storage lockers for rental by guests at the Site.

Specification of the Double-Sided Pass-Though Ride/Attraction Locker System with QR Code-Driven Access Controlled Locker Units Constructed According to the Present Invention FIG. 16 shows a plan view of a site map of an amusement park ride/attraction, at which the wireless-networked single-sided locker system of the present invention 150 is installed along with its integrated facility ride management system servers 351. As shown, the single-sided locker system 150 supports differentiated service offerings, as such as x-large, large and small/regular sized single-sided lockers for rental by guests at the Site.

Figure 17:
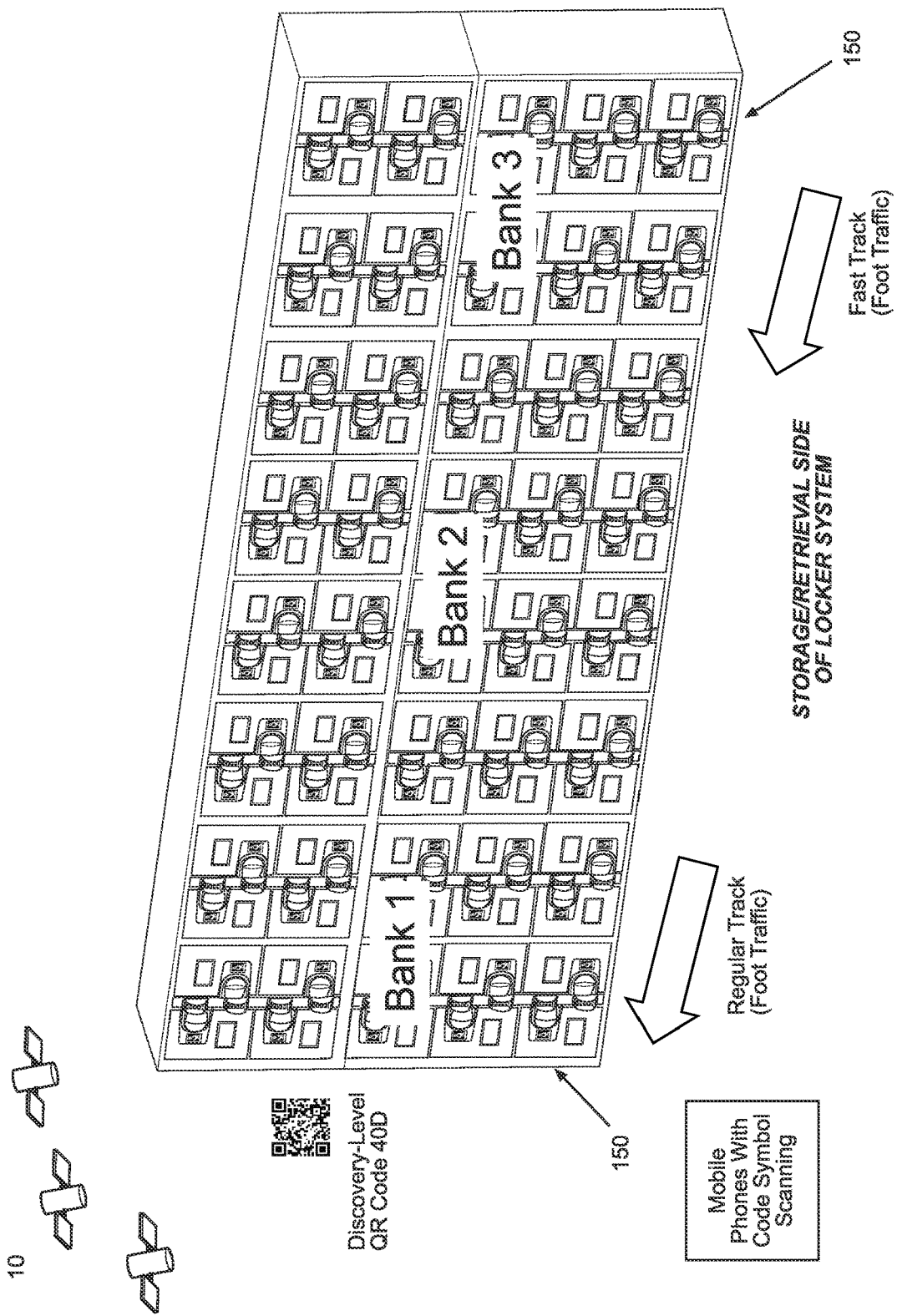
FIG. 17 is a perspective view of the wireless networked double-sided storage locker system installed at the Site of FIG. 16, having a multi-bank cabinet structure containing plurality of single-sided electronically-controlled storage lockers, wherein each side of each electronically-controlled locker door bears a Device-Level QR Code, that can be scanned/read using a web-enabled mobile smartphone deployed on the system network, and carrying out the rental and access control transaction process supported on the display screen of the mobile smartphone.

FIG. 17 shows the wireless networked single-sided storage locker system installed at the Site of FIG. 16, having a multi-bank cabinet structure containing plurality of single-sided electronically-controlled storage lockers, wherein each side of each electronically-controlled locker door bears a Device-Level QR Code, that can be scanned/read using a web-enabled mobile smartphone 130 deployed in the system network, and carrying out the transaction supported on the display screen of the mobile smartphone 130.

FIG. 18 specifies the LED color codes used for the LED locker door status indications on each single-sided storage locker deployed in the locker system of the present invention. Notably, in the illustrative embodiment, a first color (e.g. GREEN) state is assigned for the locker status AVAILABLE for rental; a second color (e.g. BLUE) state is assigned for the locker status RESERVD for rental; and the OFF (i.e. NO LED) state is assigned for lockers that are RENTED and not available for rental.

Figure 19A:
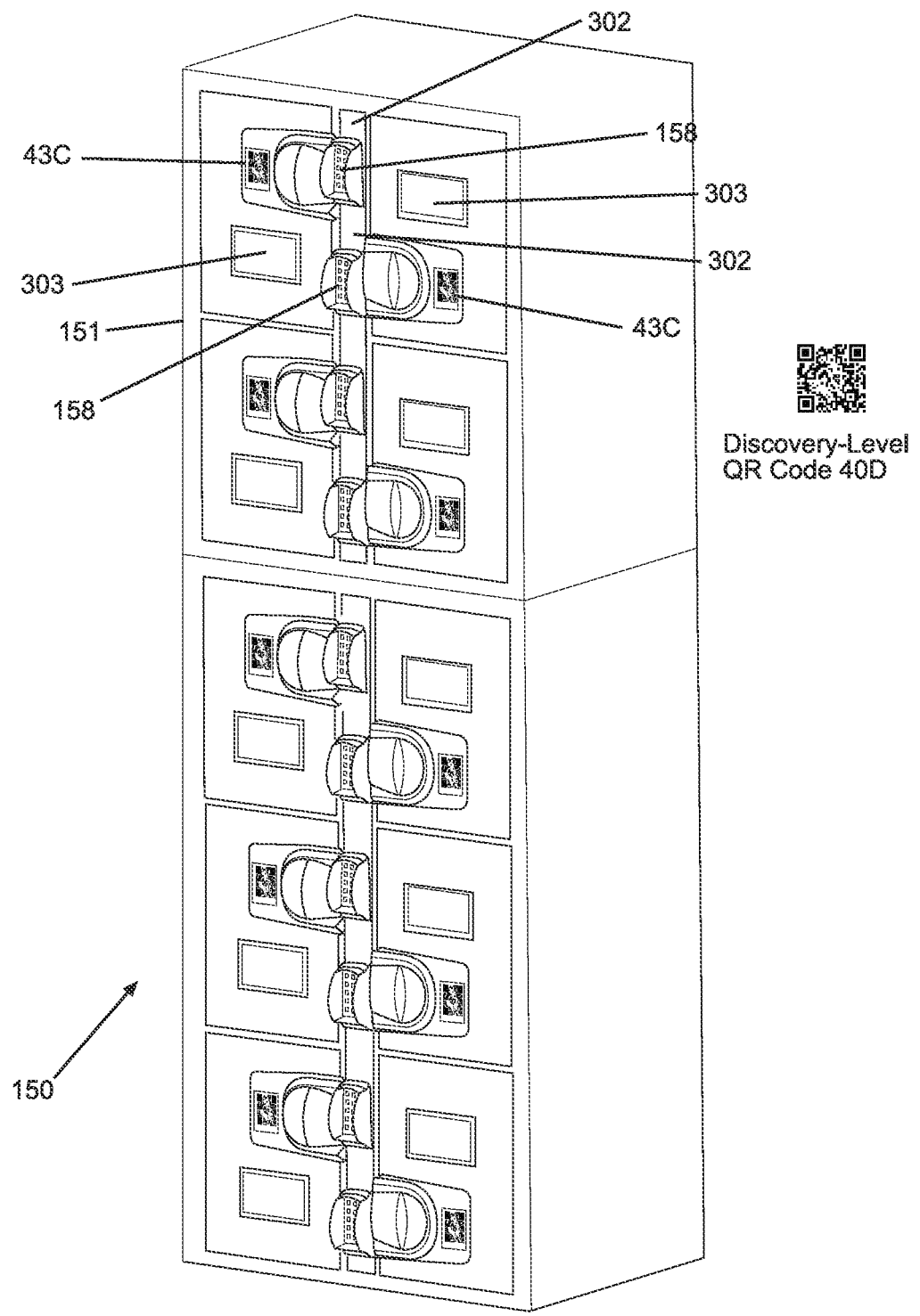
FIG. 19A a perspective view showing a column of double-sided pass-through storage locker cabinets from the wireless networked locker system shown in FIG. 17, wherein each electronically-controlled single-sided storage locker unit posts or displays a Door-Level QR code on each locker door, for scanning with a web-enabled mobile smartphone deployed on the wireless system network of the present invention.

FIG. 19A shows a column of single-sided storage locker cabinets from the wireless networked locker system 150 shown in FIG. 17, wherein each electronically-controlled single-sided storage locker unit posts or displays a Door-Level QR code for scanning with a web-enabled mobile smartphone deployed on the wireless system network of the present invention.

Figure 19B:
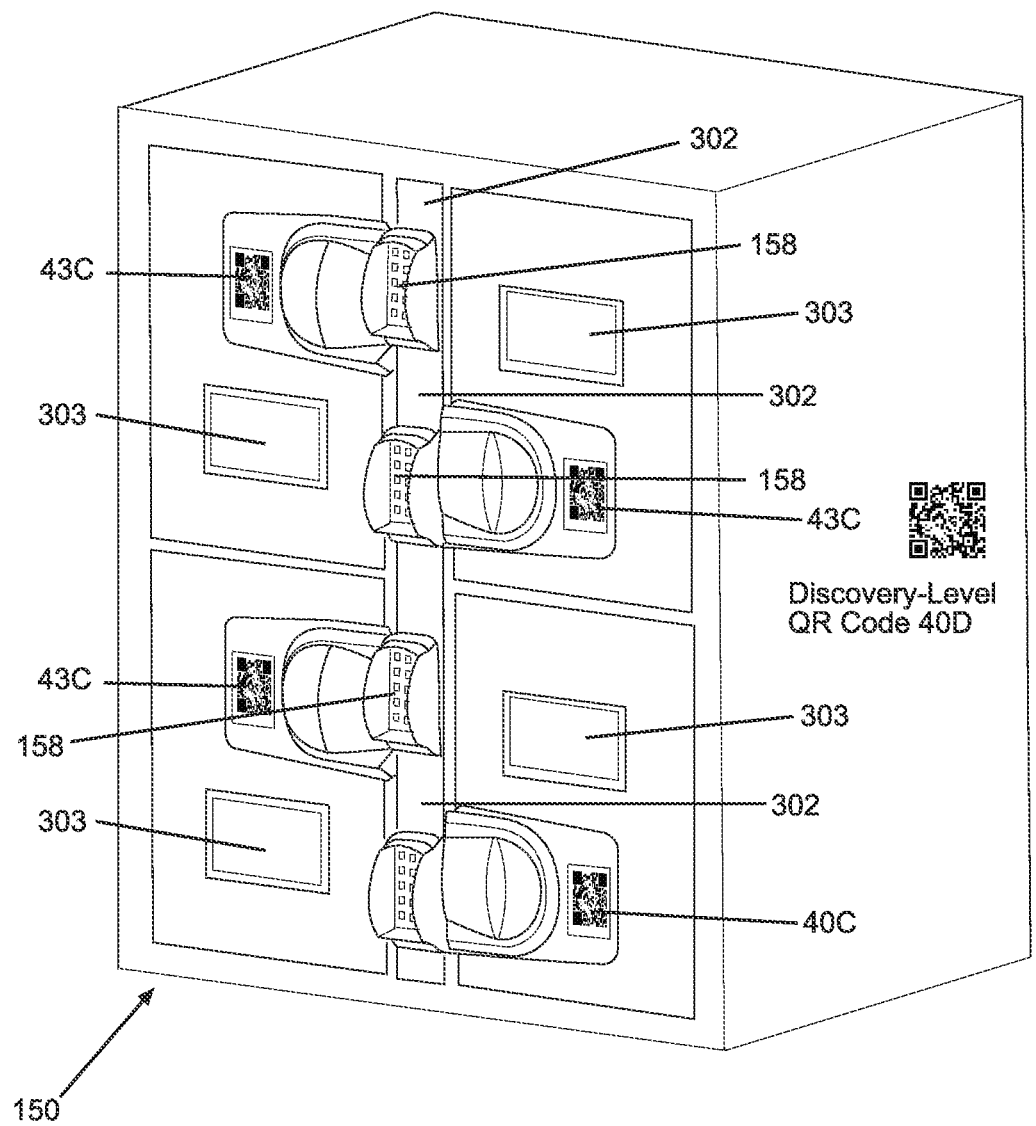
FIG. 19B a perspective view showing two stacked rows of a single column of double-sided pass-through storage locker cabinets from the wireless networked locker system shown in FIGS. 17 and 19B, showing in greater detail the Door/Device-Level QR Code, PIN-code entry keypad and e-ink display panel provided on each door surface of each single-sided storage locker unit.

FIG. 19B a perspective view showing two stacked rows of a single column of single-sided storage locker cabinets from the wireless networked locker system shown in FIGS. 17 and 19B, showing in greater detail the Door/Device-Level QR Code 43C, PIN-code entry keypad 158 and e-ink display panel 303 provided on each single-sided locker unit.

Figure 20A:
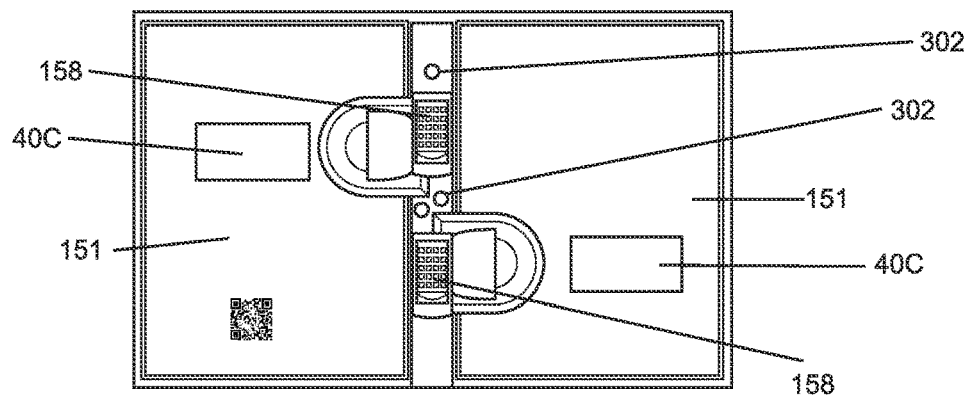
FIG. 20A is a perspective view of a locker units in the network wireless networked locker cabinet system shown in FIG. 19B, each having a low-power electronic-ink display panel for displaying QR codes, user instructions, messages, as well as advertisements.
Figure 27:
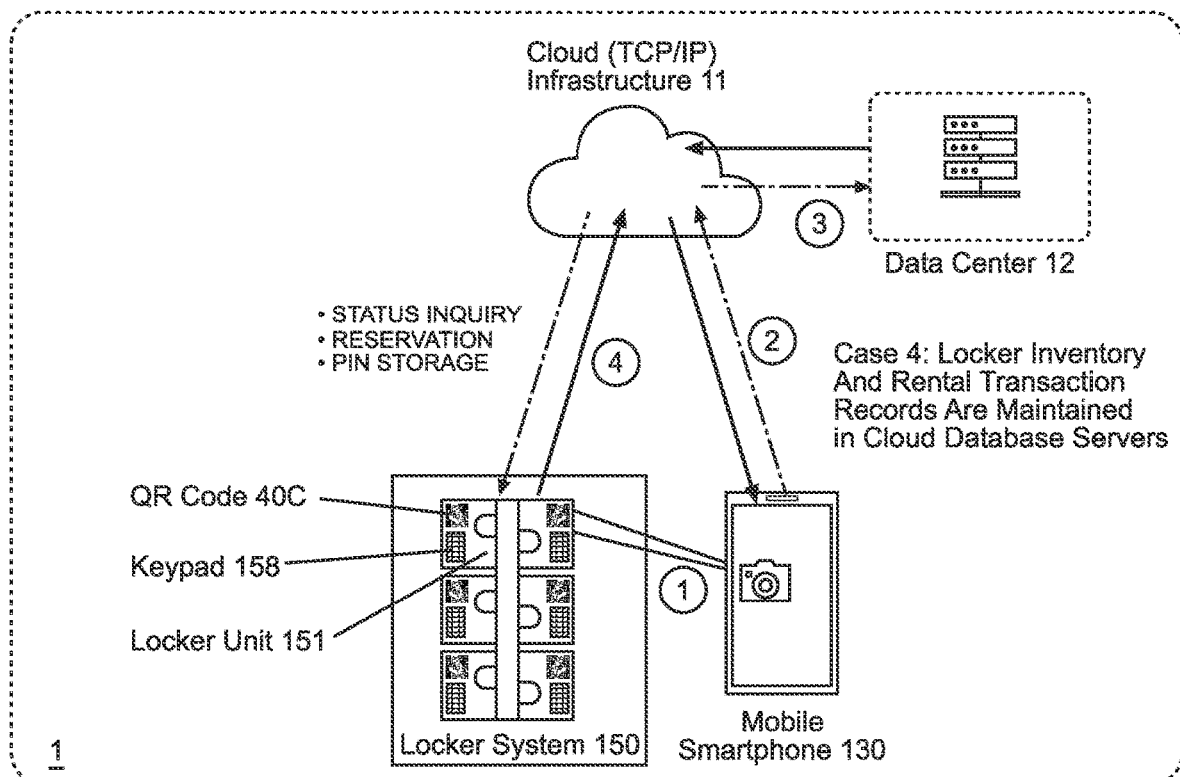
FIG. 27 shows the wireless system network of the present invention with mobile phones and other network components configured and operating according to Case 4, where a local kiosk server system is not employed to manage groups of local locker units at a site location in a specific facility, and all locker inventory and rental transaction records are maintained in databases in cloud-based network servers.

FIG. 20A shows a pair of locker units 151 in the network wireless networked locker cabinet system 150 shown in FIG. 27, each having an electronic-ink (E-ink) display panel 303 for displaying QR codes, guest-customized rented locker identifiers (e.g. text, symbols and/or graphics), user instructions, messages, as well as advertisements and promotions. It is understood that the network infrastructure of the present invention will support programming of the E-ink display panel 303 using remote servers allowing for remote client machines to be used by others to select and program the messaging to be display on the surface of these single-sided ride storage lockers. The messages can be form vendors and/or service providers at the park seeking to advertise and promote their products and services to guests visiting the park facility. Preferably, the e-ink graphics display panel 303 will be realized using state-of-the-art bistable display media, such as disclosed in U.S. Pat. No. 7,757,954, and various patents cited therein, each incorporated herein by reference as it fully set forth herein.

Figure 20B:
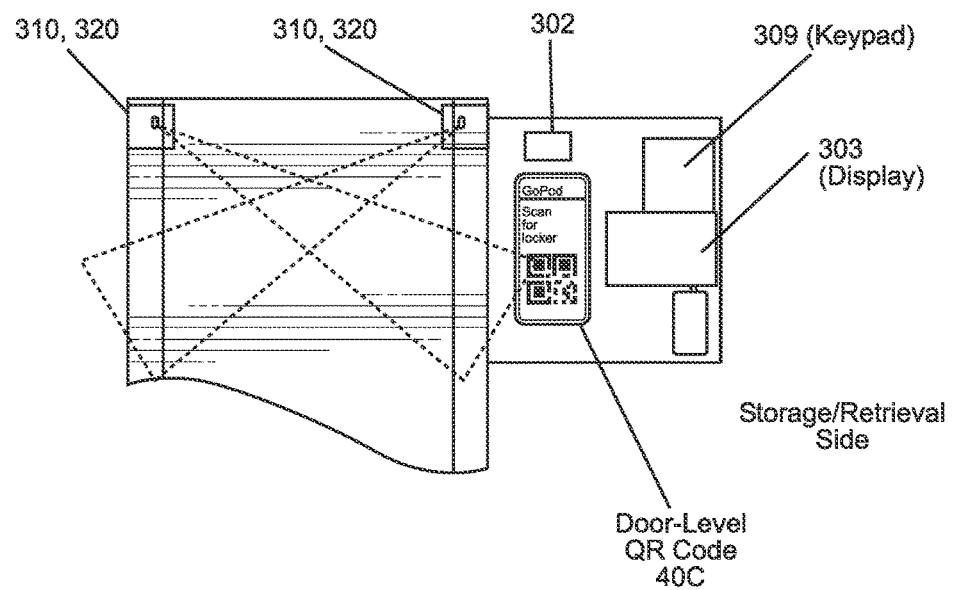
FIG. 20B is an elevated side view of the single-sided locker unit shown in FIG. 20A, with its locker door opened and configured for storage and access of personal belongings, for each locker unit, wherein a pair of digital camera systems, and IR object sensing transceivers, are mounted within the interior space of each locker unit, to provide both visible-band and IR-band field of views (FOVS) that cover the interior space of the locker unit to automatically capture digital images of objects within the FOVs and automatically process the same to detect the presence of personal belongings (e.g. items) being stored within the interior storage space of each single-sided locker unit.
Figure 20C:
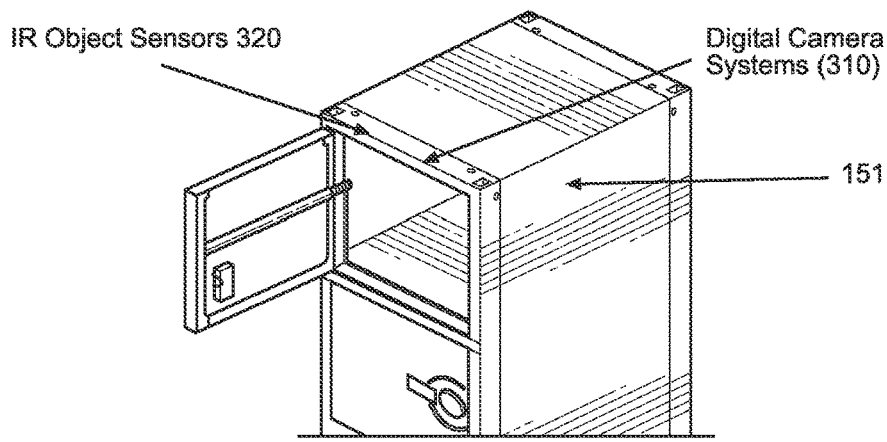
FIG. 20C is a rear perspective view showing the storage side locker door opened for storing personal belongings into the interior storage cabinet of the respective double-sided locker unit, upon accessing and controlling the electronic locker unit using the code symbol scanning and/or PIN code accessing methods of the present invention.

FIGS. 20B and 20C shows a single-sided locker unit shown in FIG. 20A, with its locker door opened and configured for storage and access of personal belongings, for the locker unit 151. As shown, the FOV #1 and FOV #2 are projected from embedded miniature digital camera systems 310 through the interior of each respective locker unit 151, capturing and processing digital images of objects within the FOVS and searching for (i) the presence of objects (e.g. personal belongings) therein as after a locker has been rented, or (ii) the absence of objects in the FOV as after a locker rental has been terminated.

As shown in FIGS. 20B and 20C, each single-sided locker unit 151 is also provided with a pair of IR-based object sensing transmitters and receivers 320, each constructed from solid-state IR-LED devices, and each pair of IR object transceivers 320 establishing an IR sensing beam spanning across the interior of the locker unit, sensing for the presence and/or absence of objects (e.g. personal belongings) stored therein at any moment in time. Preferably, a pair of X configured IR sensing beams (X) are installed inside the interior space of each locker unit 151 so as to provide the required spatial sensing coverage to practice the automated object presence/absence detection methods required to support the locker rental and access control operations within the double-sided ride storage locker system of the present invention 150.

FIG. 20C shows the storage side locker door opened for storing personal belongings into the interior storage cabinet 150 of the respective single-sided locker unit 151, upon accessing and controlling the electronic locker unit using the QR code symbol scanning and/or PIN code accessing methods of the present invention described in great detail herein.

Figure 21A:
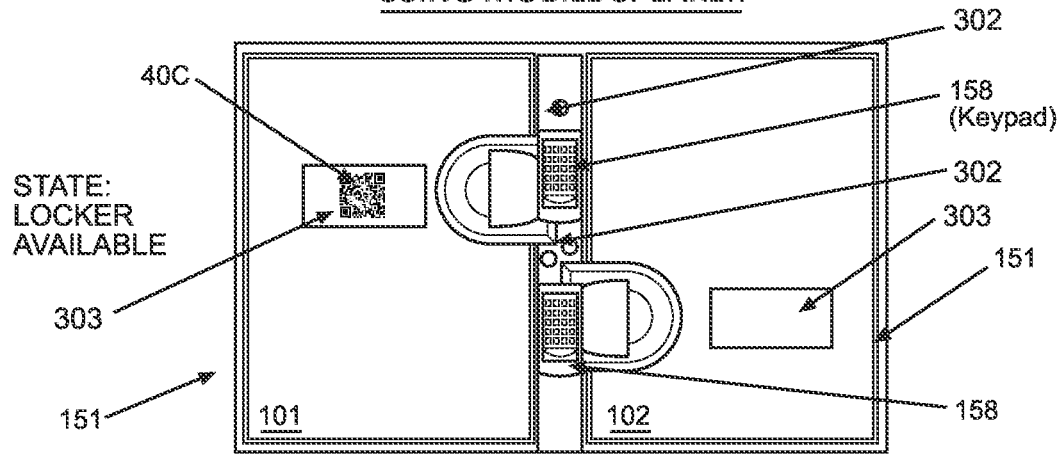
FIG. 21A is a perspective view of the single-sided locker units of FIG. 20A, showing the left-sided locker configured in the "locker available" state, and displaying a Door-Level QR code available for scanning by a guest's web-enabled mobile phone to receive the services from the system network of the present invention.

FIG. 21A shows the double-sided locker units 151 of FIG. 20A, with the left-sided locker configured so that its E-ink display panel 303 indicates the "locker available" state, and displaying a Door-Level QR code on the E-ink display panel 303, and readily available for scanning by a guest's web-enabled mobile phone 130 so as to receive the services from the system network of the present invention, as described in detail herein.

Figure 21B:
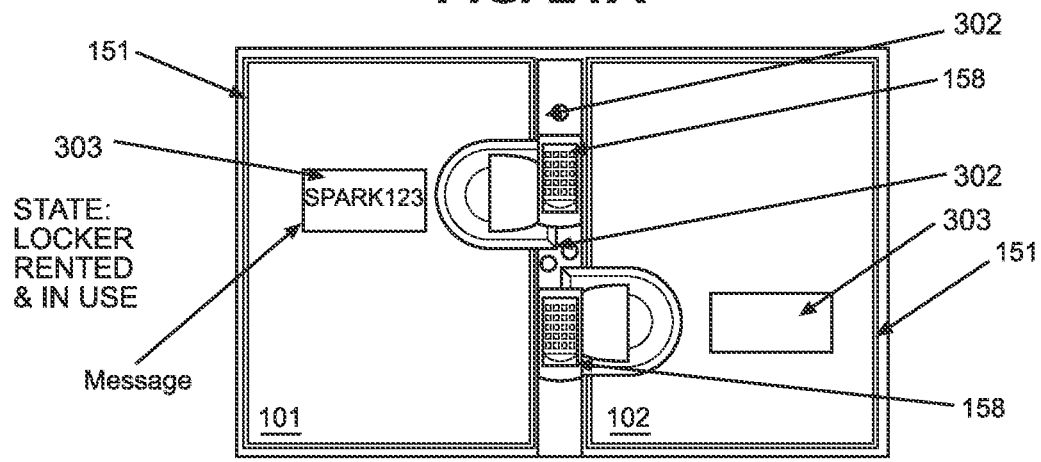
FIG. 21B is a perspective view of the locker units of FIG. 20A, showing the left-sided locker in the "locker rented & in use" state, displaying a user-selected message "SPARK123" to facilitate quick identification and recognition of the guest's rented locker on the ingress and egress sides of the single-sided locker system.

FIG. 21B shows the locker units of FIG. 20A, with the left-sided locker configured in the "locker rented & in use" state, displaying a user-selected message "SPARK123" on its E-ink display panel 303, which is selectable by the guest during the rental transaction using a GUI screen served by the network servers during the rental transaction process. The GUI screen, served to the guest's mobile phone display 130, will display a message inviting the guest user with the option to provide a custom fixed length name, or even graphical icon (created using the phone's touch screen display) for display on both the ingress and egress side door panels of a rented locker so that the guest user, and his or her party/group/family, can easily recognize the rented locker on both the ingress and egress sides of the rented double sided locker unit 151. When this option is selected, the facility/site assigned locker # will remain displayed always on the doors of the locker units, but this custom display signage can and should serve to augment the customization and identification of a rented single-sided ride locker, in the hectic and exciting environment in which such ride storage locker systems 150 will be installed and deployed at ride sites around the world.

Figure 21C:
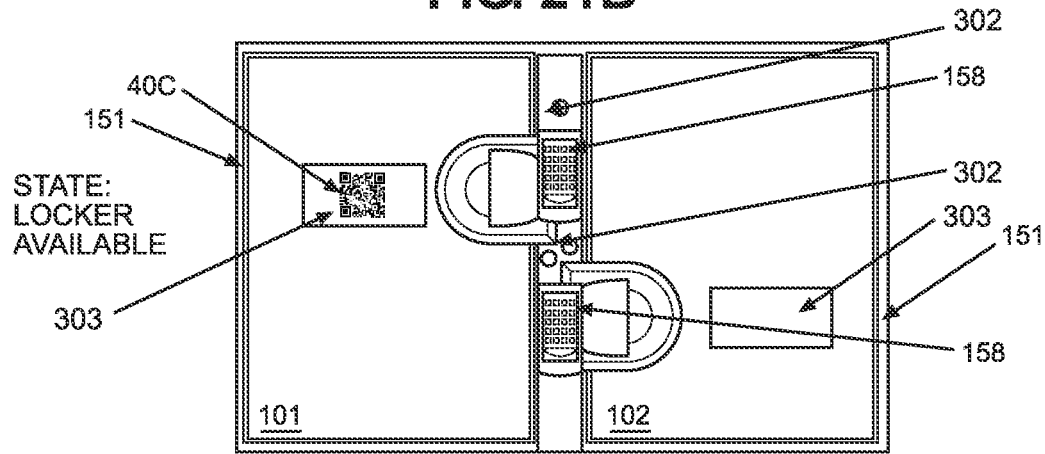
FIG. 21C is a perspective view of the locker units of FIG. 20A, showing the left-sided locker in the "locker available" state, displaying a Door-Level QR code once again.

FIG. 21C shows the locker units of FIG. 20A, with the left-sided locker 151 in the "locker available" state, displaying a Door-Level QR code once again on the E-ink display panel 303 on both sides of the single-sided locker unit 151.

Using e-ink (i.e. bi-stable electronic display media) to realize display panels 303 has the advantage of assisting guests to display personally meaningful marks/symbols which can be quickly seen and recognized at the single-sided ride storage locker system of the present invention 150.

Figure 22:
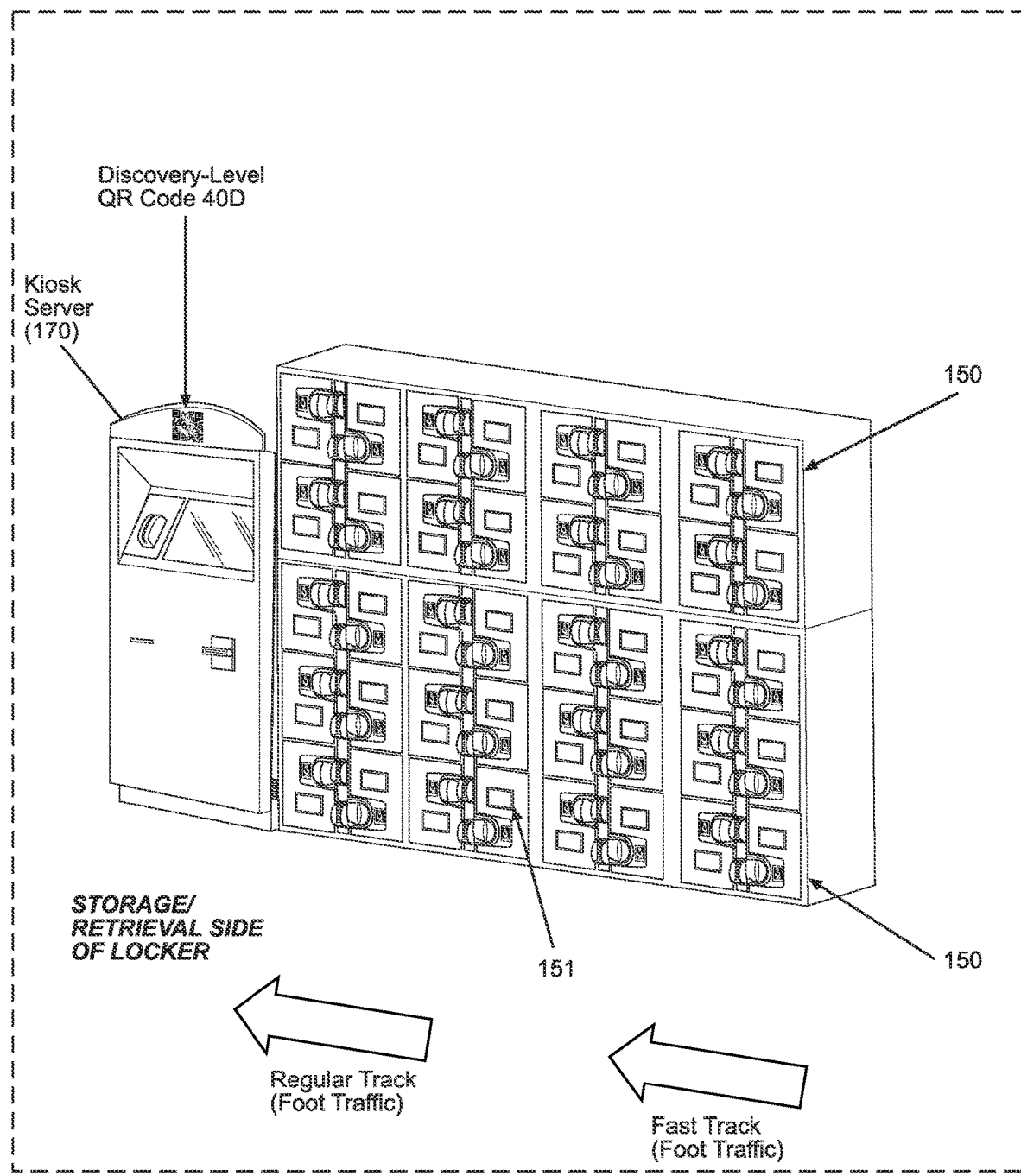
FIG. 22 is a perspective view of an illustrative embodiment of the wireless-networked single-sided storage locker system installation of the present invention as shown in FIGS. 16 and 17.

Specification of GPS-Tracked Wireless Networked Single-Sided Locker System with QR Code-Driven Access Controlled Locker Units According to the Present Invention FIG. 22 shows an exemplary installation of the wireless-networked single-sided ride storage locker system of the present invention 150, as shown and illustrated in FIGS. 16, 17, and 18 through 21C, specifically configured for operation with a legacy network kiosk server system 170, to illustrate that this is only one possible network configuration for the present invention, keeping in mind that there are many (e.g. at least six) other possible network configurations illustrated in FIGS. 24, 25, 26, 27, 28, 29 and 30 that may be used to practice the present invention.

Figure 23A:
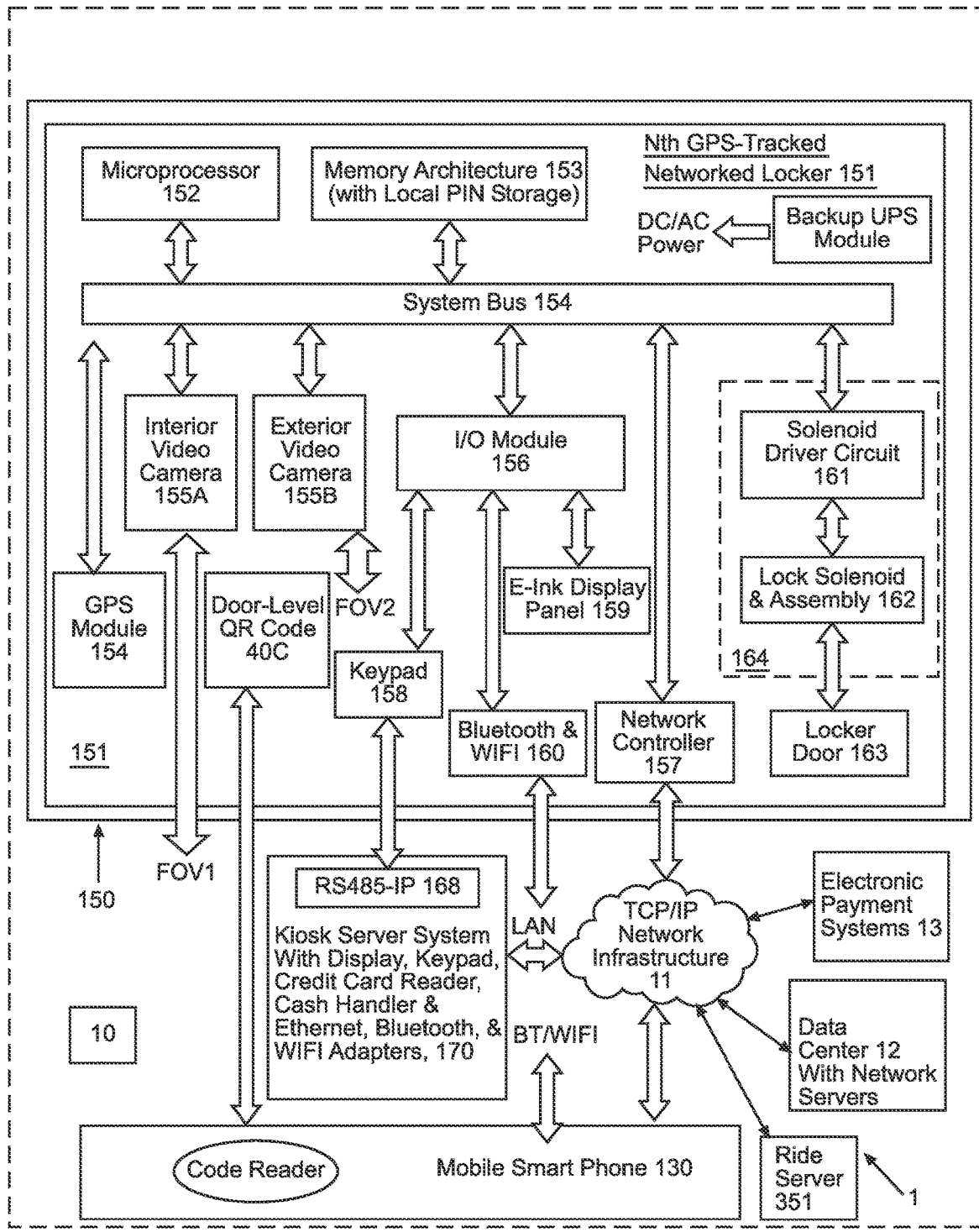
FIG. 23A is a schematic system block diagram of the wireless networked single-sided storage locker system of FIG. 22, provided with QR code driven access control and shown comprising a group of electronically-controlled locker units that are internetworked together in a GPS-tracked cabinet, that can be locally-managed by a networked kiosk server system as described in FIG. 24, and/or remotely-managed by network servers maintained in a cloud-based data center shown in FIG. 15, under any of the exemplary case scenarios modeled and described in FIGS. 23B, 24, 25, 26, 27, 28, 29 and 30.

As shown in FIG. 23A, the double-sided locker system design 150 shown in FIG. 22 comprises: a group of electronically-controlled single-sided storage locker units 151 that are internetworked together and packaged in a (GPS-tracked) cabinet that is installable in diverse ways at any particular site or attraction. These electronically-controlled locker units 151 can be either (i) locally managed by a networked (legacy) kiosk server system 170 as shown in FIGS. 22, 23A and 23B according to case scenario modeled and described in in FIG. 24, and/or (ii) remotely managed by network servers maintained in a cloud-based data center 12 shown in FIGS. 13, 14 and 15, under any of the other exemplary case scenarios modeled and described in FIGS. 25, 26, 27, 28, 29 and 30, as described below.

The wireless networked single-sided locker system 150 is fully equipped with QR code-driven access control using the GPS-tracking wireless system network of the present invention 1. As shown in FIG. 22, the single-sided locker system 150 supports electronic-ink display panels 303 on the locker door of each single-sided locker unit 151, so as to display QR codes, user instructions, messages and graphical indicia including advertising required or suggested by the principles of the present invention.

Figure 23B:
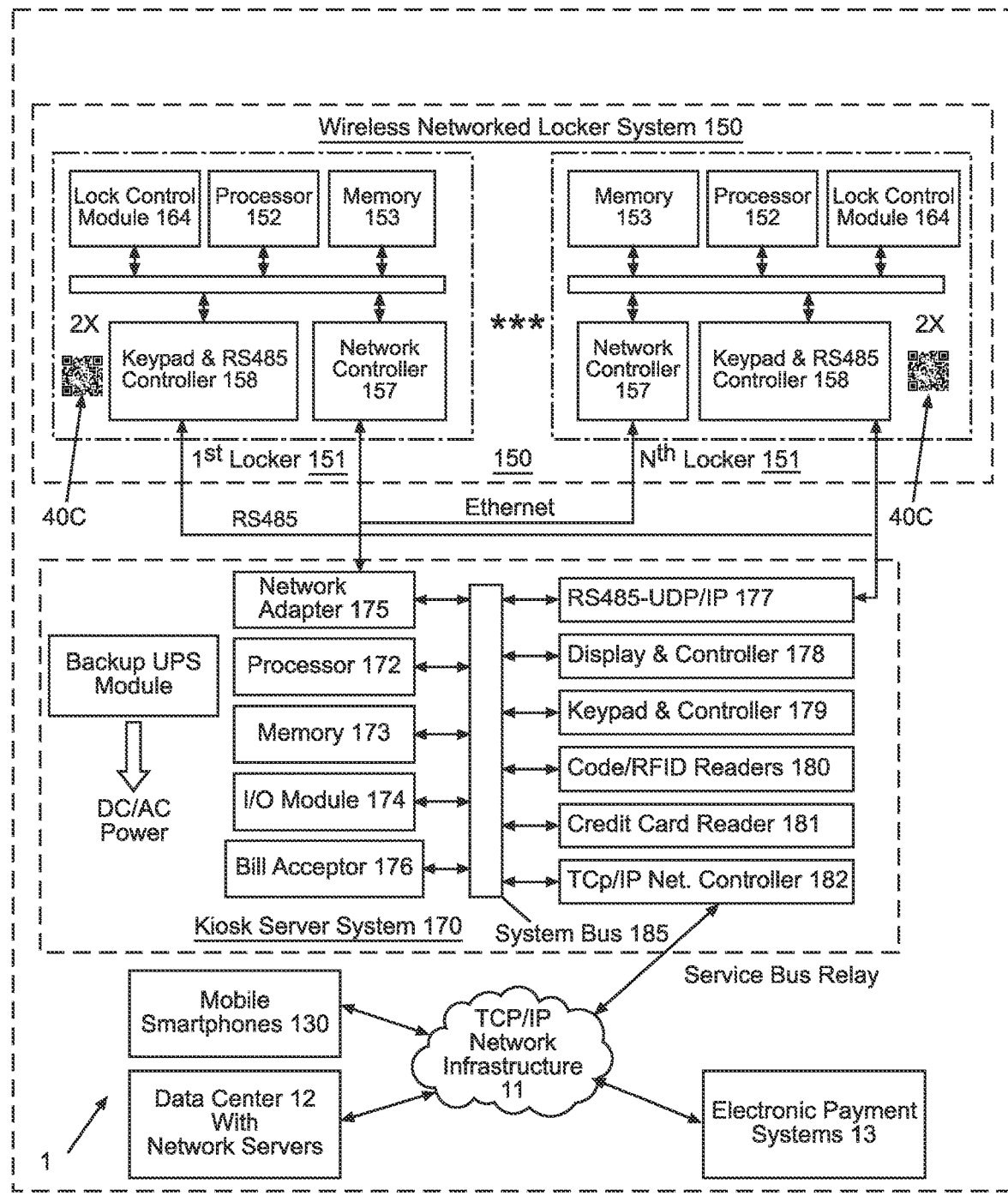
FIG. 23B is a schematic diagram of the wireless networked single-sided storage locker system shown in FIG. 23B, with the internal system architecture of the kiosk server system shown in greater detail along with aspects of the system architecture of the locker units in the networked locker system, so as to show that the networked locker units are networked together and managed/manageable by the kiosk server system using Ethernet or other communication networking protocols, while the manual keypads and PIN storage memory on each locker unit are in communication with kiosk server system using a serial-to-UDP/IP communication network.

As shown in FIG. 23A, the single-sided ride storage locker system design 150 comprises: a locker cabinet with a plurality of electronically-controlled lockers 151, stored in a cabinet 152 (having wheels as application requires), and electronics and communications equipment as shown in FIG. 23B. As shown in this particular illustrative embodiment, each locker unit 151 comprises: a rugged housing for containing objects and at least one hinged door provided with an electronic lock unit 153; a Door-Level QR Code 40C physically posted or electronically displayed on the door surface using its E-ink panel 159 (303); an e-ink display controller 156 for the locker unit 151; RGY locker status LED lights 152; a local lock controller 156 for controlling the electronic lock control module; a physical manually-entry keypad 158 for each lock controller 156 mounted on the locker door, enabling the manual entry of digital lock code selected by the user; a network controller 157 for interfacing with the TCP/IP infrastructure 11 and communicating each locker unit with the wireless system network servers on the access control network system 1, as described herein; an internal digital video camera 155A with a field of view (FOV) on the interior of the locker cabinet, and an external video camera with a field of view on the exterior of the locker facing the user to enable facial recognition as desired or required by the application; a GPS module 154 interfaced with the lock controller 156 and its system bus and programmed processor, to provide real-time GPS coordinate with each locker transaction; and a Bluetooth and WIFI network adapter and various antennas to support RF and GPS communications with various systems on the wireless system network, including a guest user's web-enabled mobile phone system 130.

As shown in FIG. 23A, each wireless networked locker system 151 comprises the following components integrated about a system bus, namely: a programmed microprocessor 152 interfaced to the system bus 154 and supported by a memory architecture (e.g. RAM, ROM, and SSD persistent storage) 153 for use in supporting the access and control programs carried out by the locker controller, and storing the guest user's digital password (e.g. PIN) entered into the system using a mobile smartphone 130 during the mobile transactions supported by the system network and described and illustrated in great detail herein; a local battery-powered un-interrupted power supply (UPS Module) with power converters and control circuitry for automatically supplying electrical power all local electrical components within the locker unit 151 (and/or locker cabinet 150); a network controller 157 for interfacing with the TCP/IP infrastructure 11; a solenoid driver circuit 161 connected to a lock solenoid and bolt assembly 162 and locker door 163; a keypad 158 for entering digital locker password to microprocessor; an E-ink display panel 159 and controller interfaced with system bus; a Bluetooth/WIFI 160 interfaced with the system bus 154 via an I/O module interface 156; an interior digital video camera 155A with an interior field of view (FOV1) interfaced with the system bus 154 that can function as an automated object sensor to determine if a guest left belongings inside the locker interior space; an exterior digital camera 155B interfaced with the system bus 154 and can support automated facial recognition of the user to support user authentication and locker entry as part of the locker access process; a GPS module 154 interfaced with the system bus; and a Door-Level QR Code displayed in the outer door surface or electronically displayed on the E-ink panel 159.

As shown in FIG. 23B, the locker units 151 in the networked locker system 150 are networked together and managed/manageable by the kiosk server system 170 using Ethernet or other communication networking protocols (157, 175), while the manual keypads 158 and PIN storage memory 153 on each locker unit 151 are in communication with kiosk server system 170 using a serial-to-UDP/IP communication network (158, 177) as shown. As shown, the kiosk server system 170 comprises a number of computing components interfaced around a system bus, namely: a network adapter (e.g. ethernet) 175; microprocessor 172; a memory architecture 172 (e.g. Cache, RAM, PROM, SSD, and other persistence memory); I/O module 174; bill acceptor 176; RS485/UDP/IP converter/adapter 177; visual touch-screen display panel and display controller 178; manual keypad and controller 179; bar code reader and RFID readers and controllers 180; credit/debit card (e.g. magstripe and RFID chip) reader 181; TCP/IP network controller 182; backup Uninterrupted Power Supply (UPS) module to generate local DC/AC power as needed during power interruptions on site or across a facility.

As shown in FIG. 23B, the networked locker system 150 and local kiosk server system 170, used to manage the same in particular embodiments and modes of system operation described herein, are connected to the Internet/Cloud infrastructure 11, along with the millions of guest user mobile smartphones 130, electronic payment systems 13, network servers within the data centers 12 supporting the system network, and other third-party network servers discussed herein and deployed across and around the Planet Earth. As shown, the kiosk server system 170 uses a conventional Service Bus Relay (SBR) available from Microsoft Azure Platform Services and other service providers to enable the locker units 151 in locker system 150 to access and use the Internet communication infrastructure in a simple and convenient manner well known in the network communication arts.

Figure 24:
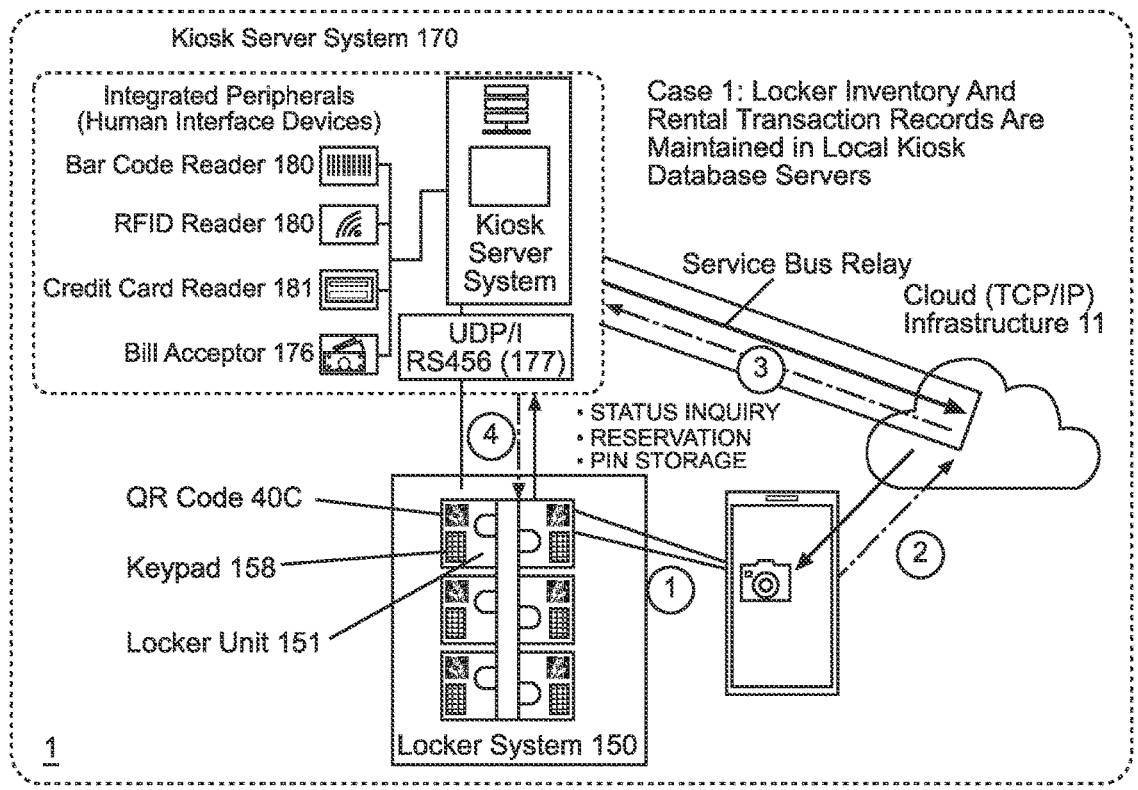
FIG. 24 shows the wireless system network of the present invention with mobile phones and other network components configured and operating according to Case 1, where a local kiosk server system is used to manage groups of locker units at a specific site location in a facility and locker inventory and rental transaction records are maintained in databases in the local kiosk server system.

FIG. 24 shows the wireless system network of the present invention with mobile phones and other network components configured and operating according to Case 1, where a local kiosk server system 170 is used to manage groups of locker units 150 (151) at a specific site location in a facility and locker inventory and rental transaction records are maintained in databases in the local kiosk server system 170.

As shown in FIG. 24, Step 1 of the control access process support in this case scenario involves using (i) a mobile phone 130 to scan (i.e. read) a Door-Level QR Code 40C on a locker unit 151, and (ii) the data path indicated by 2-3-4 to check the status of the scanned locker unit 151. If rental status is "available", then the web services supported in the kiosk server system 170 sends http messages back to the web-enabled mobile phone 130 via data path 3-2 to support the locker rental, access and control methods described herein using the Door-Level QR Code driven process described herein. Once the rental transaction has been completed, and payment or token-exchange made per the rental agreement, the kiosk server system 170 (i) stores the user's digital PIN code into the memory store of the rented/scanned locker unit 151, and automatically (ii) updates the locker inventory records and locker transaction records within database servers maintained on the local kiosk server system 170, and backed up elsewhere in the enterprise in accordance with best practices in data backup and information security.

Figure 25:
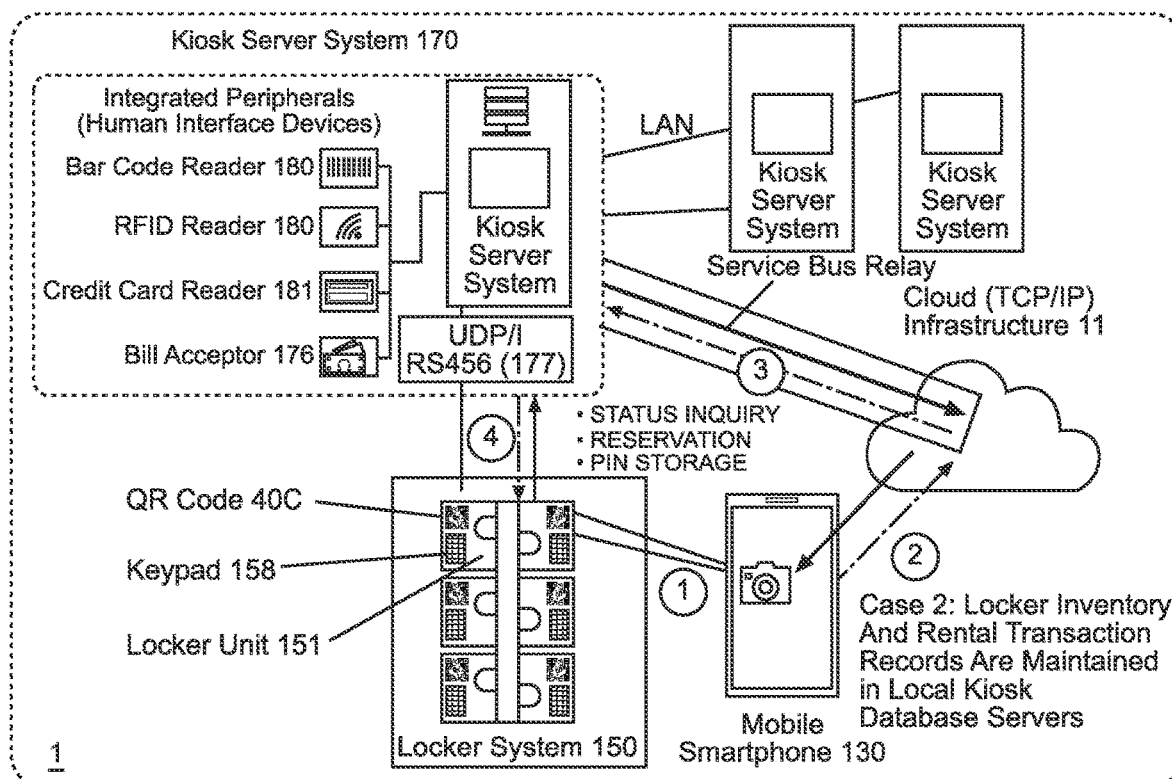
FIG. 25 shows the wireless system network of the present invention with mobile phones and other network components configured and operating according to Case 2, where local kiosk server systems are networked together and used to manage groups of locker units at specific site locations in specific facilities, and locker inventory and rental transaction records are maintained in databases synchronized in local kiosk server systems and cloud-based network servers.

FIG. 25 shows the wireless system network of the present invention with mobile phones 130 and other network components configured and operating according to Case 2, where local kiosk server systems 170 are networked together and used to manage groups of single-sided locker units 150 (151) at specific site locations in specific facilities, and locker inventory and rental transaction records are maintained in databases synchronized in local kiosk server systems 170 and cloud-based network servers 12.

As shown in FIG. 25, Step 1 of the control access process support in this case scenario involves using (i) a mobile phone 130 to scan (i.e. read) a Door-Level QR Code 40C on a double-sided locker unit 151, and (ii) the data path indicated by 2-3-4 to check the status of the scanned locker unit 151. The primary different between Case 2 and Case 1, is that in Case 2, a large number of kiosk server systems 170 deployed across Sites indexed with Site-Level QR Codes 40B in a given Facility indexed with Facility-Level QR Codes 40A, are networked together to form an enterprise level information using the ethernet or other suitable networking protocol, and across this network configuration, information records can be shared, and network directories maintained to facilitate the locker and device rental, access and control services supported by the system network of the present invention 1 described herein. So, in Case 2, if rental status is "unavailable", then the web services supported in the kiosk server system 170 sends http messages back to the web-enabled mobile phone 130 via data path 3-2 to inform the guest user at what Site in the Facility he or she can rent a locker, mobility device or other thing, using the rental, access and control methods described herein using Facility-Level QR Codes 40A, Site-Level QR codes 40B and/or Door-level QR Code 40C described herein. Once the rental transaction has been completed at a particular locker at a specific Site in the Facility, and payment or token-exchange made per the rental agreement, the kiosk server system 170 (i) stores the user's digital PIN code into the memory store of the rented/scanned locker unit 151, and automatically (ii) updates the locker inventory records and locker transaction records within database servers maintained on the local kiosk server system 170, and backed up elsewhere in the enterprise in accordance with best practices in data backup and information security.

Figure 26:
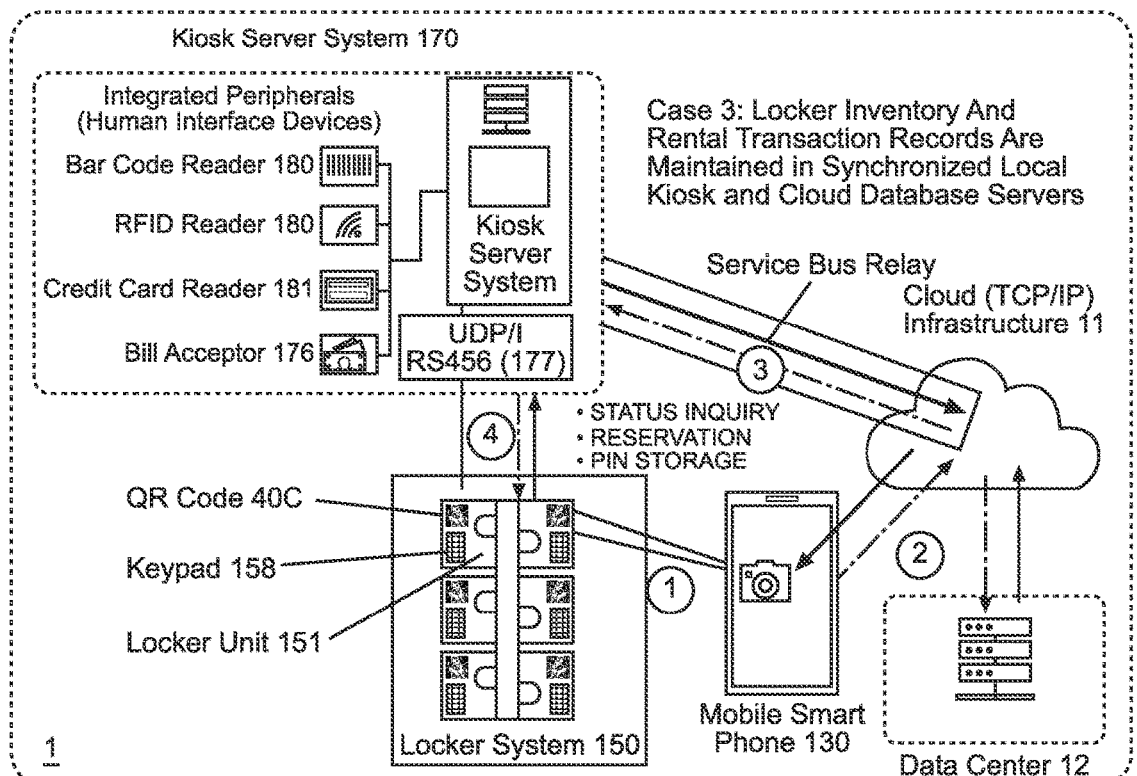
FIG. 26 shows the wireless system network of the present invention with mobile phones and other network components configured and operating according to Case 3, where a local kiosk server system is used to manage a groups of locker units at a specific site location in a specific facility, and locker inventory and rental transaction records are maintained in databases in local kiosk server systems and cloud-based network servers that are automatically data synchronized.

FIG. 26 shows the wireless system network of the present invention with mobile phones and other network components configured and operating according to Case 3, where a local kiosk server system 170 is used to manage a groups of locker units 150 at a specific site location in a specific facility, and locker inventory and rental transaction records are maintained in databases in local kiosk server systems 170 and cloud-based network servers 12 that are automatically data synchronized.

As shown in FIG. 26, Step 1 of the control access process support in this case scenario involves using (i) a mobile phone 130 to scan (i.e. read) a Door-Level QR Code 40C on a locker unit 151, and (ii) the data path indicated by 2-3-4 to check the status of the scanned locker unit 151. The primary different between Case 3 and Cases 1 and 2, is that in Case 3, is the rental inventory and transaction records are also maintained within the network database servers 12 supported in the cloud-based data center 12, with data synchronization procedures and processes running between the locker inventory and transaction record databases maintained in the local kiosk server systems 170 and cloud-based network servers at the data center 12. So, in Case 3, if rental status is "available", then the local kiosk server 170 carries out the process illustrated in Case 1. However, if the rental status is "unavailable", then the web services supported in the kiosk server system 170 sends http messages back to the web-enabled mobile phone 130 via data path 3-2 (or alternatively, cloud-based servers in the data center 12 sends http messages back to the web-enabled mobile phone 130 via data path 2) so as to inform the guest user at what Site in the Facility he or she can rent a locker, mobility device or other thing, using the rental, access and control methods described herein using Facility-Level QR Codes 40A, Site-Level QR codes 40B and/or Door-level QR Code 40C described herein. Once the rental transaction has been completed at a particular locker at a specific Site, and payment or token-exchange made per the rental agreement, the kiosk server system 170 (i) stores the user's digital PIN code into the memory store of the rented/scanned locker unit 151, and automatically (ii) updates the locker inventory records and locker transaction records within database servers maintained on the local kiosk server system 170 and cloud-based network servers 12, and data synchronized in a manner well known in the data synchronization arts.

FIG. 27 shows the wireless system network of the present invention with mobile phones 130 and other network components configured and operating according to Case 4, where a local kiosk server system 170 is not employed to manage groups of local locker units 150 at a site location in a specific facility, and all locker inventory and rental transaction records are maintained in databases in cloud-based network servers.

As shown in FIG. 27, Step 1 of the control access process support in this case scenario involves using (i) a mobile phone 130 to scan (i.e. read) a Door-Level QR Code 40C on a cloud-based networked locker unit 151 (with locker system 150 directly connected to the cloud infrastructure 11 without the use of any local kiosk server system 170 to rent, access and control a scanned locker unit 151, and (ii) the data path indicated by 2-3-4 through the cloud infrastructure 11 to check the status of the scanned locker unit 151. If rental status is "available", then the web services supported in the network servers in the data center 12 sends http messages back to the web-enabled mobile phone 130 via data path 3-2 to support the locker rental, access and control methods described herein using the Door-Level QR Code driven process described herein. Once the rental transaction has been completed, and payment or token-exchange made per the rental agreement, the network server 12 (i) stores the user's digital PIN code into the memory store of the rented/scanned locker unit 151, and automatically (ii) updates the locker inventory records and locker transaction records within database servers maintained on the cloud-based data center 12, and backed up elsewhere in the enterprise in accordance with best practices in data backup and information security.

Figure 28:
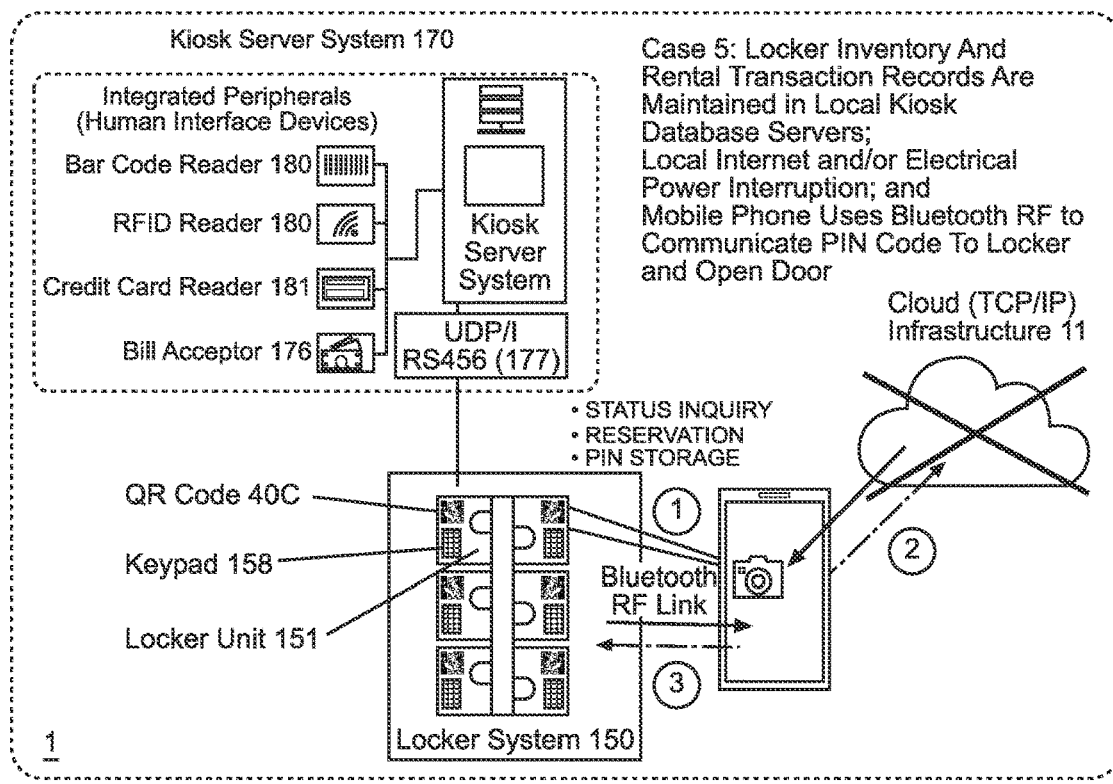
FIG. 28 shows the wireless system network of the present invention with mobile phones and other network components configured and operating according to Case 5, where locker inventory and rental transaction records are maintained in local kiosk database servers, local internet and/or electrical power is interrupted at a site and the guest's mobile phone uses Bluetooth RF communication with a specific locker unit to communicate the PIN code to locker and open the door of a rented locker and retrieve personal belongings.

FIG. 28 shows the wireless system network of the present invention with mobile phones 130 and other network components configured and operating according to Case 5, where locker inventory and rental transaction records are maintained in local kiosk database servers 170, local internet and/or electrical power is interrupted at a site and the guest's mobile phone 130 uses Bluetooth RF communication with a specific locker unit 151 to communicate the PIN code to locker and open the door of a rented locker and retrieve personal belongings.

As shown in FIG. 28, Step 1 of the control access process support in this case scenario involves using a mobile phone 130 to scan (i.e. read) a Door-Level QR Code 40C on a locker unit 151, and seek to establish an Internet/cloud connection with the local kiosk server system 170 as described hereinabove. However, due to an Internet and/or power interruption, the mobile phone 130 does not receive a proper http message back from the local kiosk server system 170, which is indicated by the X applied over the cloud icon in FIG. 14F. In response, the guest's mobile phone 130 uses Bluetooth RF communication with a specific locker unit 151 to communicate the PIN code to locker and open the door of the rented locker and retrieve personal belongings.

Figure 29:
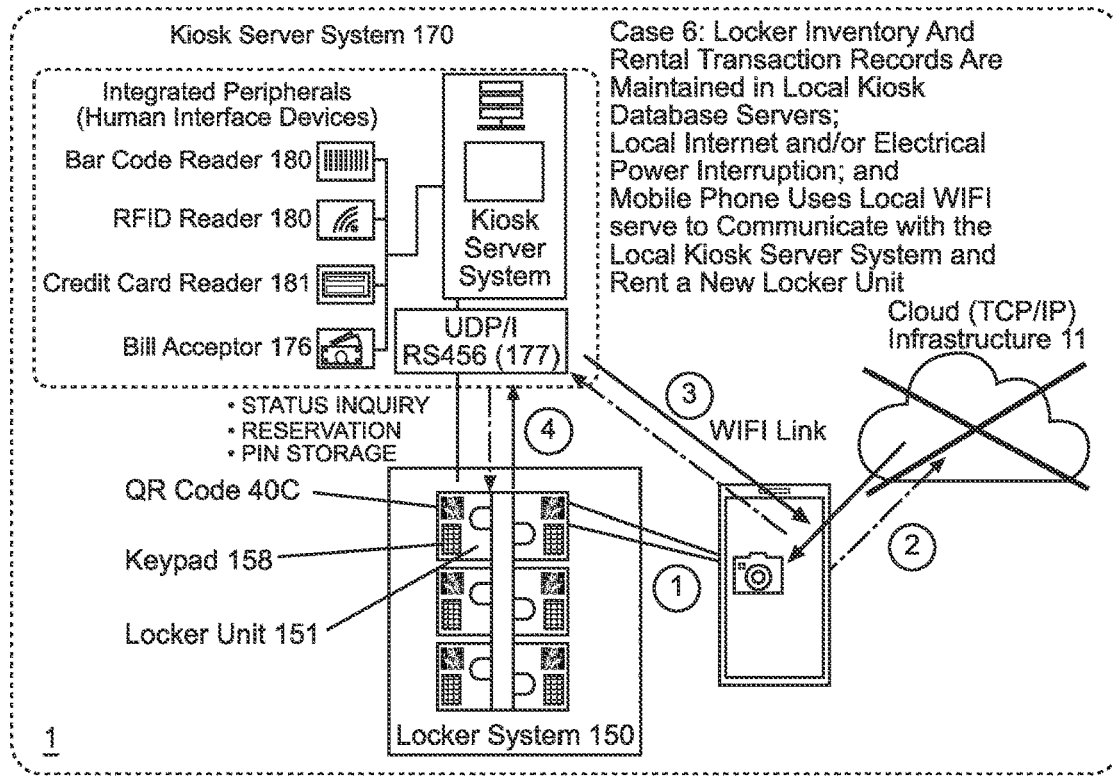
FIG. 29 shows the wireless system network of the present invention with mobile phones and other network components configured and operating according to Case 6, where locker inventory and rental transaction records are maintained in local kiosk database servers, local internet and/or electrical power is interrupted at a site and the guest's mobile phone uses local WIFI supported at the local kiosk server system to establish a WIFI communication link between the mobile smartphone and the local kiosk server system to rent a new locker unit and store the user's PIN code in the locker unit, then open the door of a rented locker and store personal belongings.

FIG. 29 shows the wireless system network of the present invention with mobile phones 130 and other network components configured and operating according to Case 6, where locker inventory and rental transaction records are maintained in local kiosk database servers 170, local internet and/or electrical power is interrupted at a site and the guest's mobile phone 130 uses local WIFI supported at the local kiosk server system 170 to establish a WIFI communication link between the mobile smartphone 130 and the local kiosk server system 170 to rent a new locker unit 151 and store the user's PIN code in the locker unit 151, then opens the door of the rented locker to store personal belongings.

As shown in FIG. 29, Step 1 of the control access process support in this case scenario involves using a mobile phone 130 to scan (i.e. read) a Door-Level QR Code 40C on a locker unit 151, and seek to establish an Internet/cloud connection with the local kiosk server system 170 as described hereinabove. However, due to an Internet and/or power interruption, the mobile phone 130 does not receive a proper http message back from the local kiosk server system 170 through the cloud infrastructure, which is indicated by the X applied over the cloud icon in FIG. 14G. In response, the guest's mobile phone 130 uses local WIFI supported at the local kiosk server system 170 to establish a WIFI communication link between the mobile smartphone 130 and the local kiosk server system 170 to rent a new locker unit 151 and store the user's PIN code in the locker unit 151, then opens the door of the rented locker to store personal belongings.

Figure 30:
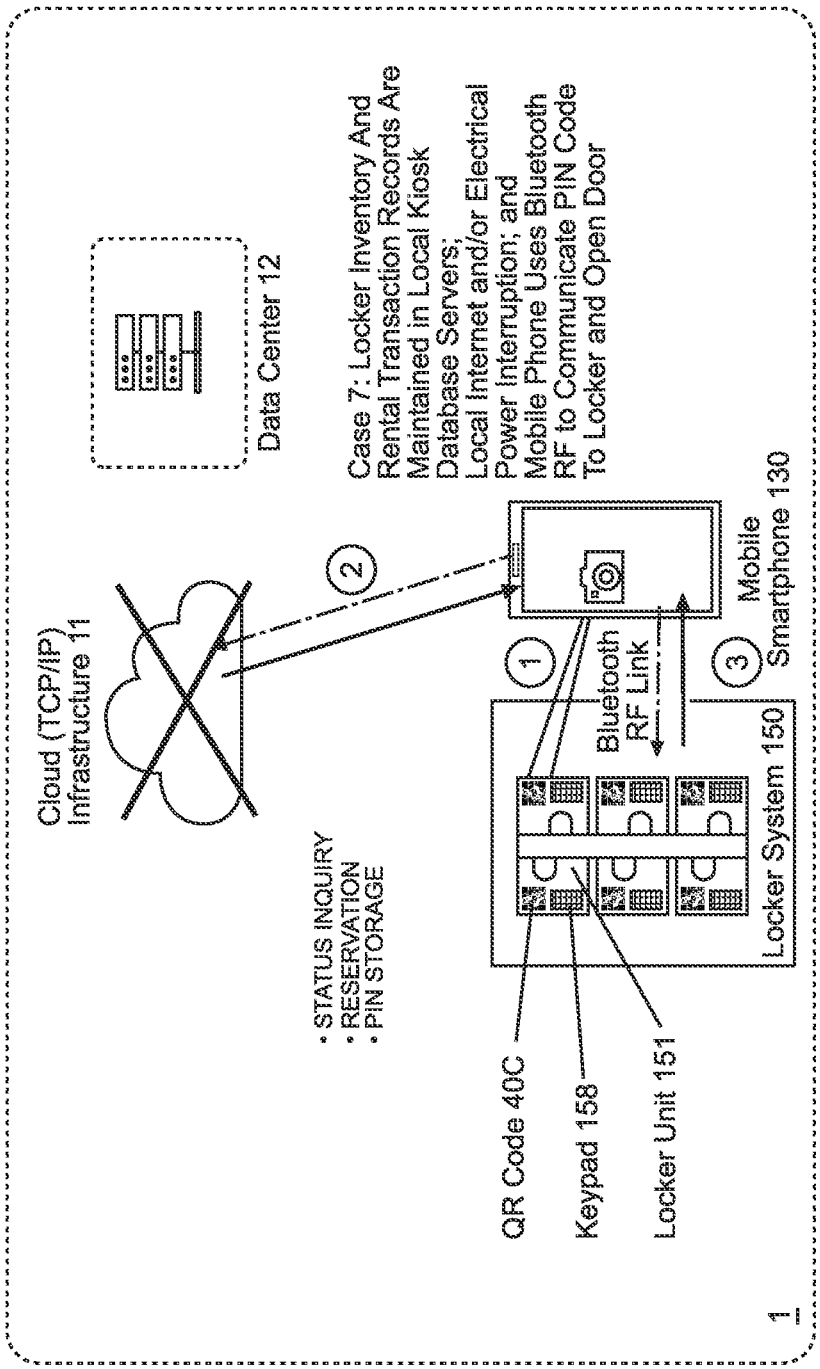
FIG. 30 shows the wireless system network of the present invention with mobile phones and other network components configured and operating according to Case 7, where locker inventory and rental transaction records are maintained in cloud database servers, local internet and/or electrical power is interrupted at a site, and a guest's mobile phone uses Bluetooth RF to communicate with the rented networked locker unit and enter the digital PIN code to open the locker door and retrieve personal belongings.

FIG. 30 shows the wireless system network of the present invention with mobile phones 130 and other network components configured and operating according to Case 7, where locker inventory and rental transaction records are maintained in cloud database servers 12, local internet and/or electrical power is interrupted at a site, and a guest's mobile phone uses Bluetooth RF to communicate with the rented networked locker unit and enter the PIN code to open the locker door and retrieve personal belongings.

As shown in FIG. 30, Step 1 of the control access process support in this case scenario involves using a mobile phone 130 to (i) scan (i.e. read) a Door-Level QR Code 40C on a locker unit 151 in a networked locker system 15 directly connected to the Internet without the use of any local kiosk server system 170, and (ii) seek to establish an Internet/cloud connection with the networked kiosk unit 151, as described hereinabove. However, due to an Internet and/or power interruption, the mobile phone 130 does not receive a proper http message back from the cloud-based network servers 12 through the cloud infrastructure during the transaction session, which is indicated by the X applied over the cloud icon in FIG. 14G. In response, the guest's mobile phone uses Bluetooth RF to communicate with the rented networked locker unit 151 and enter the PIN code to open the locker door and retrieve personal belongings.

These case scenarios are merely exemplary to illustrate the possibilities and potential configurations supported by the wireless control access system network of the present invention. Other scenarios are possible and can be supported by the system network of the present invention.

Figure 31:
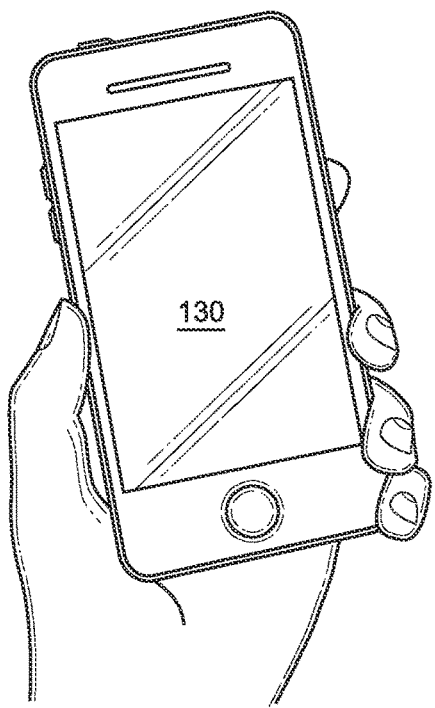
FIG. 31 is a perspective view of a mobile smartphone system (e.g. Apple iPhone device)
Figure 32:
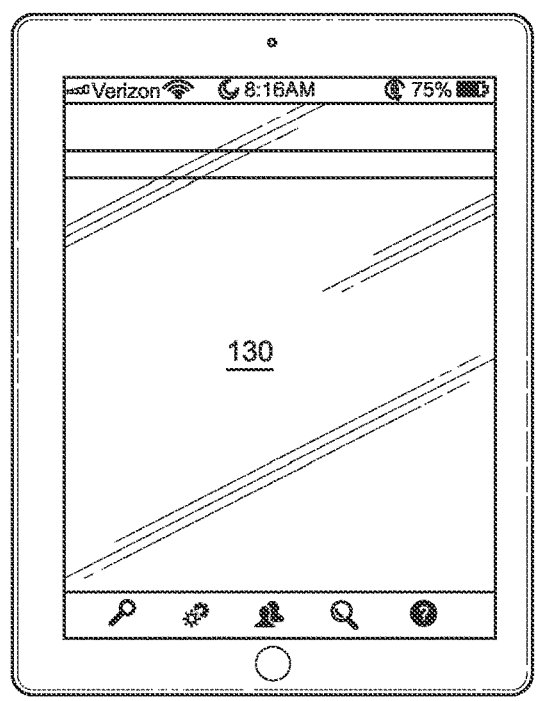
FIG. 32 is a perspective view of a mobile tablet computing system (e.g. Apple iPad device)
Figure 33:
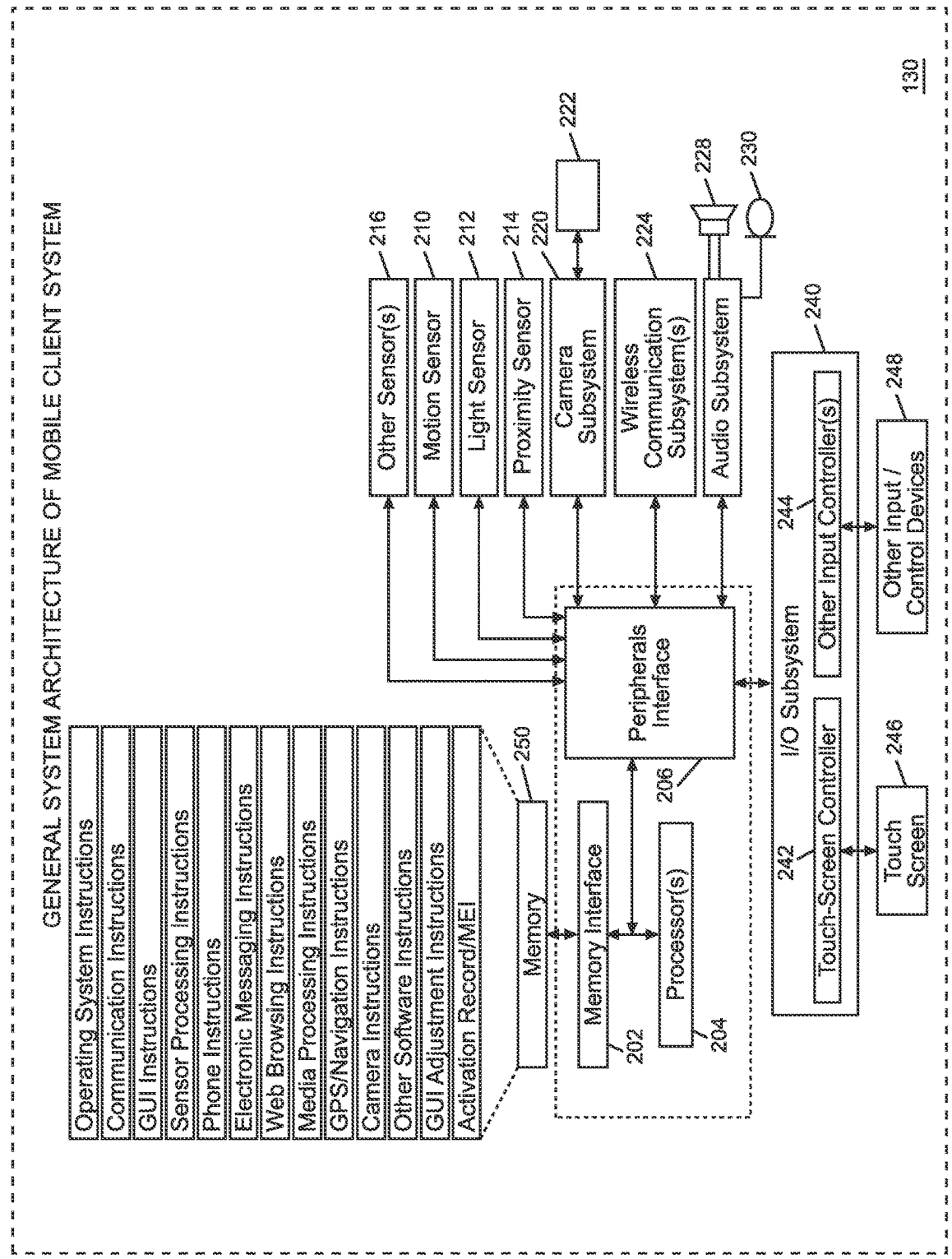
FIG. 33 is a schematic system block diagram of the mobile smartphone system and/or mobile tablet computing system shown in FIGS. 31 and 32.

Specification of System Architecture of an Exemplary Mobile Computing System Deployed on the Wireless System Network of the Present Invention FIG. 31 shows a mobile smartphone system (e.g. Apple iPhone device). FIG. 32 shows a mobile tablet computing system (e.g. Apple® iPad® device). FIG. 33 shows the system architecture for each mobile smartphone system and/or mobile tablet computing system shown in FIGS. 31 and 32, and depicted in FIGS. 13, 14, and 15 and throughout the Patent Specification.

FIG. 32 illustrate the system architecture of an exemplary mobile computing system (e.g. system component) 130 shown in FIGS. 31 and 32 and deployed on the wireless system network of the present invention 1, and supporting the many services offered by system network servers. As shown in FIG. 33, the mobile computing device 130 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. One or more communication buses or signal lines can couple the various components in the mobile device. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g., GPS receiver), a temperature sensor, a biometric sensor, a gyroscope, or other sensing device, to facilitate related functionalities. A camera subsystem 220 and an optical sensor 222, e.g., a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile computing device 130 is intended to operate. For example, a mobile device 130 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the mobile computing device 130 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile computing device 130 can be found in U.S. Pat. No. 8,631,358 incorporated herein by reference in its entirety.

In the preferred embodiments of the present invention, each mobile smartphone 130 requires a web-enabled browser program, such as Apple® Safari http browser program for the Apple® iPhone device 130 and the Apple® iPad® device 130, or any suitable web browser program for other brands of mobile phones, such as offered by Samsung, Google, Microsoft and others. The mobile smartphone 130 should also be capable of scanning and reading any machine-readable code 40 described herein, including optical code symbols and/or RFID tags, as the wireless access and control application at hand may require to be properly and adequately supported on the access and control system network of the present invention.

Alternatively, a native mobile application may be designed, developed and installed on any mobile computing system 130 to provide the mobile computing device 130 with the capacity to read machine-readable code symbols in accordance with the present invention, and support the display of GUI screens on the mobile device to support the rental, access and control services provided to the user by the service provider. In most applications, it is expected that native mobile applications designed for practicing components of the present invention will be (i) web/http-enabled despite running on native code, and (ii) enable the receipt, display and transmission of HMTL documents (e.g. webpages) on the mobile phone devices 130, in a manner well known in the Internet arts and Web-based technology pioneered by Tim Berners-Lee who is the primary inventor of the World Wide Web (WWW). However, it is possible that someday HTML as we currently know it, may evolve into something different, and even called by a different or alternative name, but notwithstanding may serve as an enabling technology useful for practicing the various inventions disclosed herein.

Figure 34A:
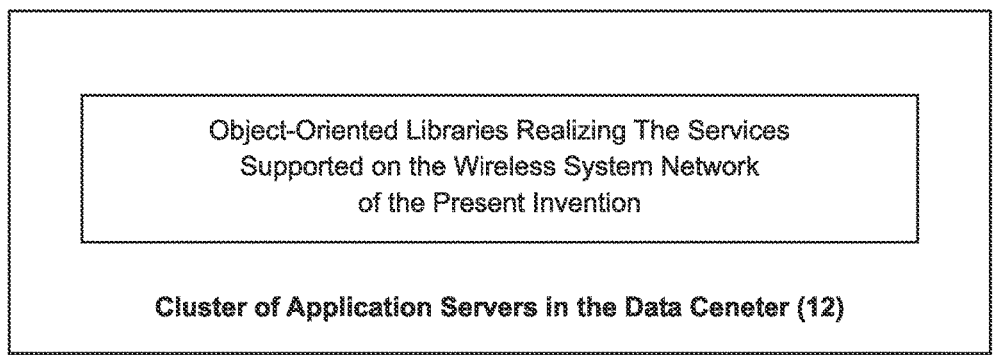
FIG. 34A is a schematic representation of the object-oriented libraries stored and executable within the cluster of application servers within the data center, realizing the many services supported on the wireless access control system network of the present invention.

Specification of Database Schema for the Database Component Used on the Wireless System Network of the Present Invention FIG. 34A illustrate object-oriented libraries that will be stored and executable within the cluster of application servers within the data centers supporting the wireless system network of the present invention, an realizing the many services supported on the wireless access control system network of the present invention.

Figure 34B:
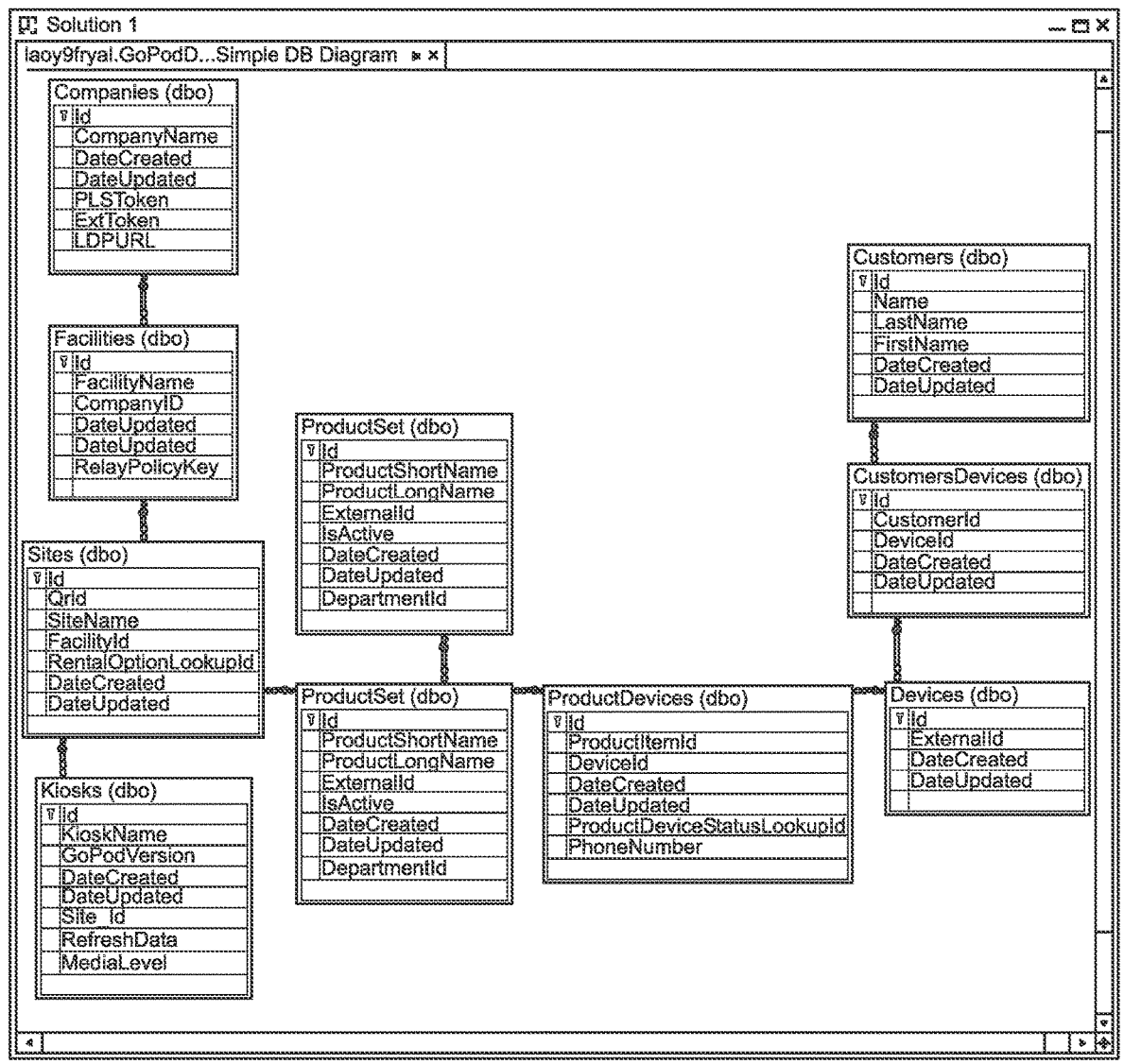
FIG. 34B is a schematic representation of the database structure associated with an exemplary relational database management system (RDBMS) used to illustrate a database architecture that will be designed and developed to support the wireless control access system network of the present invention, with the exemplary suite of services described in detail herein.

FIG. 34B represents a database structure associated with an exemplary relational database management system (RDBMS) used to illustrate a database architecture that will be designed and developed to support the wireless control access system network of the present invention, with the exemplary suite of services described in detail herein.

During the design and development of the system network, a data schema will be created for the object-oriented system-engineered (DOSE) software component thereof, for execution on a client-server architecture. In general, the software component of the system network will consist of classes, and these classes can be organized into frameworks or libraries that support the generation of graphical interface objects within GUI screens, control objects within the application or middle layer of the enterprise-level application, and enterprise or database objects represented within the system database (RDBMS) 12. Preferably, the RDBMS will be structured according to a database schema comprising enterprise objects, represented within the system database (e.g. RDBMS), including, for example: facilities including amusement and theme parks, recreational parks, centers and stadiums; rental equipment providers; vendors; service providers (e.g. instructors, trainers, medical personal); guest ID; facility managers; system user ID; Site ID; Site location; mobile phone ID; guest/visitor ID; mobile computer ID for computers deployed on the system network; and many other objects used to model the many different aspects of the system being developed. These objects and the database schema will be used and reflected in a set of object-oriented software modules developed for the system.

Each software module contains classes (written in an object-oriented programming language) supporting the system network of the present invention including, for example, the user registration module, vendor registration module, service provider registration module, mobile client computer registration module, user account management module, site account management module, ride management module, double-sided locker management module, log-in module, settings module, contacts module, search module, data synchronization module, help module, and many other modules supporting the selection, delivery and monitoring of system monitoring related services supported on the system network of the present invention.

Implementing the Mobile Client Machines and Wireless Devices on the Wireless System Network of the Present Invention In one illustrative embodiment, the enterprise-level wireless system network of the present invention is supported by a robust suite of hosted services delivered to (i) Web-based client subsystems 130 using an application service provider (ASP) model, and also to (ii) remote monitoring services deployed for various kinds of stationary and/or mobile systems to be monitored, as described above and below. In this embodiment, the Web-enabled mobile clients 130 can be realized using a web-browser application running on the operating system (OS) of a computing device 130 (e.g. Linux, Application IOS, etc.) to support online modes of system operation. It is understood, however, that some or all of the services provided by the system network can be accessed using Java clients, or a native client application running on the operating system (OS) of a client computing device 130 to support both online and limited off-line modes of system operation.

Specification of the Method of Storing Belongings within a Single-Sided Storage Locker System Installed at an Amusement Park Environment FIG. 35 describes the primary steps involved in practicing the method of storing personal belongings within a single-sided storage locker system installed at an amusement park, in accordance with the principles of the present invention.

As indicated at Block A in FIG. 35, the first step involves a guest visiting a Facility such as an Amusement Park, and using a web-enabled mobile camera phone 130 to scan (i) a Facility-Level QR Code 40A to rent and reserve an available storage locker 151 that will be available in a Double-Sided Locker System 150 at a selected Site in the Park, (ii) a Site-Level QR Code 40B at a specific Site to reserve and rent a double-sided storage locker 151 or (iii) a Door-Level QR Code 40C to rent an available storage locker 151 in 1 Double-Sided Pass-Through Locker System 150 at a Site in the Park. During this step, the guest supplies the system with an Access PIN Code for accessing the rented locker 151, as may be required, and the system generates a digital token/cookie (i.e. digital code) which the system (server) 150 stores the digital token in memory on the mobile camera phone 130 so as to remember the mobile camera phone 130 that scanned the multi-level QR Code 40 and initiated the locker rental transaction process documented within the data records specified in FIGS. 15A, 15B, and 15C.

As indicated at Block B in FIG. 35, during the second step if the Storage Locker is rented by scanning a Facility-Level QR Code 40C or Site-Level QR Code 40B, then the guest can use a web-enabled mobile camera phone 130 to scan the Door-Level QR Code 40C on the storage/ingress side of rented storage locker 151, open the door, store personal belongings of the guest and/or guest's family, and embark on the Park Ride/Event; and if a storage locker 150 is rented by scanning the storage/ingress side of a Door-Level QR Code 40C, then the guest may open the locker door after rental, store personal belongings in the opened storage locker 151, close the locker door, and embark on the Amusement Park Ride/Event.

As indicated at Block C in FIG. 35, the third step involves, after completing the Park Ride/Event, the Guest exits the Park Area and scans the Door-Level QR Code 40C on the retrieval/egress side of the rented storage rocker 150, opens the locker door, removes personal belongings, and then closes the locker door.

As indicated at Block D in FIG. 35, after the door is locked on the egress-side of the rented storage locker, the system automatically checks and analyzes the data records to determine if any personal belongings are visually-detected in the rented locker 151 using internal locker cameras 320 and IR object detectors 310, and if not, then terminates the locker rental transaction; but if personal belongings are visually detected, then system automatically sends a message to the guest phone 130 requesting the guest to remove belongings from the rented locker unit 151.

As will be described in greater detail below, there are three primary code scanning workflows that guest users can undertake to rent, access, control and use double-sided pass-through locker systems of the present invention using mobile smartphones to scan QR Codes, display messages, and receipts, and instructions on how to use the double-sided locker system with minimal contact of public surfaces. These three primary code scanning workflows are identified as follows: Facility-Level Code Scanning Followed by Door-Level Scanning shown in FIGS. 36A through 44; Site-Level Code Scanning Followed by Door-Level Scanning shown in FIGS. 45A through 53; and Door-Level Code Scanning Followed by Door-Level Scanning shown in FIGS. 54A through 60B. Each of these scanning workflows and associated methods will be described in greater detail below with reference to underlying data processing methods that provide the system with intelligence and significant levels of automation in the field of locker rental, access and control.

Notably, in each of these three workflows of the preferred illustrative embodiments of the present invention, the system administrator of the single-sided locker system 150 has the option of enabling the guest user to: (i) to automatically open the locker upon successfully scanning the Door-Level QR Code on the rented locker unit, without manual entry of the guest-set 4 digit access PIN on either the virtual keypad or hardware keypad 158 provide on each locker door; (ii) to automatically open the locker upon successfully scanning the Door-Level QR Code on the rented locker unit, and also manual entering the guest-set 4 digit access PIN on the virtual keypad; or (iii) automatically open the locker upon successfully manually entering the guest-set 4 digit access PIN on the hardware keypad 158 provide on the locker door of the rented locker. Any one or more of these locker opening methods can be enabled by a system administer using programming techniques known in the art to enable any guest user, or guest users, to open locker doors of rented lockers installed at sites within a facility.

While first locker access method described above (i) has the advantage of quick locker door access by the simple scanning of a Door-Level QR Code scanned by an authorized mobile phone containing a transaction identifier (i.e. digital cookie) linked to a specific locker unit and rental transaction identifier maintained within the locally and globally maintained database systems of the present invention, there is still the unlikely and low risk of theft and fraud should the phone get lost or stolen and then used to open a rented locker authorized by the phone.

The second locker access method is based on a form of 2 factor authentication, requiring both code scanning with the phone and entry of the access PIN via the virtual keypad supported by the mobile phone. This is the most secure method supported on the system, and is preferred in most instances.

The third locker access method only requires entering the access PIN selected for the rented locker using the hardware physical keypad 158 mounted on the locker door, to automatically open the door of a rented locker. When enabled, this method allows guest users to access their rented lockers, even when electrical power and network connectivity within the facility is disrupted for one reason or another, given that back-up battery power is supported to each single-sided locker system 150 of the present invention. This prevents guests from ever being locked out of rented lockers and their ability to retrieval personal belongings under almost any set of circumstances within a facility that may cause disruption in services.

Preferably, all three single-sided locker access methods described above are enabled to operate with each of the code scanning workflows described below and specified in the Drawings.

Specification of the Method of Managing Access Control to a Networked Locker System by Scanning Facility-Level QR Codes Posted at the Entrance Gate or Outside of an Amusement Park Facility Using a Mobile Smartphone Wireless Connected to the Wireless Access Control System Network of the Present Invention FIGS. 36A, 36B, 36C and 36D describes the primary steps involved when carrying out the methods of managing access control to a networked locker system 150 by scanning Facility-Level QR Codes 40A posted at the entrance gate or outside of an amusement park facility 800, using a mobile smartphone 130 wireless connected to the wireless access control system network of the present invention.

Figure 37A:
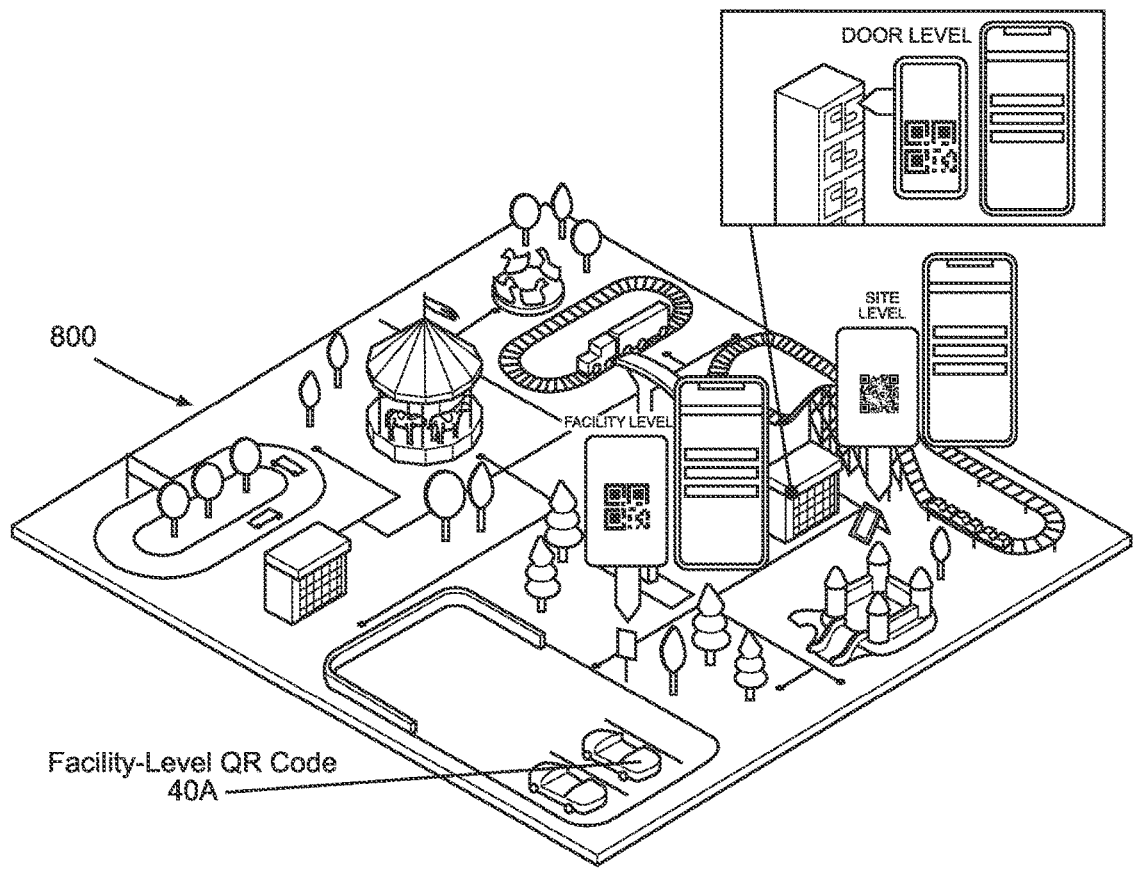
FIG. 37A is a schematic illustrating showing a perspective view of an amusement park facility, with a sign posted at the entrance date of the park, displaying a Facility-Level QR code as shown in FIG. 37B, which upon scanning with a web-enabled mobile smartphone is engineered to direct the guest user to a web-based e-commerce-enabled locker rental and access control transaction process, having the largest scope of services, encapsulating the entire facility, and allowing guest users to select a (ride, attraction or event) Site location of choice within the amusement park for their locker rental within the amusement park, and then allow the wireless system network to automatically assign an available locker to the guest at the selected Site.
Figure 37B:
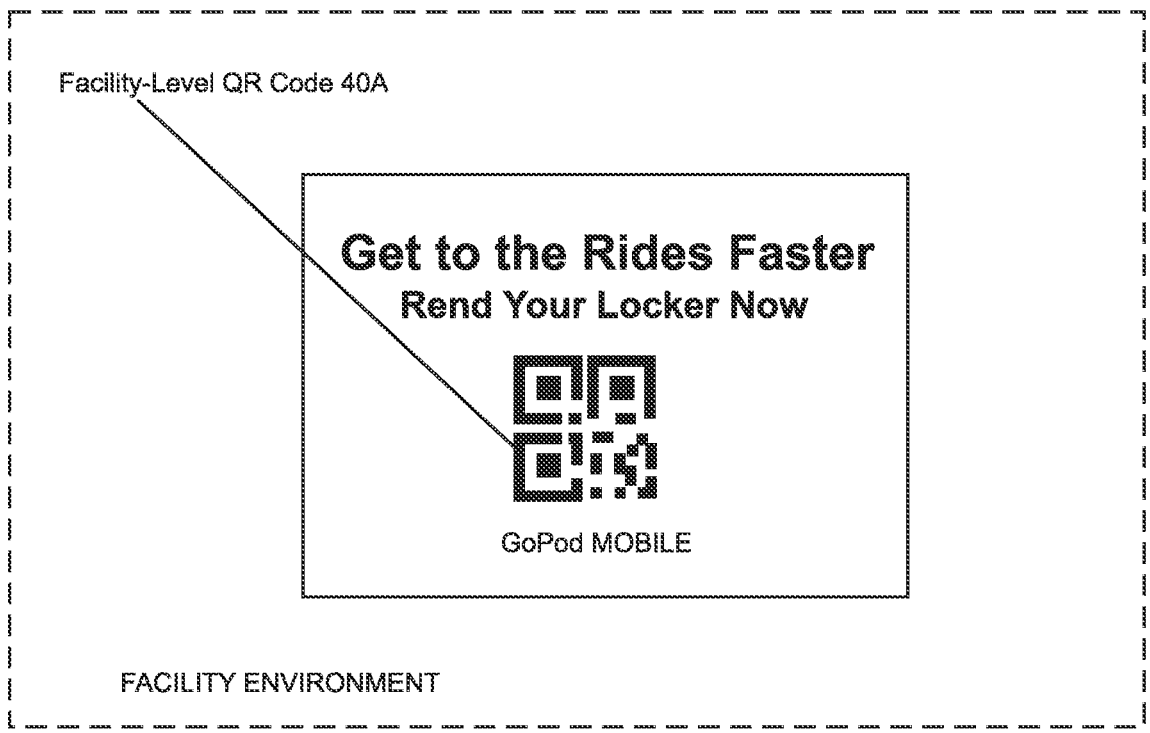
FIG. 37B is an enlarged view of the Facility-Level QR Code posted at the entrance gate of the amusement park illustrated in FIG. 37A.

FIG. 37A shows a perspective view of an amusement park facility 800, with a sign posted at the entrance date of the park, displaying a Facility-Level QR code 40A as shown in FIG. 37B which, upon scanning with a web-enabled mobile smartphone 130, is engineered to direct the guest user to a web-based e-commerce-enabled locker rental and access control transaction having the largest scope of services, encapsulating the entire facility. This allows guest users to select a Site location of choice within the amusement park 800 for their locker rental within the amusement park, and then allow the wireless system network to automatically assign an available locker to the guest at the selected Site.

FIG. 37B shows an enlarged view of the Facility-Level QR Code 40A posted at the entrance gate of the amusement park illustrated in FIG. 37A.

Figure 36B:
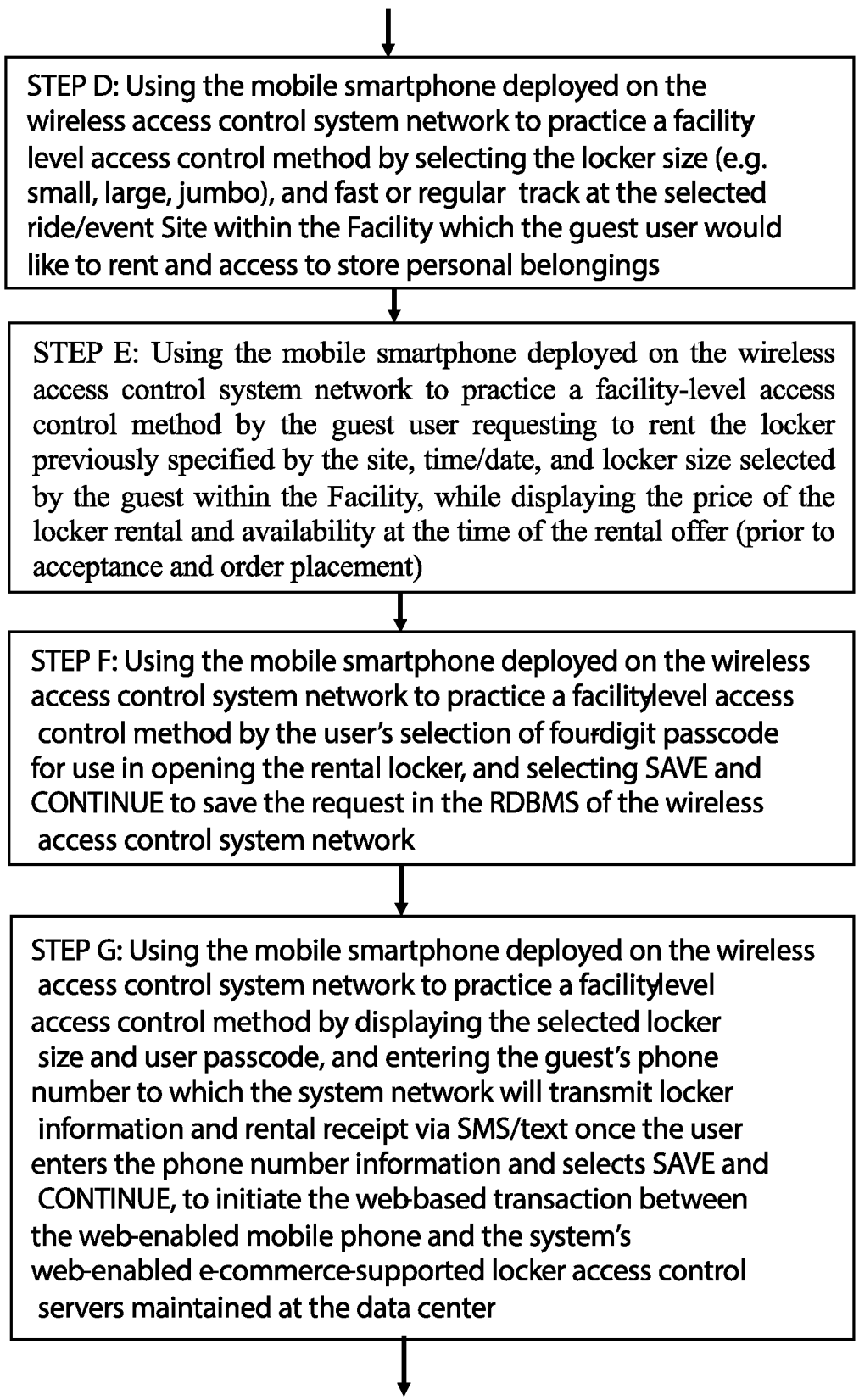
Figure 36C:
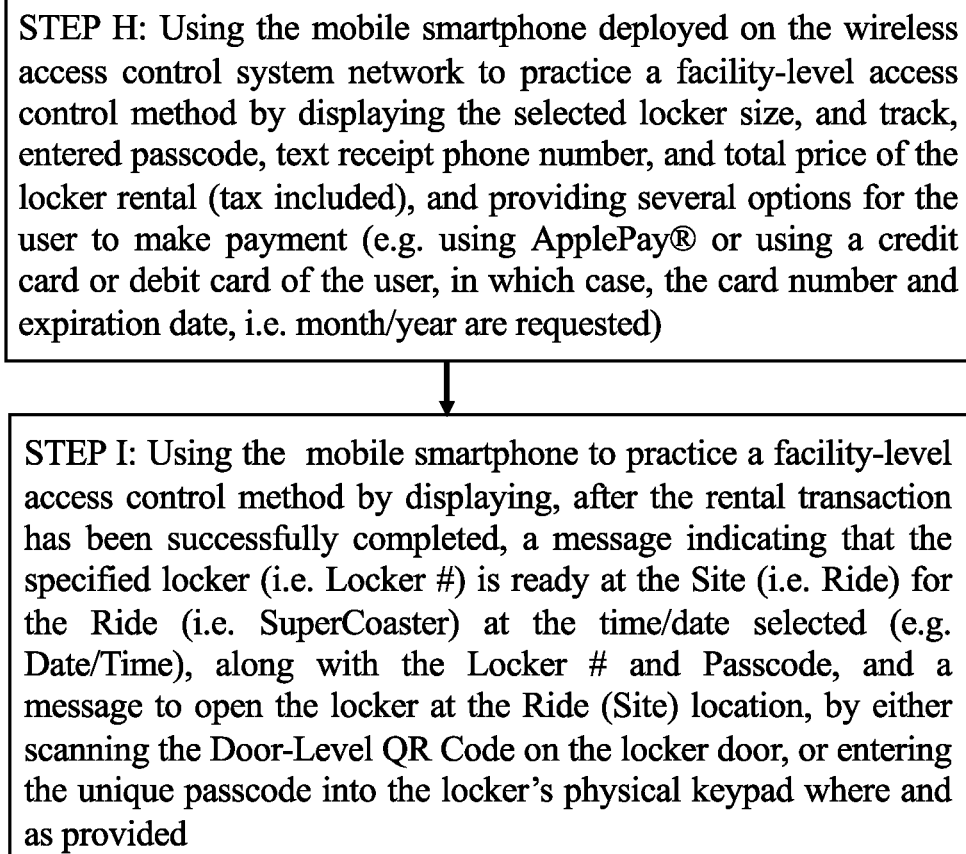

The method described and illustrated in FIGS. 36A through 36C is supported by the GUI screens shown in FIG. 38A through 38I.

Figure 38A:
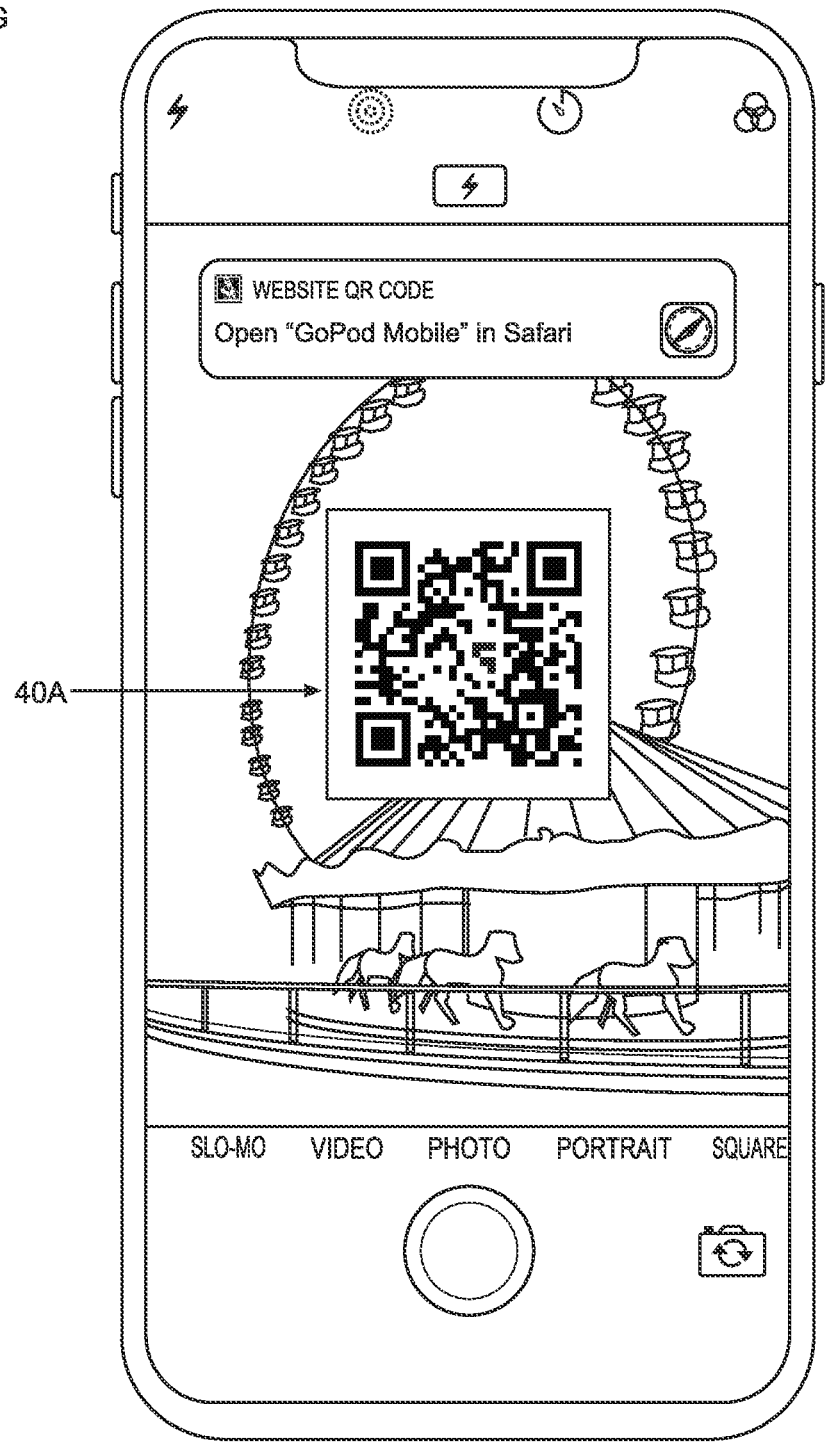
FIG. 38A is a graphical user interface (GUI) screen of the mobile smartphone shown in FIG. 31, deployed on the wireless access control system network of the present invention, and showing the first step in the facility-level access control method of the present invention involving (i) the scanning of a Facility-Level QR Code as shown in FIGS. 37A and 37B, and (ii) automatically directing the smartphone web-browser application (e.g. Apple Safari) to parse and analyze the scanned QR code and serve, load and display the webpage specified by the URL encoded in the Facility-Level QR Code as illustrated in table of FIG. 12, and whereupon, the application server stores a "Rental Transaction Identifier—Facility Entry" (RTI-FE) within the cache on the mobile smartphone.

As indicated in Step A of FIG. 36A, and shown in FIG. 38A, a mobile smartphone 130 deployed on the wireless access control system network 1 is used to practice a facility-level access control method by (i) scanning of a Facility-Level QR Code 40A, and (ii) automatically directing the smartphone web-browser application (e.g. Apple Safari) to parse and analyze the scanned QR code and serve, load and display the webpage specified by the URL encoded in the Facility-Level QR Code, and whereupon, the application server stores a "Rental Transaction Identifier—Facility Entry" (RTI-FE) (e.g. digital token) within the cache on the mobile smartphone.

Figure 38B:
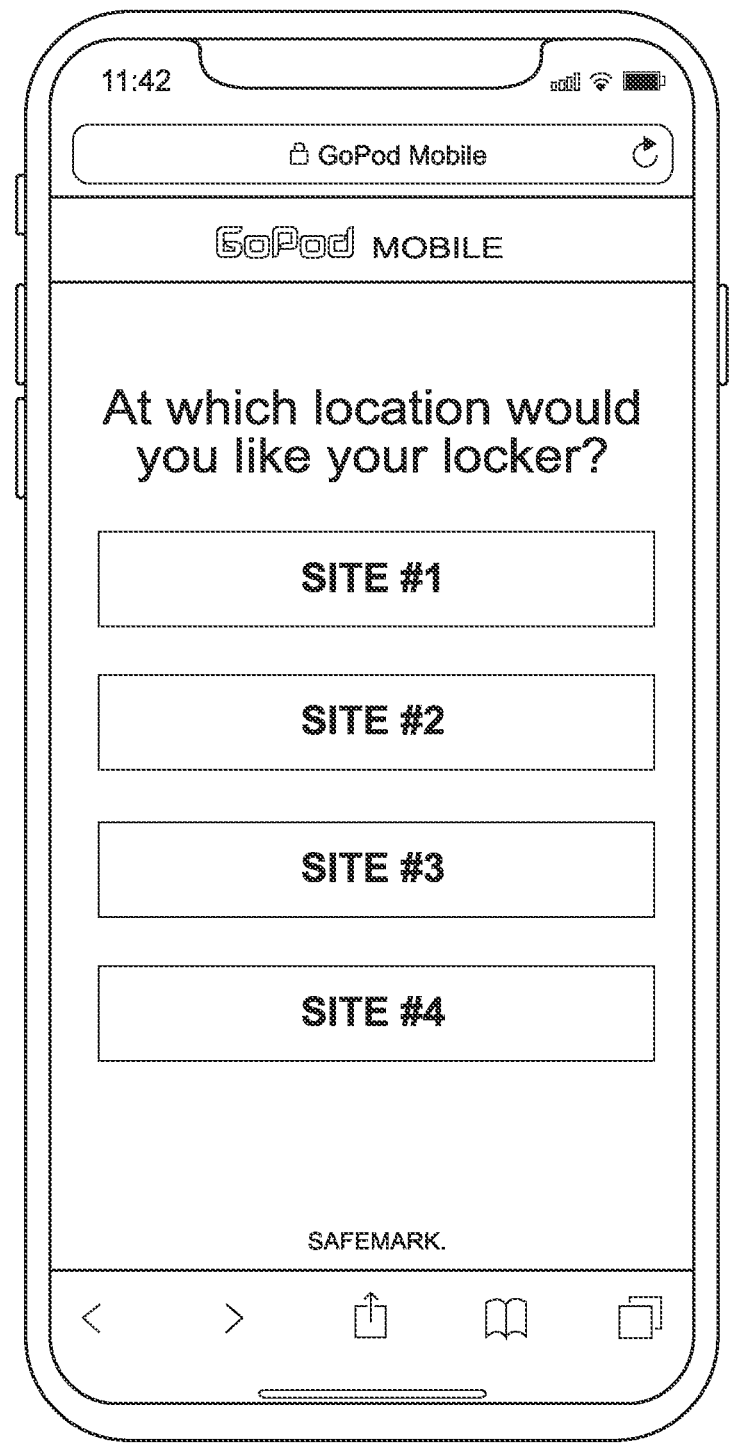
FIG. 38B is a graphical user interface (GUI) screen of the mobile smartphone shown in FIG. 31, deployed on the wireless access control system network of the present invention, and showing the second step in the facility-level access control method of the present invention involving the selection of which Site (ride, attraction or event) within the Facility (e.g. amusement park) (e.g. RIDE #1, RIDE #2, RIDE ##, RIDE #4) where the guest user would like to rent and access a storage locker of a particular size, along a specific track, to store personal belongings, for a particular time on a specific date, for a specified time period relating to a specified scheduled ride event.

As indicated in Step B of FIG. 36A, and shown in FIG. 38B, the mobile smartphone 130 deployed on the wireless access control system network is used to practice a facility-level access control method by selecting which Site within the Facility (e.g. Main Gate, South Entrance, or Picnic Area) where the guest user would like to rent and access a storage locker 151 to store personal belongings.

Figure 38C:
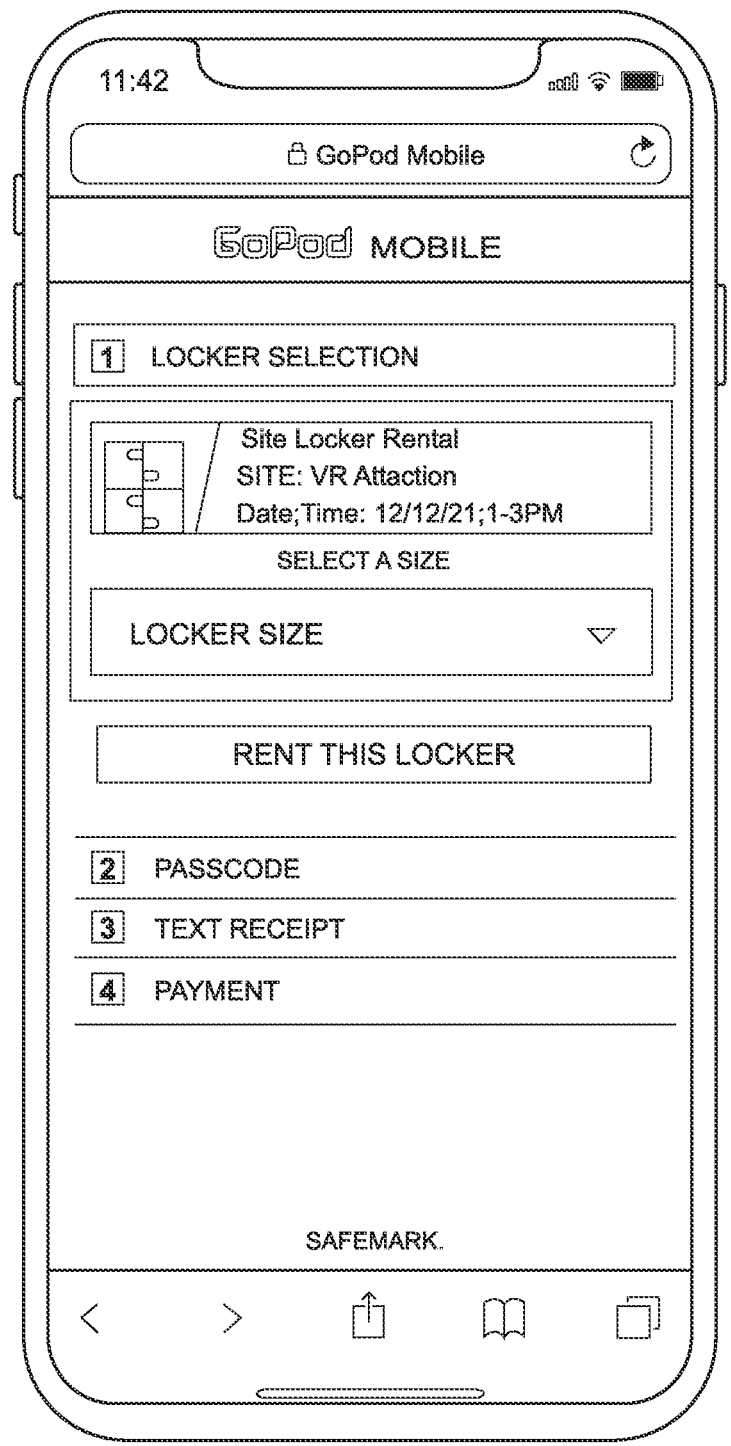
FIG. 38C is a graphical user interface (GUI) screen of the mobile smartphone shown in FIG. 31, deployed on the wireless access control system network of the present invention, and showing the third step in the facility-level access control method of the present invention involving the selection of time/date of the locker rental at the Ride Site within the Facility when would the guest user would like to rent and access to store personal belongings.

As indicated in Step C of FIG. 36A, and shown in FIG. 38C, the mobile smartphone 130 deployed on the wireless access control system network 1 is used to practice a facility-level access control method by selecting the time/date of the locker rental at the Site within the Facility when would the guest user would like to rent and access to store personal belongings.

Figure 38D:
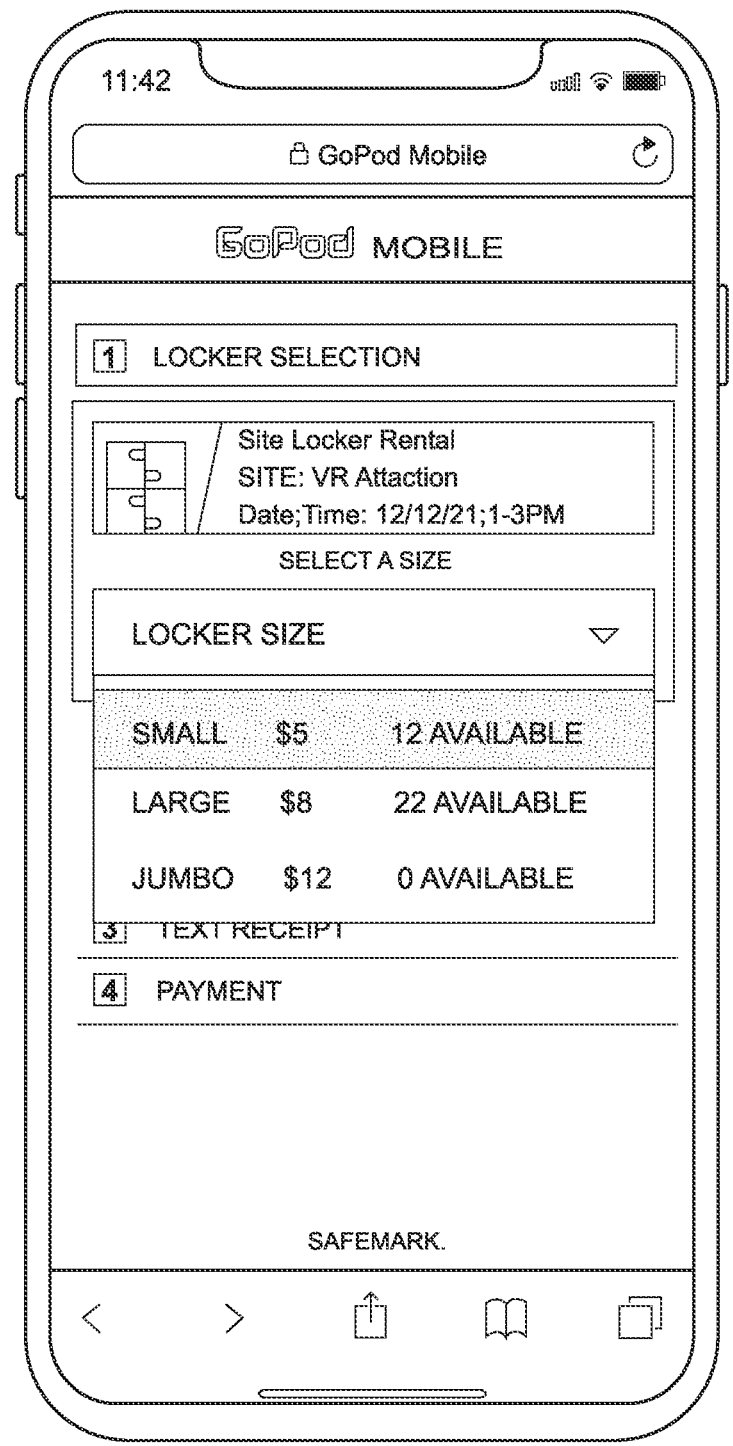
FIG. 38D is a graphical user interface (GUI) screen of the mobile smartphone shown in FIG. 31, deployed on the wireless access control system network of the present invention, and showing the fourth step in the facility-level access control method of the present invention involving the selection of locker size (e.g. small, large, jumbo) at the selected Site within the Facility which the guest user would like to rent and access to store personal belongings.

As indicated in Step D of FIG. 36B, and shown in FIG. 38D a mobile smartphone deployed on the wireless access control system network 1 is used to practice a facility-level access control method by selecting the locker size (e.g. small, large, jumbo) at the selected Site within the Facility which the guest user would like to rent and access to store personal belongings.

Figure 38E:
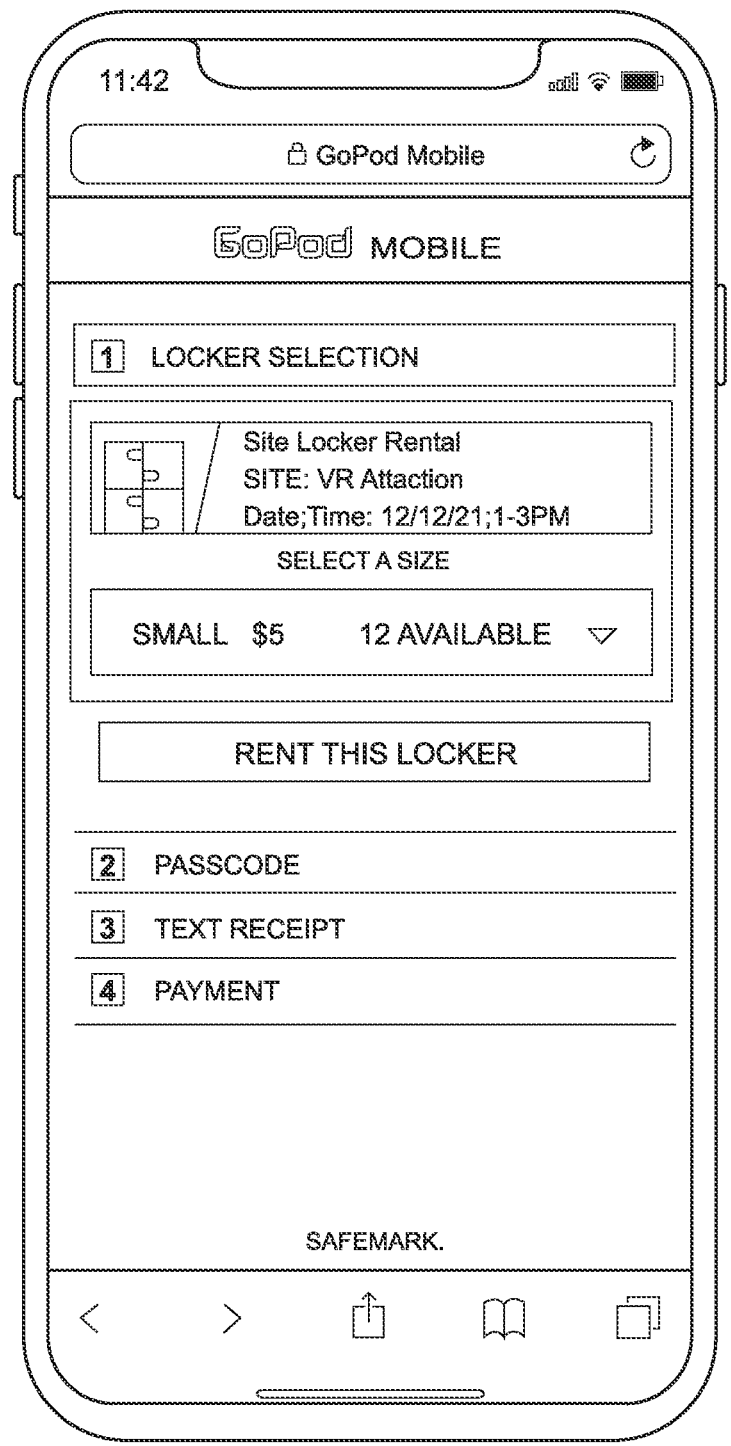
FIG. 38E is a graphical user interface (GUI) screen of the mobile smartphone shown in FIG. 31, deployed on the wireless access control system network of the present invention, and showing the fifth step in the facility-level access control method of the present invention involving the guest user requesting to rent the locker previously specified by the site, time/date, and locker size selected by the guest within the Facility, while displaying the price of the locker rental and availability at the time of the rental offer (prior to acceptance and order placement)

As indicated in Step E of FIG. 36B, and shown in FIG. 38E, the mobile smartphone 130 deployed on the wireless access control system network 1 is used to practice a facility-level access control method by the guest user requesting to rent the locker previously specified by the site, time/date, and locker size selected by the guest within the Facility, while displaying the price of the locker rental and availability at the time of the rental offer (prior to acceptance and order placement).

Figure 38F:
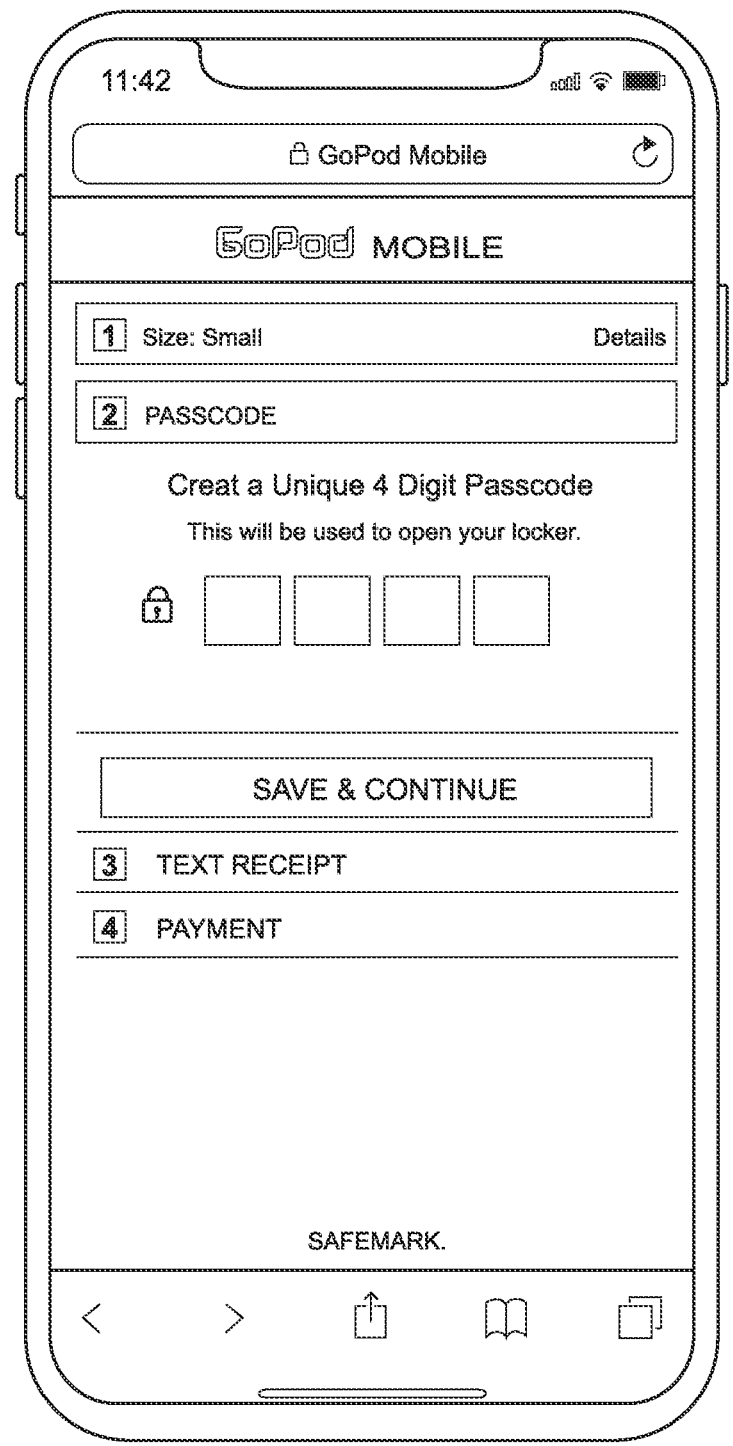
FIG. 38F is a graphical user interface (GUI) screen of the mobile smartphone shown in FIG. 31, deployed on the wireless access control system network of the present invention, and showing the sixth step in the facility-level access control method of the present invention involving the user's selection or manual-entry of four-digit passcode (PIN) stored in system databases for use in opening the rental locker, and selecting SAVE and CONTINUE to save the request in the RDBMS of the wireless access control system network.

As indicated at Step F of FIG. 36B, and shown in FIG. 38F, the mobile smartphone 130 deployed on the wireless access control system network is used to practice a facility-level access control method by the user's selection of four-digit passcode for use in opening the rental locker, and selecting SAVE and CONTINUE to save the request in the RDBMS of the wireless access control system network.

Figure 38G:
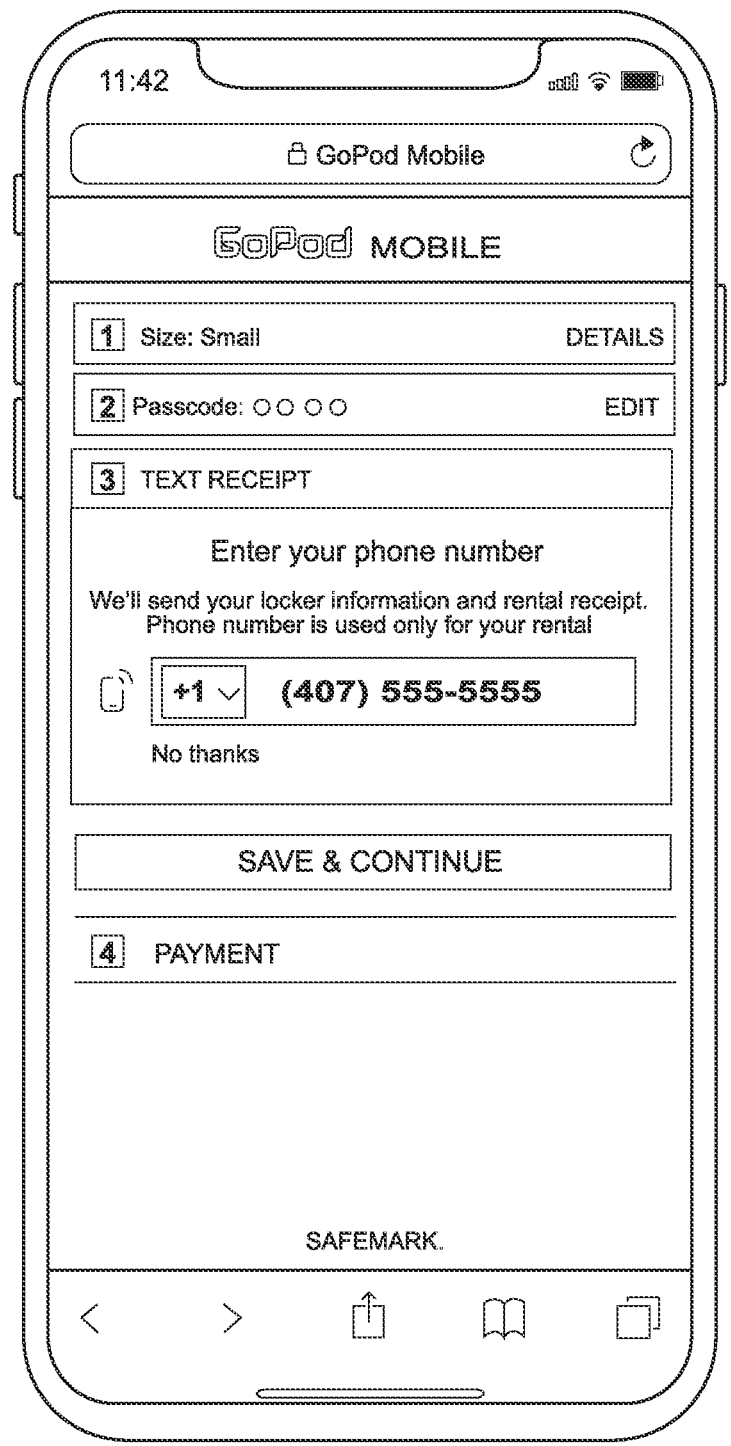
FIG. 38G is a graphical user interface (GUI) screen of the mobile smartphone shown in FIG. 31, deployed on the wireless access control system network of the present invention, and showing the seventh step in the facility-level access control method of the present invention displaying the selected locker size and user passcode, and involving entering the guest's phone number to which the system network will transmit locker information and rental receipt via SMS/text once the user enters the phone number information (assigned to the mobile phone) and selects SAVE and CONTINUE, to initiate the web-based transaction between the web-enabled mobile phone and the system's web-enabled e-commerce-supported locker access control servers maintained at the data center.

As indicated in Step G of FIG. 36B, and shown in FIG. 38G the mobile smartphone 130 deployed on the wireless access control system network 1 is used to practice a facility-level access control method by displaying the selected locker size and user passcode, and entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers maintained at the data center.

Figure 38H:
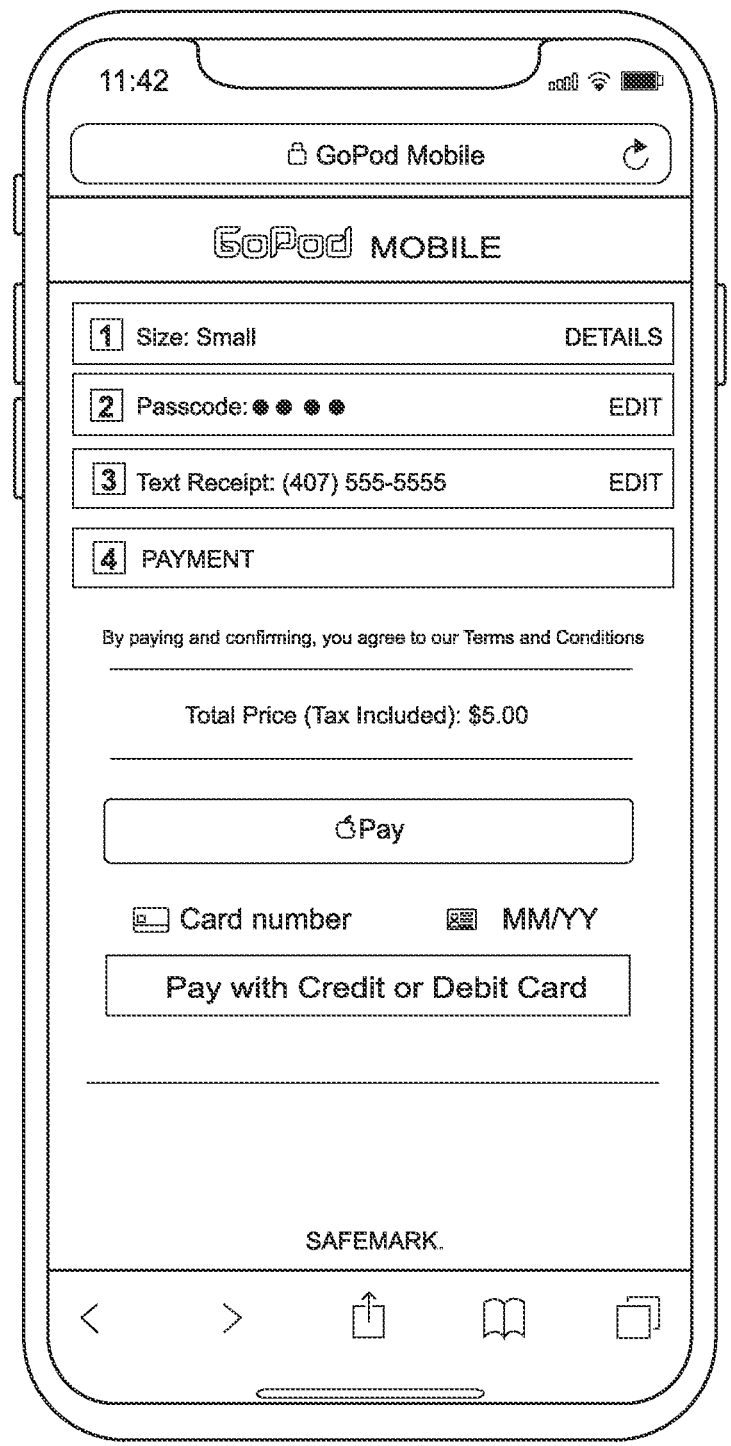
FIG. 38H is a graphical user interface (GUI) screen of the mobile smartphone shown in FIG. 31, deployed on the wireless access control system network of the present invention, and showing the eighth step in the facility-level access control method of the present invention displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested)

As indicated in Step H of FIG. 36C, and shown in FIG. 38H the mobile smartphone deployed on the wireless access control system network is used to practice a facility-level access control method by displaying the selected locker size, entered passcode, text receipt phone number, and total price of the locker rental (tax included), and providing several options for the user to make payment (e.g. using ApplePay® or using a credit card or debit card of the user, in which case, the card number and expiration date, i.e. month/year are requested).

Figure 38I:
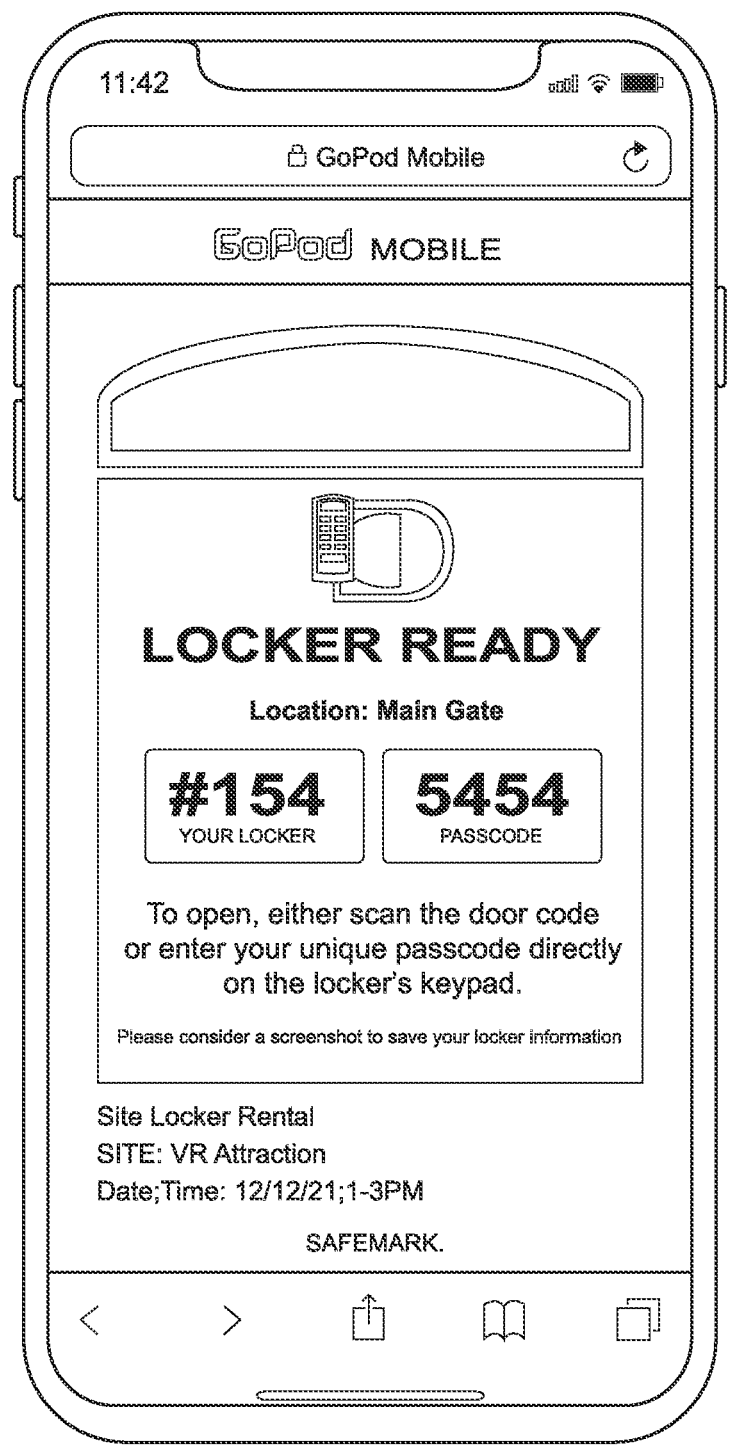
FIG. 38I is a graphical user interface (GUI) screen of the mobile smartphone shown in FIG. 31, deployed on the wireless access control system network of the present invention, and showing the nineth step in the facility-level access control method of the present invention displaying, after the prior payment transaction has been successfully completed, a message that the locker is ready, along with the selected location MAIN GATE, locker # and passcode, and a message to open the locker at its location, by either scanning the Door-Level QR Code on the locker door, or entering the unique passcode into the locker's keypad (where and as provided)

As indicated in Step I of FIG. 36C, and shown in FIG. 38I the mobile smartphone deployed on the wireless access control system network is used to practice a facility-level access control method by displaying, after the prior payment transaction has been successfully completed, a message that the locker is ready, along with the selected location MAIN GATE, locker # and passcode, and a message to open the locker at its location, by either scanning the Door-Level QR Code on the locker door, or entering the unique passcode into the locker's keypad where and as provided.

Figure 39:
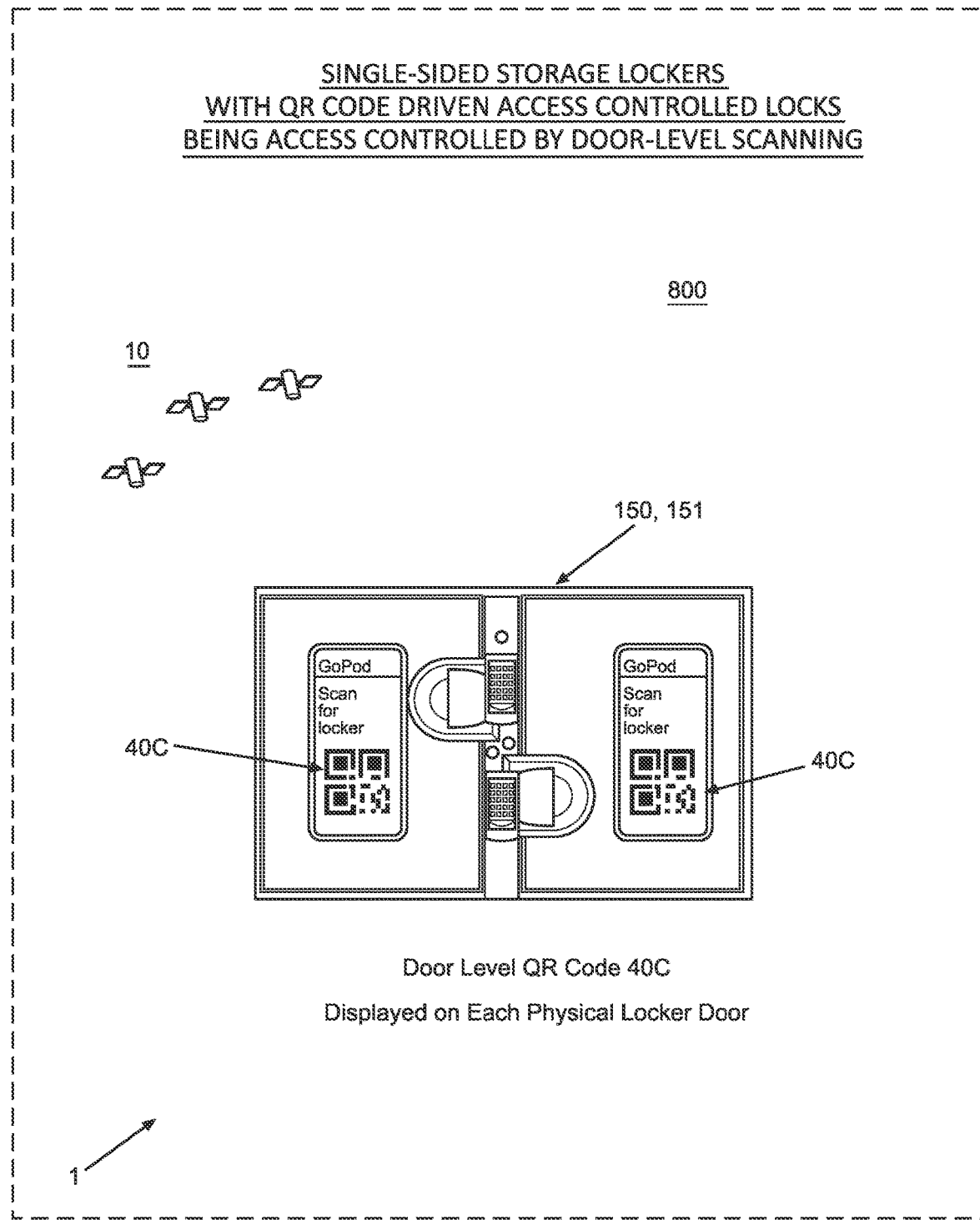
FIG. 39 is a plan view of an exemplary Door-Level QR Code (i.e. a machine-readable code, such as an optically-readable bar code symbol and/or RFID encoded tag component) physically posted or electrically displayed on the surface of each locker unit in the single-sided storage locker system illustrated in FIGS. 16 and 17.

Specification of Method of Managing Access Control to a Networked Storage Locker within an Amusement Park Enterprise by Scanning the Ingress/Storage Side of a Door-Level QR Code after Scanning a Facility Level QR Code Using a Mobile Smartphone Connected to the Wireless Access Control System Network of the Present Invention FIG. 39 shows an exemplary Door-Level QR Code (i.e. a machine-readable code, such as an optically-readable bar code symbol and/or RFID encoded tag component) physically posted or electrically displayed on the front surface of the storage/entry side door of each locker unit in the double-sided storage locker system illustrated in FIGS. 16 and 17.

Figure 40A:
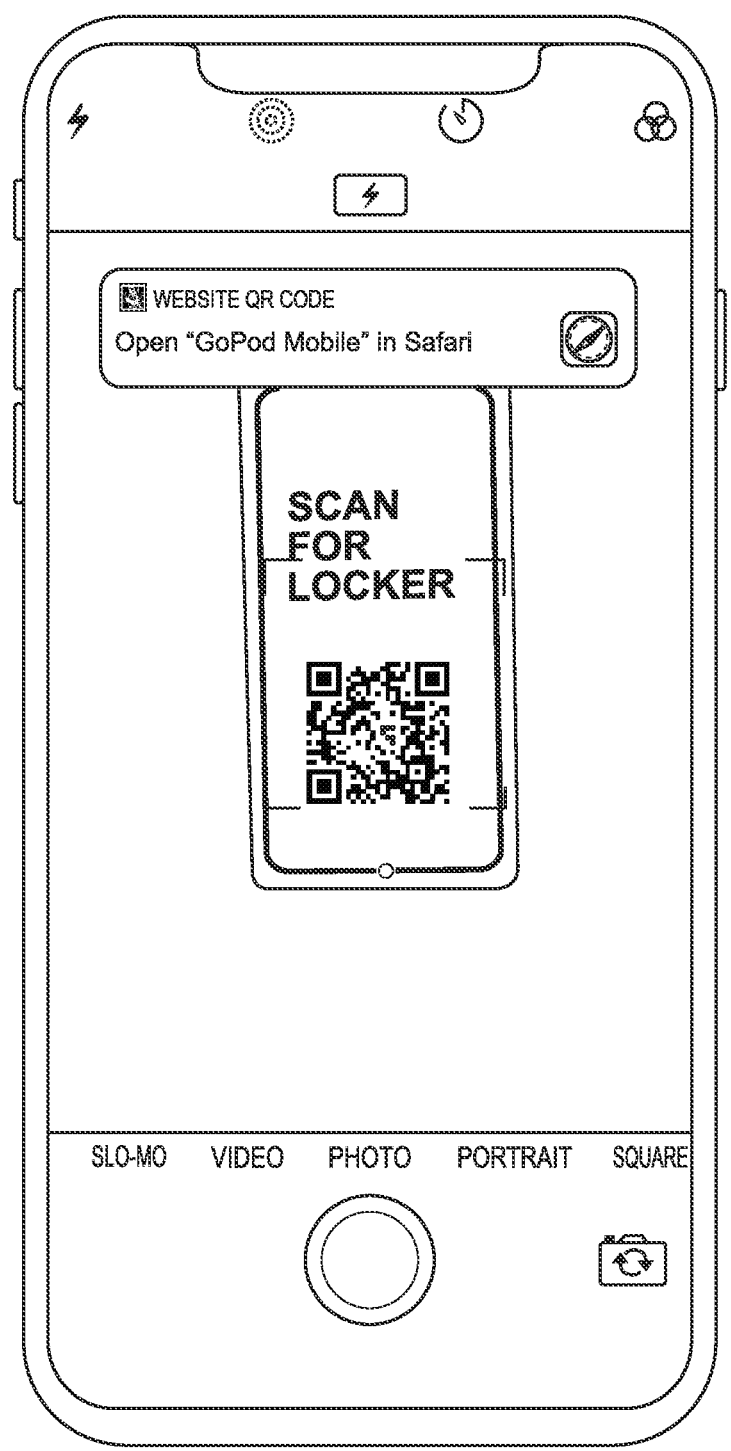
FIG. 40A is a graphical user interface (GUI) screen of the mobile smartphone shown in FIG. 31, deployed on the wireless access control system network of the present invention, and showing the first step in the door-level access control method when entered after completing the facility-level access control method described in FIGS. 38A through 38J, involving (i) the scanning of the Door-Level QR code on the rented locker using the user's web-enabled mobile smartphone, as shown in FIG. 39, (ii) automatically directing the smartphone web-browser application (e.g. Apple Safari) to parse and analyze the scanned QR code and serve, load and display the webpage specified by the URL encoded in the Door-Level QR Code as illustrated in table of FIG. 12, and (iii) executing the access control transaction script for the locker rental transaction identified by the "Rental Transaction Identifier—Facility Entry" (e.g. digital token/cookie) stored on the phone by the application servers, so as to determine the state of the transaction for the Door-Level Access Control Method.
Figure 40B:
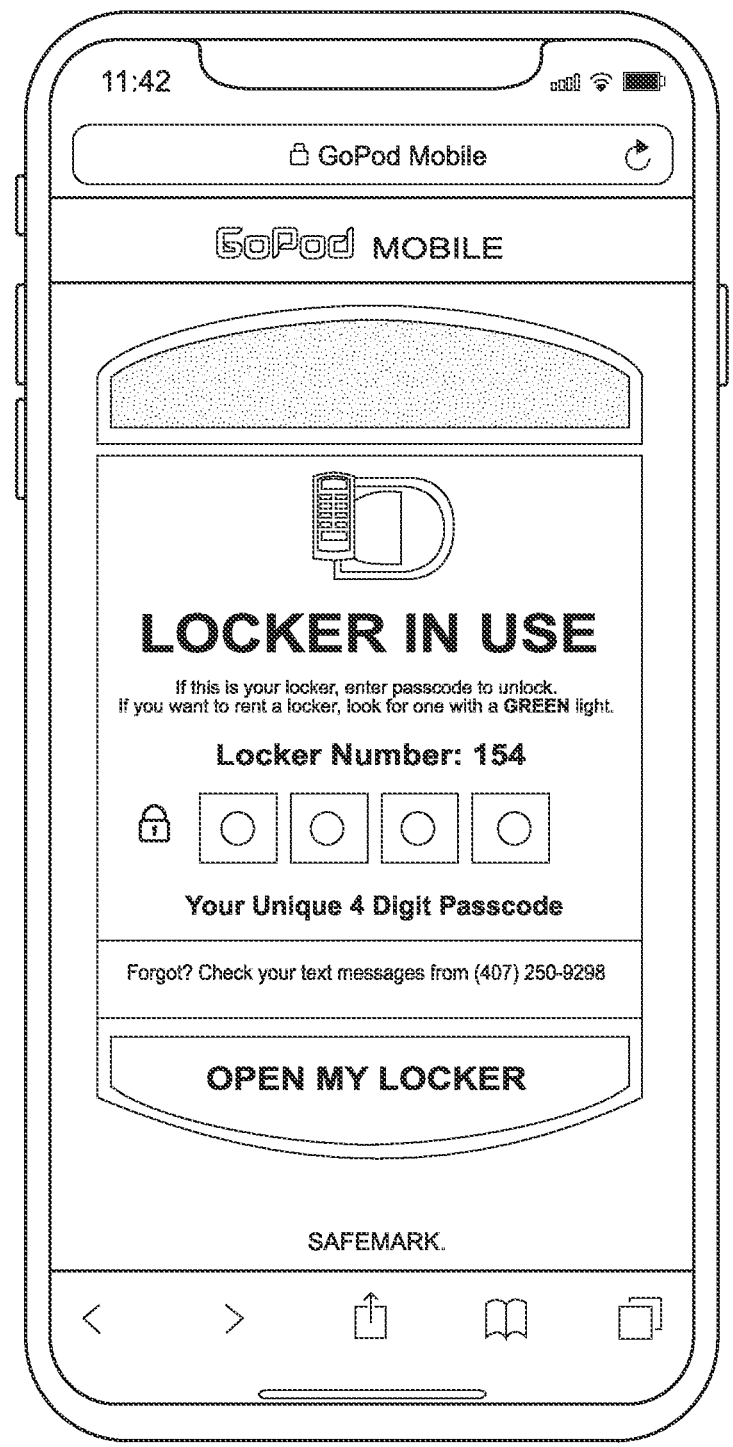
FIG. 40B is a graphical user interface (GUI) screen of the mobile smartphone shown in FIG. 31, deployed on the wireless access control system network of the present invention, and showing the second step in the door-level access control method of the present invention displaying a message that the "Locker Is in Use" (e.g. Locker Number 154), and requesting the user to enter his or her unique 4 digital passcode, and the select the button "OPEN MY LOCKER" (i.e. when the 2 factor authentication method has been enabled by system administrators, though it is understood that single factor authentication requiring only code scanning can be enabled to automatically open the locker when the door QR code is scanned by an authorized mobile scanning phone system)
Figure 40C:
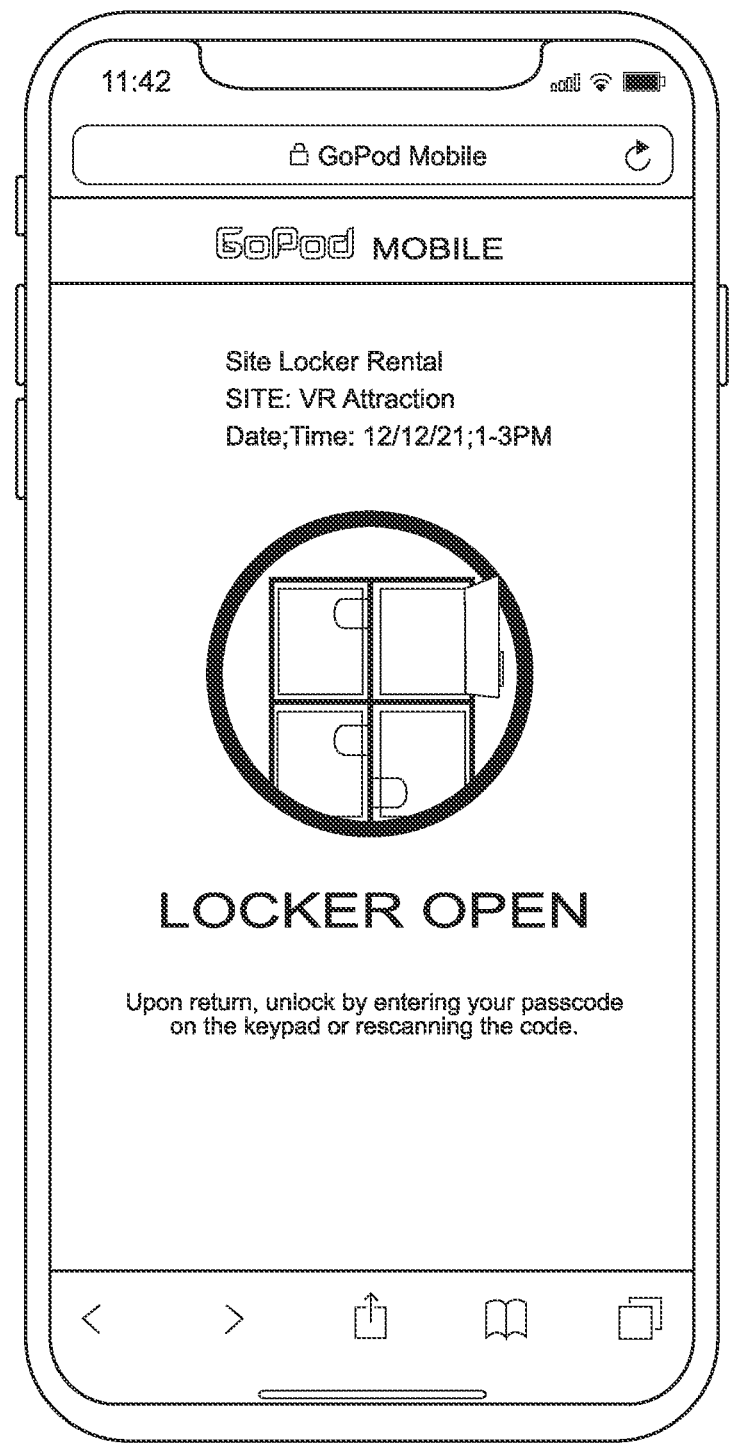
FIG. 40C is a graphical user interface (GUI) screen of the mobile smartphone shown in FIG. 31, deployed on the wireless access control system network of the present invention, and showing the third step in the door-level access control method displaying, after scanning the Door-Level QR Code or entering the unique passcode into the locker's keypad, a message that the "Locker Is Open" (and "upon return, unlock the locker by entering the passcode on the keypad or rescanning the Door-Level QR Code"), allowing the user to either (i) store personal belongings in the storage locker or access stored personal belongings from the accessed locker, as the case may be, on the storage side of the rented locker unit.

The method described and illustrated in FIG. 36D is supported by the GUI screens shown in FIG. 40A through 40C.

As indicated in Step J of FIG. 36D, and shown in FIG. 40A, a mobile smartphone 130 deployed on the wireless access control system network is used to scan a Door-Level QR Code 40C after scanning a Facility-Level QR Code 40A, by (i) the scanning of the Door-Level QR code 40C on the rented locker using the user's web-enabled mobile smartphone, (ii) automatically directing the smartphone web-browser application to parse and analyze the scanned QR code and serve, load and display the webpage specified by the URL encoded in the Door-Level QR Code 40C, and (iii) executing the access control transaction script for the locker rental transaction identified by the "Rental Transaction Identifier-Facility Entry" (e.g. digital token/cookie) stored on the phone by the application servers, so as to determine the state of the transaction for the Door-Level Access Control Method.

As indicated at Step K of FIG. 36D, the guest uses the mobile smartphone 130 deployed on the wireless access control system network to practice a facility-level access control method, by displaying a message that the "Locker Is in Use/Rented" (e.g. Locker Number 154), and requesting the user to enter his or her unique 4 digital passcode via the GUI-based virtual keypad, and the select the button "OPEN MY LOCKER".

Figure 41:
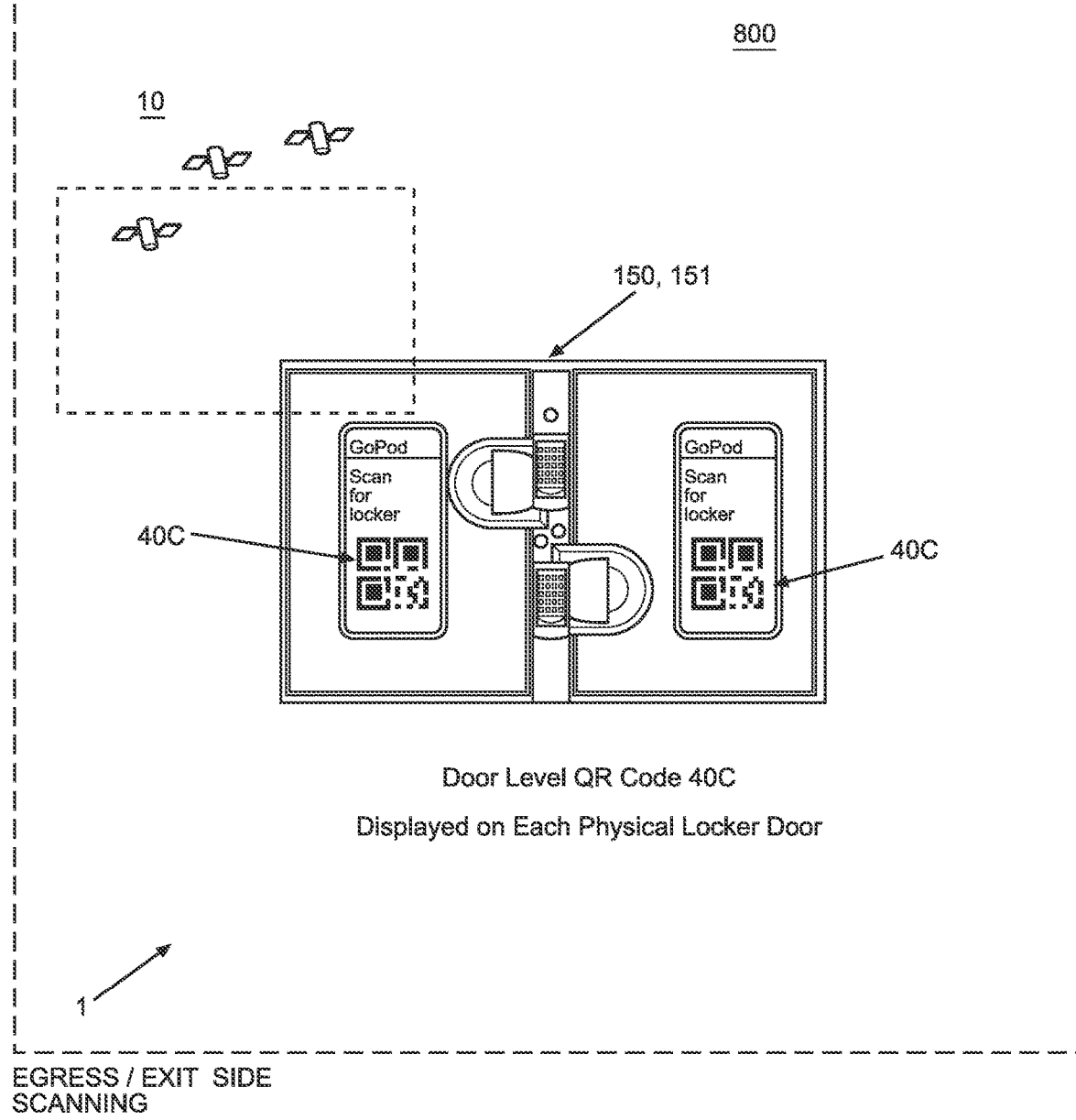
FIG. 41 is a plan view of an exemplary Door-Level QR Code (i.e. a machine-readable code, such as an optically-readable bar code symbol and/or RFID encoded tag component) physically posted or electrically displayed on the surface of each locker unit in the single-sided storage locker system illustrated in FIGS. 16 and 17.

As indicated at Step L of FIG. 36D, and shown in FIG. 40B, the mobile smartphone 130 deployed on the wireless access control system network is used to practice a facility-level access control method, by displaying a message that the "Locker Is in Use" (e.g. Locker Number 154), and requesting the user to enter his or her unique 4 digital passcode, and the select the button "OPEN MY LOCKER". Specification of Method of Managing Access Control to a Networked Storage Locker within an Amusement Park Enterprise by Scanning a Door-Level QR Code after Scanning a Door-Level QR Code Using a Mobile Smartphone Connected to the Wireless Access Control System Network of the Present Invention FIG. 41 shows an exemplary Door-Level QR Code (i.e. a machine-readable code, such as an optically-readable bar code symbol and/or RFID encoded tag component) physically posted or electrically displayed on the surface of the door of each locker unit in the single-sided storage locker system illustrated in FIGS. 16 and 17.

Figure 42A:
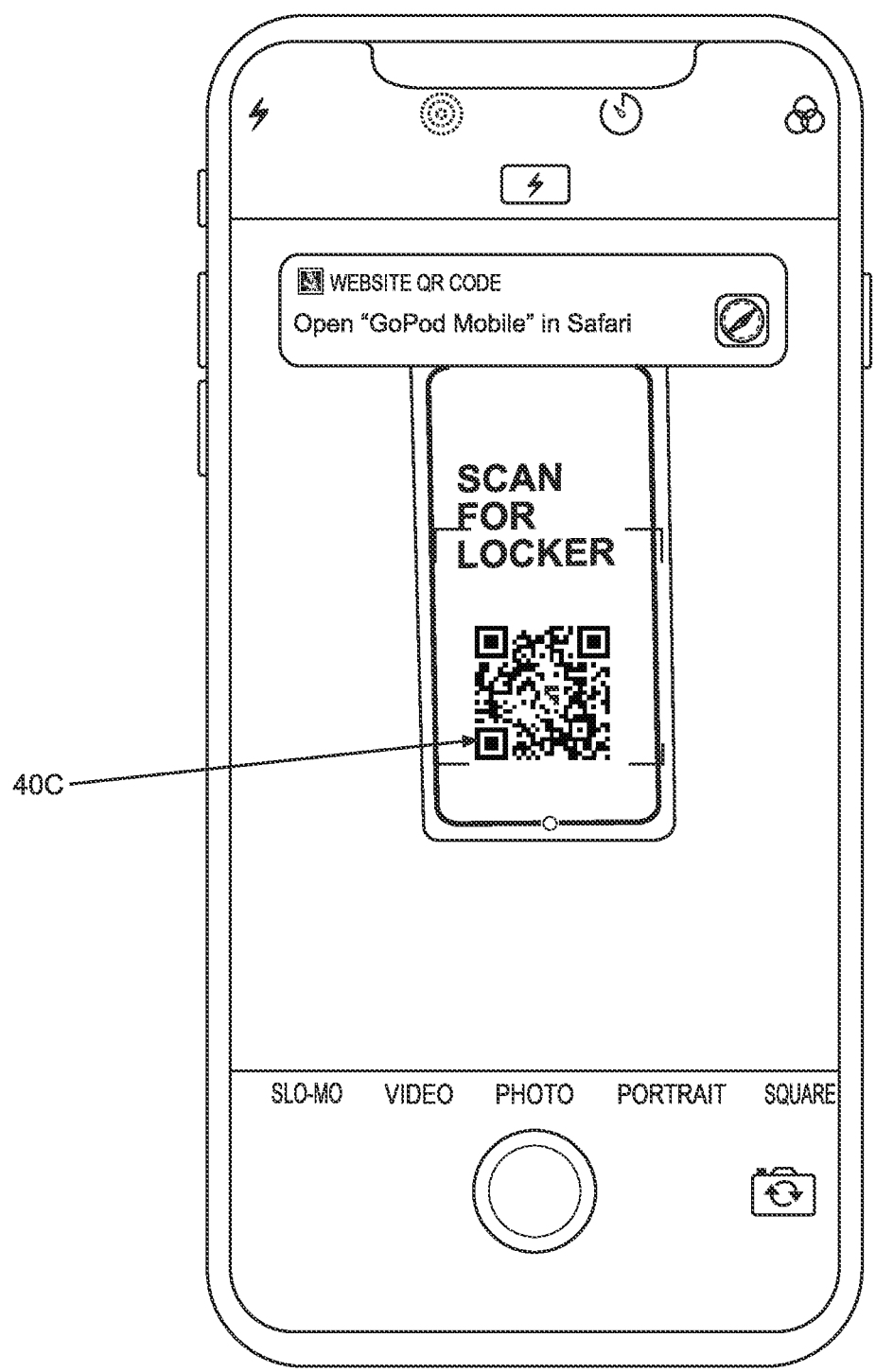
FIG. 42A is a graphical user interface (GUI) screen of the mobile smartphone shown in FIG. 31, deployed on the wireless access control system network of the present invention, and showing the first step in the door-level access control method when entered after completing the facility-level access control method described in FIGS. 36A through 36D, involving (i) the scanning of the Door-Level QR code on the rented locker using the user's web-enabled mobile smartphone, as shown in FIG. 41, (ii) automatically directing the smartphone web-browser application (e.g. Apple Safari) to parse and analyze the scanned QR code and serve, load and display the webpage specified by the URL encoded in the Door-Level QR Code as illustrated in table of FIG. 12, and (iii) executing the access control transaction script for the locker rental transaction identified by the "Rental Transaction Identifier—Facility Entry" (e.g. digital token/cookie) stored on the phone by the application servers, so as to determine the state of the transaction for the Door-Level Access Control Method.
Figure 42B:
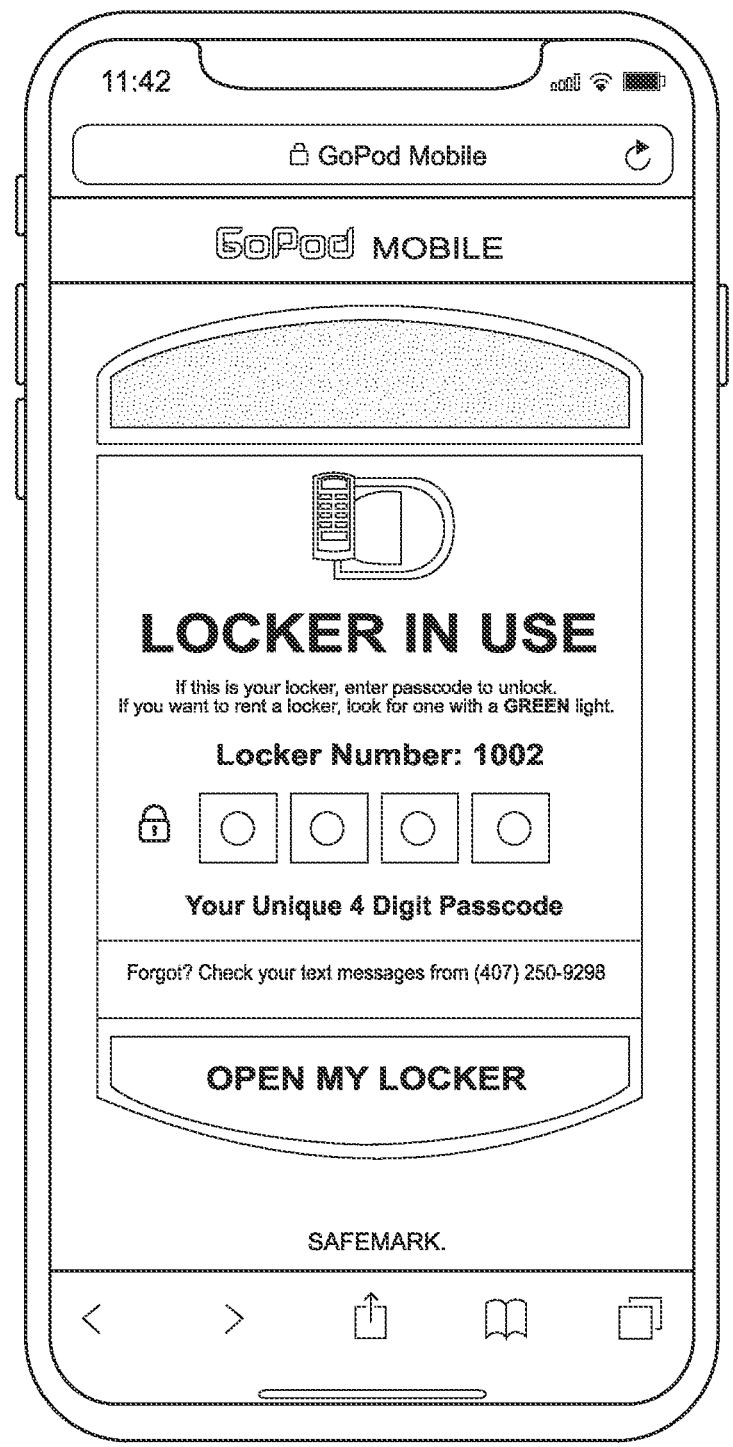
FIG. 42B is a graphical user interface (GUI) screen of the mobile smartphone shown in FIG. 31, deployed on the wireless access control system network of the present invention, and showing the second step in the door-level access control method of the present invention displaying a message that the "Locker Is in Use" (e.g. Locker Number 154), and requesting the user to enter his or her unique 4 digital passcode, and the select the button "OPEN MY LOCKER"
Figure 42C:
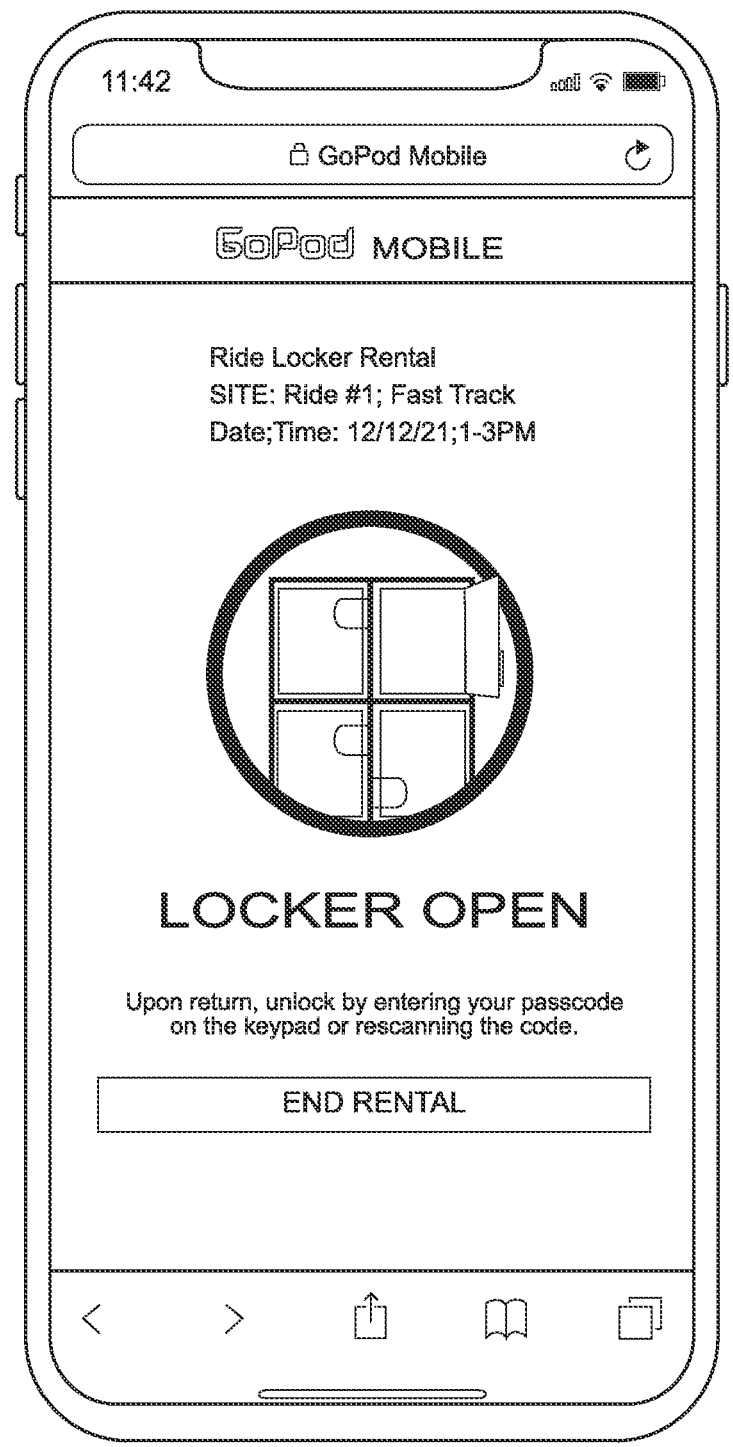
FIG. 42C is a graphical user interface (GUI) screen of the mobile smartphone shown in FIG. 31, deployed on the wireless access control system network of the present invention, and showing the third step in the door-level access control method displaying, after scanning the Door-Level QR Code or entering the unique passcode into the locker's keypad, a message that the locker is OPEN (and "upon return, unlock the locker by entering the passcode on the keypad or rescanning the Door-Level QR Code"), allowing the user to either (i) store personal belongings in the storage locker or access stored personal belongings from the accessed locker, as the case may be.
Figure 42D:
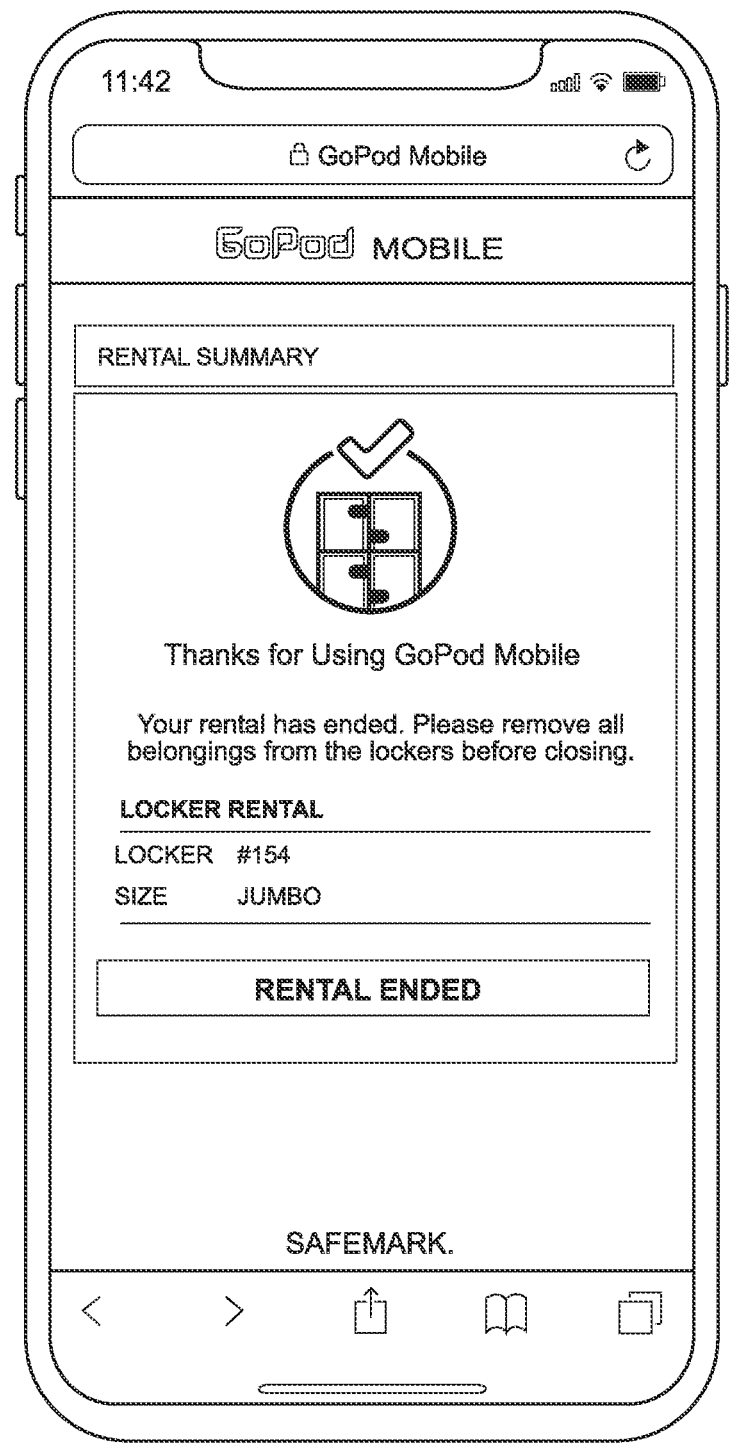
FIG. 42D is a graphical user interface (GUI) screen of the mobile smartphone shown in FIG. 31, deployed on the wireless access control system network of the present invention, and showing the fourth step in the door-level access control method displaying, after scanning the Door-Level QR Code or entering the unique passcode into the locker's keypad, a message that the locker rental has ended.

As indicated at Step ML of FIG. 36D, and shown in FIG. 40C, the mobile smartphone 130 deployed on the wireless access control system network is used to practice a facility-level access control method, by displaying, after scanning the Door-Level QR Code 40C as shown in FIG. 42A and then entering the unique passcode into the locker's keypad 158 on the locker door as shown in FIG. 42B, whereupon a message is displayed on the mobile phone indicating that the locker is OPEN, and guest user should retrieve personal belongings from the storage locker 151, and terminate the locker rental, as indicated at FIG. 42D.

Optionally, if the internal automated locker camera systems 310 are active within the rented locker, and at least one camera detects one or more objects in the locker, then the access control system network will automatically make such determinations and prevent the user from terminating the locker rental until all objects have been removed from the locker as confirmed by video camera images captured by the internal locker-based digital camera systems 310 supporting FOV #1 and FOV #2, illustrated in FIG. 20B.

The double-sided pass-through locker system supports a door-level access control method after scanning a Facility-Level QR code. The method involves (i) scanning the Door-Level QR code on the storage/ingress side of a rented locker using the user's web-enabled mobile smartphone, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier—Facility Entry" (e.g. digital token/cookie) stored on the phone by the application servers, so as to determine the state of the transaction for the Door-Level Access Control Method.

The above-described machine-readable code-driven access control method of the present invention shows how it is now possible to enable wireless rental, access and control to a specified locker (151) in a GPS-specified networked locker system 150 using a web-enabled smartphone 130, to read a Door-Level machine-readable (QR) code symbol to automatically initiate direct communication with the web-based communication/application/database servers maintained with the data center 12 of the wireless system network 1, and conduct the supporting web-based transaction. Each time the code symbol is scanned and the guest user seeks to open a rented locker, as well as an unavailable locker, transaction records of such events are recorded in the RDBMS of the data center 12.

However, during emergencies, when electrical power and/or Internet connectivity are disrupted, the system and method of the present invention allows the guest user to directly enter his or her digital password (e.g. PIN) into the physical (hard-key type) keypad 158 provided on the rented locker unit 151, and locally operate its lock controller (provided with local battery power backup) and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit in locker unit 151, and open the locker door and access one's personal belongings while the locker system is disconnected from the Internet infrastructure and/or during local power disruptions. Details regarding this back-up local access method are disclosed in U.S. Pat. No. 8,990,110, US Patent Application No. US2019/0035186, incorporated herein by reference.

Also, during emergencies, when electrical power and/or Internet connectivity are disrupted, the system and method of the present invention also allows the guest user to locally communicate with the locker controller, through its network adapter and antennas (e.g. using Bluetooth and/or WIFI protocols), to establish a communication session between the mobile smartphone 130 and the rented locker unit 151, and then enter the guest's digital locker password (i.e. PIN) via the virtual keypad (GUI screen) on the mobile smartphone 130, to locally operate its lock controller (provided with local battery power backup), and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit of a rented locker unit 151, and open the locker door and access one's personal belongings while the locker system is disconnected from the Internet infrastructure and/or during local power disruptions.

Method of Renting, Accessing and Controlling a Double-Sided Storage Locker by Scanning Facility-Level QR Code at Park, and then Scanning a Door-Level QR Code on a Single-Sided Storage Locker at a Site FIG. 43 describes the primary data processing steps that take place when practicing the method of renting, accessing and controlling a single-sided storage locker according to the present invention, particularly, when (i) first scanning a Facility-Level QR code 40A at a park using a web-enabled mobile phone to rent a single-sided locker at a Site, and (ii) then scanning a Door-level QR code 40C on the rented single-sided storage locker at the site.

While the method summarized above, and described in greater detail below, is a typical use case when using the Facility-Level/Door-Level Scanning Methods of the present invention disclosed and claimed herein, there will be other embodiments of this general method that will be adapted to serve the varied needs and requirements of a multitude of applications around the world. Below the illustrative method will be described in greater technical detail with reference to actions undertaken by both the guest and system during the distributed data processing method, using the data elements collected, stored and managed within the database system represented in FIGS. 15, 15A, 15 and 15C, and elsewhere in this Patent Specification.

As indicated at Step 1 of FIG. 43, the method involves the guest user using a Web-Enabled Mobile Phone 130 to scan a Facility-Level QR Code 40A posted at a Facility having one or more Sites supporting a plurality Of Single-Sided Storage Lockers 151 within a specified locker cabinet of the single-sided locker system 150.

As indicated at Step 2 of FIG. 43, the method involves the system (i.e. system servers 12) automatically generating and storing a Rental Transaction Record and Identifier in the System Database 12 in response to the scanning of the Facility-Level QR Code 40A and rental of a Single-Sided Storage Locker 151 during a web-based e-commerce locker rental transaction.

As indicated at Step 3 of FIG. 43, the method involves the system 12 automatically generates and stores a Device Identifier (i.e. Digital Token/Cookie) on the Mobile Phone 130 scanning the Facility-Level QR Code. The system then requests the guest to enter his or her Access PIN (e.g. 4 digit code), and then the system automatically assigns a locker # to the guest (though this could be a selection process providing the guest to choose a locker at the Ride Site) and issues the locker rental agreement. The cookie (i.e. digital token) stored on the mobile phone can be randomly generated for the rental transaction, or may be derived from the MAC address of the mobile phone 130, or other digital token generating methods suitable for the purpose at hand to provide a unique and secure identifier for the particular web-enabled mobile phone 130 that was used to scan and read a particular Facility-Level QR Code.

As indicated at Step 4 of FIG. 43, the method involves, at the door level, the guest using the Mobile Phone 130 to scan a Door-Level QR Code 40C on the Rented Single-sided Storage Locker 151.

As indicated at Step 5 of FIG. 43, the method involves the system automatically reading and updating the Rental Transaction Record and Identifier stored in the System Database maintained on the Datacenter Servers 12.

As indicated at Step 6 of FIG. 43, the method involves the system automatically reading the Device Identifier (i.e. Cookie) stored on the Mobile Phone 130 used to scan the Facility-Level QR Code 40A and rent the Single-Sided Locker 151.

As indicated at Step 7 of FIG. 43, the method involves, after the guest completes the ride experience, for the guest, at the door level, to then use the Mobile Phone 130 to scan Door-Level QR Code 40C on the rented Single-Sided Locker 151.

As indicated at Step 8 of FIG. 43, the method involves the system automatically reading and updating the Rental Transaction Record and identifier stored in the System Database 12.

As indicated at Step 9 of FIG. 43, the method involves the system automatically reading the Device Identifier (i.e. Cookie) on Mobile Phone 130 used to scan the Facility-Level QR Code 40A and the Door-Level QR Code 40C. The system also requests the guest to enter the Access PIN and then determines and displays on the mobile phone display if an extra rental fee is due because the locker rental time went over the agreed to rental limit (i.e. rental time overage) set by the ride ticket held by the guest, as managed by the ride management server 351 in FIG. 15, connected to the system via an application programming interface (API), as shown in FIG. 15.

As indicated at Step 10 of FIG. 43, the method involves the guest then using the Mobile Scanning Phone 130 to access the Rented Locker 151, retrieve belongings therefrom, pay for extra locker rental time if and as required by determined locker rental overage, and then terminates the rental transaction.

As indicated at Step 11 of FIG. 43, the method involves the system automatically reading and updating the Rental Transaction Record and Identifier stored in the System Database, to reflect that the Double-sided Storage Locker is AVAILABLE for rental and use.

As indicated at Step 12 of FIG. 43, the method involves the system automatically driving the Locker (Rental) Status Indication Light (LED) on the available Single-Sided Storage Locker 151 to indicate rental AVAILABILITY Status, as shown in FIG. 18B, for quick recognition by guest users who are searching for a locker to rent at the Site.

These above described data processing operation supported behind the scenes on the system network of the present invention are exemplary in nature and may be practiced differently depending on the particular illustrative embodiment being practiced for any given situation. In the illustrative embodiment described above, the system requested the guest user to provide an access PIN, after scanning a Door-Level QR Code to access a rented single-sided storage locker, to provide a form of 2-factor authentication for added security. However, it is understood in alternative embodiments practicing 1-factor authentication, it is possible for the system network to automatically unlock and open a rented locker unit upon the guest user (i) using his or her web-enabled mobile phone to scan and read its Door-Level QR code as described in detail herein, or (ii) manually entering the access PIN via the physical keypad provided on each side door on the rented single-sided locker unit.

Figure 44A:
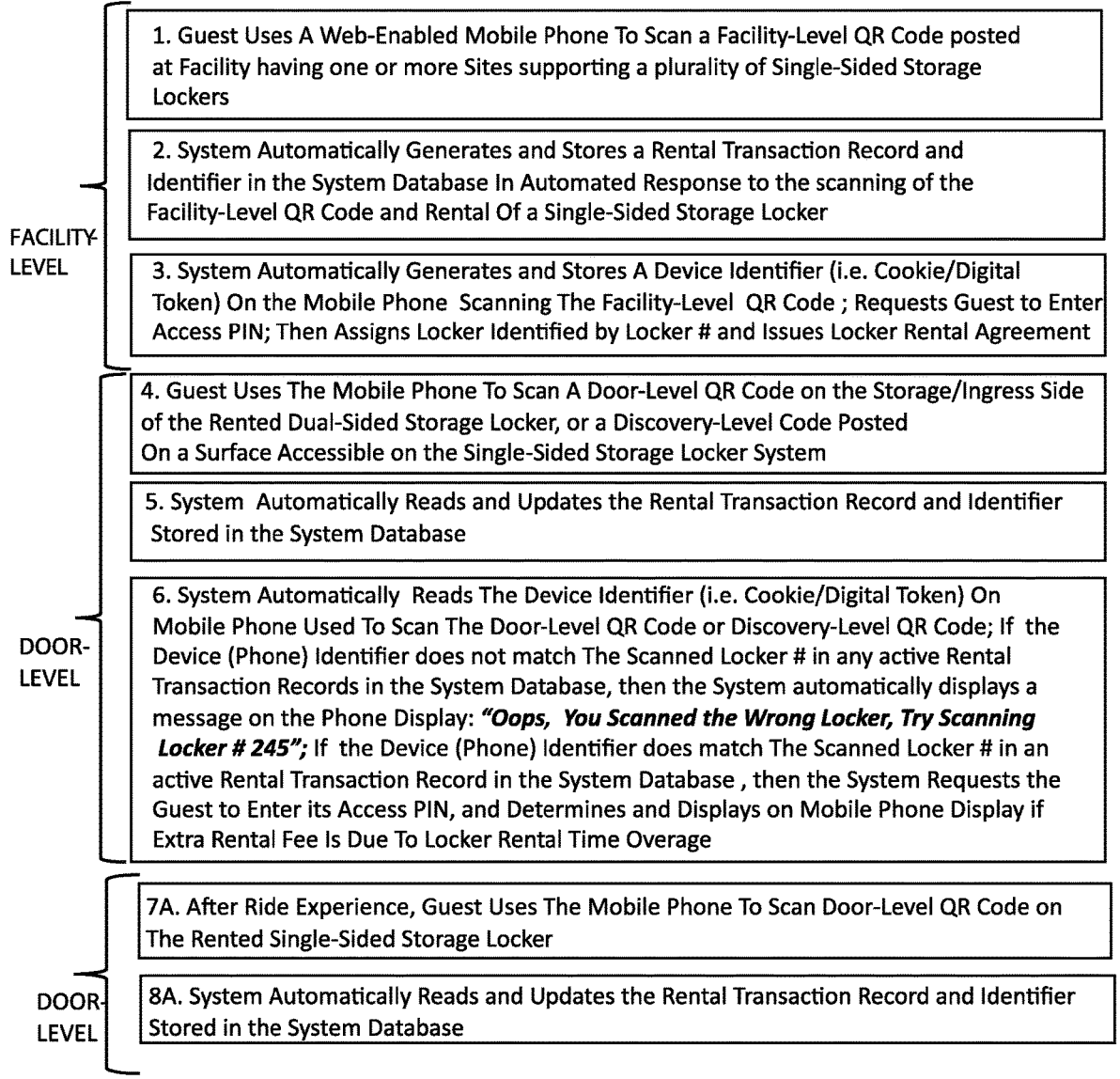

Method of Finding a Single-Sided Storage Locker Rented within a Facility by Scanning a Facility-Level QR Code at the Facility, or a Door-Level QR Code on a Single-Sided Storage Locker at a Site FIGS. 44A and 44B describe the primary data processing steps involved in carrying out the method of finding a single-sided storage locker rented within a facility by scanning a Facility-Level QR Code 40A at the Facility, or a Door-Level QR code 40A on a single-sided storage locker at a ride/attraction site. This process follows the flow described in FIG. 43 with additional logic added to Steps 6, 9A and 9B that automatically checks and analyzes the data records reflected in FIGS. 15A, 15B, 15 and 15D to ensure the mobile phone 130 scanning a particular QR code on a single-sided locker 151 is registered/linked with a rental transaction data record, and if not, to automatically generate messages to the guest to scan another rented locker within the single-sided locker system 150, or other ride site if that rental data records across a facility suggest the same, in the spirit of accuracy, authenticity and automation.

As indicated at Step 1 of FIG. 44A, the method involves using a Web-Enabled Mobile Phone 130 to scan a Facility QR Code 40A.

As indicated at Step 2 of FIG. 44A, the method involves generating and storing a Rental Transaction Record and Identifier in the System Database in automated response to the scanning of a Facility-Level QR Code 40A and the rental of a Single-Sided Storage Locker 151.

As indicated at Step 3 of FIG. 44A, the method involves the System Automatically Generates and Stores A Device Identifier (i.e. Cookie/Digital Token) On the Mobile Phone Scanning The Facility-Level QR Code; Requests Guest to Enter Access PIN; then assigns Locker Identified by Locker # and issues a Locker Rental Agreement.

As indicated at Step 4 of FIG. 44A, the method involves the guest using the Mobile Phone 130 to scan a Door-Level QR Code 40C on the Rented Single-Sided Storage Locker, or a Discovery-Level Code posted on a surface accessible somewhere on the Single-Sided Locker System 150.

As indicated at Step 5 of FIG. 44A, the method involves the System Automatically Reading and Updating the Rental Transaction Record and Identifier stored in the System Database. 12

As indicated at Step 6 of FIG. 44A, the method involves the System automatically reading the Device Identifier (i.e. Cookie/Digital Token) on Mobile Phone 130 used to scan the Door-Level QR Code 40A or Discovery-Level QR Code 40D;

If the Device (Phone) Identifier does not match the Scanned Locker # in any active Rental Transaction Records in the System Database, then the System automatically displays a message on the Phone Display: "*Oops, You Scanned the Wrong Locker, Try Scanning Locker # XXXX*";

If the Device (Phone) Identifier does match the Scanned Locker # in an active Rental Transaction Record in the System Database, then the System requests the Guest to enter its Access PIN, and automatically determines and displays on Mobile Phone Display 130 if Extra Rental Fee is due to any Locker Rental Time Overage.

Figure 42E:
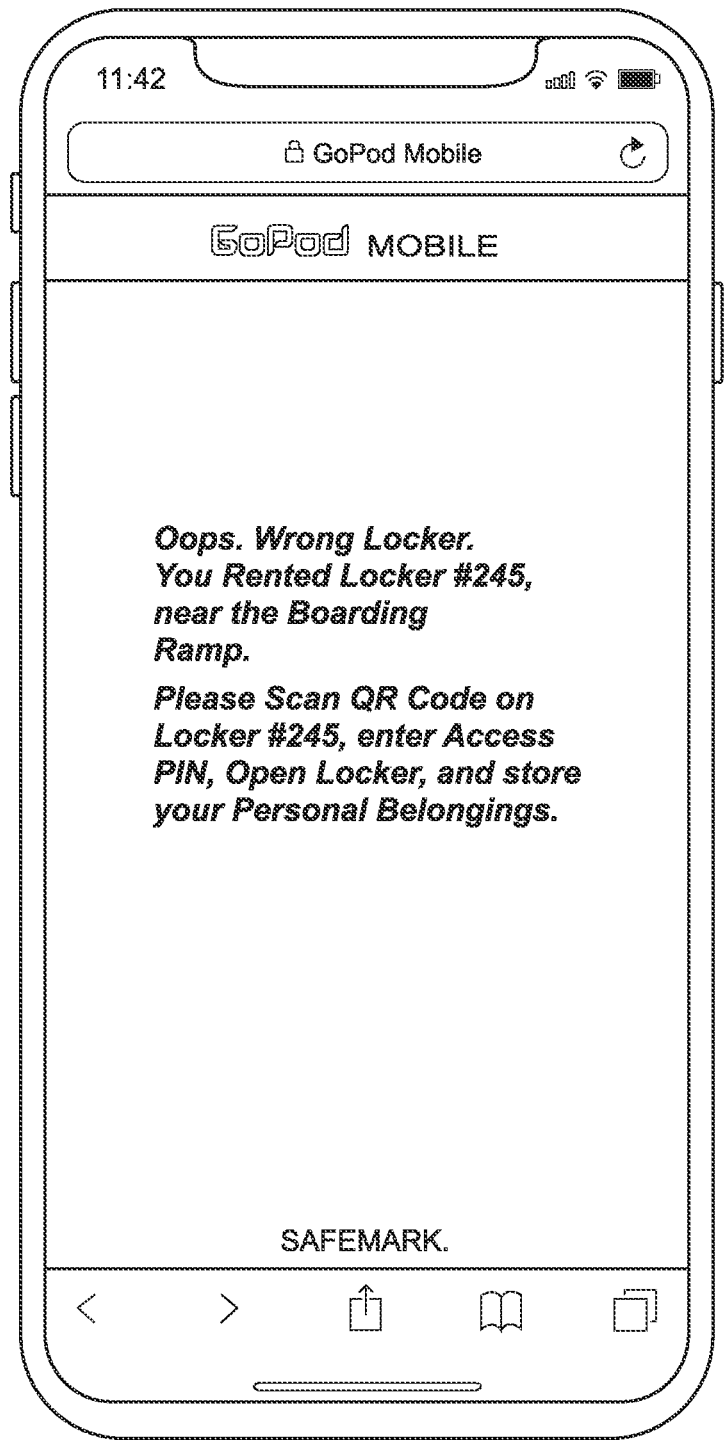
FIG. 42E is a graphical user interface (GUI) screen of the mobile smartphone shown in FIG. 31, deployed on the wireless access control system network of the present invention, and showing a step that may be supported in the door-level access control method of the present invention when enabled with Automated Locker Discovery, wherein, after a mobile phone scans a locker that is not registered and linked with the mobile phone, but rather another rented locker within the single-sided locker system, the system servers automatically serves and display a message on the guest's mobile phone indicating that an incorrect locker was scanned and that the guest should scan a different specified locker identified in the message to open the correct rented locker and store (or retrieve) personal belongings in the single-sided storage locker system.

Regarding the system sending a message to the guest about scanning an incorrect locker, FIG. 42E shows an exemplary GUI screen of the mobile smartphone 130, when operating in Automated Locker Discovery mode, displaying a message on the guest's mobile phone indicating that an incorrect locker was scanned and that the guest should scan a different specified locker identified in the message to open the correct rented locker and store (or retrieve) personal belongings from the ingress side of the single-sided storage locker system.

As indicated at Step 6 in FIG. 44A, the logic applied there provides for two possible flow paths, indicated as Path A and Path B respectively, depending on the facts determined at that stage of the process. Flow Path A includes Blocks indicated by 7A, 8A, 9A, 10A, 11A and 12A, whereas Flow Path B includes Blocks indicated by 7B, 8B, 9B, 10B, 11B and 12B. The steps in these two Flow Paths A and B will be described in detail below.

As indicated at Step 7A of FIG. 44A, the method along Flow Path A involves, after the guest's ride experience, the Guest using the Mobile Phone 130 to scan Door-Level QR Code 340C on the Retrieval/Egress Side of The Rented Single-Sided Locker 151.

As indicated at Step 8A of FIG. 44, the method involves the system automatically reading and updating the Rental Transaction Record and Identifier stored in the System Database.

As indicated at Step 9A of FIG. 44B, the method involves the System automatically reading the Device Identifier (i.e. Cookie/Digital Token) on Mobile Phone 130 used to scan the Door-Level QR Code 40C or Discovery-Level QR Code 40D;

If the Device (Phone) Identifier does not match The Scanned Locker # in any active Rental Transaction Records in the System Database, then the System automatically displays a message on the Phone Display: "Oops, You Scanned the Wrong Locker, Try Scanning Locker #245"; and If the Device (Phone) Identifier does match The Scanned Locker # in an active Rental Transaction Record in the System Database, then the System requests the Guest to enter its Access PIN, and automatically determines and displays on Mobile Phone Display 130 if Extra Rental Fee is due to any Locker Rental Time Overage.

Figure 42F:
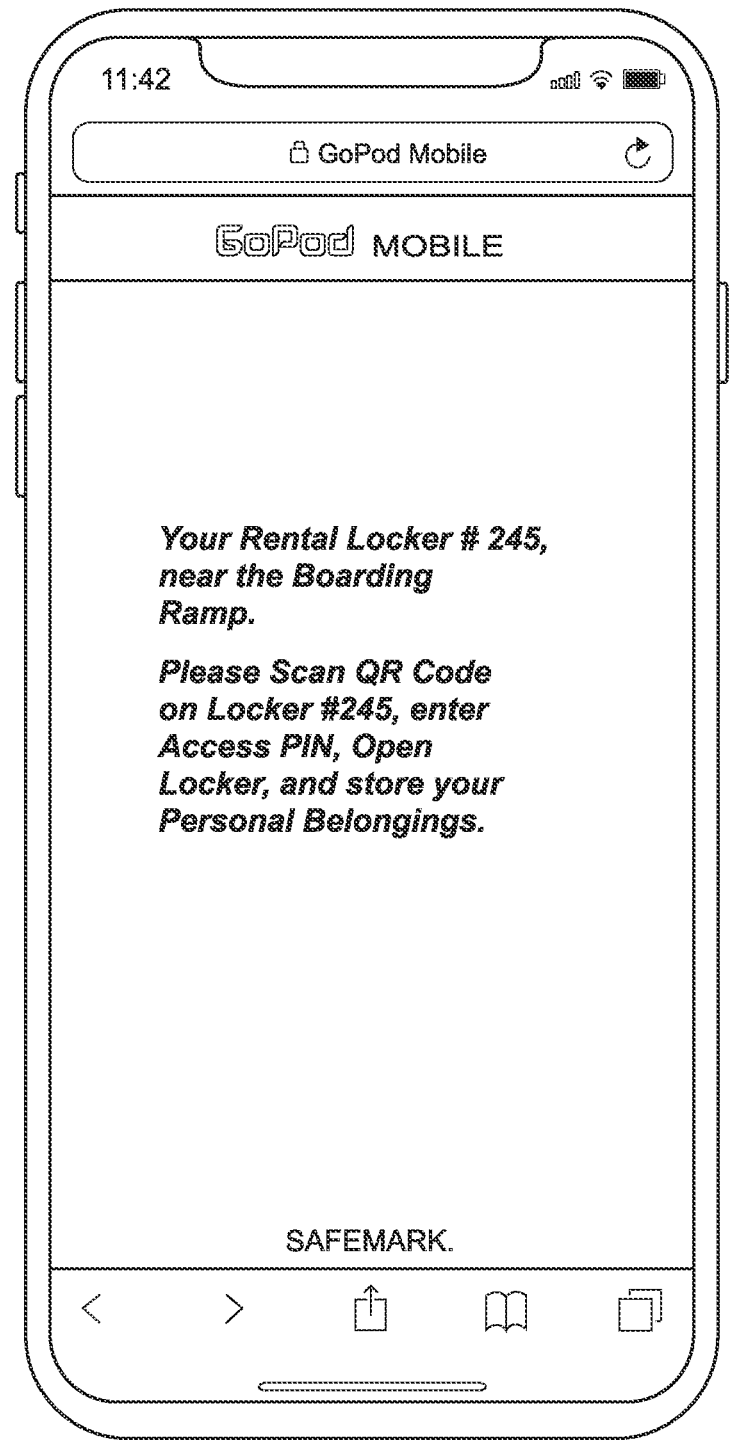
FIG. 42F is a graphical user interface (GUI) screen of the mobile smartphone shown in FIG. 31, deployed on the wireless access control system network of the present invention, and showing a step that may be supported in any level access control method of the present invention when enabled with Automated Locker Discovery, wherein, after a mobile phone scans a Discovery-Level QR Code posted on the single-sided storage locker system, as shown in FIG. 15, the system servers automatically serves and display a message on the guest's mobile phone indicating that the guest has rented a specified locker #, located at a particular location, which can be opened by scanning to store personal belongings in the single-sided storage locker system.

Regarding the system sending a message to the guest about scanning an incorrect locker, FIG. 42F shows an exemplary GUI screen of the mobile smartphone 130, when operating in Automated Locker Discovery mode, displaying a message on the guest's mobile phone, similar to the message reflected in Step 9A in FIG. 44B, indicating that an incorrect locker was scanned and that the guest should scan a different specified locker identified in the message to open the correct rented locker and retrieve personal belongings.

As indicated at Step 10A of FIG. 44B, the method involves the guest uses the Mobile Scanning Phone to pay for Extra Rental Time if and as required, and terminates the Rental Transaction; guest removes belongings from locker, and terminates Locker Rental.

As indicated at Step 11A of FIG. 44B, the method involves the System automatically reading and updating the Rental Transaction Record and Identifier Stored in the System Database, to reflect that the Single-Sided Storage Locker is AVAILABLE for rental.

As indicated at Step 12A of FIG. 44B, the method involves the system automatically drives LED Status Indication Light on the Available Single-Sided Storage Locker to indicate AVAILABILITY Status. This completes Flow Path A.

As indicated at Step 7B of FIG. 44B, the method involves along Flow Path B, after some park experience, guest using the Mobile Phone 130 to scan Door-Level QR Code on the Rented Single-Sided Locker 151.

As indicated at Step 8B of FIG. 44B, the method involves the system automatically reading and updating the Rental Transaction Record and Identifier stored in the System Database.

As indicated at Step 9B of FIG. 44B, the method involves the system automatically reading the Device Identifier (i.e. Cookie/Digital Token) on Mobile Phone 130 used to scan the Door-Level QR Code or Discovery-Level QR Code; If the Device (Phone) Identifier does not match the Scanned Locker # in any active Rental Transaction Records in the System Database, then the System automatically displays a message on the Phone Display: "Oops, You Scanned the Wrong Locker, Try Scanning Locker #245"; If the Device (Phone) Identifier does match the Scanned Locker # in an active Rental Transaction Record in the System Database, then the System Requests the Guest to enter its Access PIN, and determines and displays on Mobile Phone Display if Extra Rental Fee is due to Any Locker Rental Time Overage.

Regarding the system sending a message to the guest about scanning an incorrect locker, FIG. 42F shows an exemplary GUI screen of the mobile smartphone 130, when operating in Automated Locker Discovery mode, displaying a message on the guest's mobile phone, similar to the message reflected in Step 9B in FIG. 44B indicating that an incorrect locker was scanned and that the guest should scan a different specified locker identified in the message to open the correct rented locker and retrieve personal belongings.

As indicated at Step 10B of FIG. 44B, the method involves the guest using the Mobile Scanning Phone 130 to pay for Extra Rental Time if and as required, and terminate the Rental Transaction; guest removes belongings from Locker, and terminates Locker Rental.

As indicated at Step 11B of FIG. 44B, the method involves the system automatically reading and updating the Rental Transaction Record and Identifier stored in the System Database, to reflect that the Single-Sided Storage Locker is AVAILABLE for Rental.

As indicated at Step 12B of FIG. 44B, the method involves the system automatically driving the Locker Status Indication Light (LED) on the Available Single-Sided Storage Locker to indicate AVAILABILITY Status. This completes Flow Path B.

Regarding the system sending a message and instructions to the guest in response to a request identify and locate all lockers rented by the guest in the facility, FIG. 42G shows a GUI screen of the mobile smartphone 130 operating in an Automated Locker Discovery Mode. After a mobile phone 130 scans a Discovery-Level QR Code 40D posted on the ingress side of the single-sided storage locker system 150, as shown in FIG. 15, the system servers automatically operating on the rental transaction data records schematically illustrated in FIG. 15DC, automatically serves and display a message on the guest's mobile phone 130 indicating that the guest has rented a specified locker #, located at a particular location, which can be opened by scanning to store personal belongings from the ingress side of the single-sided storage locker system 150.

Regarding the system sending a message and instructions to the guest in response to a request identify and locate all lockers rented by the guest in the facility, FIG. 42H shows a GUI screen of the mobile smartphone 130 operating in Automated Locker Discovery. After a mobile phone 130 scans a Discovery-Level QR Code 40D posted on the egress side of the single-sided storage locker system 150, as shown in FIG. 15, the system servers automatically operating on the rental transaction data records schematically illustrated in FIG. 15C, automatically serves and display a message on the guest's mobile phone 130 indicating that the guest has rented a specified locker #, located at a particular location, which can be opened by scanning to retrieve personal belongings from the egress side of the single-sided storage locker system 150.

Figure 45B:
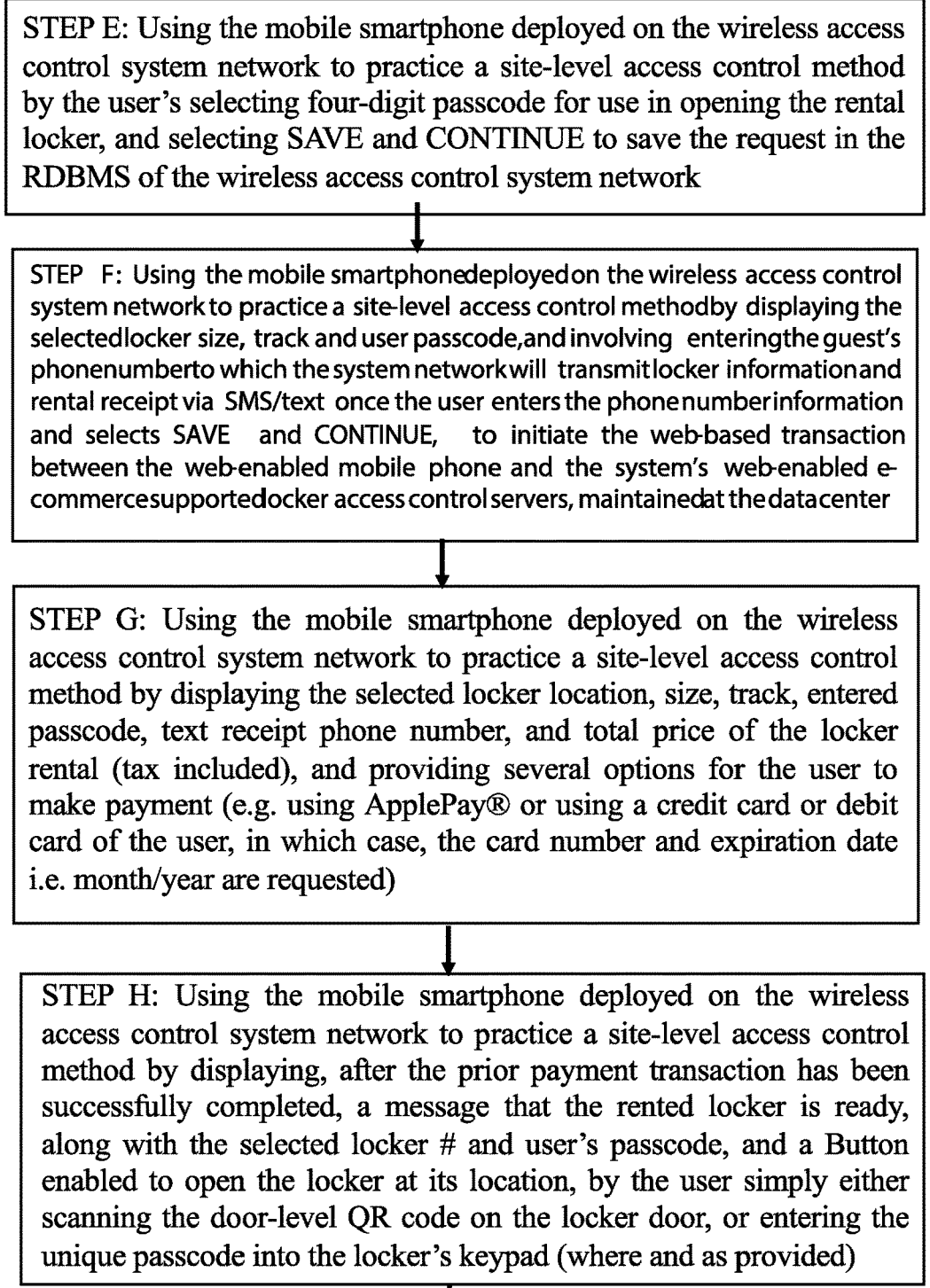

Specification of the Method of Renting and Managing Access Control to a Networked Locker System by Scanning Site-Level QR Codes Posted at a Particular Site in a Facility, Using a Mobile Smartphone Wireless Connected to the Wireless Access Control System Network of the Present Invention FIGS. 45A, 45B and 45C describe the primary steps involved when carrying out the method of managing access control to a networked locker system by scanning Site-Level QR Codes 40B posted at a particular Site in an amusement park facility, using a mobile smartphone wireless connected to the wireless access control system network of the present invention.

Figure 46A:
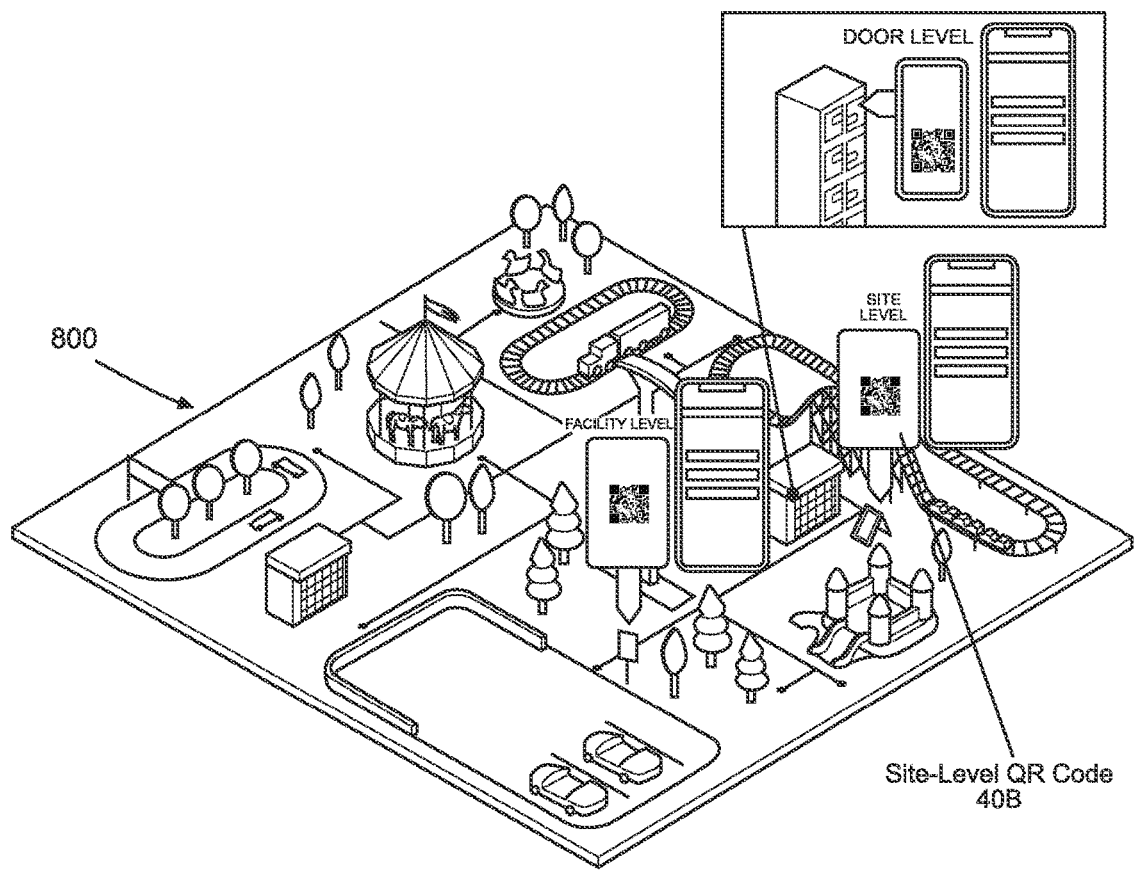
FIG. 46A is a schematic illustrating showing a perspective view of an amusement park facility, with a sign posted at a Site in the park, displaying a Site-Level QR code as shown in FIG. 46B, which upon scanning with a web-enabled mobile smartphone is engineered to direct the guest user to a web-based e-commerce-enabled locker rental and access control transaction process having a narrowed scope of services within the facility, and allowing guest users to select a storage locker, mobility solution or other service at the Ride Site within the amusement park, and then allow the wireless system network to automatically assign an available single-sided ride storage locker to the guest at the selected Site.
Figure 46B:
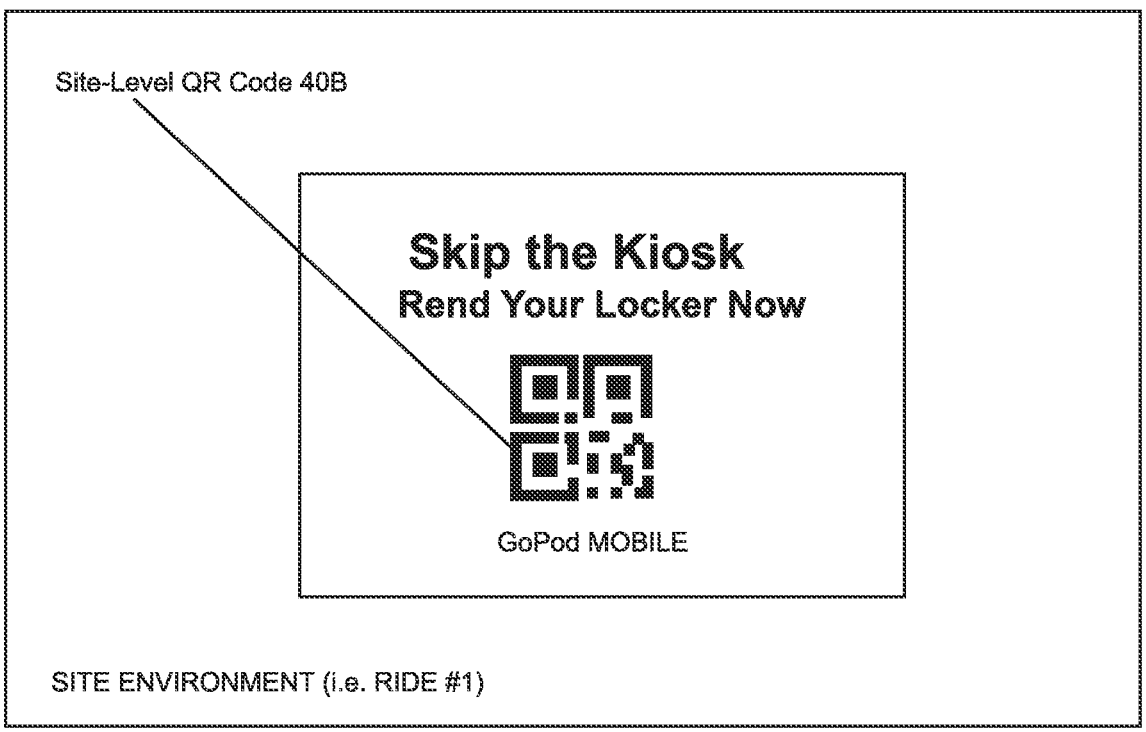
FIG. 46B is an enlarged view of the Site-Level QR Code posted at a Site within the amusement park illustrated in FIG. 46A, wherein at the Site Level, the user is able to scan a Site-Level QR code that is intelligently assigned to that Site location (e.g. at Ride, Attraction or Event Location), and users will select a size of the storage locker (and desired or required track such as fast track or regular track), and the wireless system network will automatically assign an available single-sided ride storage locker to the user at that Site, as the case may be.

FIG. 46A illustrates an amusement park facility, with a sign posted at a Site in the park, displaying a Site-Level QR code 40B as shown in FIG. 46B which, upon scanning with a web-enabled mobile smartphone 130, is engineered to direct the guest user to a web-based e-commerce-enabled locker rental and access control transaction having a narrowed scope of services within the facility. This allows guest users to select a storage locker, mobility solution or other service at the Site within the amusement park, and then allow the wireless system network to automatically assign an available locker, mobility solution or service to the guest at the selected Site. FIG. 55B shows and enlarged view of the Site-Level QR Code 40B posted at a Site within the amusement park illustrated in FIG. 55A, wherein at the Site Level, the user is able to scan a Site-Level QR code 40B that is intelligently assigned to that Site location, and users will select a size of the storage locker (or type of mobility solution desired or required), and the wireless system network will automatically assign an available locker to the user (or an available vehicle, wheelchair or stroller to the user) at that Site, as the case may be.

The method described and illustrated in FIGS. 45A through 45C is supported by the GUI screens shown in FIG. 47A through 47I.

Figure 47A:
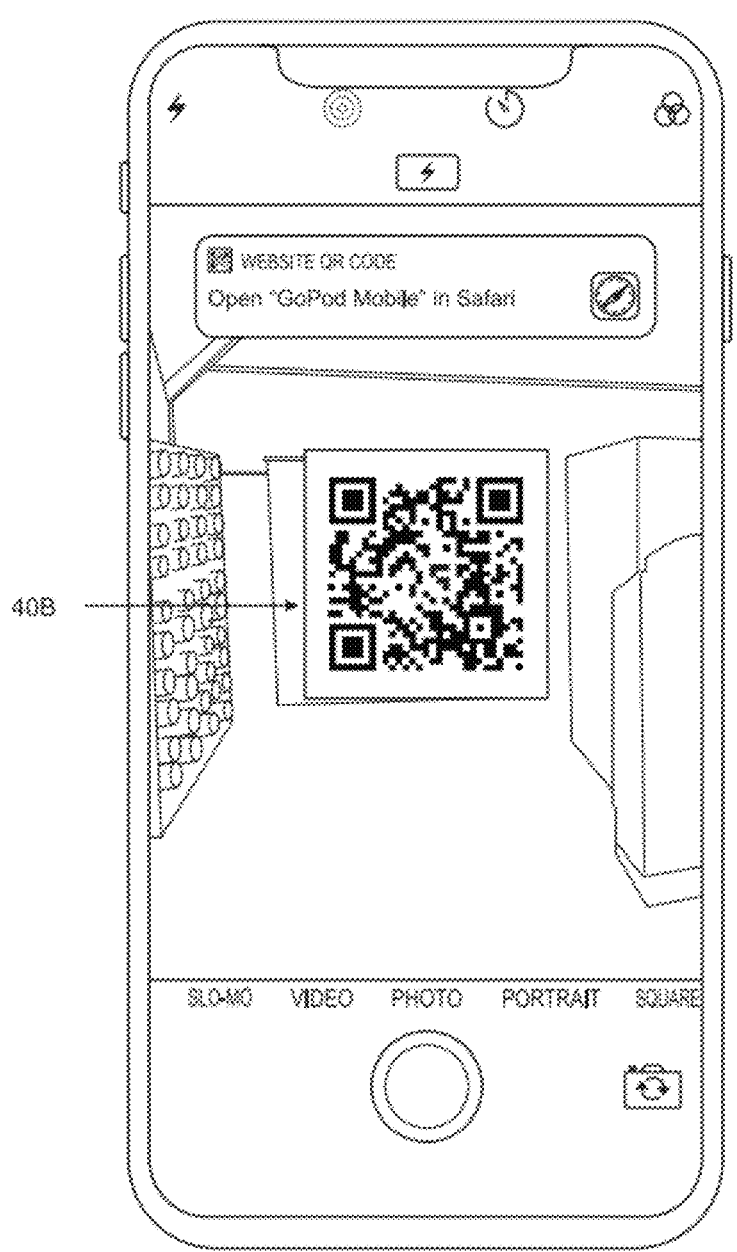
FIG. 47A is a graphical user interface (GUI) screen of the mobile smartphone shown in FIG. 31, deployed on the wireless access control system network of the present invention, and showing the first step in the site-level access control method of the present invention involving (i) the scanning of a Site-Level QR Code as shown in FIGS. 46A and 46B, and (ii) automatically directing the smartphone web-browser application (e.g. Apple Safari) to parse and analyze the scanned QR code and serve, load and display the webpage specified by the URL encoded in the Site-Level QR Code as illustrated in table of FIG. 12, and whereupon, the application server stores a "Rental Transaction Identifier-Site-Entry" (RTI-SE) (e.g. digital token/cookie) within the cache memory on the mobile smartphone.

As indicated at Step A of FIG. 45A, and as shown in FIG. 47A, a mobile smartphone 130 deployed on the wireless access control system network 1 is used to practice a site-level access control method by (i) the scanning of a Site-Level QR Code 40B, and (ii) automatically directing the smartphone web-browser application to parse and analyze the scanned QR code and serve, load and display the webpage specified by the URL encoded in the Site-Level QR Code, and whereupon, the application server stores a "Rental Transaction Identifier-Site-Entry" (RTI-SE) within the cache on the mobile smartphone.

Figure 47B:
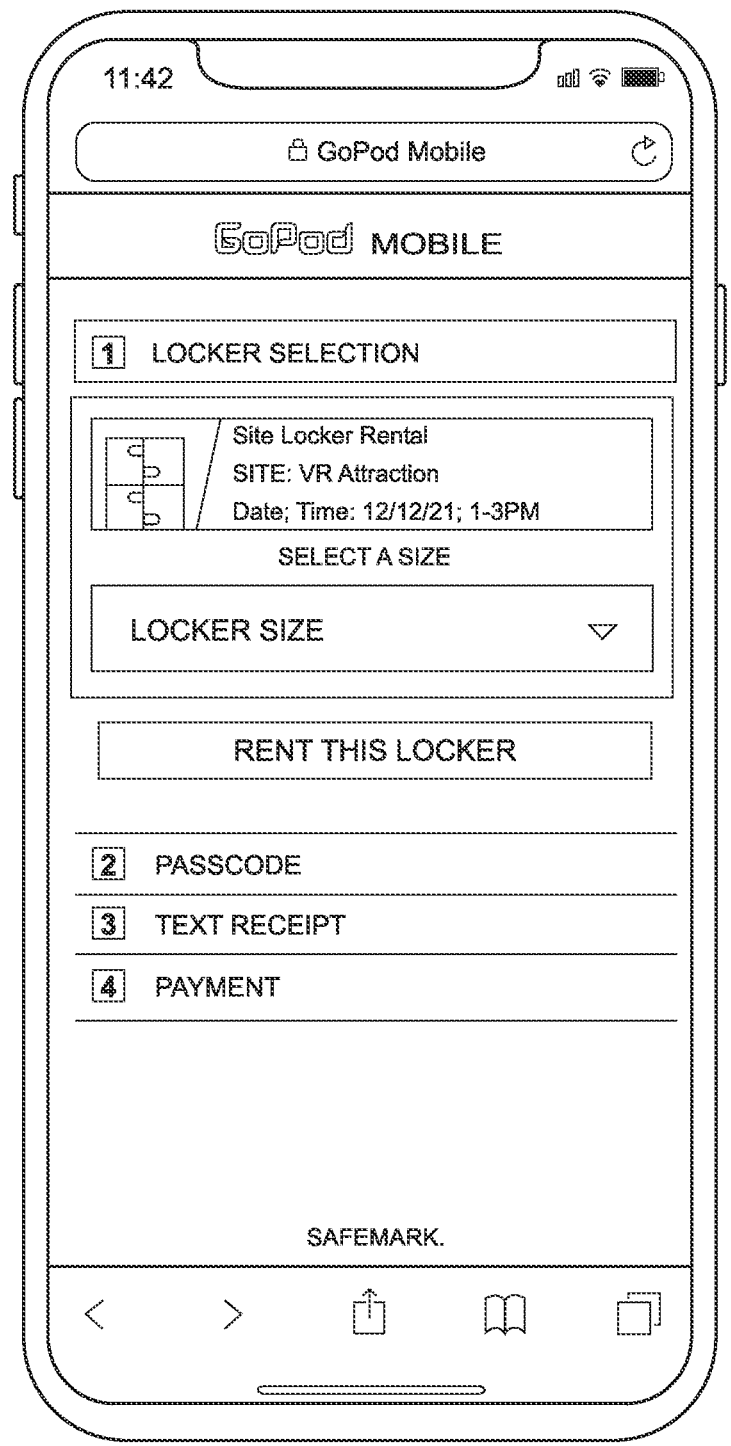
FIG. 47B is a graphical user interface (GUI) screen of the mobile smartphone shown in FIG. 31, deployed on the wireless access control system network of the present invention, and showing the second step in the site-level access control method of the present invention involving the selection of time/date of the locker rental at the Site within the Facility when would the guest user would like to rent and access to store personal belongings.

As indicated at Step B of FIG. 45A, and as shown in FIG. 47B, the mobile smartphone 130 deployed on the wireless access control system network 1 is used to practice a site-level access control method by selecting the time/date of the locker rental at the Site within the Facility when would the guest user would like to rent and access to store personal belongings.

Figure 47C:
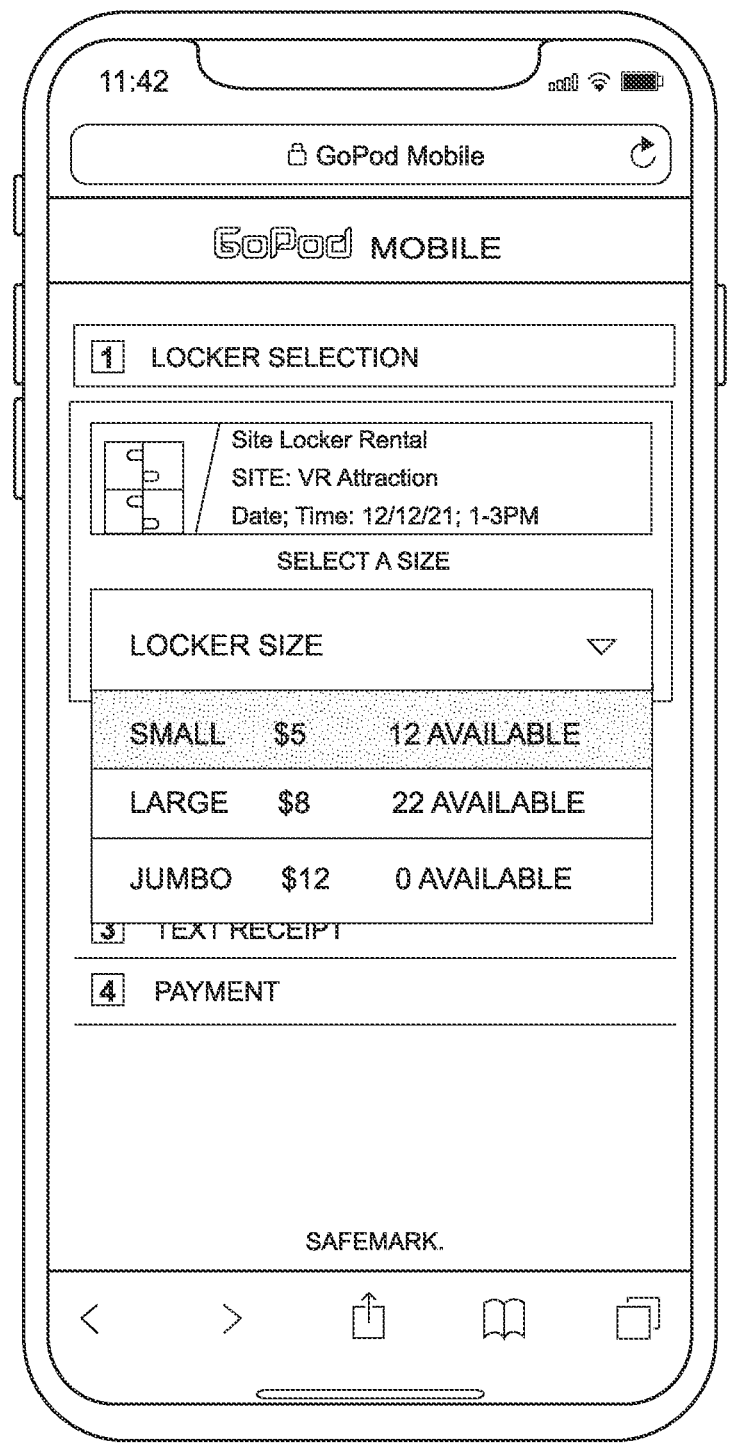
FIG. 47C is a graphical user interface (GUI) screen of the mobile smartphone shown in FIG. 31, deployed on the wireless access control system network of the present invention, and showing the third step in the site-level access control method of the present invention involving the selection of locker size (e.g. small, large, jumbo) and track at the selected Site within the Facility which the guest user would like to rent and access to store personal belongings.

As indicated at Step C of FIG. 45A, and as shown in FIG. 47C, the mobile smartphone 130 deployed on the wireless access control system network is used to practice a site-level access control method by selecting the locker size (e.g. small, large, jumbo) at the selected Site within the Facility which the guest user would like to rent and access to store personal belongings.

Figure 47D:
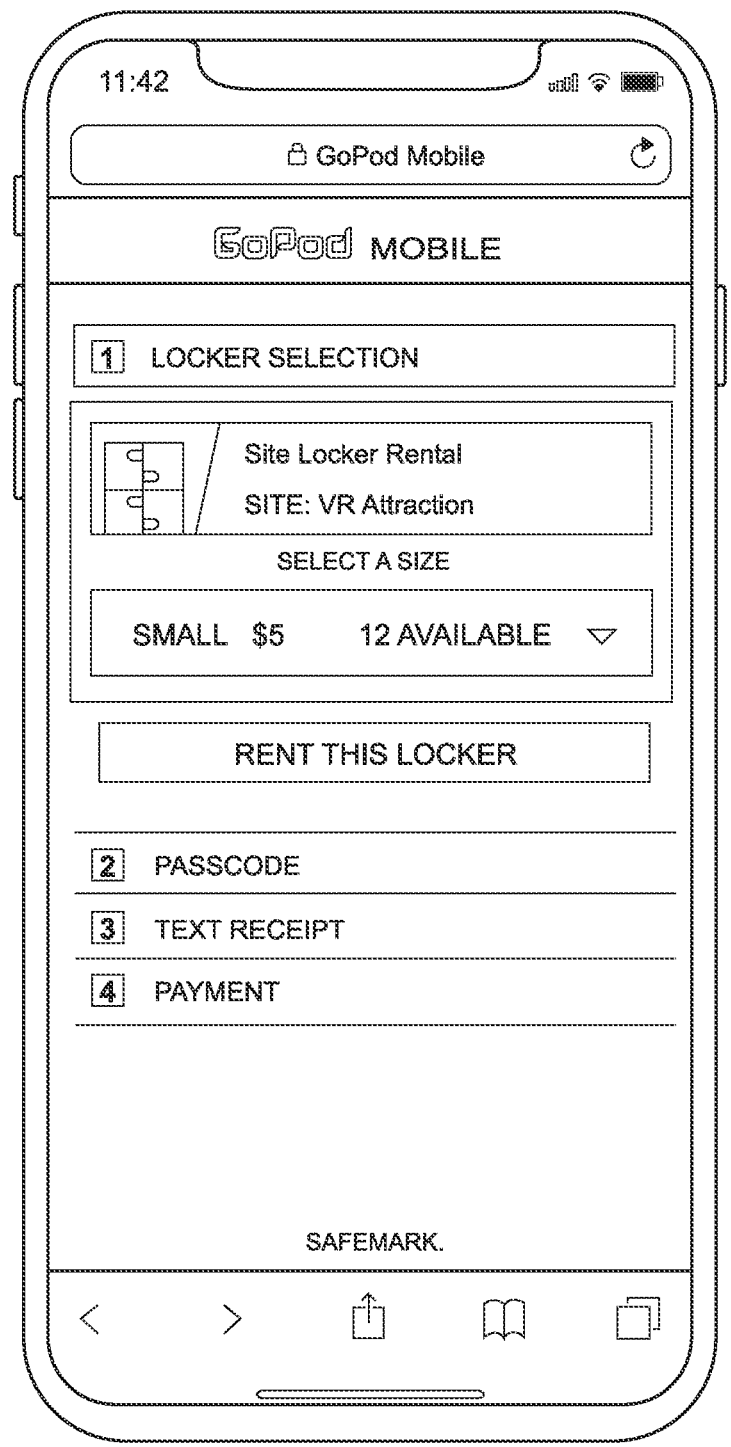
FIG. 47D is a graphical user interface (GUI) screen of the mobile smartphone shown in FIG. 31, deployed on the wireless access control system network of the present invention, and showing the fourth step in the site-level access control method of the present invention involving the guest user requesting to "Rent This Locker" previously specified by the Site, time/date, and locker size and track selected by the guest at the Site, while displaying the price of the locker rental and availability at the time of the rental offer (prior to acceptance and order placement)

As indicated at Step D of FIG. 45A, and as shown in FIG. 47D, the mobile smartphone 130 deployed on the wireless access control system network 1 is used to practice a site-level access control method by the guest user requesting to "Rent This Locker" previously specified by the Site, time/date, and locker size selected by the guest at the Site, while displaying the price of the locker rental and availability at the time of the rental offer (prior to acceptance and order placement).

Figure 47E:
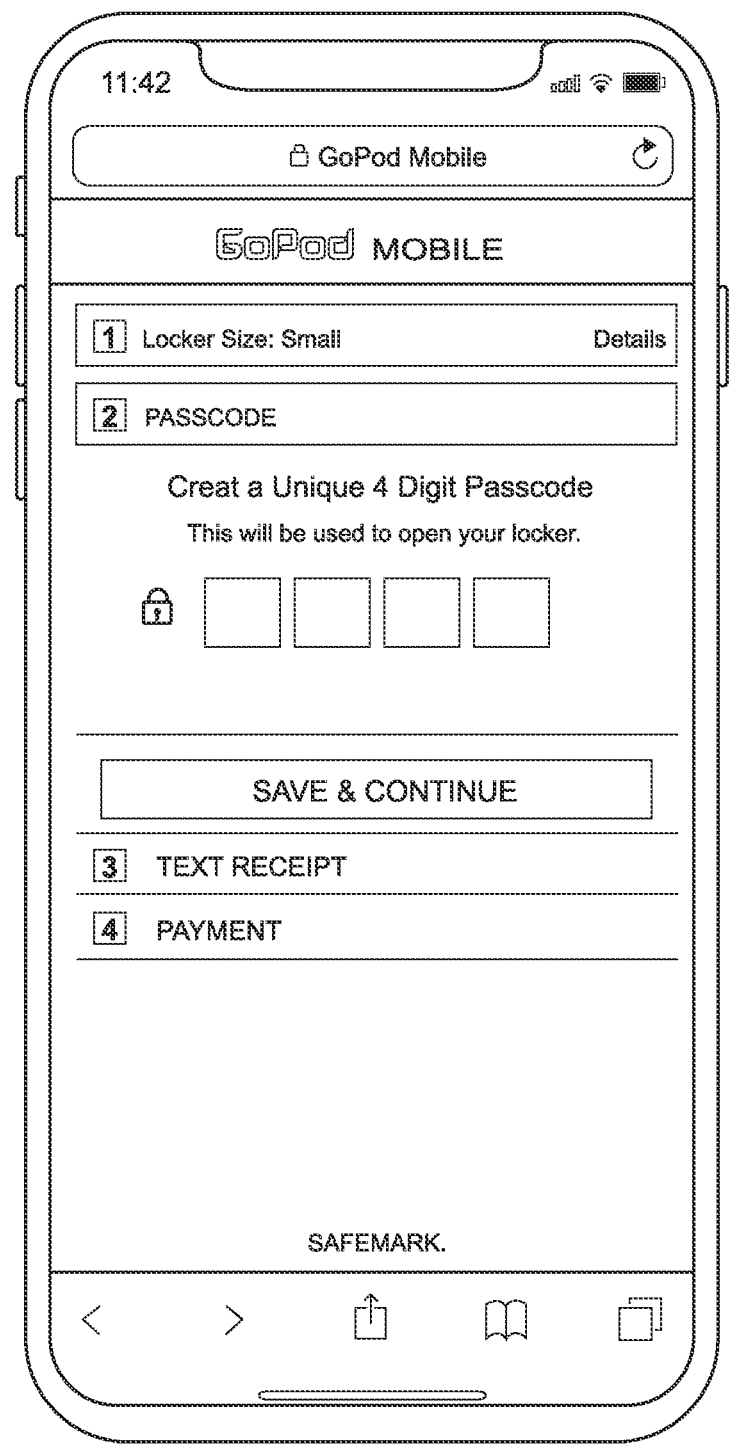
FIG. 47E is a graphical user interface (GUI) screen of the mobile smartphone shown in FIG. 31, deployed on the wireless access control system network of the present invention, and showing the fifth step in the site-level access control method of the present invention involving the user's selection of four-digit passcode for use in opening the rental locker, and selecting "SAVE and CONTINUE" to save the request in the RDBMS of the wireless access control system network.
Figure 47F:
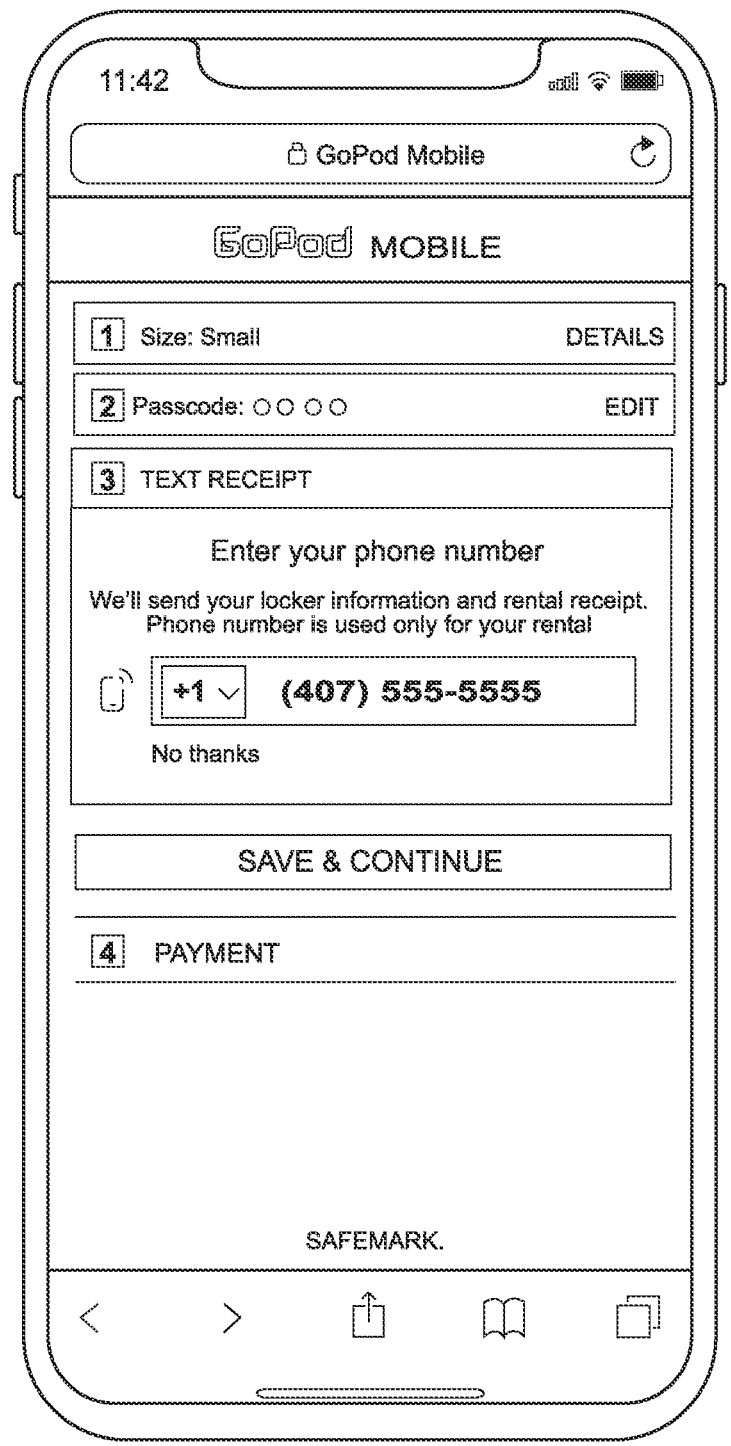
FIG. 47F is a graphical user interface (GUI) screen of the mobile smartphone shown in FIG. 31, deployed on the wireless access control system network of the present invention, and showing the sixth step in the site-level access control method of the present invention displaying the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center.

As indicated at Step E of FIG. 45B, and as shown in FIG. 47E, the mobile smartphone 130 deployed on the wireless access control system network 1 is used to practice a site-level access control method by the user's selecting four-digit passcode for use in opening the rental locker, and selecting SAVE and CONTINUE to save the request in the RDBMS of the wireless access control system network.

As indicated at Step F of FIG. 45B, and as shown in FIG. 47, the mobile smartphone deployed on the wireless access control system network is used to practice a site-level access control method by displaying the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center.

Figure 47G:
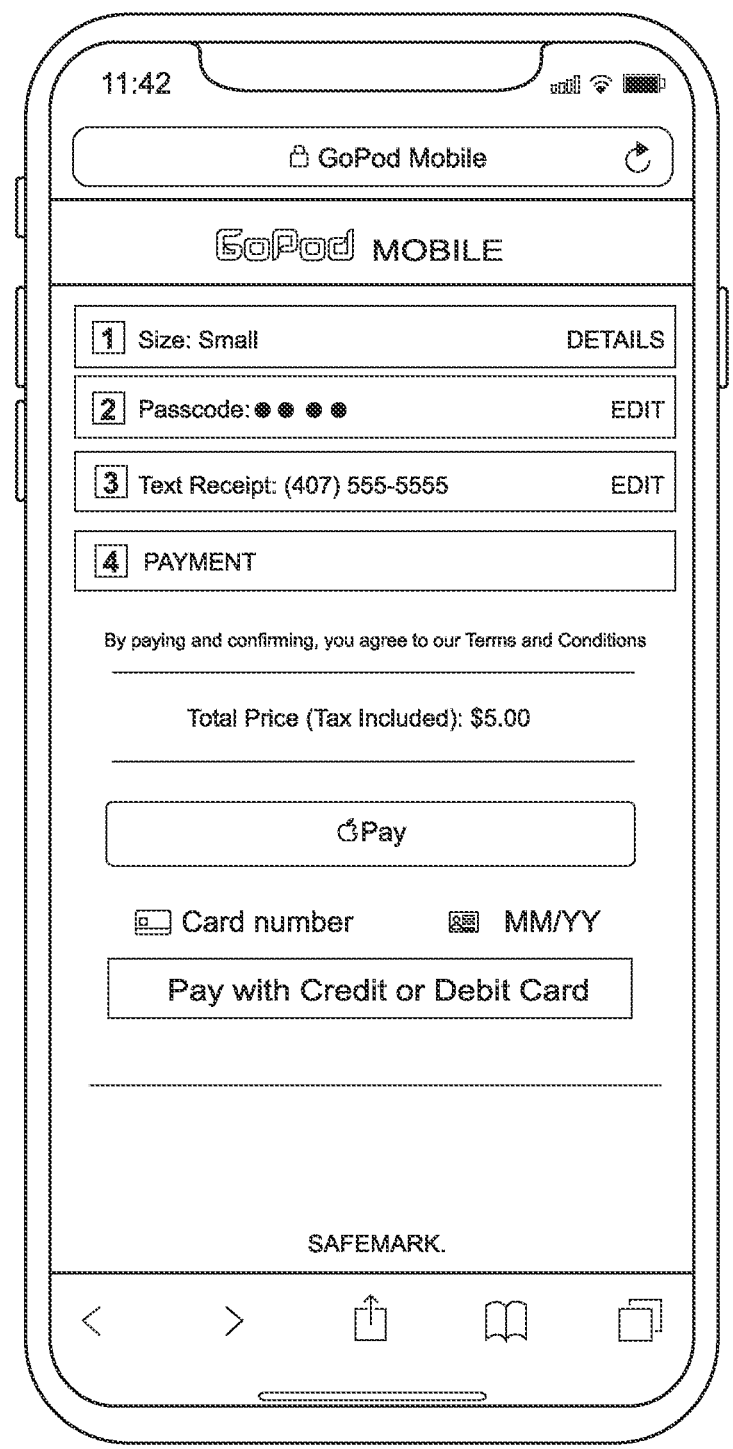
FIG. 47G is a graphical user interface (GUI) screen of the mobile smartphone shown in FIG. 31, deployed on the wireless access control system network of the present invention, and showing the seventh step in the site-level access control method of the present invention displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested)

As indicated at Step G of FIG. 45B, and as shown in FIG. 47G, the mobile smartphone deployed on the wireless access control system network is used to practice a site-level access control method by displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested).

Figure 47H:
FIG. 47H is a graphical user interface (GUI) screen of the mobile smartphone shown in FIG. 41, deployed on the wireless access control system network of the present invention, and showing the eighth step in the site-level access control method of the present invention displaying, after the prior payment transaction has been successfully completed, a message that the "Locker is Ready", along with the selected locker # and user's passcode, and a Button enabled to open the locker at its location, by the user simply either scanning the Door-Level QR Code on the locker door, or entering the unique passcode into the locker's keypad (where and as provided)

As indicated at Step H of FIG. 45C, and as shown in FIG. 47H, a mobile smartphone 130 deployed on the wireless access control system network 1 is used to practice a site-level access control method by displaying, after the prior payment transaction has been successfully completed, a message that the locker is ready, along with the selected locker # and user's passcode, and a Button enabled to open the locker at its location, by the user simply either scanning the Door-Level QR Code 40C on the locker door, or entering the unique passcode into the locker's keypad (where and as provided).

Specification of Method of Enabling Contact-Less Access Control of a Rented Single-Sided Storage Locker within an Amusement Park by Scanning a Door-Level QR Code on the Rented Locker after Scanning the Site-Level QR Code Using a Mobile Smartphone Connected to the Wireless Access Control System Network of the Present Invention FIG. 45C describes the primary steps involved when carrying out the methods of managing access control to a rented networked locker 151 by scanning the Door-Level QR Codes 40C posted on the locker rented at amusement park facility after scanning a Site-Level QR Code 40B, using a mobile smartphone wireless connected to the wireless access control system network of the present invention.

Figure 48:
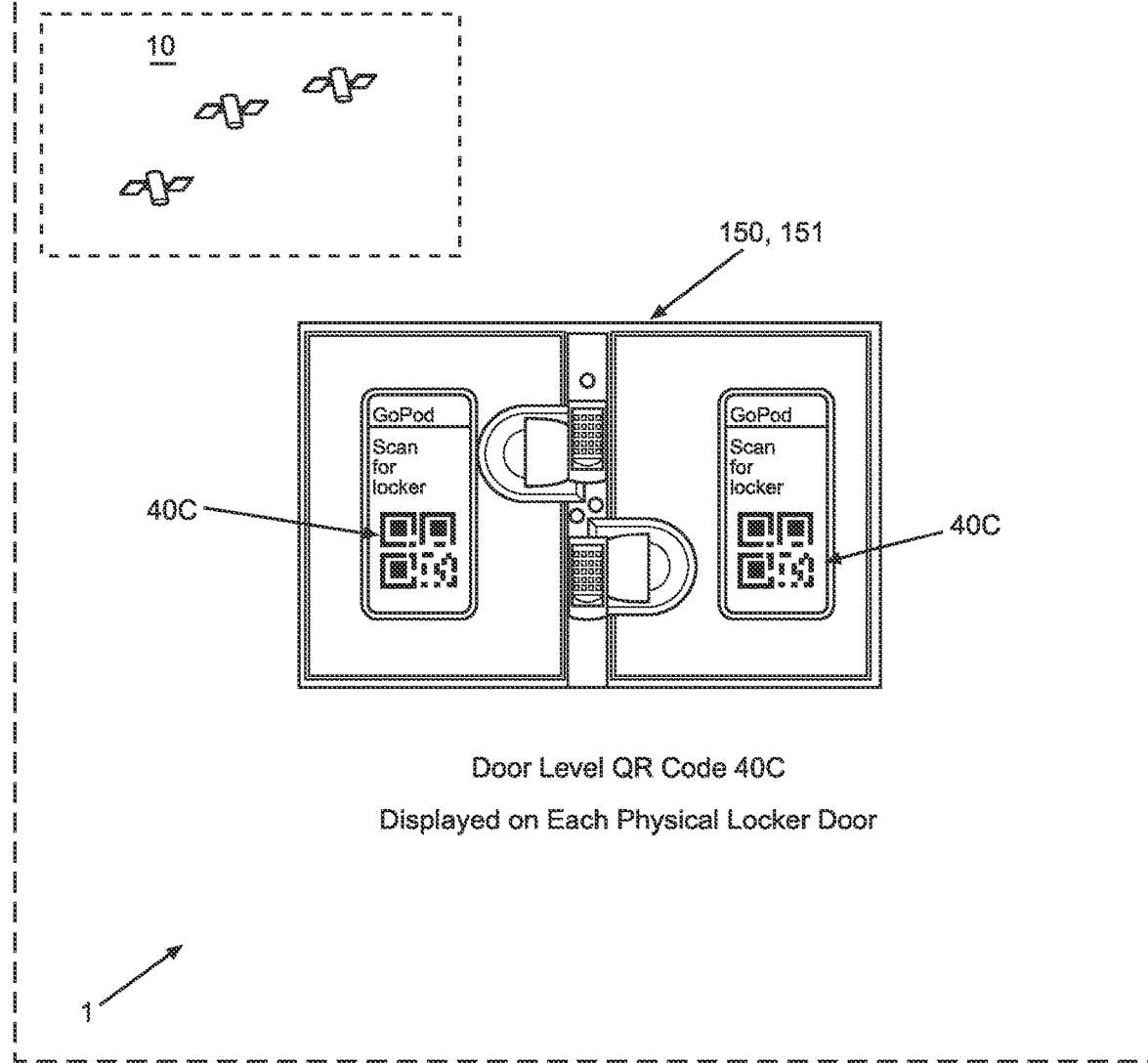
FIG. 48 is a plan view of an exemplary Door-Level QR Code physically posted or electrically displayed on the front door surface of the storage/entry/ingress side of each locker unit in the GPS-tracked wireless networked locker system illustrated in FIGS. 16, 17, 22.

FIG. 48 shows a Door-Level QR Code 40C (i.e. a machine-readable code, such as an optically-readable bar code symbol and/or RFID encoded tag component) physically posted or electrically displayed on the front door surface of each locker unit in the GPS-tracked wireless networked locker system 1 illustrated in FIG. 22.

The method described and illustrated in FIGS. 45C and 45D is supported by the GUI screens shown in FIG. 49A through 49D.

Figure 49A:
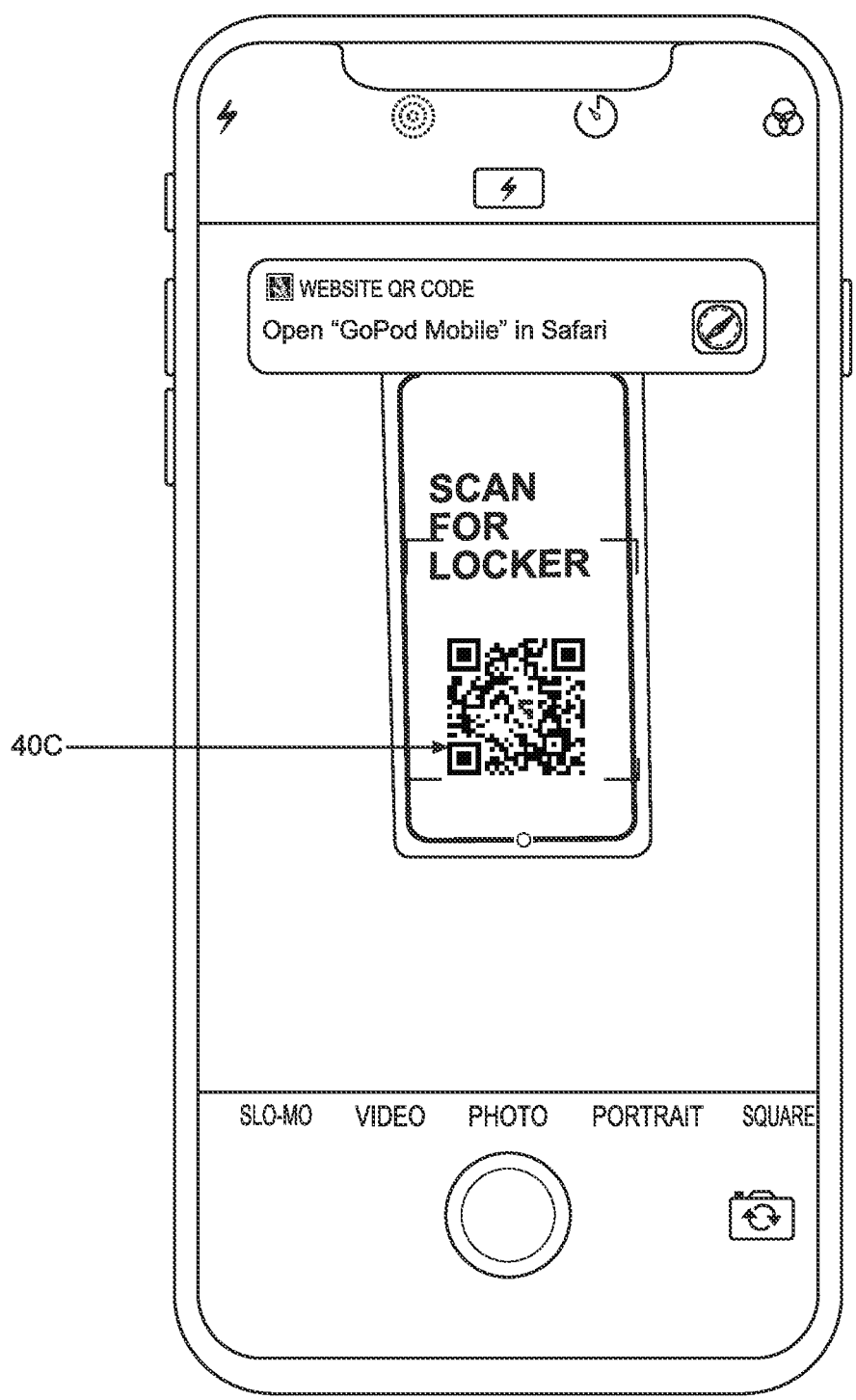
FIG. 49A is a graphical user interface (GUI) screen of the mobile smartphone shown in FIG. 31, deployed on the wireless access control system network of the present invention, and showing the first step in the door-level access control method when entered after scanning a site-level access QR code as described in FIGS. 47A through 47H, involving (i) the scanning of the Door-Level QR code on the ingress/storage/entry side of the rented locker using the user's web-enabled mobile smartphone, as shown in FIG. 46, (ii) automatically directing the smartphone web-browser application (e.g. Apple Safari) to parse and analyze the scanned QR code and serve, load and display the webpage specified by the URL encoded in the Door-Level QR Code as illustrated in table of FIG. 12, and (iii) executing the access control transaction script for the locker rental transaction identified by the "Rental Transaction Identifier—Site Entry" stored on the phone by the application servers, so as to determine the state of the transaction for the Door-Level Access Control Method.

As indicated at Step I of FIG. 45C, and as shown in FIG. 49A, a mobile smartphone deployed on the wireless access control system network 1 is used to scan a Door-Level QR Code 40C after scanning a Site-Level QR Code 40B by (i) the scanning of the Door-Level QR code on the rented locker using the user's web-enabled mobile smartphone 130, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier-Site Entry" (e.g. digital token/cookie) stored on the phone by the application servers, so as to determine the state of the transaction for the Door-Level Access Control Method.

Figure 49B:
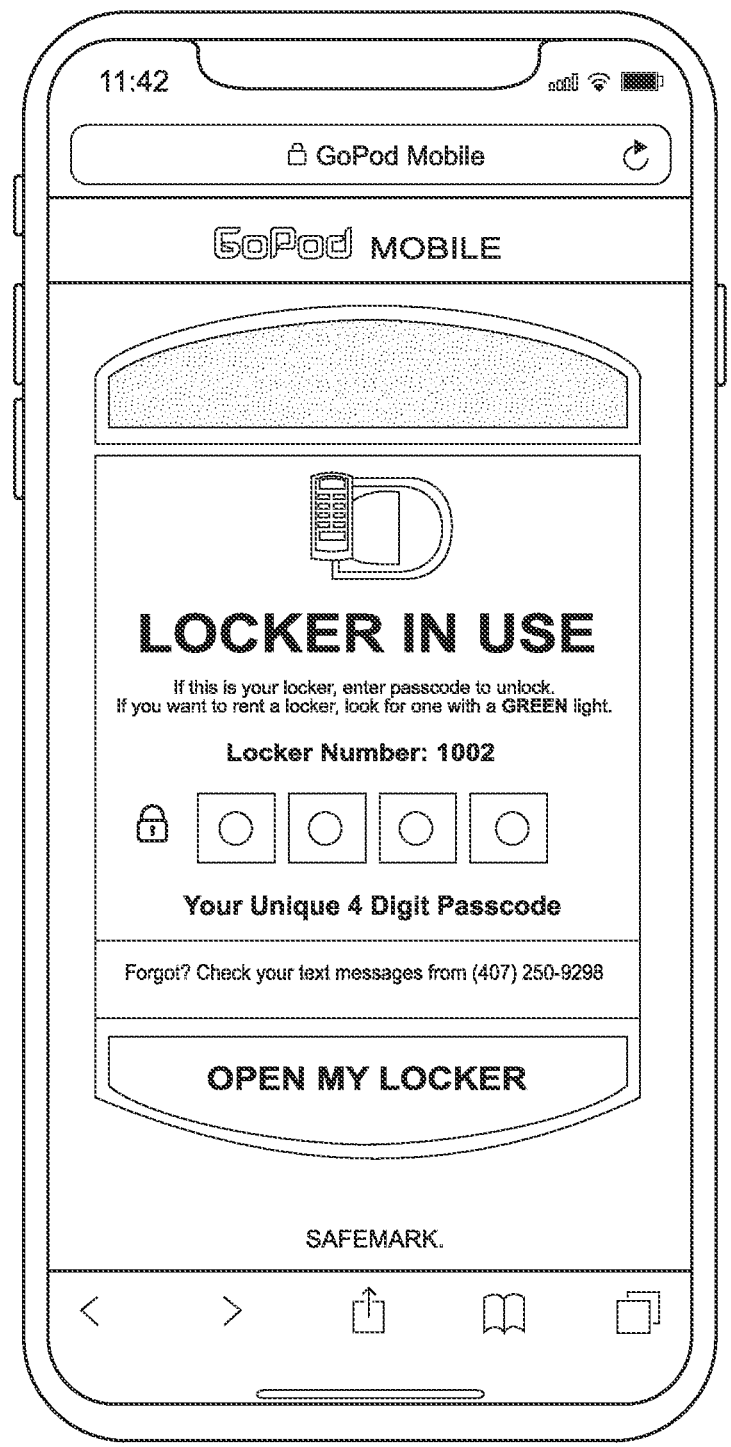
FIG. 49B is a graphical user interface (GUI) screen of the mobile smartphone shown in FIG. 31, deployed on the wireless access control system network of the present invention, and showing the second step in the door-level access control method of the present invention displaying a message that the "Locker Is in Use" (e.g. Locker Number 154), and requesting the user to enter his or her unique 4 digital passcode, and the select the button "OPEN MY LOCKER"

As indicated at Step J of FIG. 45C, and as shown in FIG. 49B, the mobile smartphone 130 deployed on the wireless access control system network 1 is used to practice a door-level access control method, after completing the site-level access control method, by displaying a message that the "Locker Is in Use" (e.g. Locker Number 154), and requesting the user to enter his or her unique 4 digital passcode, and the select button "OPEN MY LOCKER".

Figure 49C:
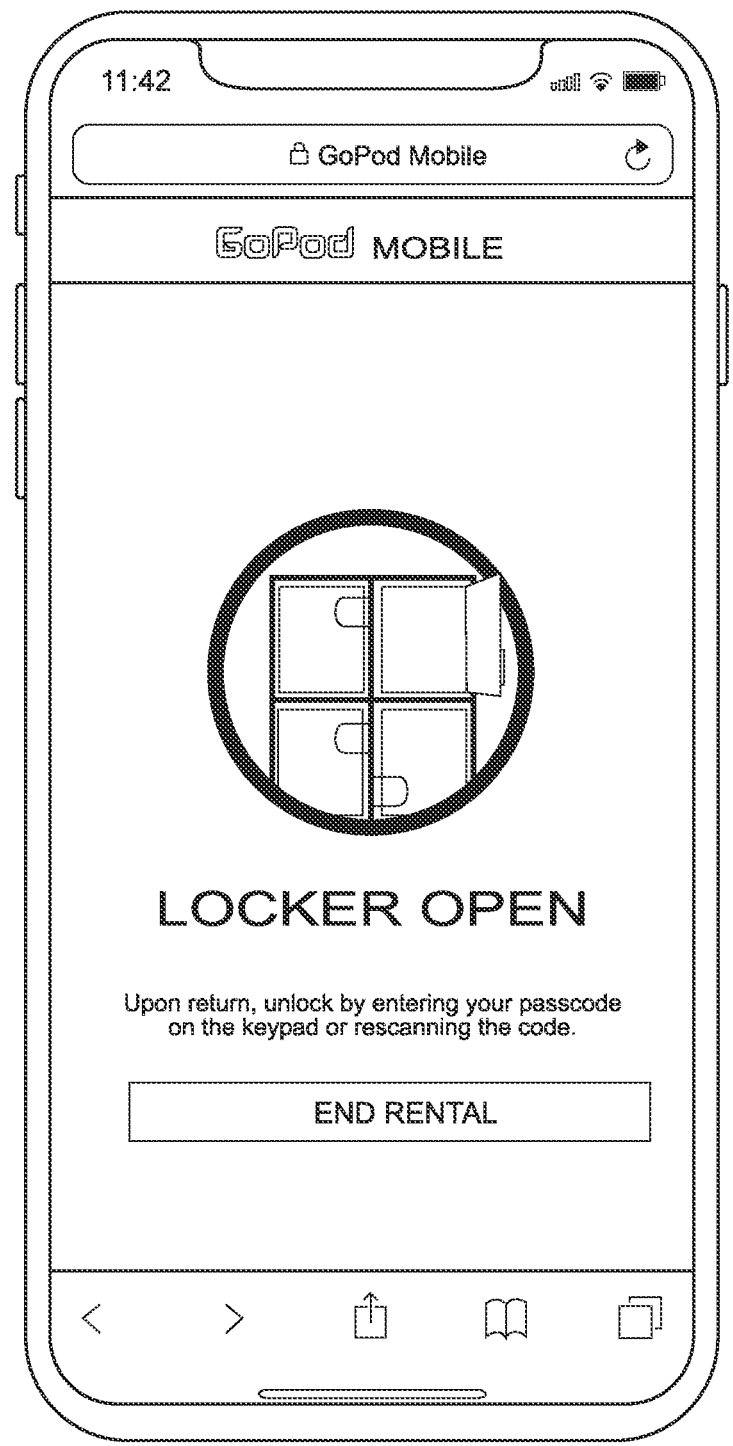
FIG. 49C is a graphical user interface (GUI) screen of the mobile smartphone shown in FIG. 31, deployed on the wireless access control system network of the present invention, and showing the third step in the door-level access control method displaying, after scanning the Door-Level QR Code or entering the unique passcode into the locker's keypad, a message that the "Locker is Open" (and "upon return, unlock the locker by entering the passcode on the keypad or rescanning the Door-Level QR Code") allowing the user to either retrieve personal belongings from the storage locker (or access stored personal belongings from the accessed locker, as the case may be), and an END RENTAL Button for selection by the user to the end the locker rental.

As indicated at Step K of FIG. 45C, and as shown in FIG. 49C, the mobile smartphone 130 deployed on the wireless access control system network 1 is used to practice a door-level access control method, after completing the site-level access control method, by scanning the Door-Level QR Code or entering the unique passcode into the locker's keypad, and displaying a message that the locker is OPEN, and upon return, unlocking the locker by entering the passcode on the keypad or rescanning the Door-Level QR Code 40C, and allowing the user to retrieve personal belongings from the storage locker, and select the END RENTAL Button to the end the locker rental.

Optionally, if the internal automated locker camera systems 310 are active within the rented locker, and the camera detects one or more objects in the locker, then the access control system network will automatically make such determinations and prevent the user from terminating the locker rental until all objects have been removed from the locker as confirmed by video camera images captured by the internal locker-based digital camera systems 310 supporting FOV #1 and FOV #2, illustrated in FIG. 20B.

Figure 50:
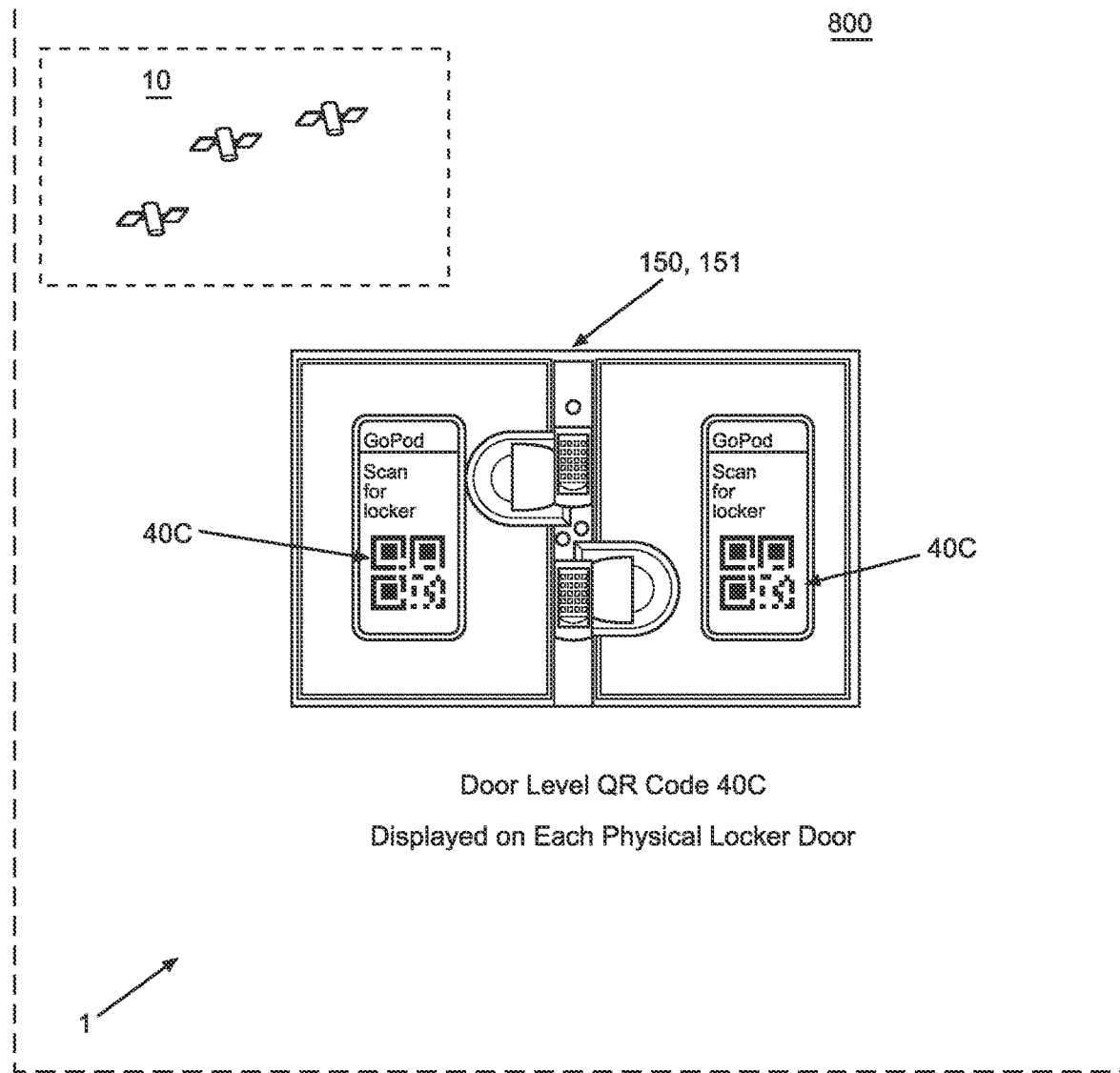
FIG. 50 is a plan view of an exemplary Door-Level QR Code physically posted or electrically displayed on the front door surface of the retrieval/exit/egress side of each double-sided locker unit in the double-sided storage locker system illustrated in FIGS. 16, 17, 22.

FIG. 50 shows a Door-Level QR Code 40C (i.e. a machine-readable code, such as an optically-readable bar code symbol and/or RFID encoded tag component) physically posted or electrically displayed on the door surface of a rented single-sided locker unit in the wireless networked single-sided storage locker system 150 illustrated in FIG. 22. Such scanning operations may be performed anytime a guest wishes to access a rented storage locker 151 anytime during a visit to a park facility.

The method described and illustrated in FIG. 45C is supported by the GUI screens shown in FIGS. 51A through 51D.

Figure 51A:
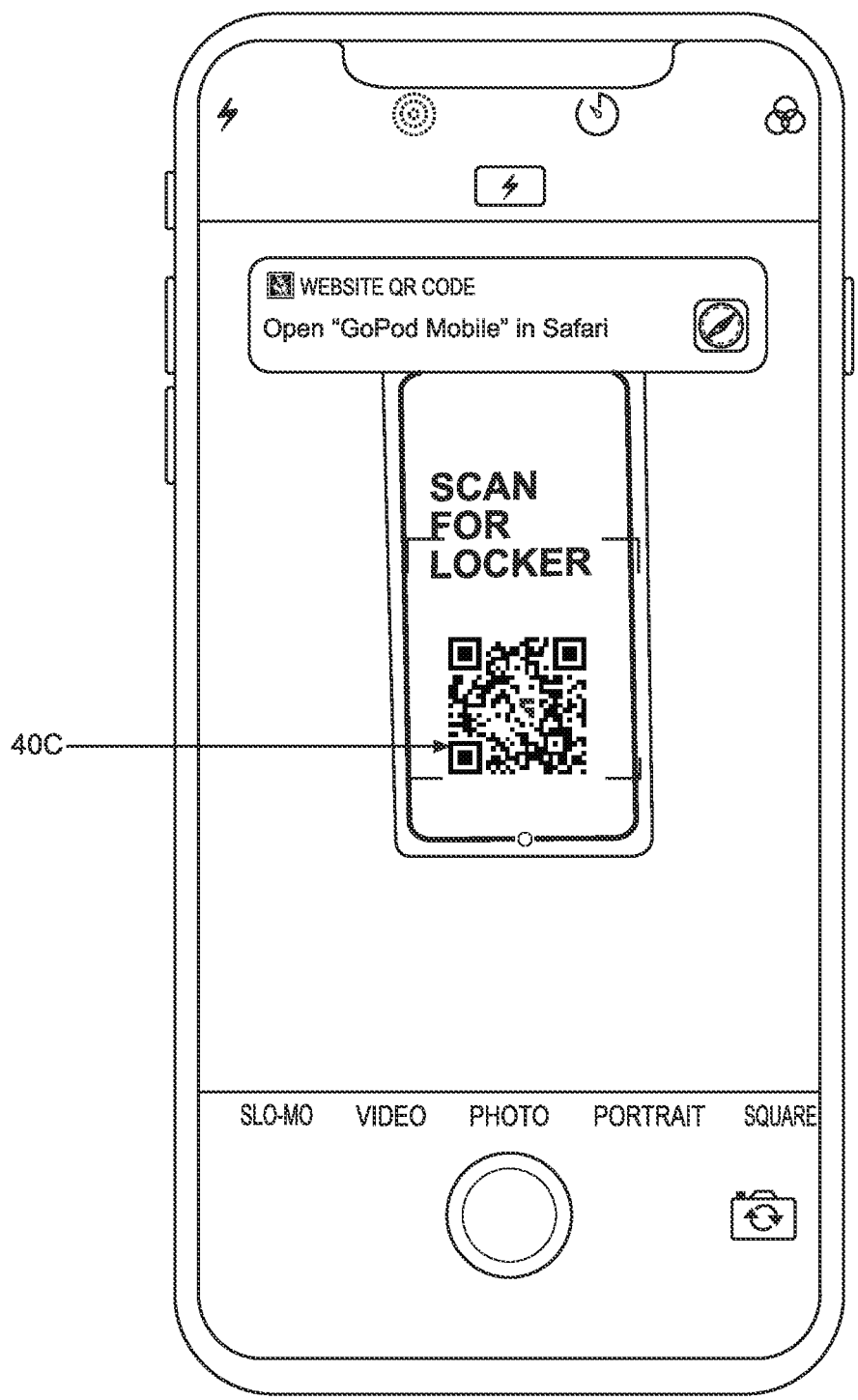
FIG. 51A is a graphical user interface (GUI) screen of the mobile smartphone shown in FIG. 31, deployed on the wireless access control system network of the present invention, and showing the first step in the door-level access control method when entered after scanning a site-level access QR code as described in FIGS. 35A through 35I, involving (i) the scanning of the Door-Level QR code on the egress/retrieval/exit side of the rented locker using the user's web-enabled mobile smartphone, as shown in FIG. 46, (ii) automatically directing the smartphone web-browser application (e.g. Apple Safari) to parse and analyze the scanned QR code and serve, load and display the webpage specified by the URL encoded in the Door-Level QR Code as illustrated in table of FIG. 12, and (iii) executing the access control transaction script for the locker rental transaction identified by the "Rental Transaction Identifier-Site Entry" stored on the phone by the application servers, so as to determine the state of the transaction for the Door-Level Access Control Method.

As indicated at Step I of FIG. 45C, and as shown in FIG. 51A, a mobile smartphone deployed on the wireless access control system network 1 is used to scan a Door-Level QR Code 40C after scanning a Site-Level QR Code 40B by (i) the scanning of the Door-Level QR code on the rented locker using the user's web-enabled mobile smartphone 130, (ii) automatically directing the smartphone web-browser application to parse and analyze the scanned QR code and serve, load and display the webpage specified by the URL encoded in the Door-Level QR Code on the storage/ingress side of the rented locker unit, and (iii) executing the access control transaction script for the locker rental transaction identified by the "Rental Transaction Identifier-Site Entry" (e.g. digital token/cookie) stored on the phone by the application servers, so as to determine the state of the transaction for the Door-Level Access Control Method.

Figure 51B:
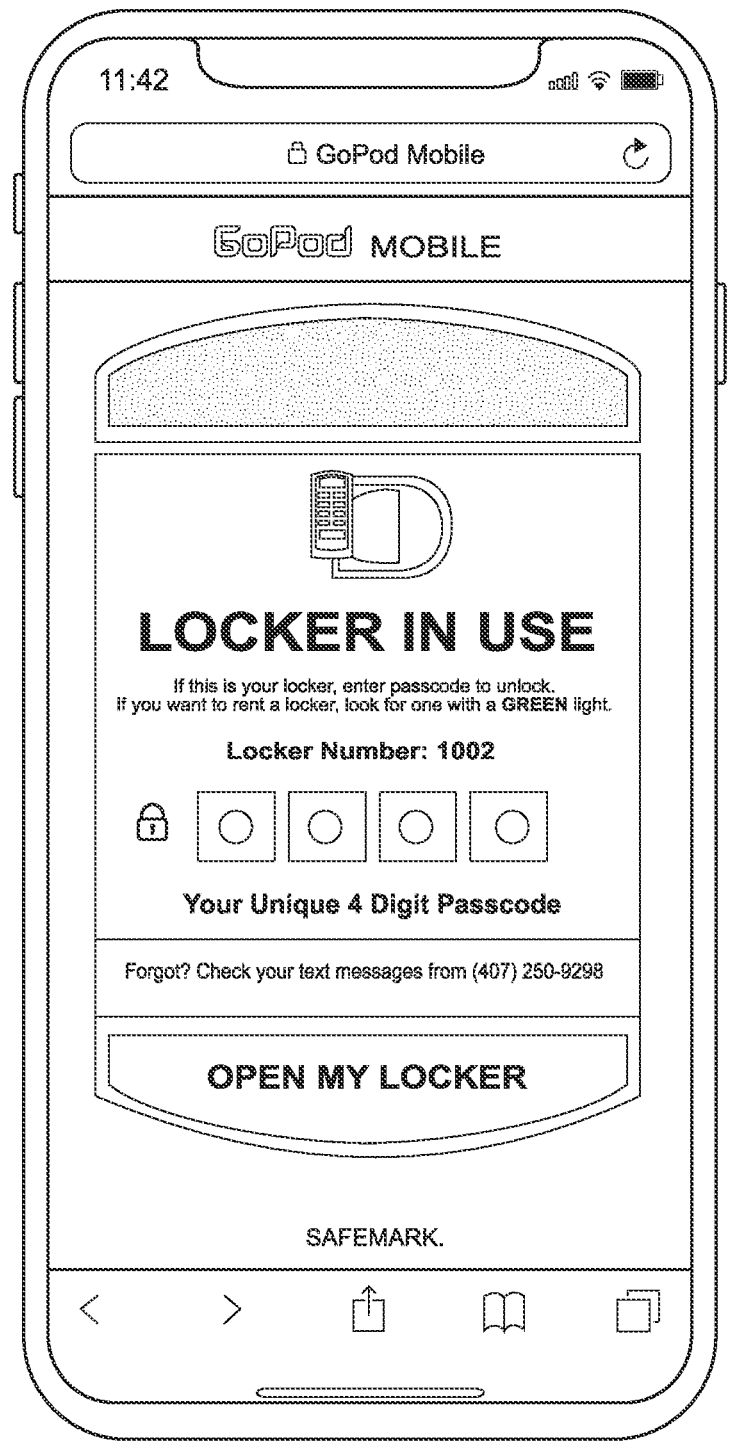
FIG. 51B is a graphical user interface (GUI) screen of the mobile smartphone shown in FIG. 31, deployed on the wireless access control system network of the present invention, and showing the second step in the door-level access control method of the present invention displaying a message that the "Locker Is in Use" (e.g. Locker Number 154), and requesting the user to enter his or her unique 4 digital passcode, and the select the button "OPEN MY LOCKER"

As indicated at Step J of FIG. 45C, and as shown in FIG. 51B, the mobile smartphone 130 deployed on the wireless access control system network 1 is used to practice a door-level access control method, after completing the site-level access control method, by displaying a message that the "Locker Is in Use" (e.g. Locker Number 154), and requesting the user to enter his or her unique 4 digital passcode, and the select button "OPEN MY LOCKER".

Figure 51C:
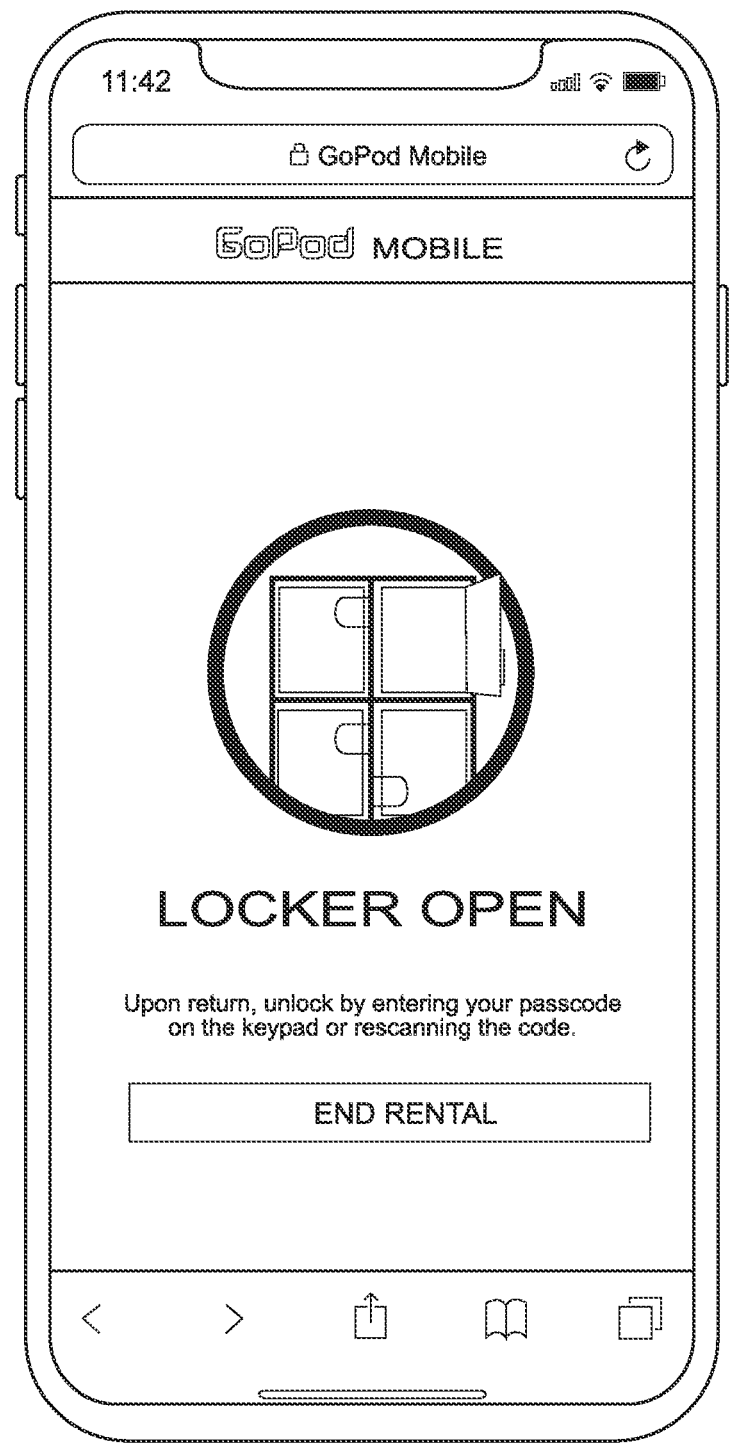
FIG. 51C is a graphical user interface (GUI) screen of the mobile smartphone shown in FIG. 31, deployed on the wireless access control system network of the present invention, and showing the third step in the door-level access control method displaying, after scanning the Door-Level QR Code or entering the unique passcode (PIN) into the locker's keypad, a message that the locker is OPEN (and "upon return, unlock the locker by entering the passcode on the keypad or rescanning the Door-Level QR Code") allowing the user to either store personal belongings in the storage locker or access stored personal belongings from the accessed locker, as the case may be, and an END RENTAL Button for selection by the user to the end the locker rental.

As indicated at Step K of FIG. 45C, and as shown in FIG. 51C, the mobile smartphone 130 deployed on the wireless access control system network 1 displays a message that the locker is OPEN, and upon return, unlocking the locker by entering the passcode on the keypad or rescanning the Door-Level QR Code 40C, and allowing the user to retrieve personal belongings from the storage locker, and select the END RENTAL Button to the end the locker rental.

Figure 51D:
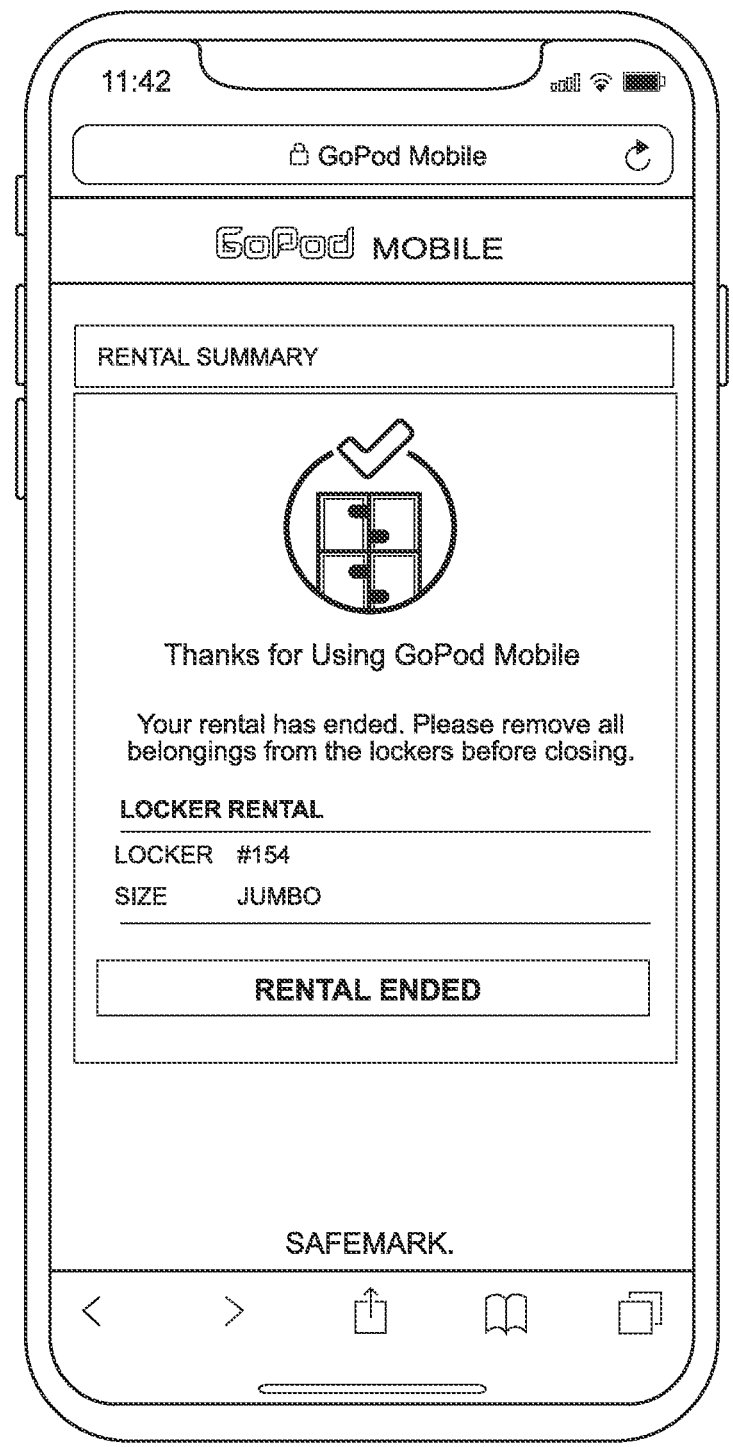
FIG. 51D is a graphical user interface (GUI) screen of the mobile smartphone shown in FIG. 31, deployed on the wireless access control system network of the present invention, and showing the fourth step in the door-level access control method displaying, after scanning the Door-Level QR Code or entering the unique passcode into the locker's keypad, retrieving personal belongings from the storage locker (or accessing stored personal belongings from the accessed locker, as the case may be), and selecting the end of the locker rental.

As shown in FIG. 51D, the mobile smartphone 130 deployed on the wireless access control system network 1 displays a message that the "Locker Rental has Ended" and for the guest to "please remove all belongings from the locker before closing". Optionally, if the internal automated locker camera systems 310 are active within the rented locker, and the camera detects one or more objects in the locker, then the access control system network will automatically make such determinations and prevent the user from terminating the locker rental until all objects have been removed from the locker as confirmed by video camera images captured by the internal locker-based digital camera systems 310 supporting FOV #1 and FOV #2, illustrated in FIG. 20B.

The above-described machine-readable code-driven access control method of the present invention shows how it is now possible to enable wireless rental, access and control to a specified locker (151) in a GPS-specified networked locker system 150 using a web-enabled smartphone 130, to read a Door-Level machine-readable (QR) code symbol to automatically initiate direct communication with the web-based communication/application/database servers maintained with the data center 12 of the wireless system network 1, and conduct the supporting web-based transaction. Each time the code symbol is scanned and the guest user seeks to open a rented locker, as well as an unavailable locker, transaction records of such events are recorded in the RDBMS of the data center 12.

However, during emergencies, when electrical power and/or Internet connectivity are disrupted, the system and method of the present invention allows the guest user to directly enter his or her digital password (e.g. PIN) into the keypad 158 provided on the rented locker unit 151, and locally operate its lock controller (provided with local battery power backup) and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit in locker unit 151, and open the locker door and access one's personal belongings while the locker system is disconnected from the Internet infrastructure and/ or during local power disruptions. Details regarding this back-up local access method are disclosed in U.S. Pat. No. 8,990,110, US Patent Application No. US2019/0035186, incorporated herein by reference.

Also, during emergencies, when electrical power and/or Internet connectivity are disrupted, the system and method of the present invention also allows the guest user to locally communicate with the locker controller, through its network adapter and antennas (e.g. using Bluetooth and/or WIFI protocols), to establish a communication session between the mobile smartphone 130 and the rented locker unit 151, and then enter the guest's digital locker password (i.e. PIN) via the virtual keypad (GUI screen) on the mobile smartphone 130, to locally operate its lock controller (provided with local battery power backup), and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit of a rented locker unit 151, and open the locker door and access one's personal belongings while the locker system is disconnected from the Internet infrastructure and/or during local power disruptions.

Method of Renting, Accessing and Controlling a Single-Sided Storage Locker by Scanning Site-Level QR Code at a Site to Rent or Reserve a Single-Sided Storage Locker, and then Scanning a Door-Level QR Code on the Rented Single-Sided Storage Locker at the Site FIG. 52 describes the primary data processing steps that take place when practicing the method of renting, accessing and controlling a double-sided storage locker according to the present invention, particularly, when (i) first scanning a Site-Level QR code 40B posted at a Ride Site in a Park Facility using a web-enabled mobile phone 130, (ii) then scanning a Door-level QR code 40C on the storage/ingress side of a single-sided storage locker at a Site, and (iii) then scanning a Door-Level QR code 40C on the retrieval/egress side of the single-sided storage locker of the system of the present invention 150.

While the method summarized above, and described in greater detail below, is a typical use case when using the Site-Level/Door-Level Scanning Methods of the present invention disclosed and claimed herein, there will be other embodiments of this general method that will be adapted to serve the varied needs and requirements of a multitude of applications around the world. Below the illustrative method will be described in greater technical detail with reference to actions undertaken by both the guest and system during the distributed data processing method, using the data elements collected, stored and managed within the database system represented in FIGS. 15, 15A, 15 and 15C, and elsewhere in this Patent Specification.

As indicated at Step 1 of FIG. 52, the method involves, at the site level, the guest user using a Web-Enabled Mobile Phone 130 to scan a Site-Level QR Code 40B posted at a Ride Site in a Facility supporting a plurality of Single-Sided Storage Lockers 151 within a specified locker cabinet of the Single-Sided Locker System 150.

As indicated at Step 2 of FIG. 52, the method involves, at the Site Level, the system (i.e. system servers 12) automatically generating and storing a Rental Transaction Record and Identifier in the System Database 12 in response to the scanning of the Site-Level QR Code 40B and rental of a Single-Sided Storage Locker 151.

As indicated at Step 3 of FIG. 52, the method involves the system 12 automatically generates and stores a Device Identifier (i.e. Cookie/Digital Token)) on the Mobile Phone 130 scanning the Site-Level QR Code 40B. The system then requests the guest to enter his or her Access PIN (e.g. 4 digit code), and then the system automatically assigns a locker # to the guest (though this could be a selection process providing the guest to choose a locker at the Ride Site) and issues the locker rental agreement. The cookie (i.e. digital token) stored on the mobile phone can be randomly generated for the rental transaction, or may be derived from the MAC address of the mobile phone 130, or other digital token generating methods suitable for the purpose at hand to provide a unique and secure identifier for the particular web-enabled mobile phone 130 that was used to scan and read a particular Facility-Level QR Code.

As indicated at Step 4 of FIG. 52, the method involves the guest, at the door level, using the Mobile Phone 130 to scan a Door-Level QR Code 40C on the Rented Single-Sided Storage Locker 151.

As indicated at Step 5 of FIG. 52 the method involves the system automatically reading and updating the Rental Transaction Record and Identifier stored in the System Database maintained on the Datacenter Servers 12.

As indicated at Step 6 of FIG. 52, the method involves the system automatically reading the Device Identifier (i.e. Cookie) stored on the Mobile Phone 130 used to scan the Site-Level QR Code 40B and rent the Single-Sided Locker 151 during a web-based e-commerce locker rental transaction; the system the requests guests to enter access PIN, open the locker door, and store personal belonging therein.

As indicated at Step 7 of FIG. 52, the method involves, after the guest completes the ride experience, for the guest to then use, at the door level, the Mobile Phone 130 to scan Door-Level QR Code 40C on the rented Single-Sided Locker 151.

As indicated at Step 8 of FIG. 52, the method involves the system automatically reading and updating the Rental Transaction Record and identifier stored in the System Database 12.

As indicated at Step 9 of FIG. 52, the method involves the system automatically reading the Device Identifier (i.e. Cookie) on Mobile Phone 130 used to scan the Site-Level QR Code 40B and the Door-Level QR Code 40C. The system also requests the guest to enter the Access PIN and then determines and displays on the mobile phone display if an extra rental fee is due because the locker rental time went over the agreed to rental limit (i.e. rental time overage) set by the ride ticket held by the guest, as managed by the ride management server 351 in FIG. 15, connected to the system via an application programming interface (API), as shown in FIG. 15.

As indicated at Step 10 of FIG. 52, the method involves the guest then using the Mobile Scanning Phone 130 to access the Rented Locker 151, retrieve belongings therefrom, pay for extra locker rental time if and as required by determined locker rental overage, and then terminates the rental transaction.

As indicated at Step 11 of FIG. 52, the method involves the system automatically reading and updating the Rental Transaction Record and Identifier stored in the System Database, to reflect that the Double-Sided Storage Locker is AVAILABLE for rental and use.

As indicated at Step 12 of FIG. 52, the method involves the system automatically driving the Locker (Rental) Status Indication Light (LED) on the available Single-Sided Storage Locker 151 to indicate rental AVAILABILITY Status, as shown in FIG. 18B, for quick recognition by guest users present on the ingress side, who are searching for a locker to rent prior to boarding the ride at the Site.

These above described data processing operation supported behind the scenes on the system network of the present invention are exemplary in nature and may be practiced differently depending on the particular illustrative embodiment being practiced for any given situation. In the illustrative embodiment described above, the system requested the guest user to provide an access PIN, after scanning a Door-Level QR Code to access a rented double-sided storage locker, to provide a form of 2-factor authentication for added security. However, it is understood in alternative embodiments practicing 1-factor authentication, it is possible for the system network to automatically unlock and open a rented locker unit upon the guest user (i) using his or her web-enabled mobile phone to scan and read its Door-Level QR code as described in detail herein, or (ii) manually entering the access PIN via the physical keypad provided on each side door on the rented double-sided locker unit.

Method of Finding a Single-Sided Storage Locker Rented within a Facility by Scanning a Site-Level QR Code at the Facility, or a Door-Level QR Code on any Single-Sided Storage Locker at any Site within the Facility FIGS. 53A and 53B, taken together, show a flow chart describing the primary steps involved in carrying out method of method of finding a single-sided storage locker rented within a facility by scanning a Site-Level QR Code at the facility, or a Door-Level QR Code on any single-sided storage locker at any Site within the Facility.

FIGS. 53A and 53B describe the primary data processing steps involved in carrying out the method of finding a single-sided storage locker rented within a facility by scanning a Facility-Level QR Code 40A at the Facility, or a Door-Level QR code 40A on a storage locker at a site. This process follows the flow described in FIG. 43 with additional logic added to Steps 6, 9A and 9B that automatically checks and analyzes the data records reflected in FIGS. 15A, 15B, 15 and 15D to ensure the mobile phone 130 scanning a particular QR code on a single-sided locker 151 is registered/linked with a rental transaction data record, and if not, to automatically generate messages to the guest to scan another rented locker within the double-sided locker system 150, or other ride site if that rental data records across a facility suggest the same, in the spirit of accuracy, authenticity and automation.

As indicated at Step 1 of FIG. 53A, the method involves using a Web-Enabled Mobile Phone 130 to scan a Facility QR Code 40A.

As indicated at Step 2 of FIG. 53A, the method involves generating and storing a Rental Transaction Record and Identifier in the system database in automated response to the scanning of a Facility-Level QR Code 40A and the rental of a Single-Sided Storage Locker 151.

As indicated at Step 3 of FIG. 53A, the method involves the system automatically generates and stores a Device Identifier (i.e. Cookie/Digital Token) on the Mobile Phone 130 scanning the Facility-Level QR Code 40A; requests guest to enter access PIN; then assigns locker identified by Locker # and Issues Locker Rental Agreement.

As indicated at Step 4 of FIG. 53A, the method involves the guest using the Mobile Phone to scan a Door-Level QR Code 40C on the rented Single-Sided Storage Locker 151, or a Discovery-Level Code 40D posted on a surface accessible on the Single-Sided Locker System 150.

As indicated at Step 5 of FIG. 53A, the method involves the System Automatically Reading and Updating the Rental Transaction Record and Identifier stored in the System Database.

As indicated at Step 6 of FIG. 53A, the method involves the System automatically reading the Device Identifier (i.e. Cookie/Digital Token) on Mobile Phone 130 used to scan the Door-Level QR Code 40A or Discovery-Level QR Code 40D; If the Device (Phone) Identifier does not match the Scanned Locker # in any active Rental Transaction Records in the System Database, then the System automatically displays a message on the Phone Display: "Oops, You Scanned the Wrong Locker, Try Scanning Locker #XXXX"; If the Device (Phone) Identifier does match the Scanned Locker # in an active Rental Transaction Record in the System Database, then the System requests the Guest to enter its Access PIN, and automatically determines and displays on Mobile Phone Display 130 if Extra Rental Fee is due to any Locker Rental Time Overage.

Regarding the system sending a message to the guest scanning an incorrect locker, FIG. 42E shows an exemplary GUI screen of the mobile smartphone 130, when operating in Automated Locker Discovery mode, displaying a message on the guest's mobile phone, similar to the message reflected in Step 6 of FIG. 53A, indicating that an incorrect locker was scanned and that the guest should scan a different specified locker identified in the message to open the correct rented locker and store (or retrieve) personal belongings from the ingress side of the single-sided storage locker system.

At Step 6, the logic applied there provides for two possible flow paths, indicated as Path A and Path B respectively, depending on the facts determined at that stage of the process. Flow Path A includes Blocks indicated by 7A, 8A, 9A, 10A, 11A and 12A, whereas Flow Path B includes Blocks indicated by 7B, 8B, 9B, 10B, 11B and 12B. The steps in these two Flow Paths A and B will be described in detail below.

As indicated at Step 7A of FIG. 53A, the method along Flow Path A involves, after the guest's ride experience, the Guest using the Mobile Phone 130 to scan Door-Level QR Code 340C on the rented Single-Sided Locker 151.

As indicated at Step 8A of FIG. 44, the method involves the system automatically reading and updating the Rental Transaction Record and Identifier stored in the System Database.

As indicated at Step 9A of FIG. 53B, the method involves the System automatically reading the Device Identifier (i.e. Cookie/Digital Token) on Mobile Phone 130 used to scan the Door-Level QR Code 40C or Discovery-Level QR Code 40D;

If the Device (Phone) Identifier does not match the scanned Locker # in any active Rental Transaction Records in the System Database, then the system automatically displays a message on the Phone Display: "Oops, You Scanned the Wrong Locker, Try Scanning Locker #245"; and If the Device (Phone) Identifier does match The Scanned Locker # in an active Rental Transaction Record in the System Database, then the system requests the guest to enter its access PIN, and automatically determines and displays on Mobile Phone Display 130 if Extra Rental Fee is due to any Locker Rental Time Overage.

FIG. 42F shows an exemplary GUI screen of the mobile smartphone 130, when operating in Automated Locker Discovery Mode, displaying a message on the guest's mobile phone, similar to the message reflected in Step 9A in FIG. 53B, indicating that an incorrect locker was scanned and that the guest should scan a different specified locker identified in the message to open the correct rented locker and retrieve personal belongings.

As indicated at Step 10A of FIG. 53B, the method involves the guest using the Mobile Scanning Phone 130 to pay for Extra Rental Time if and as required, and terminate the Rental Transaction; guest removes belongings from locker 151, and terminates locker rental.

As indicated at Step 11A of FIG. 53B, the method involves the system automatically reading and updating the Rental Transaction Record and Identifier stored in the system database, to reflect that the Dual-Sided Storage Locker is AVAILABLE for rental.

As indicated at Step 12A of FIG. 53B, the method involves the system automatically drives LED Status Indication Light on the Available Single-Sided Storage Locker to indicate AVAILABILITY Status. This completes Flow Path A.

As indicated at Step 7B of FIG. 53B, the method involves along Flow Path B, after some park experience, guest uses the Mobile Phone 130 to scan Door-Level QR Code 40C on what is believed to be a rented Single-Sided Locker 151.

As indicated at Step 8B of FIG. 53B, the method involves the system automatically reading and updating the Rental Transaction Record and Identifier stored in the System Database.

As indicated at Step 9B of FIG. 53B, the method involves the system automatically reading the Device Identifier (i.e. Cookie/Digital Token) on Mobile Phone 130 used to scan the Door-Level QR Code or Discovery-Level QR Code; If the Device (Phone) Identifier does not match the Scanned Locker # in any active Rental Transaction Records in the System Database, then the System automatically displays a message on the Phone Display: "Oops, You Scanned the Wrong Locker, Try Scanning Locker #245"; If the Device (Phone) Identifier does match the Scanned Locker # in an active Rental Transaction Record in the System Database, then the System Requests the Guest to enter its Access PIN, and determines and displays on Mobile Phone Display if Extra Rental Fee is due to Any Locker Rental Time Overage.

As indicated at Step 10B of FIG. 53B, the method involves the guest using the Mobile Scanning Phone 130 to pay for Extra Rental Time if and as required, and terminate the Rental Transaction; Guest removes belongings from Locker, and terminates Locker Rental.

As indicated at Step 11B of FIG. 53B, the method involves the system automatically reading and updating the Rental Transaction Record and Identifier stored in the System Database, to reflect that the Single-Sided Storage Locker is AVAILABLE for Rental.

As indicated at Step 12B of FIG. 53B, the method involves the system automatically driving the Locker Status Indication Light (LED) on the Available Single-Sided Storage Locker to indicate AVAILABILITY Status. This completes Flow Path B.

FIG. 42G shows a GUI screen of the mobile smartphone 130 operating in Automated Locker Discovery Mode, wherein, after a mobile phone 130 scans a Discovery-Level QR Code 40D posted on the ingress side of the single-sided storage locker system, as shown in FIG. 15, the system servers automatically operating on the rental transaction data records schematically illustrated in FIG. 15C, automatically serves and display a message on the guest's mobile phone 130 indicating that the guest has rented a specified locker #, located at a particular location, which can be opened by scanning to store personal belongings from the ingress side of the single-sided storage locker system 150.

FIG. 42H shows a GUI screen of the mobile smartphone 130 operating in Automated Locker Discovery, wherein, after a mobile phone scans a Discovery-Level QR Code 40D posted on the egress side of the single-sided storage locker system, as shown in FIG. 15, the system servers automatically operating on the rental transaction data records schematically illustrated in FIG. 15C, automatically serves and display a message on the guest's mobile phone 130 indicating that the guest has rented a specified locker #, located at a particular location, which can be opened by scanning to retrieve personal belongings from the egress side of the single-sided storage locker system 150.

Specification of the Method of Managing Access Control to a Networked Single-Sided Storage Locker by Scanning Door-Level QR Codes Posted or Displayed on the Single-Sided Lockers Deployed within the Amusement Park Facility, Using a Mobile Smartphone Wireless Connected to the Wireless Access Control System Network of the Present Invention FIGS. 54A and 54B describe the primary steps involved when carrying out the method of managing access control to a networked locker system by scanning Door-Level QR Codes 40C posted or displayed on a single-sided locker to be rented at a site within the amusement park facility, using a mobile smartphone 130 wireless connected to the wireless access control system network of the present invention.

Figure 55A:
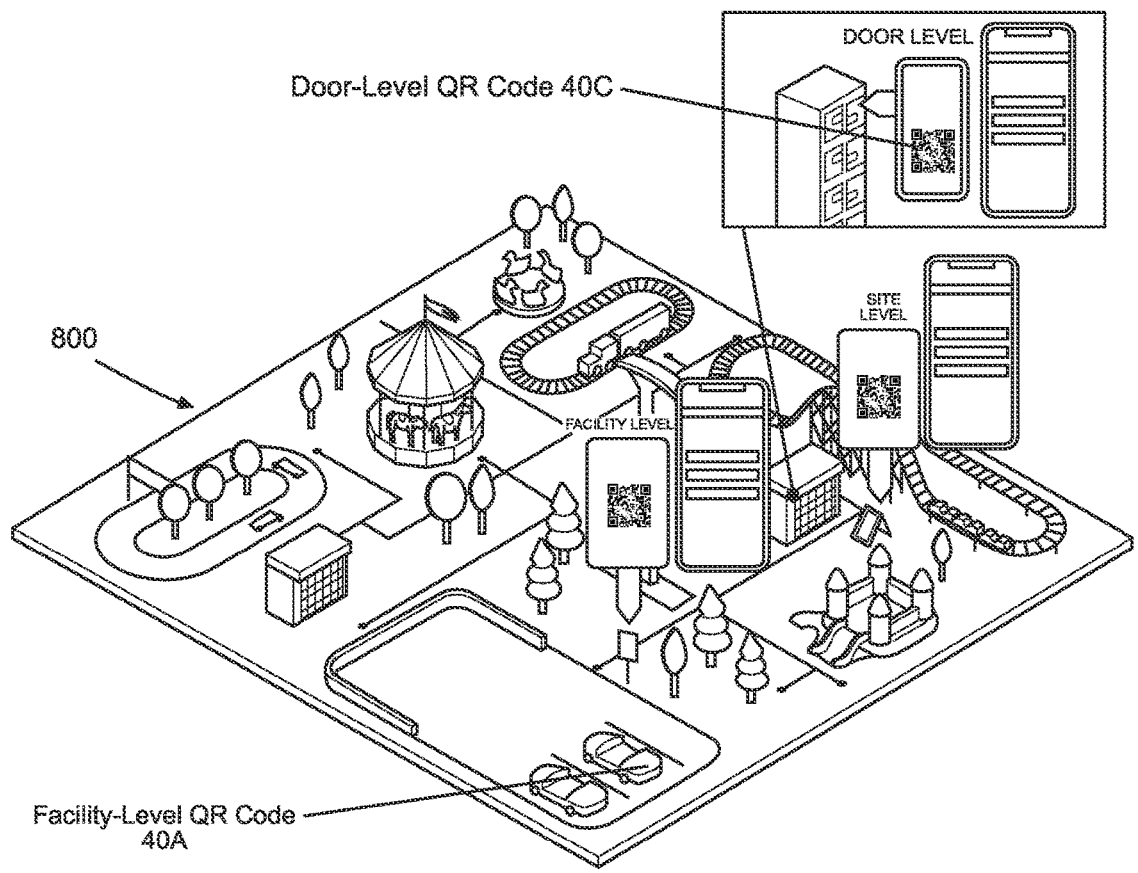
FIG. 55A is a schematic illustrating showing a perspective view of an amusement park facility, with a locker cabinet located at sign posted at a Site in the park, and each locker unit in the cabinet displaying a Door-Level QR code as shown in FIG. 55B, which upon scanning with a web-enabled mobile smartphone is engineered to direct the guest user to a web-based e-commerce-enabled locker rental and access control transaction process having a narrowed scope of services within the facility, and allowing guest users to rent the storage locker, at the Site within the amusement park, and then allow the wireless system network to automatically control access to the locker at the Site.
Figure 55B:
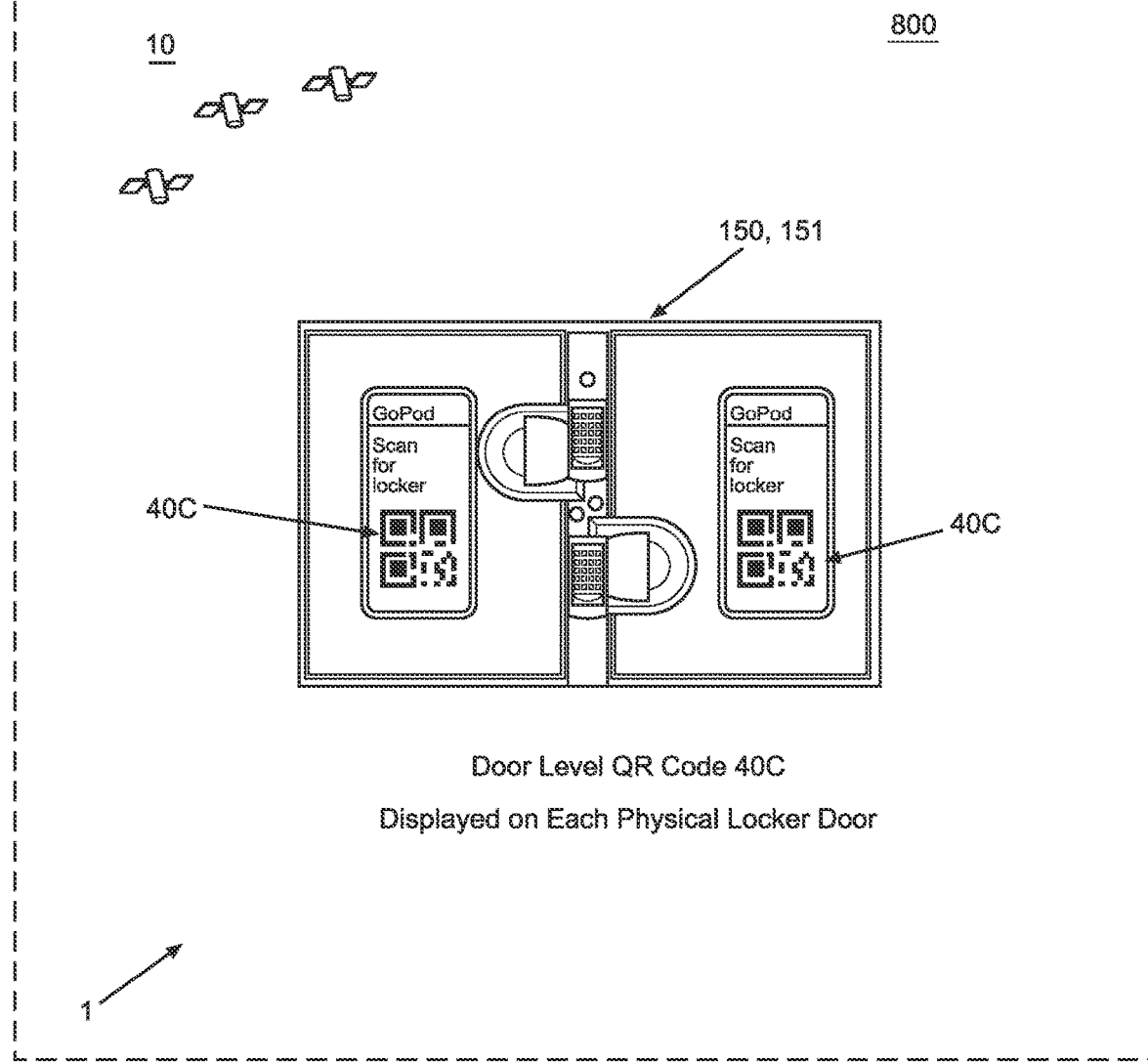
FIG. 55B is a plan view of the Door-Level QR Code physically posted or electrically displayed on the front door surface of each locker unit in the GPS-tracked wireless networked locker system illustrated in FIGS. 16, 17 and 22, wherein at this most explicit level, Door Level, users are allowed to directly scan the locker door they want to rent, and intelligence regarding the Size, Price, Site, and Facility is effectively built into the Door-Level QR Code so that users can enjoy an expedited rental experience.

FIG. 55A showing an amusement park facility, with a locker cabinet located at sign posted at a Site in the park, and each locker unit 151 in the cabinet displaying a Door-Level QR code 40C as shown in FIG. 55B, which upon scanning with a web-enabled mobile smartphone is engineered to direct the guest user to a web-based e-commerce-enabled locker rental and access control transaction having a narrowed scope of services within the facility. This allows guest users to rent the storage locker, at the Site within the amusement park, and then allow the wireless system network to automatically control access to the locker at the Site.

FIG. 55B shows the Door-Level QR Code 40C physically posted or electrically displayed on the front door surface of each locker unit 151 in the wireless networked locker system 150 illustrated in FIG. 22, wherein at this most explicit level, Door Level, users are allowed to directly scan the locker door they want to rent, and intelligence regarding the Size, Price, Site, and Facility is effectively built into the Door-Level QR Code 40C so that users can enjoy an expedited rental experience.

The method described and illustrated in FIGS. 54A and 54B is supported by the GUI screens shown in FIG. 56A through 56G.

Figure 56A:
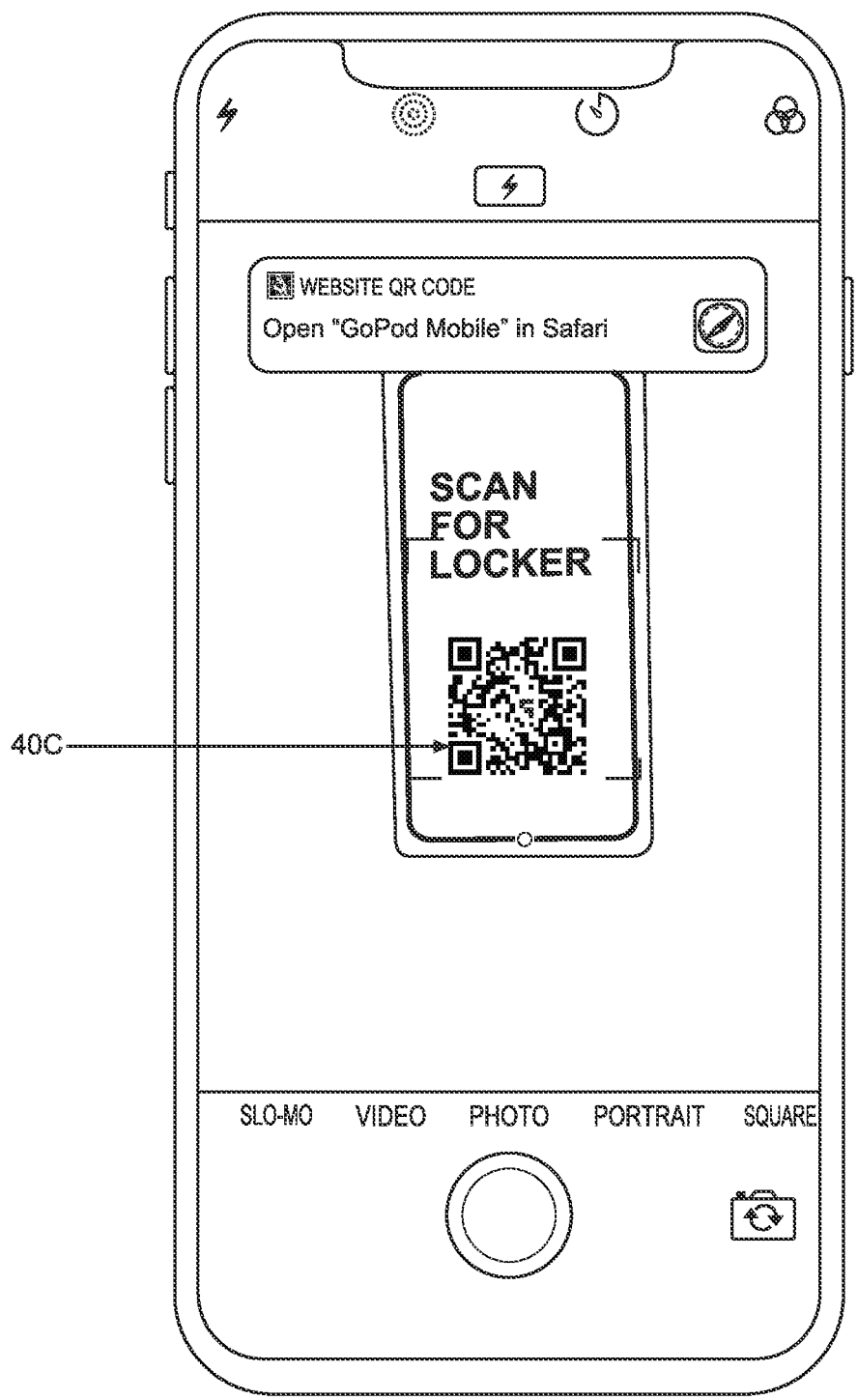
FIG. 56A is a graphical user interface (GUI) screen of the mobile smartphone shown in FIG. 31, deployed on the wireless access control system network of the present invention, and showing the first step in the door-level access control method of the present invention involving (i) the scanning of a Door-Level QR Code as shown in FIGS. 43A and 43B, and (ii) automatically directing the smartphone web-browser application (e.g. Apple Safari) to parse and analyze the scanned QR code and serve, load and display the webpage specified by the URL encoded in the Site-Level QR Code as illustrated in table of FIG. 12, and whereupon, the application server stores a "Rental Transaction Identifier—Door-Entry" (RTI-DE) (e.g. digital token/cookie) within the cache on the mobile smartphone.

As indicated at Step A of FIG. 54A, and as shown in FIG. 56A, a mobile smartphone 130 deployed on the wireless access control system network is used to practice a door-level access control method by (i) the scanning of a Door-Level QR Code 40C posted on the rented locker unit, and (ii) automatically directing the smartphone web-browser application to parse and analyze the scanned QR code and serve, load and display the webpage specified by the URL encoded in the Door-Level QR Code, and whereupon, the application server stores a "Rental Transaction Identifier-Door-Entry" (RTI-DE) (e.g. digital token) within the cache on the mobile smartphone 130.

Figure 56B:
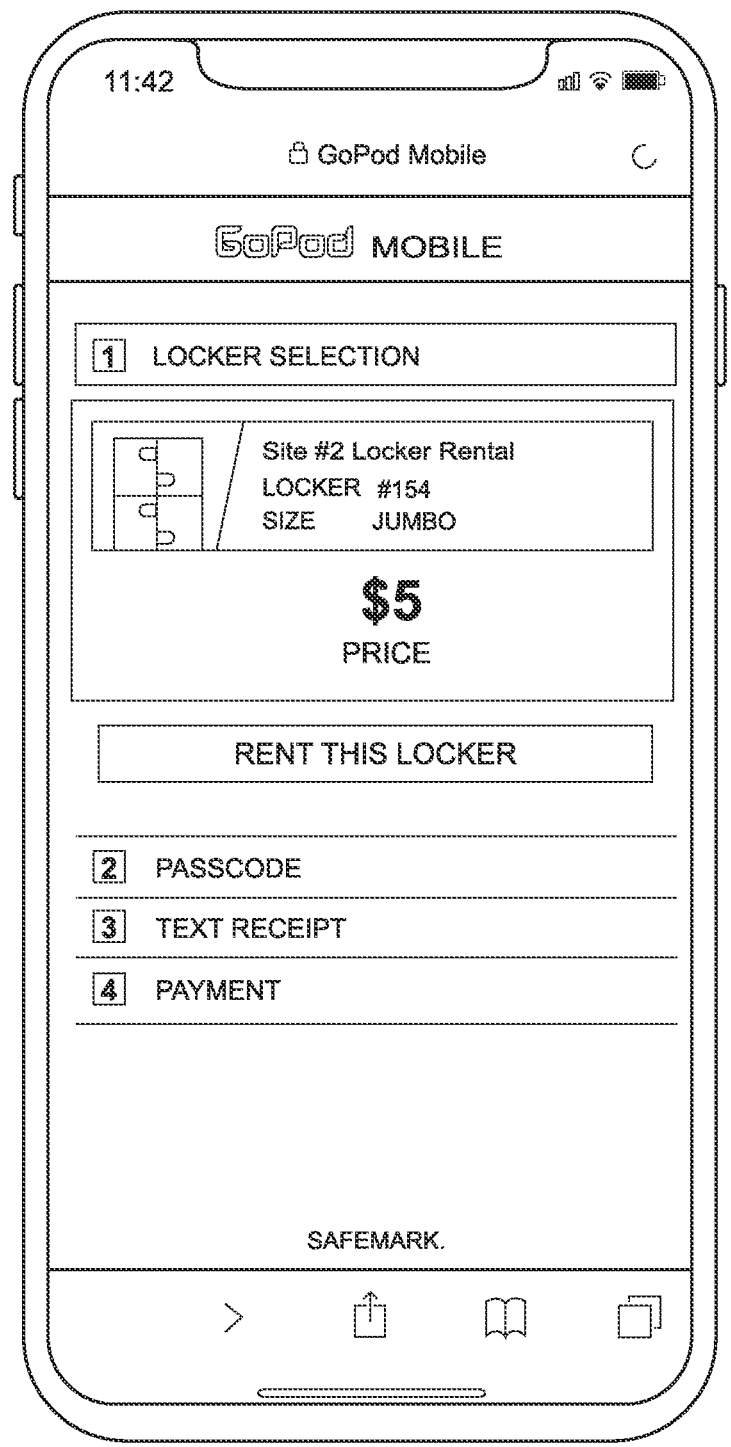
FIG. 56B is a graphical user interface (GUI) screen of the mobile smartphone shown in FIG. 31, deployed on the wireless access control system network of the present invention, and showing the second step in the door-level access control method of the present invention involving the user selecting the "Rent This Locker" Button to rent the scanned and selected locker for a specific time/date (e.g. Locker Rental 1-3 PM), given its specified size and rental price at the Site (i.e. Ride #1) within the Facility.

As indicated at Step B of FIG. 54A, and as shown in FIG. 56B, the mobile smartphone 130 130 deployed on the wireless access control system network is used to practice a door-level access control method by the user selecting the "Rent This Locker" Button to rent the scanned and selected locker for a specific time/date (e.g. Locker Rental: 1-3 PM), given its specified size and rental price at the Site within the Facility.

Figure 56C:
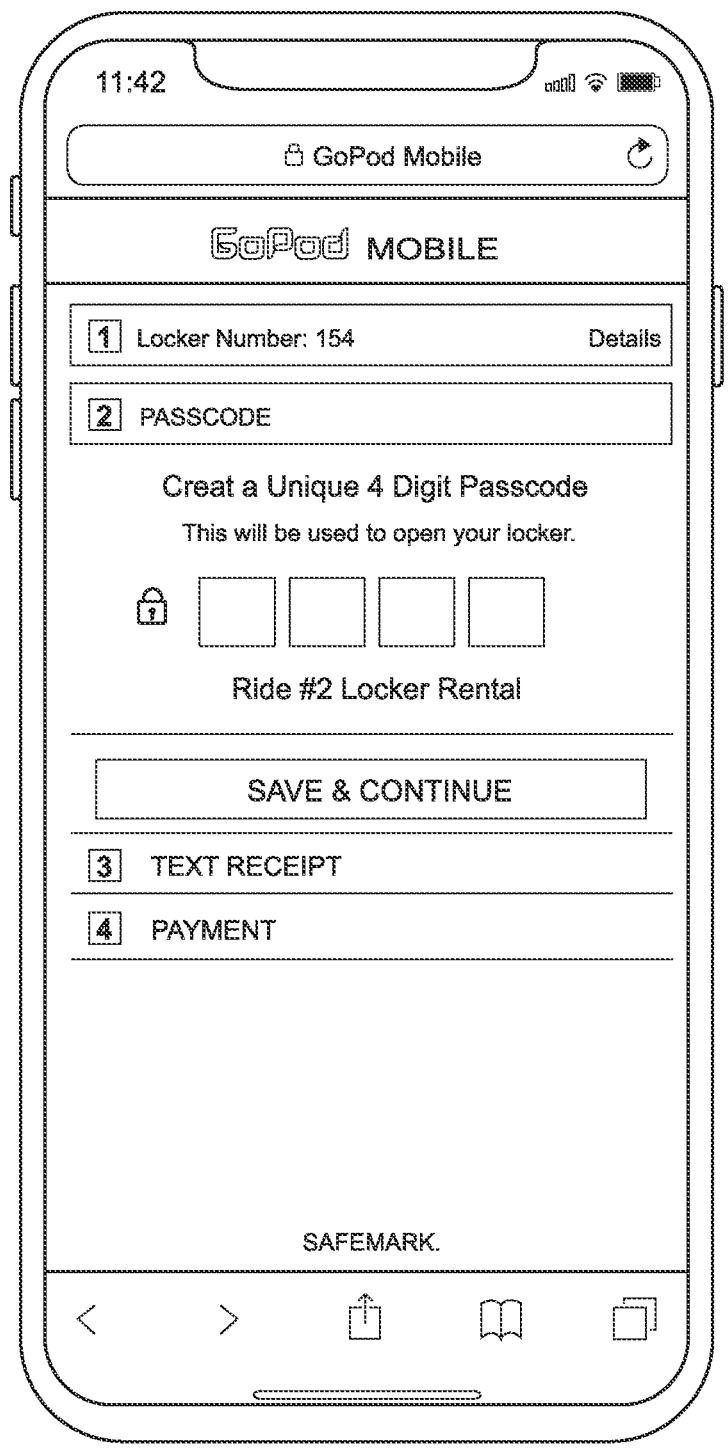
FIG. 56C is a graphical user interface (GUI) screen of the mobile smartphone shown in FIG. 31, deployed on the wireless access control system network of the present invention, and showing the third step in the door-level access control method of the present invention involving the user's selection of four-digit passcode for use in opening the rental locker, and selecting SAVE and CONTINUE to save the request in the RDBMS of the wireless access control system network.

As indicated at Step C of FIG. 54A, and as shown in FIG. 56C, the mobile smartphone 130 deployed on the wireless access control system network to practice a door-level access control method by the user's selection of four-digit passcode for use in opening the rental locker, and selecting SAVE and CONTINUE to save the request in the RDBMS 12C of the wireless access control system network.

Figure 56D:
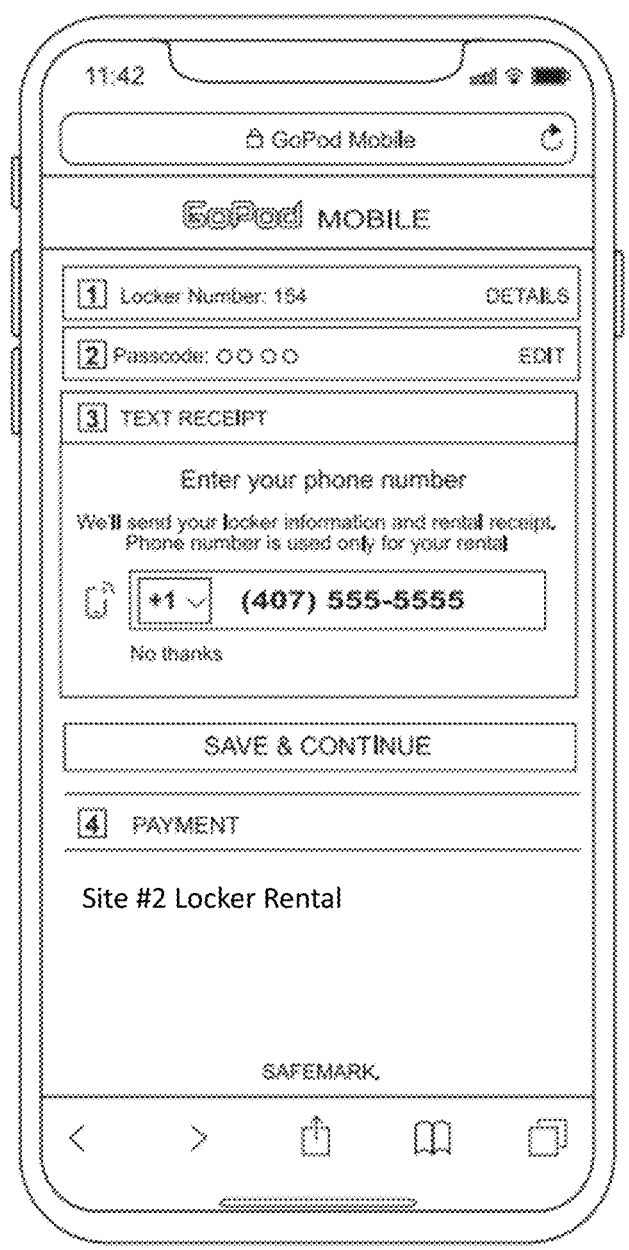
FIG. 56D is a graphical user interface (GUI) screen of the mobile smartphone shown in FIG. 31, deployed on the wireless access control system network of the present invention, and showing the fourth step in the door-level access control method of the present invention displaying the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center.
Figure 56E:
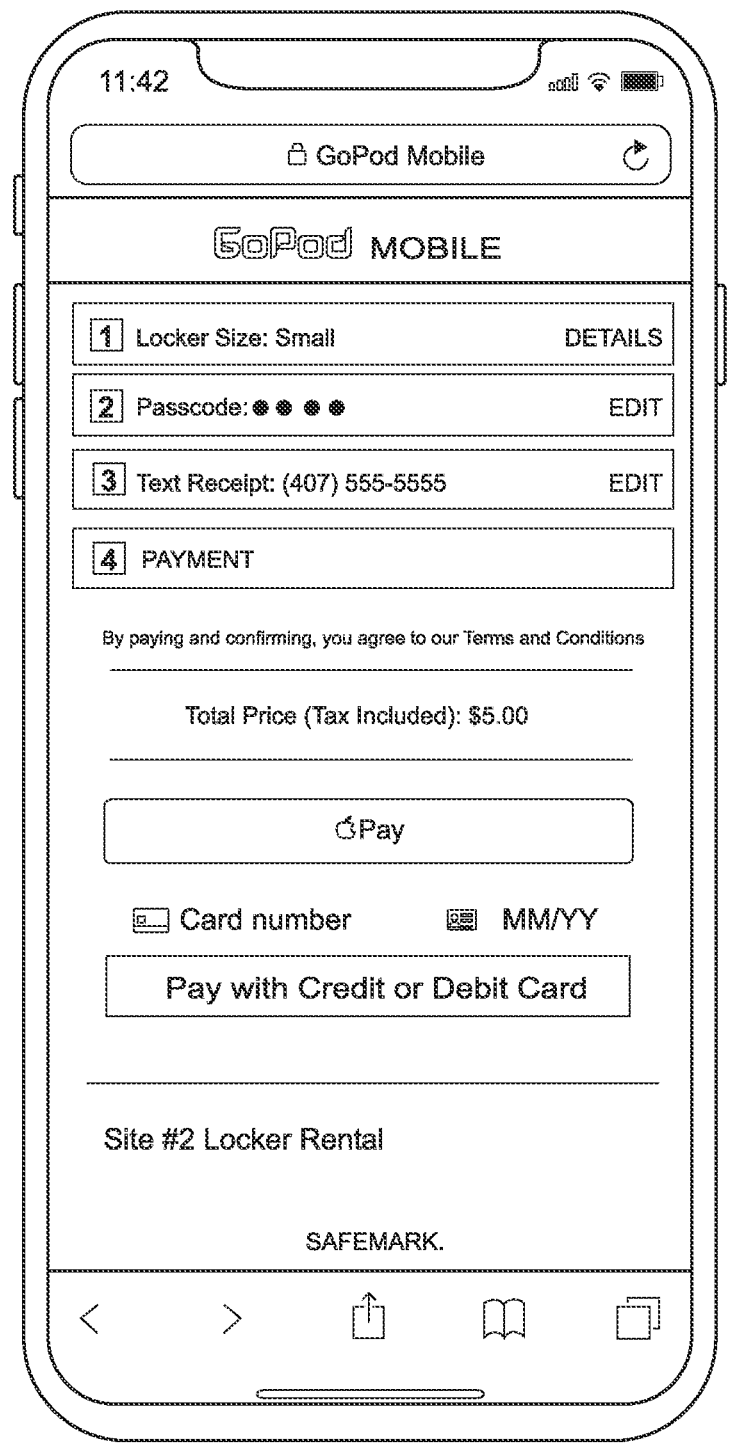
FIG. 56E is a graphical user interface (GUI) screen of the mobile smartphone shown in FIG. 31, deployed on the wireless access control system network of the present invention, and showing the fifth step in the door-level access control method of the present invention displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested)

As indicated at Step D of FIG. 54B, and as shown in FIG. 56D, the mobile smartphone 130 deployed on the wireless access control system network is used to practice a door-level access control method by displaying the selected locker size and user passcode, and entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center 12.

As indicated at Step E of FIG. 54B and as shown in FIG. 40E, using the mobile smartphone 130 deployed on the wireless access control system network 1 is used to practice a door-level access control method by displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested).

Figure 56F:
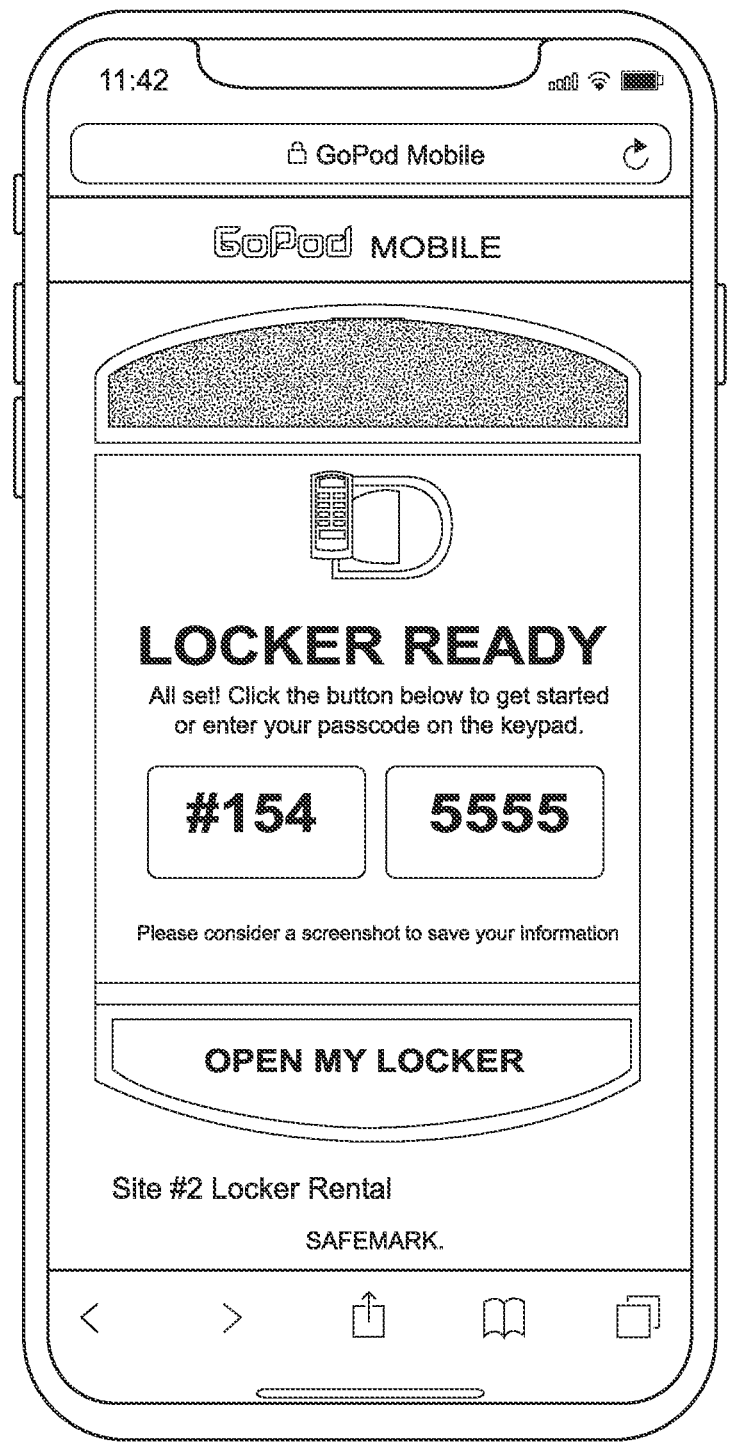
FIG. 56F is a graphical user interface (GUI) screen of the mobile smartphone shown in FIG. 31, deployed on the wireless access control system network of the present invention, and showing the sixth step in the door-level access control method of the present invention displaying, after the prior payment transaction has been successfully completed, a message that the "Locker is Ready", along with the selected locker # and user's passcode, and a Button enabled to "Open My Locker" at its location by the user simply either scanning the Door-Level QR Code on the locker door, or entering the unique passcode into the locker's keypad (where and as provided)
Figure 56G:
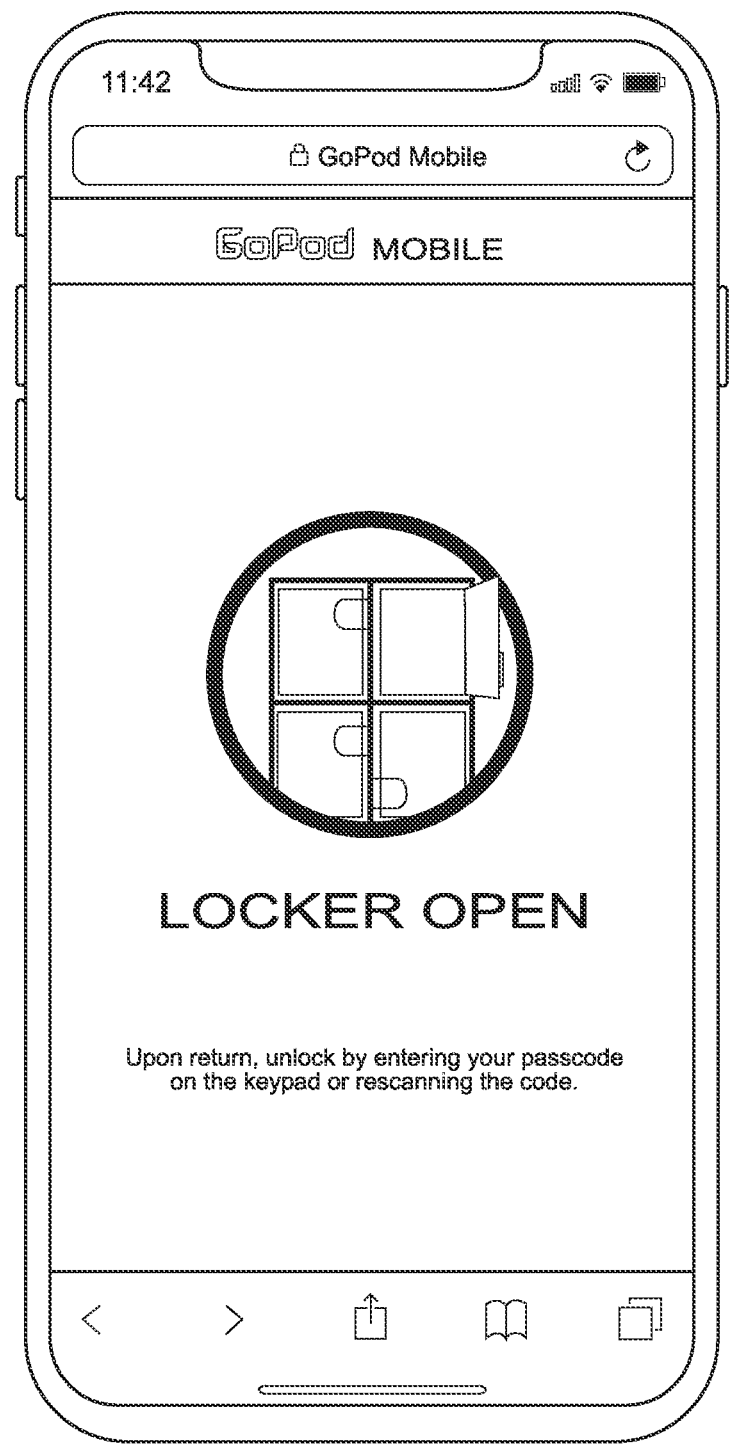
FIG. 56G is a graphical user interface (GUI) screen of the mobile smartphone shown in FIG. 31, deployed on the wireless access control system network of the present invention, and showing the seventh step in the door-level access control method of the present invention displaying, after scanning the Door-Level QR Code or entering the unique passcode into the locker's keypad, a message that the locker is OPEN (and "upon return, unlock the locker by entering the passcode on the keypad or rescanning the Door-Level QR Code"), and an END RENTAL Button for selection by the user to the end the locker rental.

As indicated at Step F of FIG. 54B, and as shown in FIG. 56F, the mobile smartphone 130 deployed on the wireless access control system network 1 is used to practice a door-level access control method by displaying, after the prior payment transaction has been successfully completed, a message that the locker is ready, along with the selected locker # and user's passcode, and a Button enabled to "Open My Locker" at its location by the user simply either scanning the Door-Level QR Code on the locker door, or entering the unique passcode into the locker's keypad, where and as provided.

Specification of the Method of Managing Access Control to a Networked Locker by Scanning the Door-Level QR Code Posted or Displayed on the Locker Deployed within the Amusement Park Facility after the Locker has been Scanned and Rented, Using a Mobile Smartphone Wireless Connected to the Wireless Access Control System Network of the Present Invention FIGS. 54C and 54D describes the primary steps involved when carrying out the method of managing access control to a networked single-sided locker by rescanning Door-Level QR Codes 40C posted or displayed on the door thereof, after the locker has been previously scanned and rented, using a mobile smartphone wireless 130 connected to the wireless access control system network of the present invention 1.

Figure 57:
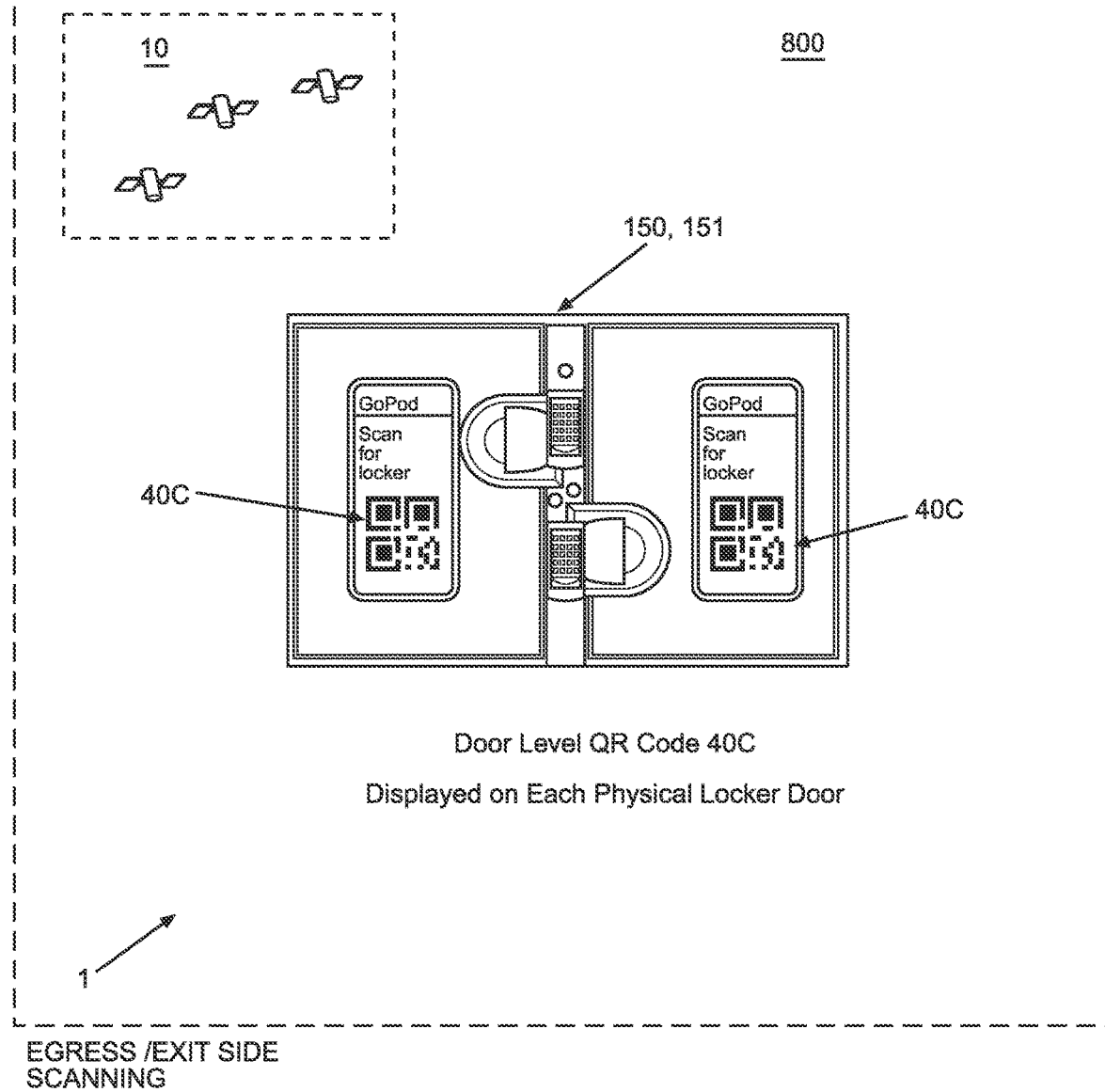
FIG. 57 is a plan view of the Door-Level QR Code physically posted or electrically displayed on the door surface of each locker unit in the GPS-tracked wireless networked locker system illustrated in FIGS. 16, 17, 22, wherein at this most explicit level, Door Level, users are allowed to directly rescan the rented locker door they want to access to remove personal belongings.

FIG. 57 shows the Door-Level QR Code 40C physically posted or electrically displayed on the front door surface of each locker unit in the wireless networked locker system 150 illustrated in FIG. 15, wherein at this most explicit level, Door Level, users are allowed to directly rescan the rented locker door they want to access to remove personal belongings.

The method described and illustrated in FIGS. 54C and 54D is supported by the GUI screens shown in FIG. 58A through 58D.

Figure 58A:
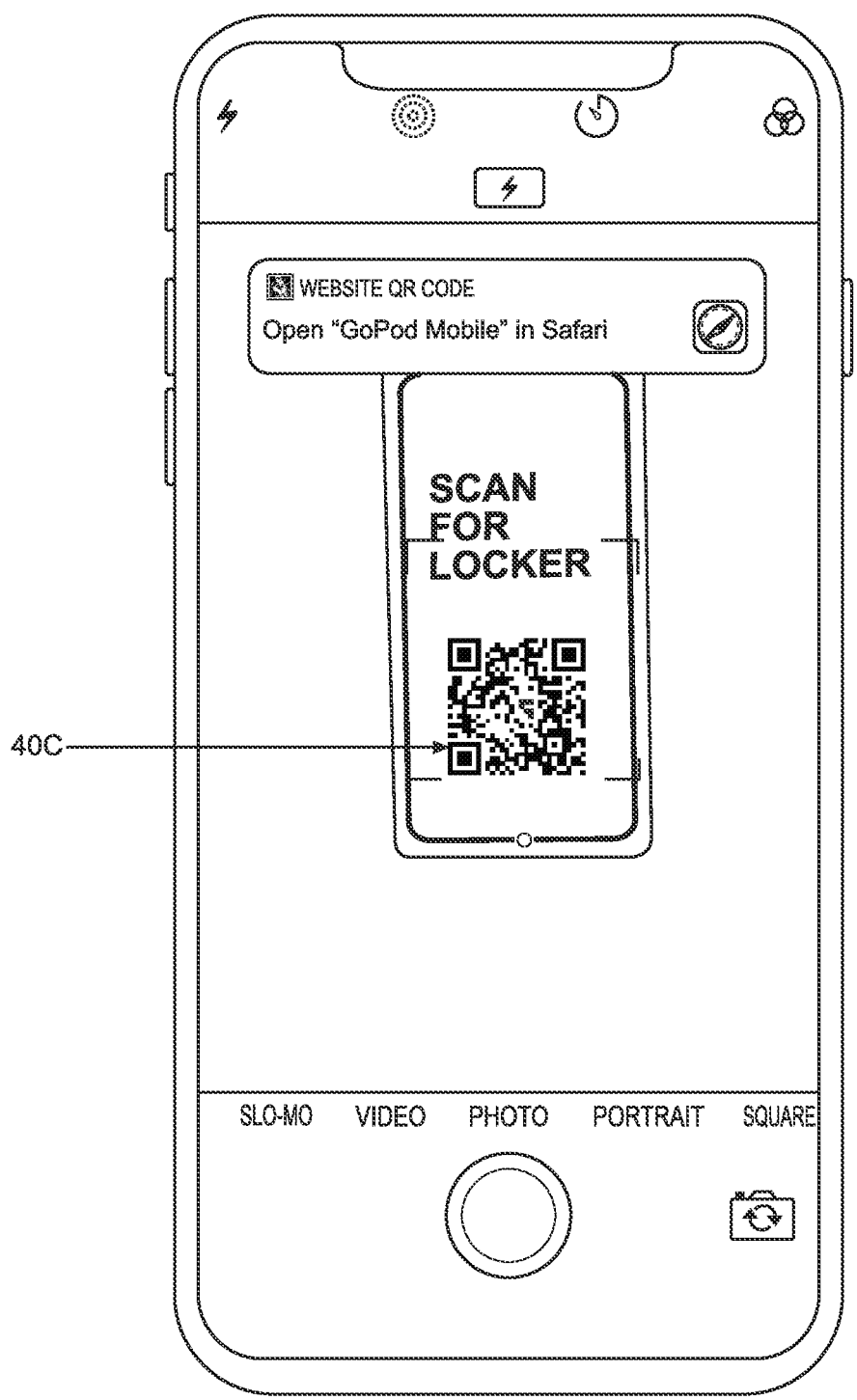
FIG. 58A is a graphical user interface (GUI) screen of the mobile smartphone shown in FIG. 31, deployed on the wireless access control system network of the present invention, and showing the first step in the door-level access control method when entered after completing the door-level access control method described in FIGS. 56A through 456G, involving (i) the scanning of the Door-Level QR code on the rented locker using the user's web-enabled mobile smartphone, as shown in FIGS. 16, 17, 22, (ii) automatically directing the smartphone web-browser application (e.g. Apple Safari) to parse and analyze the scanned QR code and serve, load and display the webpage specified by the URL encoded in the Door-Level QR Code as illustrated in table of FIG. 12, and (iii) executing the access control transaction script for the locker rental transaction identified by the "Rental Transaction Identifier—Door Entry" stored on the phone by the application servers, so as to determine the state of the transaction for the Door-Level Access Control Method.

As indicated at Step G of FIG. 54C, and as shown in FIG. 58A, a mobile smartphone 130 deployed on the wireless access control system network is used to rescan a Door-Level QR Code 40C after scanning the Door-Level QR Code 40C. This is achieved by (i) the scanning of the Door-Level QR code on the rented locker 151 using the user's web-enabled mobile smartphone 130, (ii) automatically directing the smartphone web-browser application to parse and analyze the scanned QR code and serve, load and display the webpage specified by the URL encoded in the Door-Level QR Code on the retrieval/egress side of the rented locker unit, and (iii) executing the access control transaction script for the locker rental transaction identified by the "Rental Transaction Identifier-Door Entry" (e.g. digital token/cookie) stored on the phone by the application servers, so as to determine the state of the transaction for the Door-Level Access Control Method.

Figure 58B:
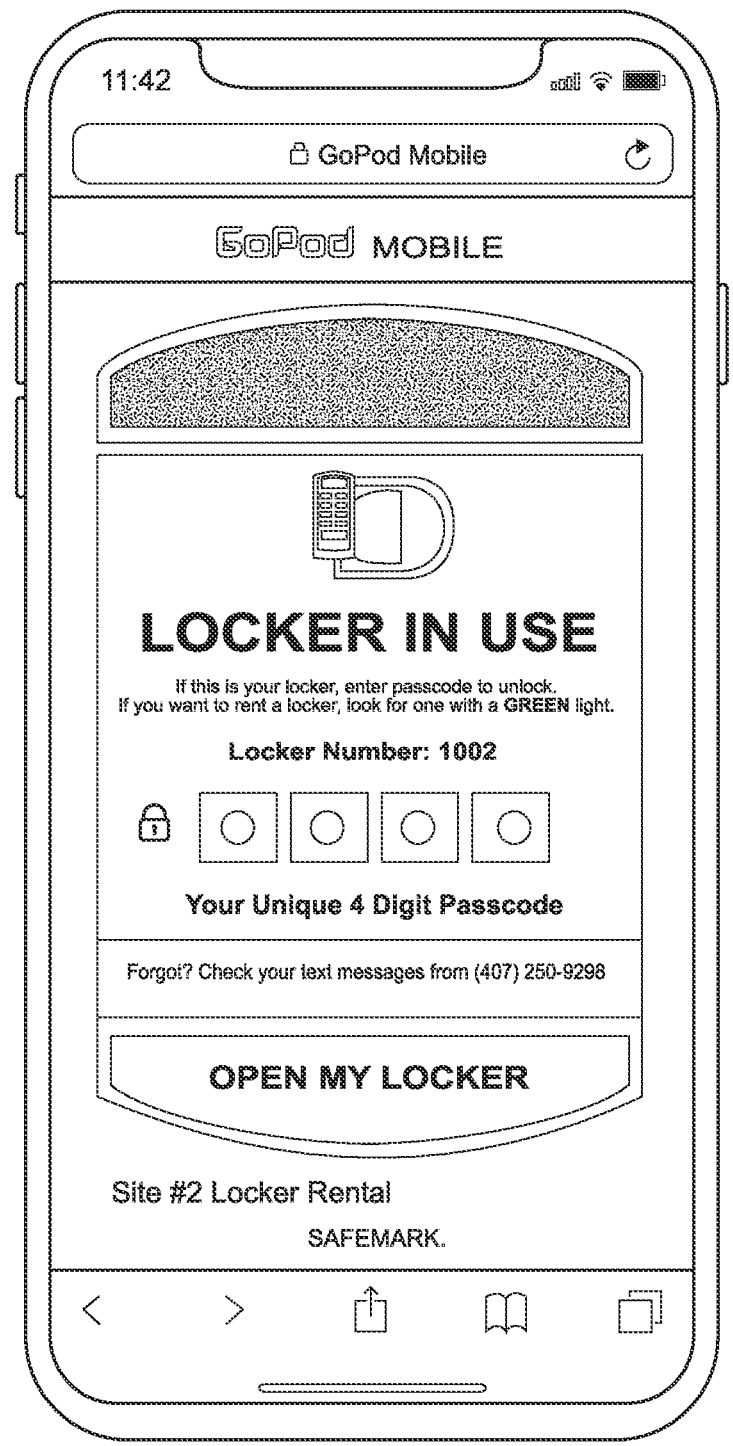
FIG. 58B is a graphical user interface (GUI) screen of the mobile smartphone shown in FIG. 31, deployed on the wireless access control system network of the present invention, and showing the second step in the door-level access control method of the present invention displaying a message that (i) the "Locker Is in Use" (e.g. Locker Number 154), and requesting the user to enter his or her unique 4 digital passcode, and the select the button "OPEN MY LOCKER", and (ii) if the scanned locker is not the guest's rented locker, then the user should look for a locker with a GREEN light indicating it is available for rental.

As indicated at Step H of FIG. 54C, and as shown in FIG. 58B, the mobile smartphone 130 deployed on the wireless access control system network 1 is used to practice a door-level access control method, after completing the door-level access control method, by displaying a message that (i) the "Locker Is in Use" (e.g. Locker Number 154), and requesting the user to enter his or her unique 4 digital passcode, and the select the button "OPEN MY LOCKER", and (ii) if the scanned locker is not the guest's rented locker, then the user should look for a locker with a GREEN light indicating it is available for rental.

Figure 58C:
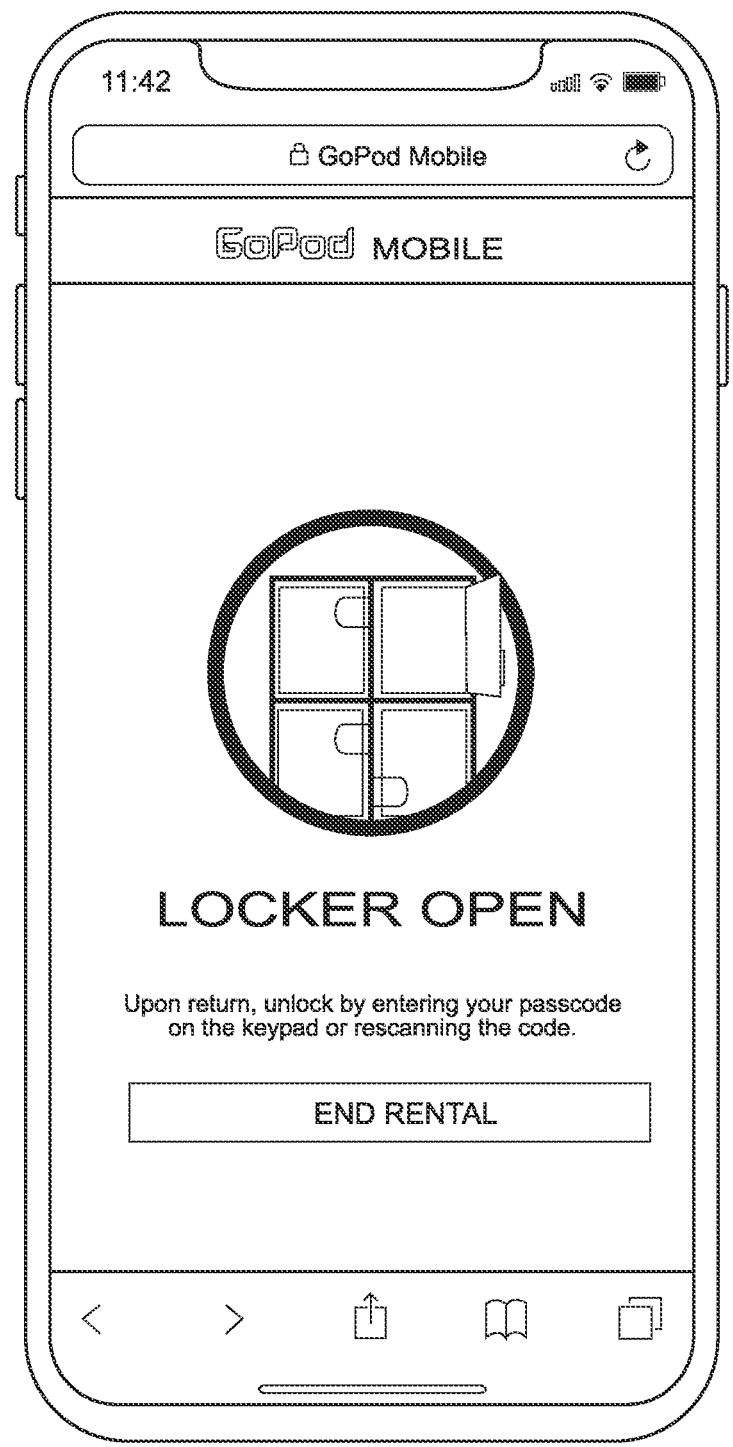
FIG. 58C is a graphical user interface (GUI) screen of the mobile smartphone shown in FIG. 31, deployed on the wireless access control system network of the present invention, and showing the third step in the door-level access control method displaying, after scanning the Door-Level QR Code or entering the unique passcode into the locker's keypad, a message indicating (i) that the "Locker is Open" (and "upon return, unlock the locker by entering the passcode on the keypad or rescanning the Door-Level QR Code") allowing the user to retrieve personal belongings from the storage locker, and (ii) that an END RENTAL Button is displayed and active for selection by the user to the end the locker rental transaction at the Site of the Facility.
Figure 58D:
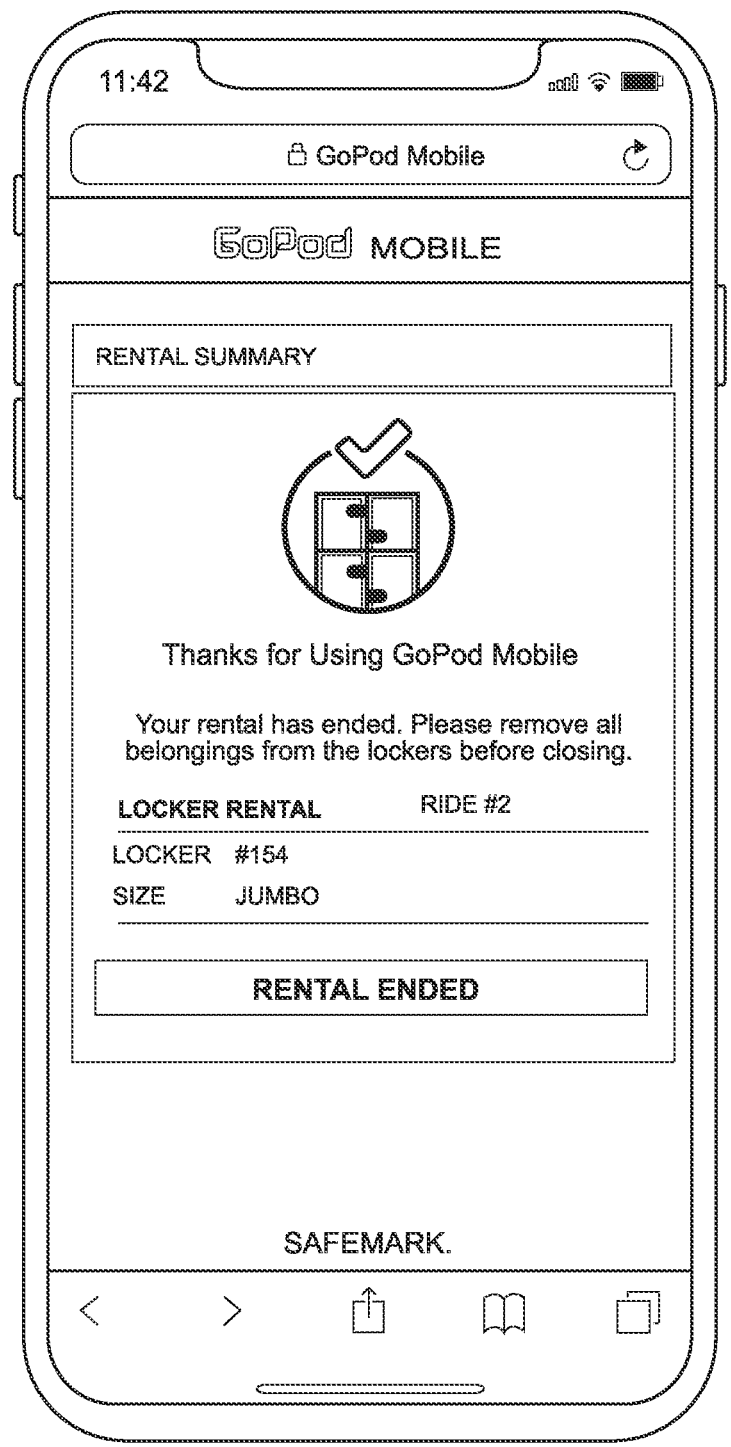
FIG. 58D is a graphical user interface (GUI) screen of the mobile smartphone shown in FIG. 31, deployed on the wireless access control system network of the present invention, and showing the fourth step in the door-level access control method of the present invention displaying a message indicating and confirming the user ended the locker rental, and the user should remove all belongings from the locker before closing the locker.

As indicated at Step I of FIG. 54D, and as shown in FIG. 58C, the mobile smartphone 130 deployed on the wireless access control system network 1 is used to practice a door-level access control method, after scanning the Door-Level QR Code or entering the unique passcode into the locker's keypad, by displaying a message indicating (i) that the "Locker is Open", and upon return, unlocking the locker by entering the passcode on the keypad or rescanning the Door-Level QR Code 40C, and allowing the user to retrieve personal belongings from the storage locker, and (ii) press the displayed END RENTAL Button to the end the locker rental transaction at the Site of the Facility, as indicated at FIG. 58D.

The above-described machine-readable code-driven access control method of the present invention shows how it is now possible to enable wireless rental, access and control to a specified locker (151) in a GPS-specified networked locker system 150 using a web-enabled smartphone 130, to read a Door-Level machine-readable (QR) code symbol to automatically initiate direct communication with the web-based communication/application/database servers maintained with the data center 12 of the wireless system network 1, and conduct the supporting web-based transaction. Each time the code symbol is scanned and the guest user seeks to open a rented locker, as well as an unavailable locker, transaction records of such events are recorded in the RDBMS of the data center 12.

However, during emergencies, when electrical power and/or Internet connectivity are disrupted, the system and method of the present invention allows the guest user to directly enter his or her digital password (e.g. PIN) into the keypad 158 provided on the rented locker unit 151, and locally operate its lock controller (provided with local battery power backup) and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit in locker unit 151, and open the locker door and access one's personal belongings while the locker system is disconnected from the Internet infrastructure and/or during local power disruptions. Details regarding this back-up local access method are disclosed in U.S. Pat. No. 8,990,110, US Patent Application No. US2019/0035186, incorporated herein by reference.

Also, during emergencies, when electrical power and/or Internet connectivity are disrupted, the system and method of the present invention also allows the guest user to locally communicate with the locker controller, through its network adapter and antennas (e.g. using Bluetooth and/or WIFI protocols), to establish a communication session between the mobile smartphone 130 and the rented locker unit 151, and then enter the guest's digital locker password (i.e. PIN) via the virtual keypad (GUI screen) on the mobile smartphone 130, to locally operate its lock controller (provided with local battery power backup), and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit of a rented locker unit 151, and open the locker door and access one's personal belongings while the locker system is disconnected from the Internet infrastructure and/or during local power disruptions.

Method of Renting, Accessing and Controlling a Single-Sided Storage Locker by Scanning a Door-Level QR Code on a Double-Sided Storage Locker to be Rented at a Site, and then Rescanning the QR Code on the Rented Single-Sided Storage Locker FIG. 59 describes the primary data processing steps that take place when practicing the method of renting, accessing and controlling a double-sided storage locker according to the present invention, particularly, when avoiding scanning of Facility-Level QR Codes 40A and Site Level QR Codes 40B, and renting and accessing a single-sided ride storage locker 151 by (i) first scanning a Door-level QR code 40C on a single-sided storage locker to be rented at a site, and (iii) then scanning the Door-Level QR code 40C on the single-sided storage locker of the system as required to access and use the rented storage locker through the day and night at the facility.

While the method summarized above, and described in greater detail below, is a typical use case when using the Door-Level/Door-Level Scanning Methods of the present invention disclosed and claimed herein, there will be other embodiments of this general method that will be adapted to serve the varied needs and requirements of a multitude of applications around the world. Below the illustrative method will be described in greater technical detail with reference to actions undertaken by both the guest and system during the distributed data processing method, using the data elements collected, stored and managed within the database system represented in FIGS. 15, 15A, 15 and 15C, and elsewhere in this Patent Specification.

As indicated at Step 1 of FIG. 59, the method involves the guest user using a Web-Enabled Mobile Phone 130 to scan a Door-Level QR Code posted on the door panel of a single-sided storage locker 151 maintained within the locker cabinet of the locker system 150, for rental by the guest user to store personal belongings often before embarking on a ride or attraction at the Site or within the Facility.

As indicated at Step 2 of FIG. 59, the method involves the system (i.e. system servers 12) automatically generating and storing a Rental Transaction Record and Identifier in the System Database 12 in response to the scanning of the Door-Level QR Code and rental of a Double-Sided Storage Locker 151 offered in the double-sided ride locker system 150 at the Ride Site.

As indicated at Step 3 of FIG. 59, the method involves the system 12 automatically generates and stores a Device Identifier (i.e. Cookie/Digital Token) on the Mobile Phone 130 scanning the Door-Level QR Code. The system then requests the guest to enter his or her Access PIN (e.g. 4 digit code), and then the system automatically assigns a locker # to the guest (though this could be a selection process providing the guest to choose a locker at the Ride Site) and issues the locker rental agreement. The cookie (i.e. digital token) stored on the mobile phone can be randomly generated for the rental transaction, or may be derived from the MAC address of the mobile phone 130, or other digital token generating methods suitable for the purpose at hand to provide a unique and secure identifier for the particular web-enabled mobile phone 130 that was used to scan and read a particular Door-Level QR Code.

As indicated at Step 4 of FIG. 59, the method involves the guest, after the ride experience, exiting from the ride or attraction, on the egress side of the locker system 150, using the Mobile Phone 130 to scan Door-Level QR Code on the Retrieval/Egress Side of the rented Double-sided Locker 151.

As indicated at Step 5 of FIG. 59, the method involves the system automatically reading and updating the Rental Transaction Record and identifier stored in the System Database 12.

As indicated at Step 6 of FIG. 59, the method involves the system automatically reading the Device Identifier (i.e. Cookie) on Mobile Phone 130 used to scan the Door-Level QR Code and the Door-Level QR Code. The system also requests the guest to enter the Access PIN and then determines and displays on the mobile phone display if an extra rental fee is due because the locker rental time went over the agreed to rental limit (i.e. rental time overage).

As indicated at Step 7 of FIG. 59, the method involves the guest then using the Mobile Scanning Phone 130 to access the Rented Storage Locker 151, retrieve belongings therefrom, pay for extra locker rental time if and as required by determined locker rental overage, and then terminates the rental transaction.

As indicated at Step 8 of FIG. 59, the method involves the system automatically reading and updating the Rental Transaction Record and Identifier stored in the System Database, to reflect that the Single-Sided Storage Locker is AVAILABLE for rental and use.

As indicated at Step 19 of FIG. 59, the method involves the system automatically driving the Locker Rental Status Indication Light (LED) 302 on the available Single-Sided Storage Locker 151 to indicate AVAILABILITY Status, for quick recognition by guest users who are searching for a locker to rent at the Site.

These above described data processing operation supported behind the scenes on the system network of the present invention are exemplary in nature and may be practiced differently depending on the particular illustrative embodiment being practiced for any given situation. In the illustrative embodiment described above, the system requested the guest user to provide an access PIN, after scanning a Door-Level QR Code 40C to access a rented single-sided storage locker 151, to provide a form of 2-factor authentication for added security. However, it is understood in alternative embodiments practicing 1-factor authentication, it is possible for the system network to automatically unlock and open a rented locker unit upon the guest user (i) using his or her web-enabled mobile phone to scan and read its Door-Level QR code as described in detail herein, or (ii) manually entering the access PIN via the physical keypad provided on each side door on the rented double-sided locker unit.

Method of Finding a Double-sided Storage Locker Rented Within a Facility by Scanning Any Door-Level QR Code on Any Single-Sided Storage Locker at a Site FIGS. 60A and 60B describe the primary steps involved in carrying out method of finding a double-sided storage locker 151 rented within a facility or at a ride site by scanning a Door-Level QR Code 40C on any double-sided storage locker 151 in a single-sided storage locker system 150 at the site or within the facility.

This process follows parts of the flow described in FIGS. 43A/43B and 53A/53B with additional logic that automatically checks and analyzes the data records reflected in FIGS. 15A, 15B, 15 and 15D to ensure the mobile phone 130 scanning a particular QR code on a single-sided locker 151 is registered/linked with a rental transaction data record, and if not, to automatically generate and send messages to the guest to scan another rented locker within the single-sided locker system 150, or other ride site if the rental data records across a facility suggest the same, in the spirit of accuracy, authenticity and automation.

As indicated at Step 1 of FIG. 60A, the method involves using a Web-Enabled Mobile Phone 130 to scan a Door-Level QR Code 40C posted on a single-sided storage locker in a single-sided locker system 150 installed at a site.

As indicated at Step 2 of FIG. 60A, the method involves generating and storing a Rental Transaction Record and Identifier in the System Database in automated response to the scanning of a Door-Level QR Code 40A and the rental of a Single-Sided Storage Locker 151.

As indicated at Step 3 of FIG. 60A, the method involves the system Automatically generates and stores s Device Identifier (i.e. Cookie/Digital Token) on the Mobile Phone scanning the Facility-Level QR Code; requests guest to enter Access PIN; then assigns locker identified by Locker # and issues a Locker Rental Agreement.

As indicated at Step 4 of FIG. 60A, the method involves after the ride experience, the guest using the Mobile Phone 130 to scan a Door-Level QR Code 40C on the rented Single-Sided Storage Locker, or a Discovery-Level Code 40D posted on a surface accessible on the Single-Sided Locker System 150.

As indicated at Step 5 of FIG. 60A, the method involves the system automatically reading and updating the Rental Transaction Record and Identifier stored in the System Database.

As indicated at Step 6 of FIG. 60A, the method involves the System automatically reading the Device Identifier (i.e. Cookie/Digital Token) on Mobile Phone 130 used to scan the Door-Level QR Code 40A or Discovery-Level QR Code 40D; If the Device (Phone) Identifier does not match the Scanned Locker # in any active Rental Transaction Records in the System Database, then the System automatically displays a message on the Phone Display: "Oops, You Scanned the Wrong Locker, Try Scanning Locker #"; If the Device (Phone) Identifier does match the Scanned Locker # in an active Rental Transaction Record in the System Database, then the System requests the Guest to enter its Access PIN, and automatically determines and displays on Mobile Phone Display 130 if Extra Rental Fee is due to any Locker Rental Time Overage.

FIG. 42E shows an exemplary GUI screen of the mobile smartphone 130, when operating in Automated Locker Discovery mode, displaying a message on the guest's mobile phone, similar to the message reflected in Step 6 of FIG. 60A, indicating that an incorrect locker was scanned and that the guest should scan a different specified locker identified in the message to open the correct rented locker and store (or retrieve) personal belongings from the ingress side of the single-sided storage locker system.

At Step 6, the logic applied there provides for two possible flow paths, indicated as Path A and Path B respectively, depending on the facts determined at that stage of the process. Flow Path A includes Blocks indicated by 7A, 8A, 9A, whereas Flow Path B includes Blocks indicated by 7B, 8B, 9B, 10B, 11B and 12B. The steps in these two Flow Paths A and B will be described in detail below.

FIG. 42F shows an exemplary GUI screen of the mobile smartphone 130, when operating in Automated Locker Discovery mode, displaying a message on the guest's mobile phone, similar to the message reflected in Step 6 in FIG. 60A, indicating that an incorrect locker was scanned and that the guest should scan a different specified locker identified in the message to open the correct rented locker and retrieve personal belongings.

As indicated at Step 7A of FIG. 60A, the method along Flow Path A involves, the Guest using the Mobile Scanning Phone 130 to pay for Extra Time if and as required, and terminate the Rental Transaction; guest removes personal belongings from the Locker, and terminates the Locker Rental.

As indicated at Step 8A of FIG. 60A, the method involves the system automatically reading and updating the Rental Transaction Record and Identifier stored in the System Database, to reflect that the Dual-Sided Storage Locker 151 is AVAILABLE for Rental.

As indicated at Step 9A of FIG. 60B, the method involves the system automatically driving Locker Status Indication Light (LEDS) on the Available Single-Sided Storage Locker 151 to indicate AVAILABILITY Status. This completes Flow Path A.

As indicated at Step 7B of FIG. 60B, the method involves along Flow Path B, Guest using the Mobile Phone 130 to scan Door-Level QR Code 40C on the rented Single-Sided Locker 151.

As indicated at Step 8B of FIG. 60B, the method involves the system automatically reading and updating the Rental Transaction Record and Identifier stored in the System Database.

As indicated at Step 9B of FIG. 60B, the method involves the system automatically reading the Device Identifier (i.e. Cookie/Digital Token) on Mobile Phone 130 used to scan the Door-Level QR Code 40C or Discovery-Level QR Code 40D; If the Device (Phone) Identifier does not match the Scanned Locker # in any active Rental Transaction Records in the System Database, then the System automatically displays a message on the Phone Display: "Oops, You Scanned the Wrong Locker, Try Scanning Locker #245"; If the Device (Phone) Identifier does match the Scanned Locker # in an active Rental Transaction Record in the System Database, then the system requests the guest to enter its Access PIN, and determines and displays on Mobile Phone Display 130 if Extra Rental Fee is due to Any Locker Rental Time Overage.

As indicated at Step 10B of FIG. 60B, the method involves the guest using the Mobile Scanning Phone 130 to pay for Extra Rental Time if and as required, and terminate the Rental Transaction; guest removes belongings from locker, and terminates locker rental.

As indicated at Step 11B of FIG. 60B, the method involves the system automatically reading and updating the Rental Transaction Record and Identifier stored in the System Database, to reflect that the Dual-Sided Storage Locker is AVAILABLE for rental.

As indicated at Step 12B of FIG. 60B, the method involves the system automatically driving the Locker Status Indication Light (LED) on the Available Dual-Sided Storage Locker to indicate AVAILABILITY Status. This completes Flow Path B.

Alternatively, the present invention provides novel methods of finding a single-sided storage locker 151 rented within a facility or at a ride site by scanning a specially-programmed code, called a Discovery-Level QR Code 40D, as shown in FIGS. 11B and 12. Typically, this special-function QR Code 40D is posted on the single-sided storage locker system 150 of the present invention, as shown in FIGS. 15, 16, 17, 19A, 19B, and 22. As illustrated in FIGS. 11B and 12, the Discovery-Level QR Code is encoded with (i) a URL pointing to a server location in the data center 12 which runs a script as generally described in FIGS. 60A and 60B. This Code may also embed a unique code indicating where the Discovery-Level QR Code 40D has been installed within a particular Facility or at particular Site in a Facility, as the case may be, for marketing, performance and other purposes.

FIG. 42G shows a GUI screen of the mobile smartphone 130 operating in an Automated Locker Discovery Mode of the system 1, wherein, after a mobile phone 130 scans a Discovery-Level QR Code 40D posted on the ingress side of the single-sided storage locker system, as shown in FIG. 15, the system servers automatically process the rental transaction data records schematically illustrated in FIG. 15C, and automatically serve and display a message on the guest's mobile phone 130 indicating that the guest has rented a specified locker #, located at a particular location, which can be opened by scanning the Door-Level QR Code 40C, and storing personal belongings from the ingress side of the single-sided storage locker system 150.

FIG. 42H shows a GUI screen of the mobile smartphone 130 operating in an Automated Locker Discovery Mode of the system 1, wherein, after a mobile phone scans a Discovery-Level QR Code 40D posted on the egress side of the single-sided storage locker system, as shown in FIG. 15, the system servers automatically process the rental transaction data records schematically illustrated in FIG. 15C, and automatically serve and display a message on the guest's mobile phone 130 indicating that the guest has rented a specified locker #, located at a particular location, which can be opened by scanning the Door-Level QR Code 40C, and retrieving personal belongings from the rented locker in the storage locker system 150.

Driving GPS-Driven Commerce Applications

As described and illustrated above, any guest who rents a double-sided locker can request to receive SMS/text and/or email offers and notifications throughout the day, on a specified mobile smartphone number. Such concierge-like platform supported services can then use GPS information collected by the GPS-tracked thing to help locate, identify and suggest particular and useful/valuable goods and/or services to guests that are available for purchase/rental and consumption at particular site locations in the amusement park facility.

Also the GPS-tracking wireless platform of the present invention described herein can also enable vendors and service providers to provide and deliver specific goods and/or services to the guests at their current location in the amusement park, and even send notifications, directions and digital mobile facility maps on the mobile phones of guest visitors to facilitate service delivery while guests are freely moving around the park or other environment.

Further Advantages of Provided by Various Aspects of the Present Invention

The wireless networked single-sided lockers of the present invention shown and described herein, will provide additional insight and great value, namely: real-time, updateable accurate database of rather expensive locker assets—offering with certainty the location and count of our cabinets that have been distributed throughout America and the world; real-time visibility with the push of a button; Aids in mapping functions without the need to program/go through data entry.

The modular portable wireless networked locker systems of the present invention will provide many advantages: they require no wires and are highly movable; they offers a great solution to temporary or event-based locker systems, as witnessed by the current COVID-19 pandemic, where temporary hospitals were set up in convention centers and lockers were added; and support large venues like stadiums whom want lockers only for concerts; where dormant lockers cannot be afforded for the 60 or 70% of days when no event is happening. Banks of lockers can be brought in and all typical services can be offered automatically: Inventory; Location; and Find-my-locker (e.g. guest-facing applications)

Modifications of the Illustrative Embodiments of the Present Invention

The present invention has been described in great detail with reference to the above illustrative embodiments. It is understood, however, that numerous modifications will readily occur to those with ordinary skill in the art having had the benefit of reading the present disclosure.

While electronic payment systems were disclosed in the illustrative embodiments, for use in paying for rental and purchase agreements, it is understood that non-banking based credit/debit card payment systems, can be used, including but not limited to reimbursement, trading and/or barter systems. Such alternative value-based systems can include, for example, BITCOIN, tokens, and diverse forms of social-based value and/or economic credit in current used, or to be devised and used among people in the future.

While electronic-ink display systems have been disclosed herein because of their low power consumption and excellent performance in high-brightness outdoor environments, it is understood that any electronic visual display technology employing any display medium, including liquid crystal displays (LCDs), plasma, as well as electronic-ink, display media can be used to practice the information display aspects of the present invention.

While web-based mobile smartphones have been the preferred technology for reading machine-readable codes applied to the facility, site and device/thing levels, in accordance with the principles of the present invention, it is understood that web-enabled body-mounted computing devices, such as Apple® and Samsung® smartwatches can be used to practice the methods of the present invention. Also, it is understood that these code symbol scanning methods can involve using code reading devices that are separate systems from the web-enabled computing systems that support the transactions between the consumer and vendors/service providers who provide the articles that might be then accessed and controlled using the wireless system network of the present invention.

While GPS-tracking has been integrated into the core services of the wireless access and control system network 1 of the present invention disclosed herein, for use in GPS-tracking of articles and things that are rented, leased or even purchased, it is understood that not all transactions supported and services provided by the wireless system network of the present invention (i.e. "the Platform") will require GPS-tracking, while employing mobile communication devices 130 to support transactions and methods of access and control, as taught herein.

Also, in alternative embodiments of the present invention described hereinabove, the system can be realized as a stand-alone application, or integrated as part of larger system networks. Such alternative system configurations will depend on particular end-user applications and target markets for products and services using the principles and technologies of the present invention.

These and all other such modifications and variations are deemed to be within the scope and spirit of the present invention as defined by the accompanying Claims to Invention.

The invention claimed is:

1. A method of automatically finding a storage locker rented by a guest within a facility having one or more sites with a plurality of storage lockers deployed at the sites within said facility for storage of personal belongings of guests, said method comprising the steps of:
   (a) a guest using a web-enabled mobile phone for scanning a facility-level machine-readable code displayed on any scannable surface posted within the facility, a site-level machine-readable code posted at a site within said facility, or a door-level machine-readable code posted on a storage locker at the site within the facility, and in response to said scanning operations, automatically renting the storage locker for storage of personal belongings within the facility;
   (b) said guest using said web-enabled mobile phone for scanning one of said machine-readable codes within said facility, and automatically processing said scanned machine-readable code in an information server operably connected to a wireless network deployed within said facility supporting said one or more sites; and
   (c) in response to said machine-readable code processing operations in step (b), automatically displaying on said web-enabled mobile phone of said guest, the identity and location of the storage locker which is being actively rented by the guest within said facility using said web-enabled mobile phone, for the convenience of the guest without the use of or need for an external look-up kiosk.

2. The method of claim 1, wherein each said storage locker comprises a single-sided storage locker.

3. The method of claim 1, wherein said machine-readable codes comprise facility-level QR codes assigned to said facility, site-level QR codes assigned to specific sites within said facility, and door-level QR codes assigned to specific storage lockers for rental within said facility.

4. A method of automatically finding a storage locker rented by a guest within a facility having one or more sites with a plurality of storage lockers deployed at the sites within said facility for storage of personal belongings of guests, said method comprising the steps of:
   (a) a guest using a web-enabled mobile phone for scanning a facility-level machine-readable code displayed on any scannable surface posted within the facility, a site-level machine-readable code posted at a site within said facility, or a door-level machine-readable code posted on a storage locker at the site within the facility, and in response to said scanning operations, automatically renting the storage locker for storage of personal belongings within the facility;
   (b) said guest using said web-enabled mobile phone for scanning a discovery-level machine-readable code displayed or posted anywhere within said facility, and automatically processing said scanned discovery-level machine-readable code in an information server operably connected to a wireless network deployed within said facility supporting said one or more sites; and
   (c) in response to said machine-readable code processing operations in step (b), automatically displaying on said web-enabled mobile phone of said guest, the identity and location of the storage locker which is being actively rented by the guest within said facility using said web-enabled mobile phone, for the convenience of the guest without the use of or need for an external look-up kiosk.

5. The method of claim 4, wherein each said storage locker comprises a single-sided storage locker.

6. The method of claim 4, wherein said machine-readable codes comprise facility-level QR codes assigned to said facility, site-level QR codes assigned to specific sites within said facility, door-level QR codes assigned to specific storage lockers for rental within said facility, and discovery-level QR codes assigned to said facility.

7. A wireless storage locker system installed within a facility having one or more sites with storage lockers available for rental by guests for storing personal belongings, said wireless storage locker system comprising:
   a plurality of storage lockers deployed at the sites within said facility for storage of personal belongings of guests;

a wireless communication and computing infrastructure deployed within said facility; and a plurality of web-enabled mobile phones operably connected to said wireless communication and computing infrastructure, for use by said guests within said facility;

wherein each said web-enabled mobile phone is configured for use by a guest within the facility for (a) carrying out a rental transaction involving a specific storage locker within said facility such that a door-level machine-readable code uniquely assigned to and displayed on said rented storage locker is automatically linked to said web-enabled mobile phone during said rental transaction, and (b) thereafter automatically finding and locating the rented storage locker at a site within said facility by the guest using said web-enabled mobile phone, previously used to rent said storage locker during the rental transaction, to (i) scan any machine-readable code posted anywhere within the facility, (ii) communicate with one or more information servers supported on said wireless communication and computing infrastructure, and (iii) automatically display on said web-enabled mobile phone, the identity and location of the rented storage locker within the facility, for the convenience of the guest without the use of an external look-up kiosk.

8. The wireless storage locker system of claim 7, wherein each said storage locker comprises a single-sided storage locker.

9. The wireless storage locker system of claim 7, wherein said machine-readable codes comprise facility-level QR codes assigned to said facility, site-level QR codes assigned to specific sites within said facility, and device-level QR codes assigned to specific storage lockers for rental within said facility.

* * * * *